(12) United States Patent
Cohen

(10) Patent No.: US 12,016,486 B2
(45) Date of Patent: Jun. 25, 2024

(54) METHODS AND APPARATUS FOR AUTOMATED FOOD PREPARATION

(71) Applicant: innoNovo LLC, Dallas, TX (US)

(72) Inventor: Adam Cohen, Dallas, TX (US)

( * ) Notice: Subject to any disclaimer, the term of this patent is extended or adjusted under 35 U.S.C. 154(b) by 0 days.

(21) Appl. No.: 17/026,097

(22) Filed: Sep. 18, 2020

(65) Prior Publication Data

US 2021/0100396 A1 Apr. 8, 2021

Related U.S. Application Data

(63) Continuation of application No. 16/182,563, filed on Nov. 6, 2018, now abandoned, which is a continuation-in-part of application No. PCT/US2017/060253, filed on Nov. 6, 2017, and a continuation-in-part of application No. 15/805,074, filed on Nov. 6, 2017, now abandoned.

(60) Provisional application No. 62/724,019, filed on Aug. 28, 2018, provisional application No. 62/670,043, filed on May 11, 2018, provisional application No. 62/588,913, filed on Nov. 20, 2017, provisional application No. 62/522,671, filed on Jun. 20, 2017, provisional application No. 62/471,957, filed on Mar. 15, 2017, provisional application No. 62/456,008, filed on Feb. 7, 2017, provisional application No. 62/417,336, filed on Nov. 4, 2016.

(51) Int. Cl.
*B65D 83/00* (2006.01)
*A47J 36/32* (2006.01)
*A47J 44/00* (2006.01)
*B65D 75/38* (2006.01)
*B65D 77/04* (2006.01)

(52) U.S. Cl.
CPC ............... *A47J 36/32* (2013.01); *A47J 44/00* (2013.01); *B65D 75/38* (2013.01); *B65D 77/04* (2013.01); *B65D 83/0055* (2013.01)

(58) Field of Classification Search
None
See application file for complete search history.

(56) References Cited

U.S. PATENT DOCUMENTS

| 3,482,718 | A | 12/1969 | Moriarty | |
| 6,568,533 | B1 * | 5/2003 | Tanaka | B65D 75/5855 206/530 |
| 2008/0063325 | A1 * | 3/2008 | Miller | B65D 75/20 383/211 |
| 2017/0158369 | A1 | 6/2017 | Dopfer | |

* cited by examiner

*Primary Examiner* — Viren A Thakur
*Assistant Examiner* — Thanh H Nguyen

(57) ABSTRACT

Methods and apparatus for automatically preparing food for consumption in which preparation comprises dispensing, manipulation, heating, and other operations using a wide variety of ingredients. The methods and apparatus described use ingredients efficiently and maintain their quality, while avoiding contact between ingredients and apparatus to minimize the risk of system contamination.

9 Claims, 75 Drawing Sheets

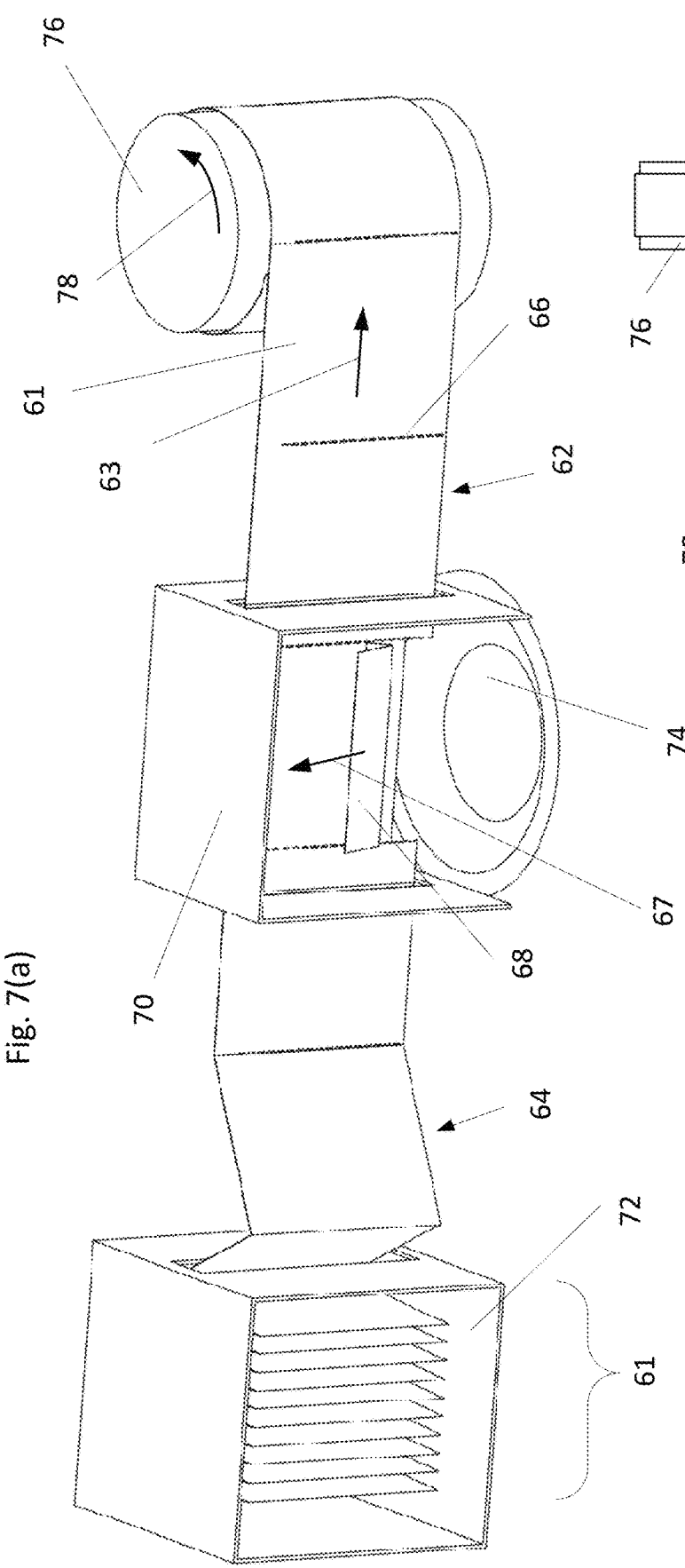
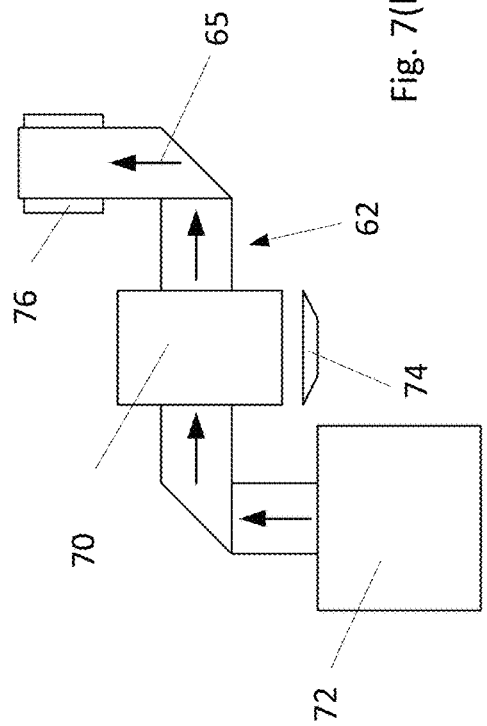
Fig. 7(a)
Fig. 7(b)

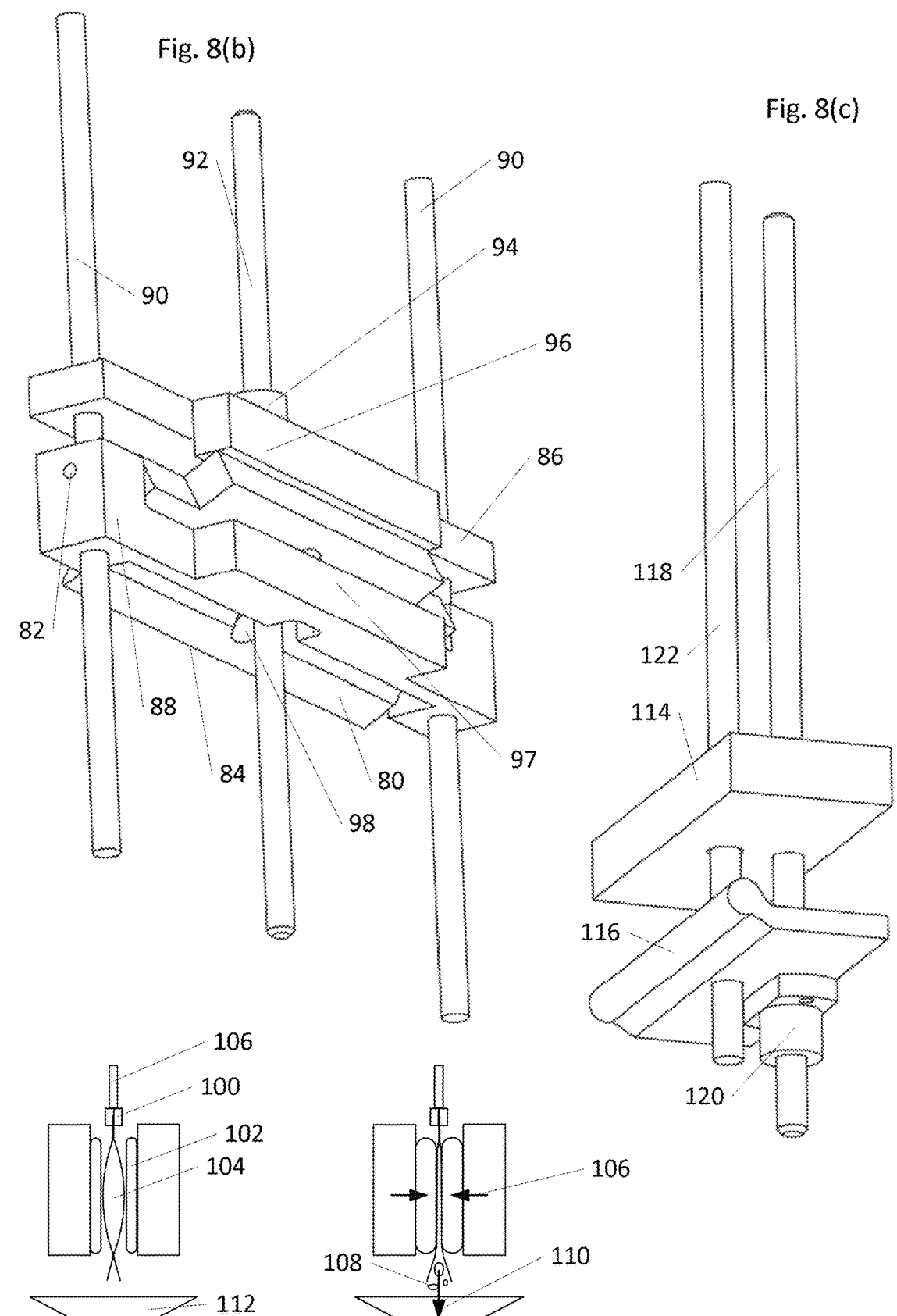

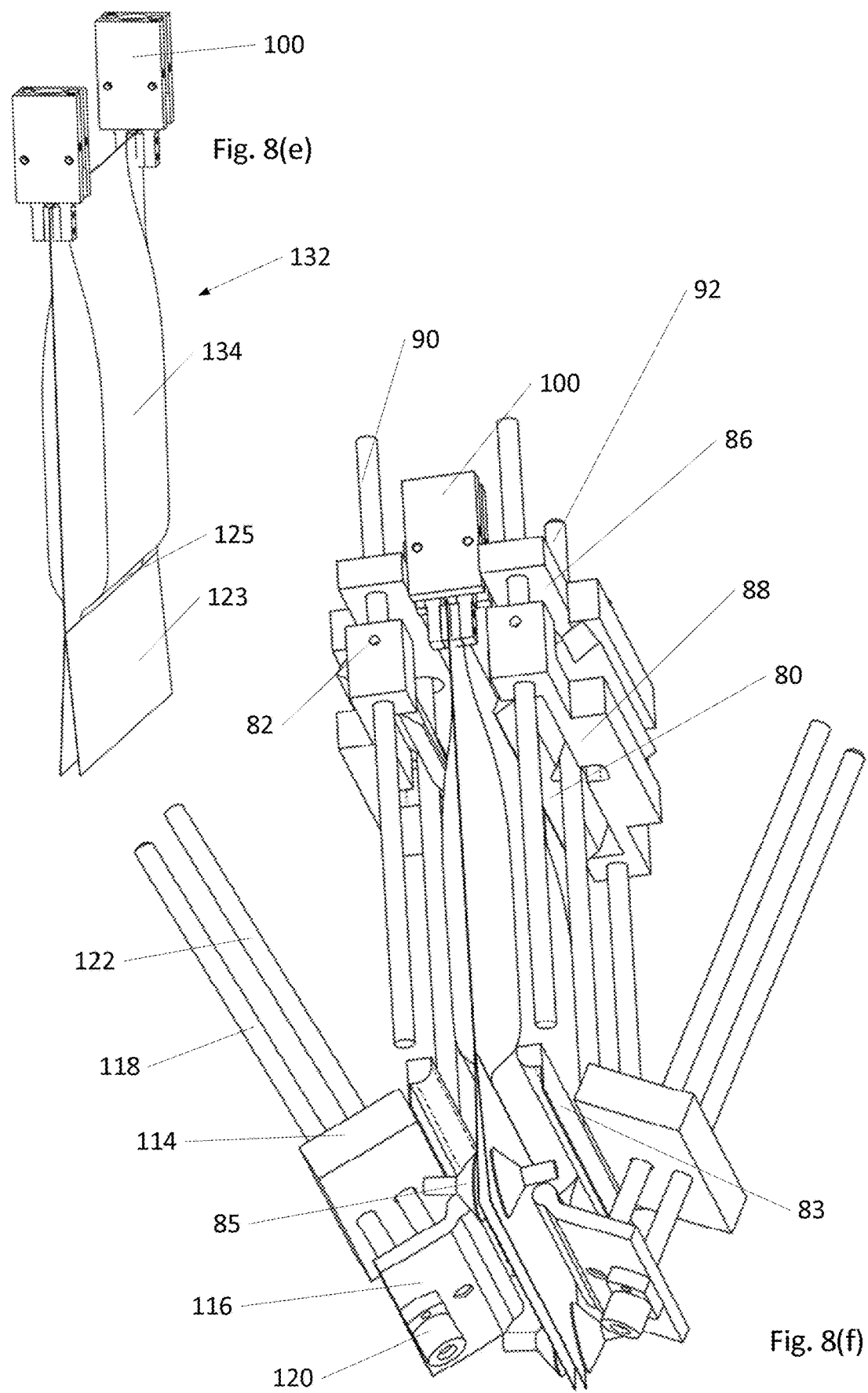

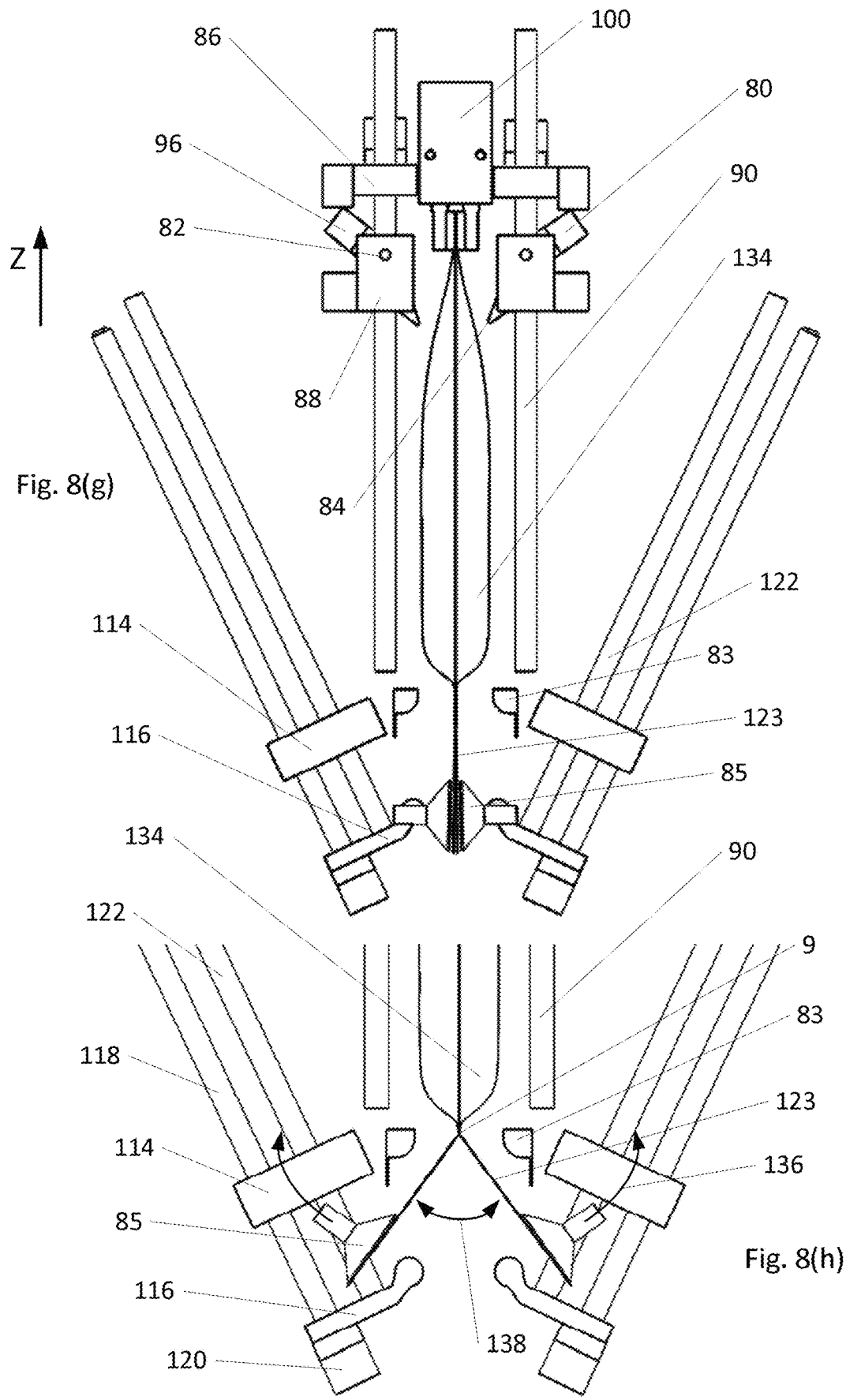

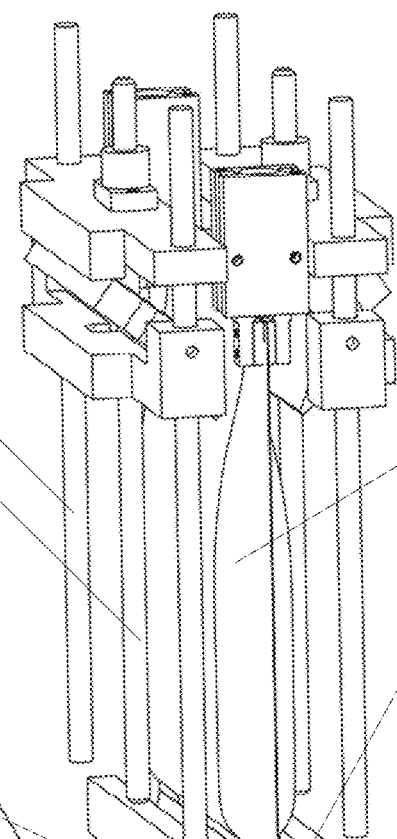
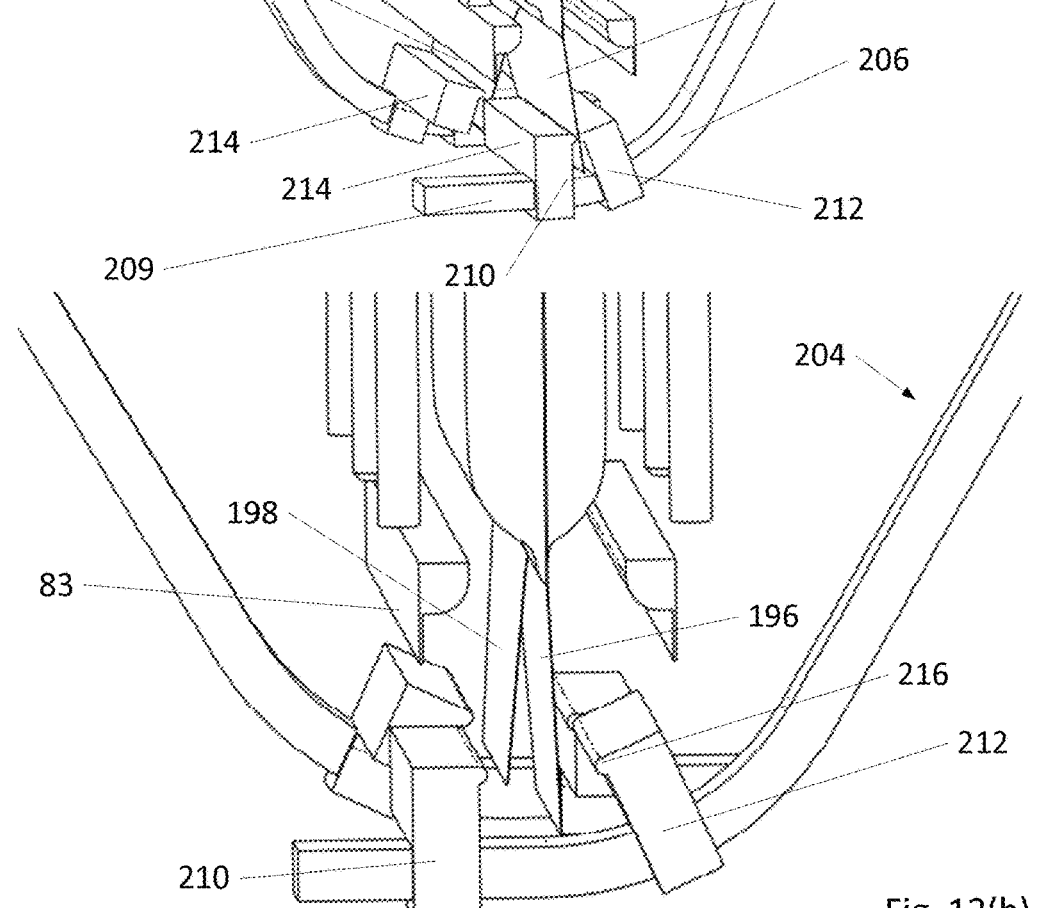
Fig. 13(a)
Fig. 13(b)

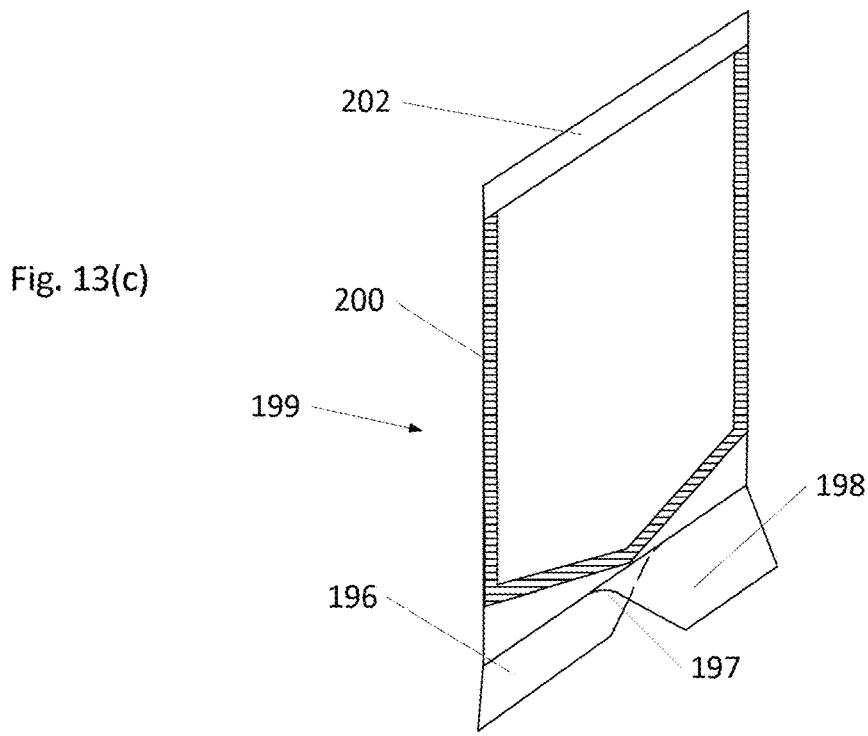

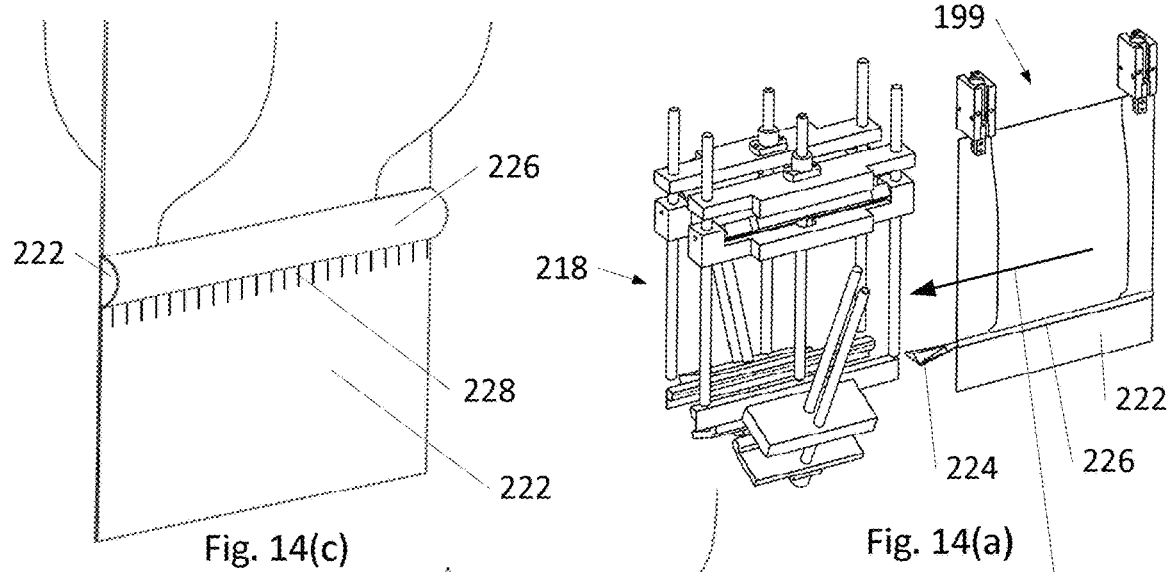
Fig. 14(c)
Fig. 14(a)
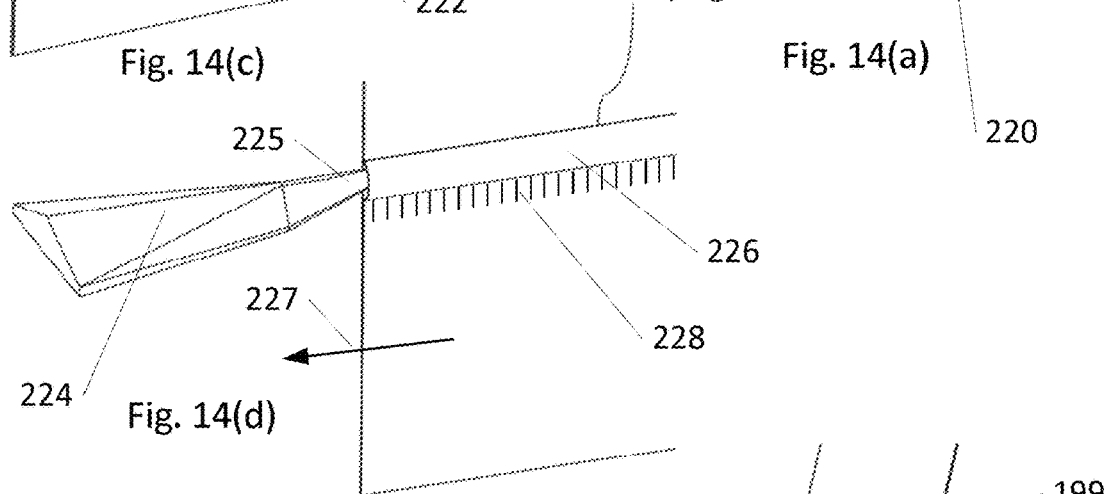
Fig. 14(d)
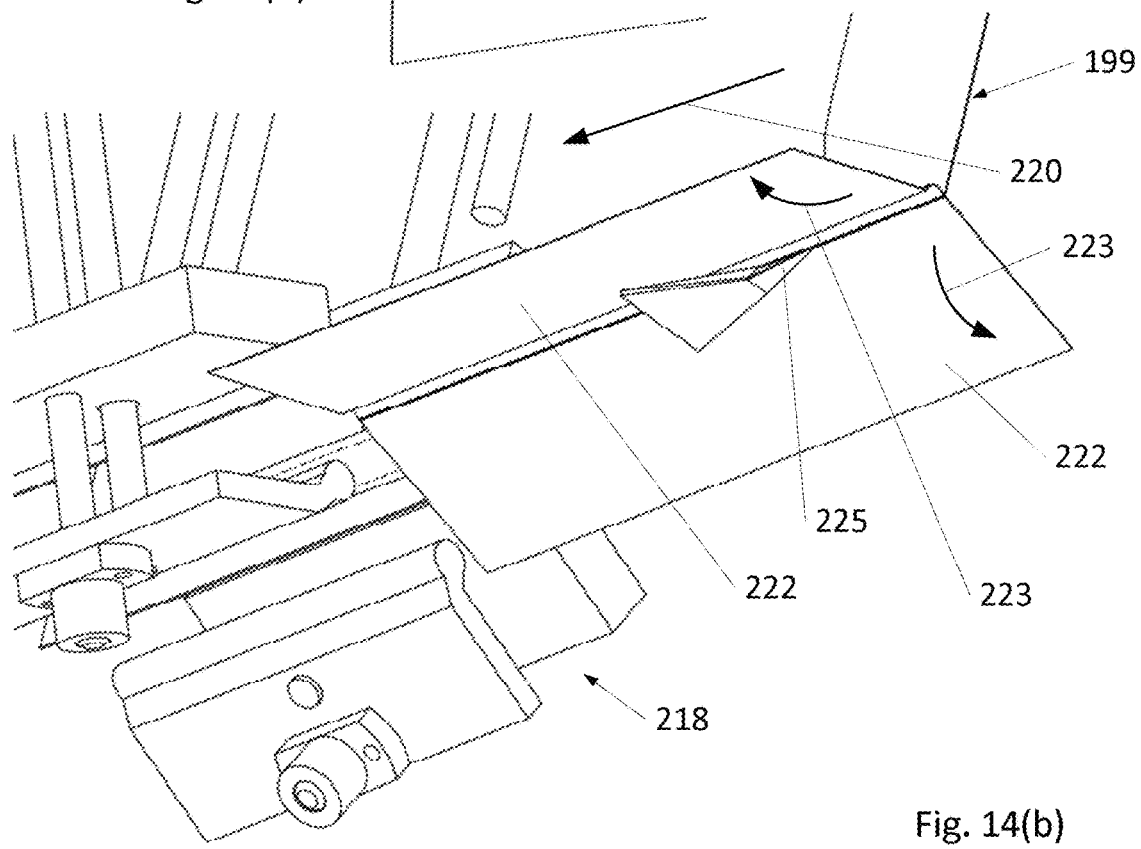
Fig. 14(b)

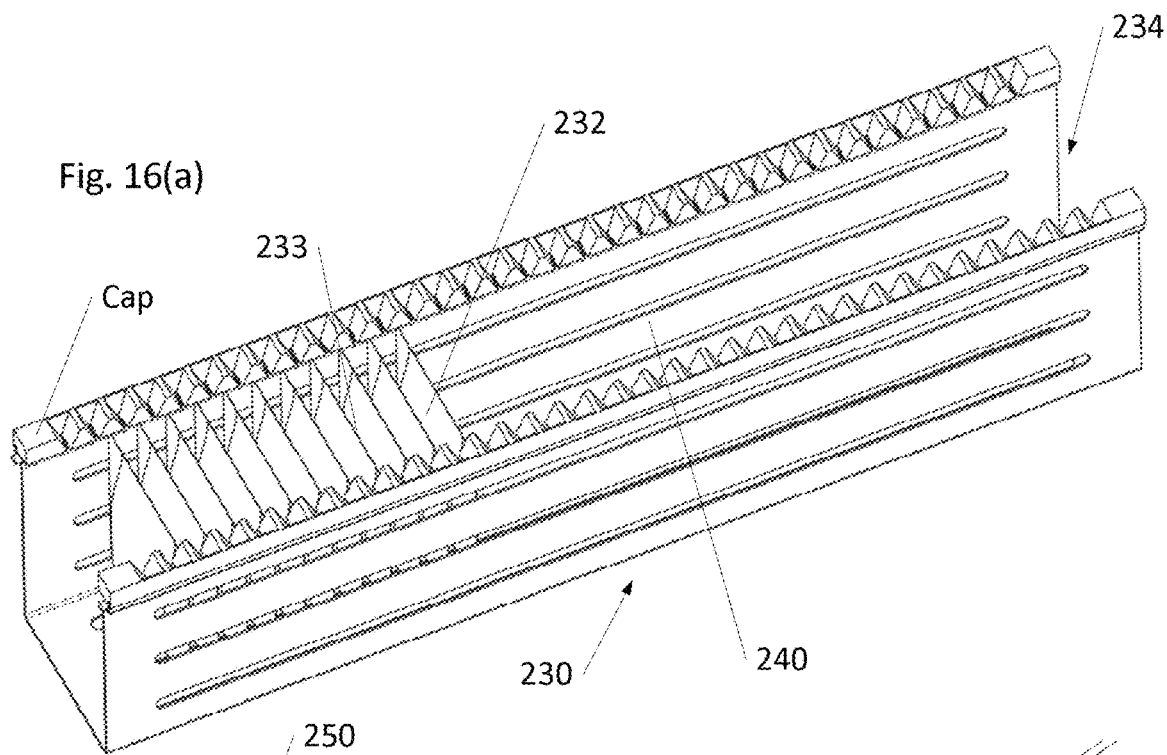
Fig. 16(a)
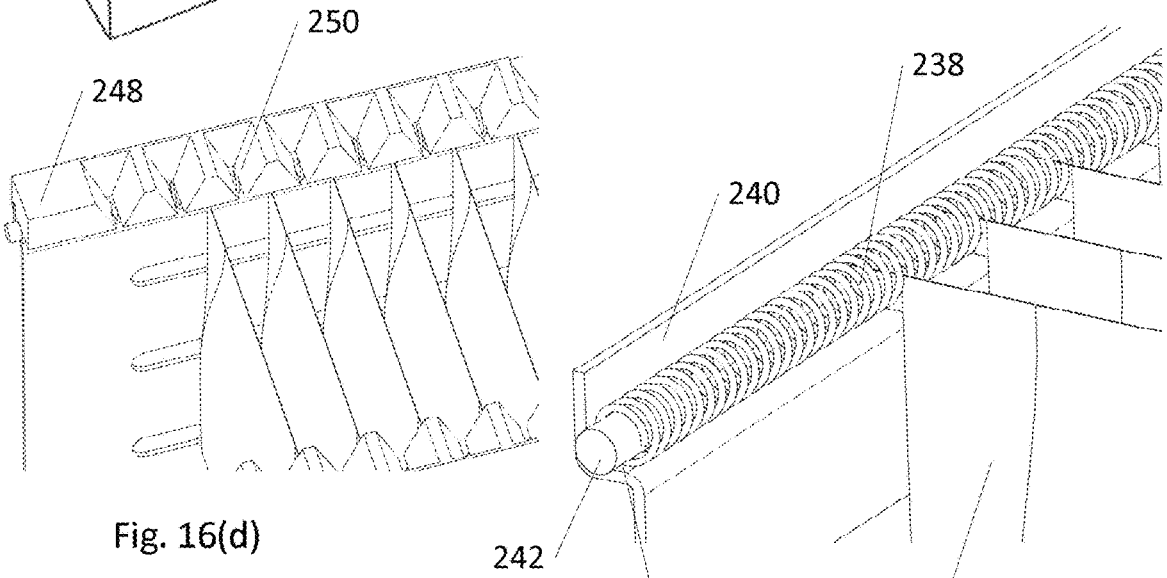
Fig. 16(d)
Fig. 16(b)
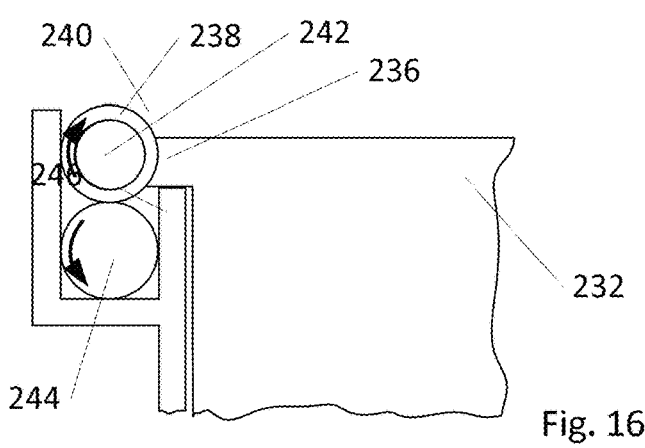
Fig. 16(c)

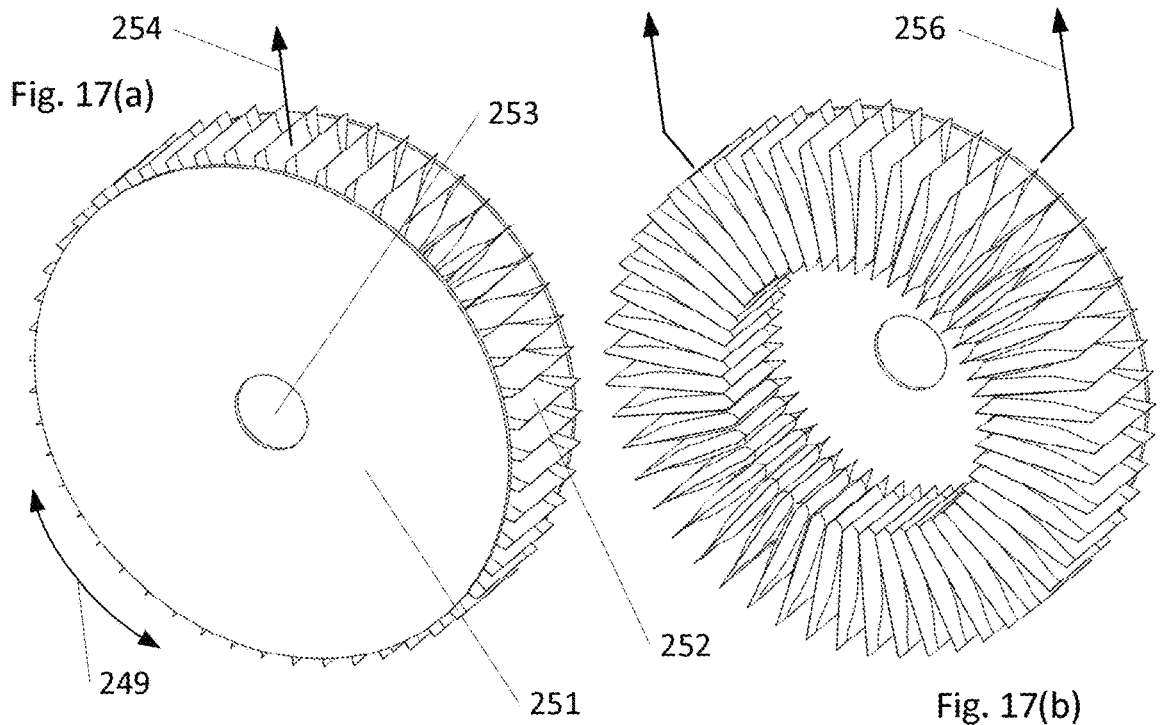
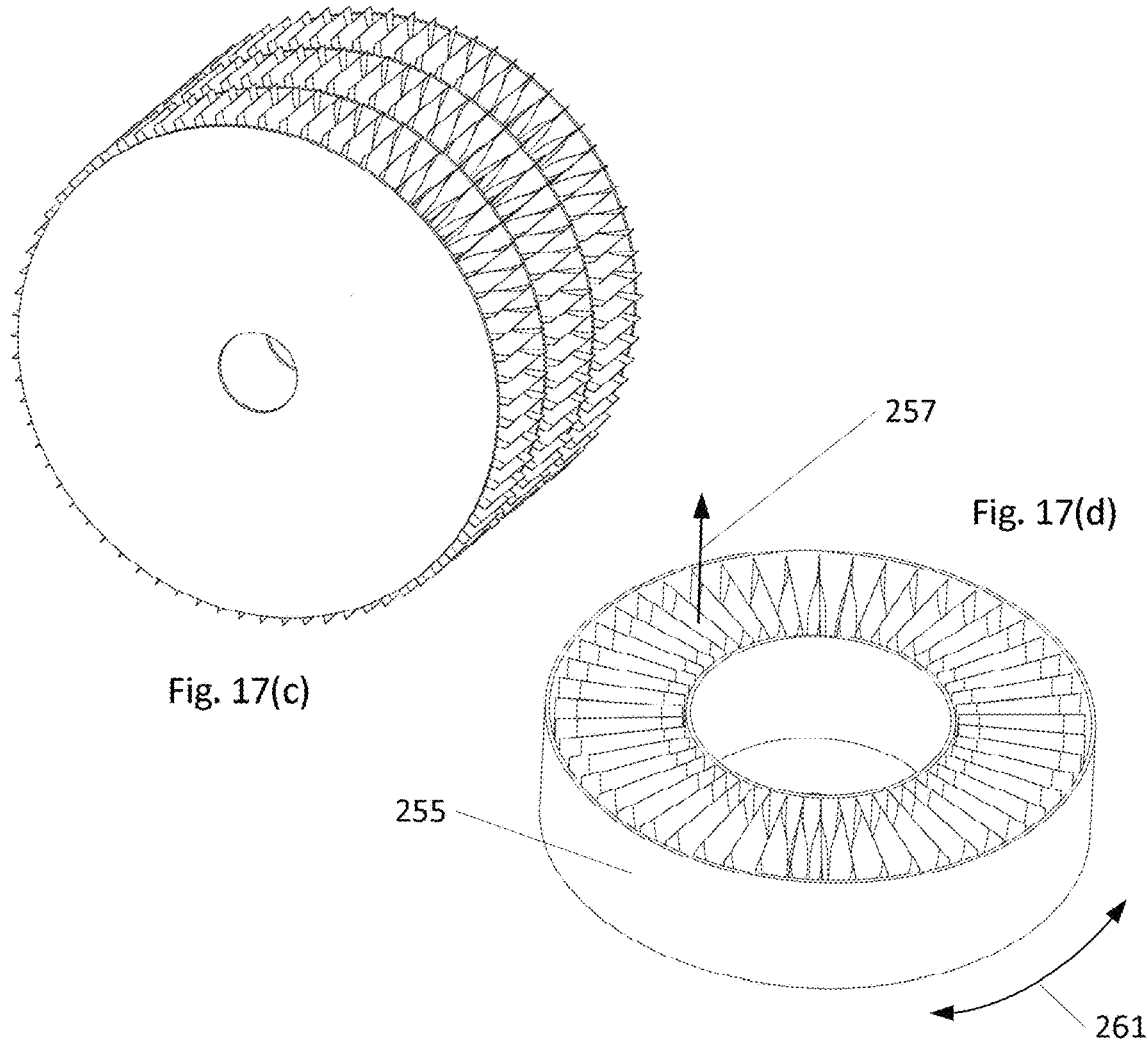
Fig. 17(a)
Fig. 17(b)
Fig. 17(c)
Fig. 17(d)

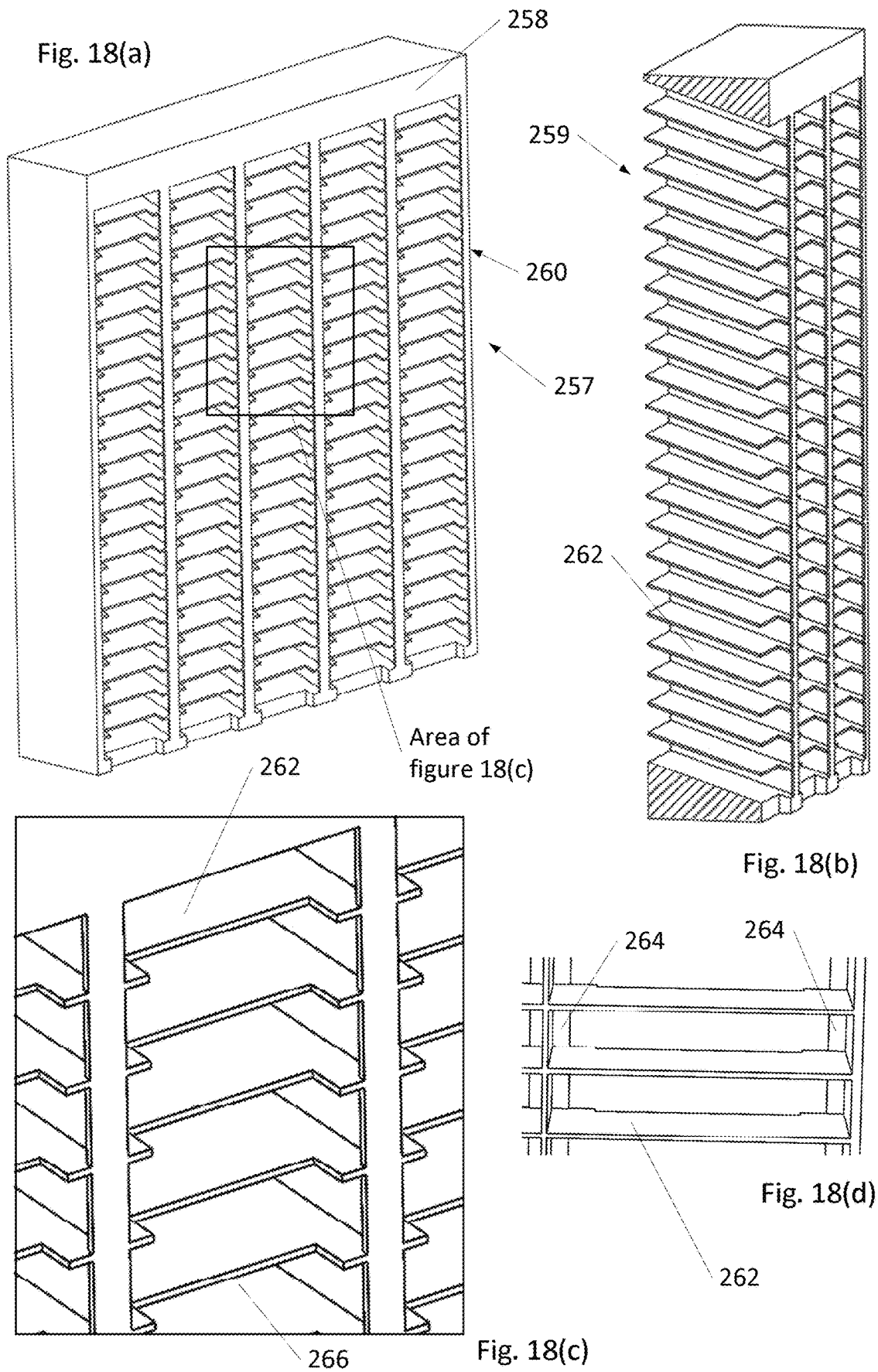

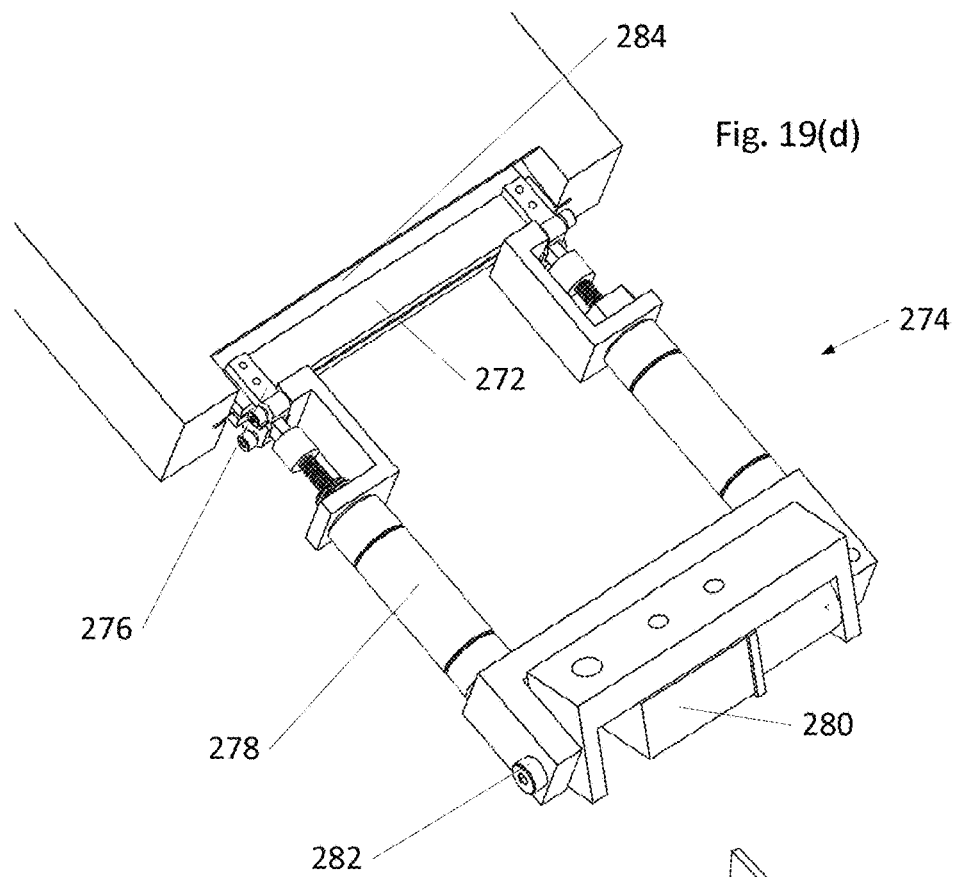
Fig. 19(d)
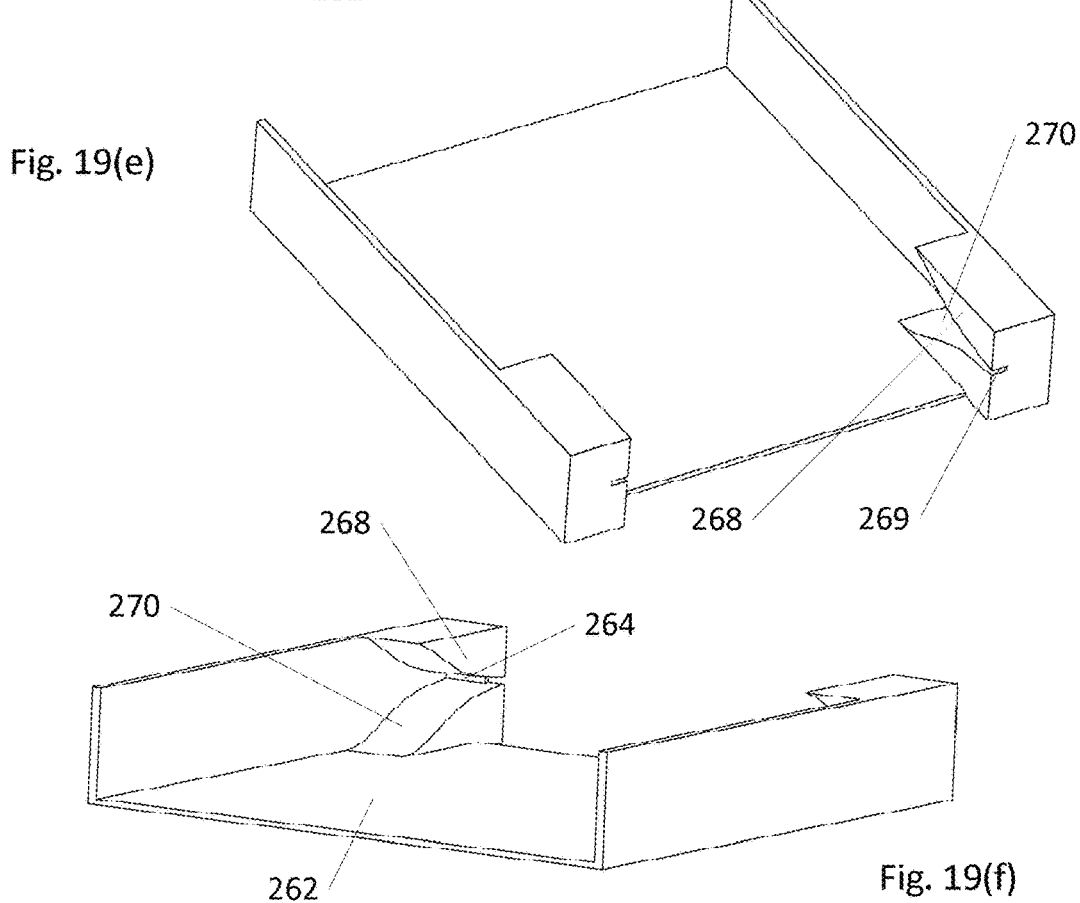
Fig. 19(e)
Fig. 19(f)

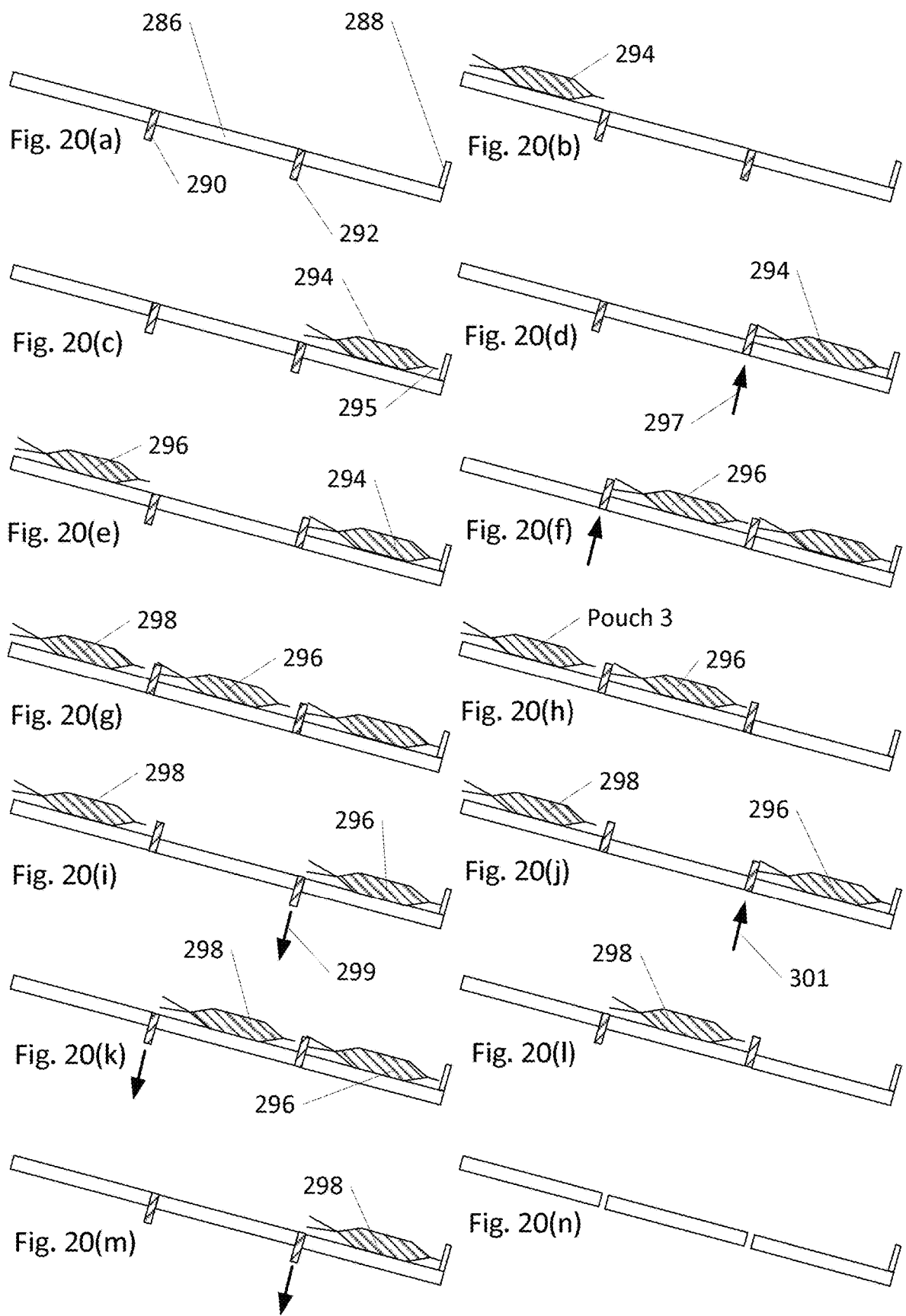

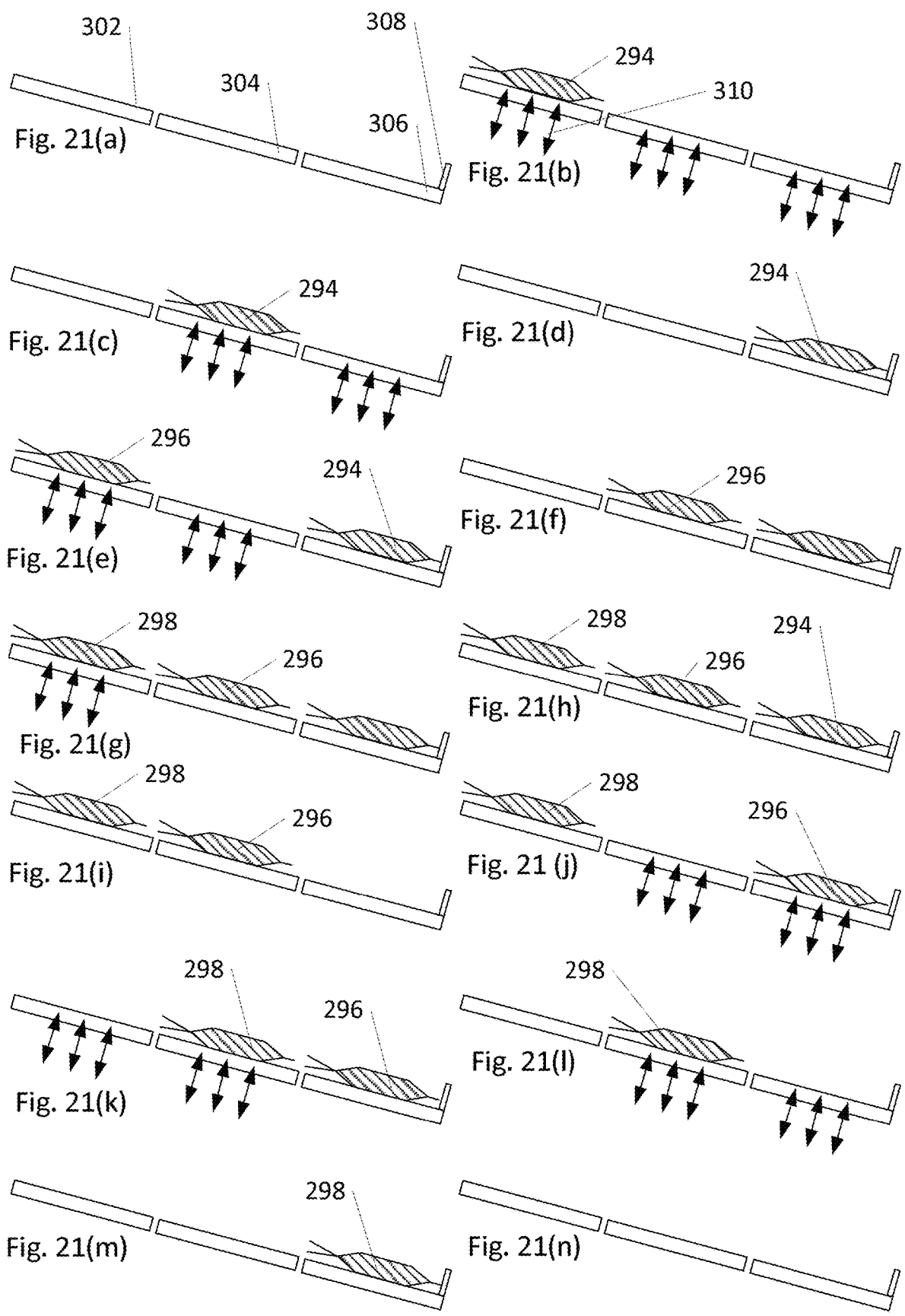

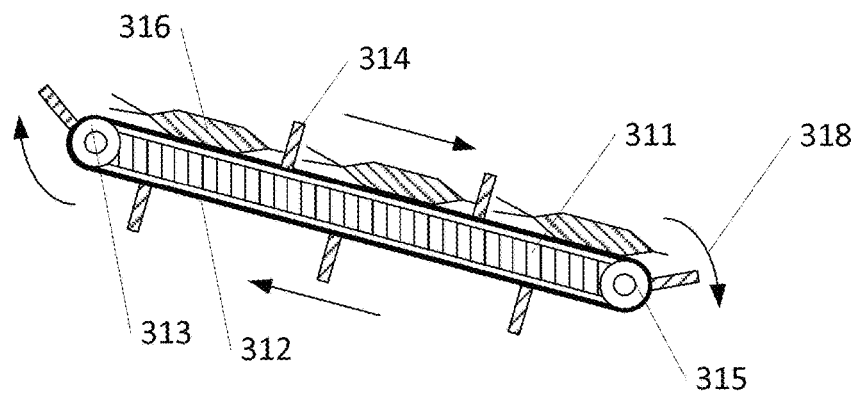
Fig. 22(a)
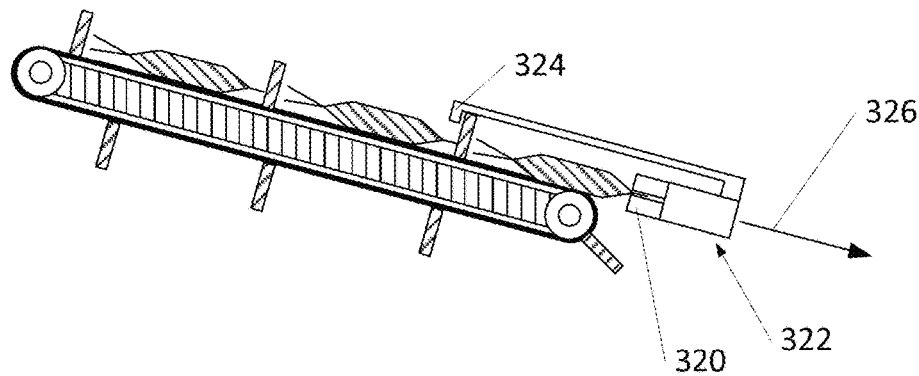
Fig. 22(b)
Fig. 23(a)    Fig. 23(b)
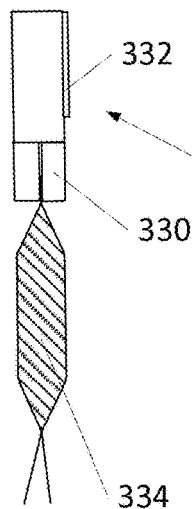 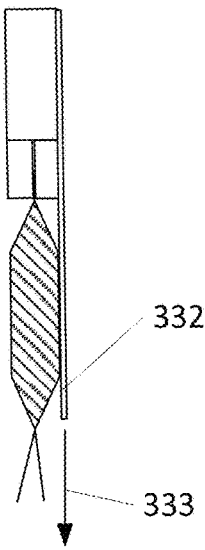
Fig. 23(c)
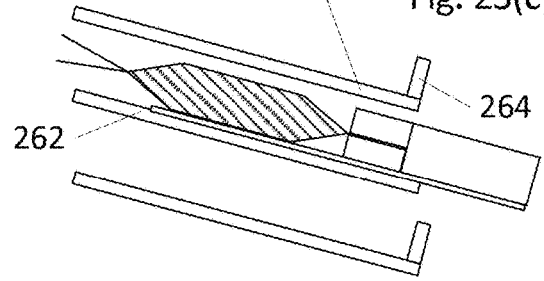
Fig. 23(d)
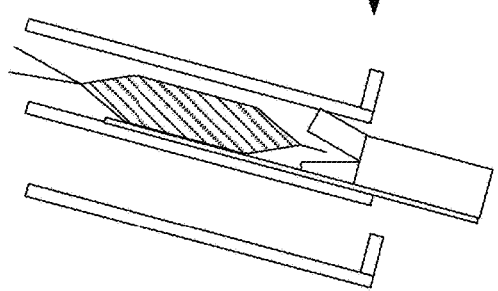
Fig. 23(e)
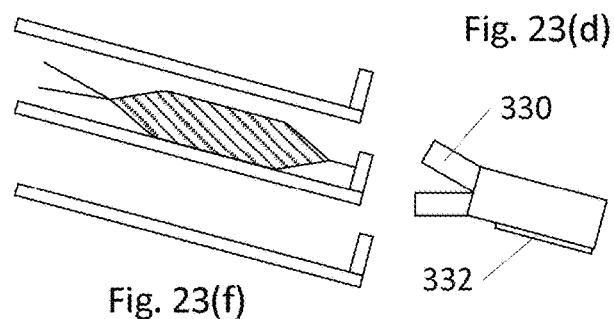
Fig. 23(f)

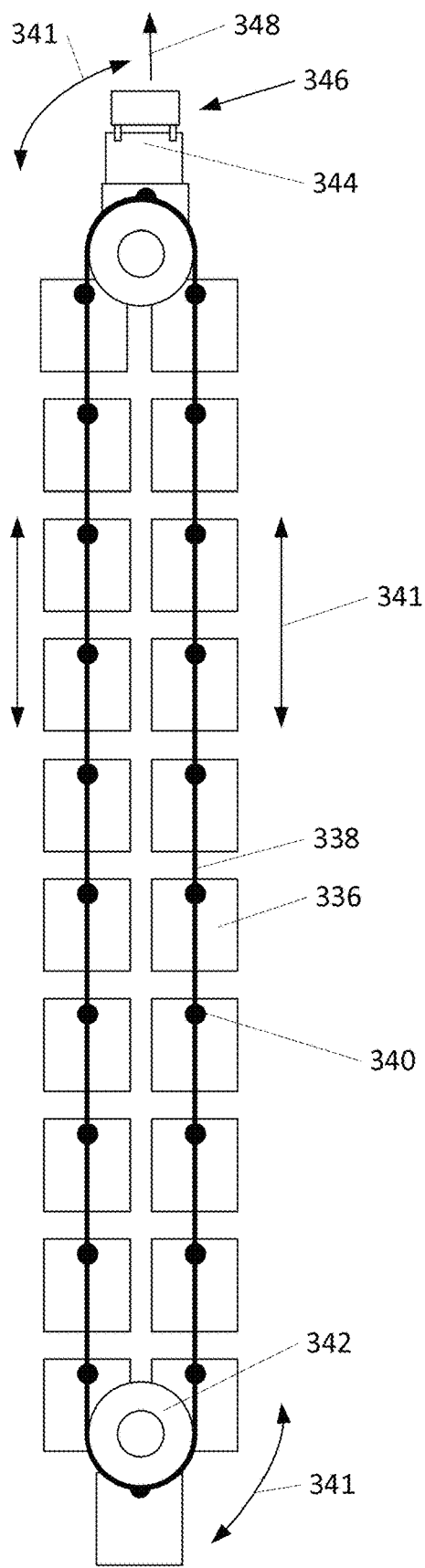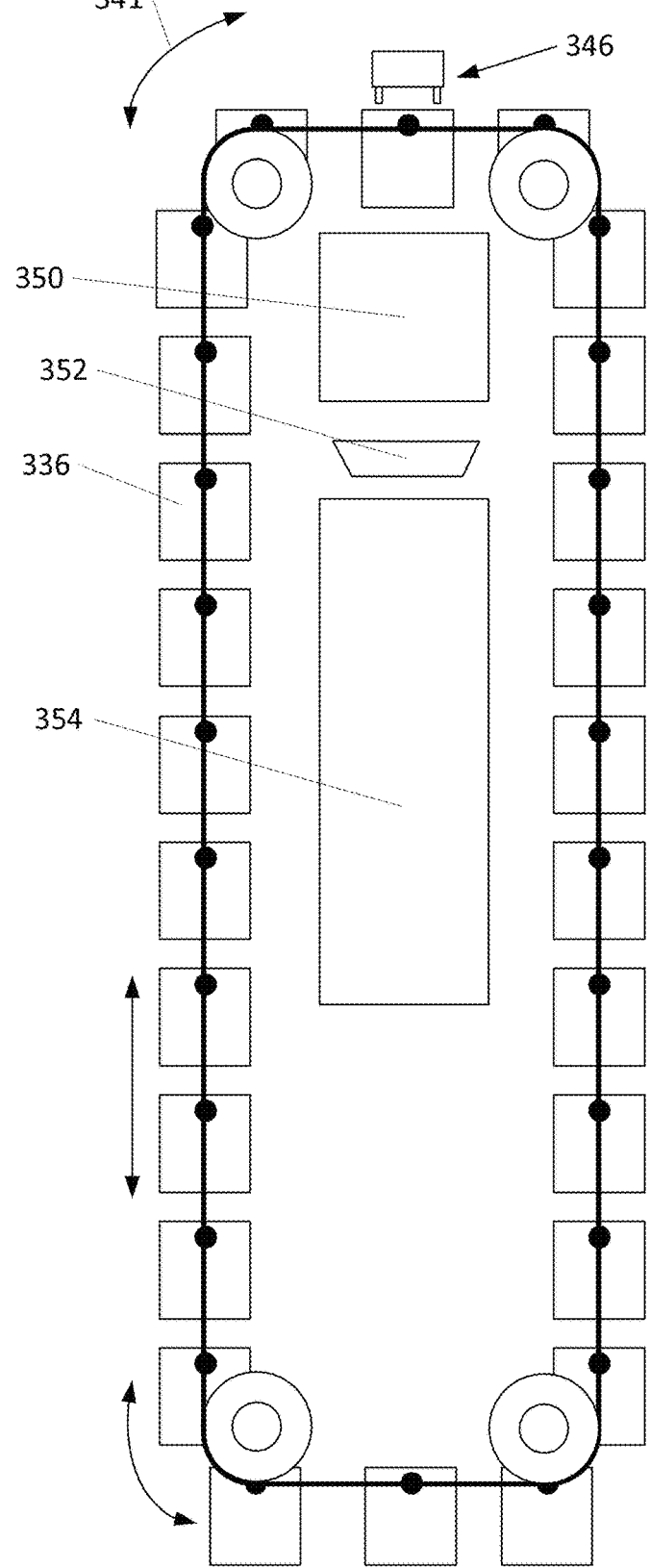

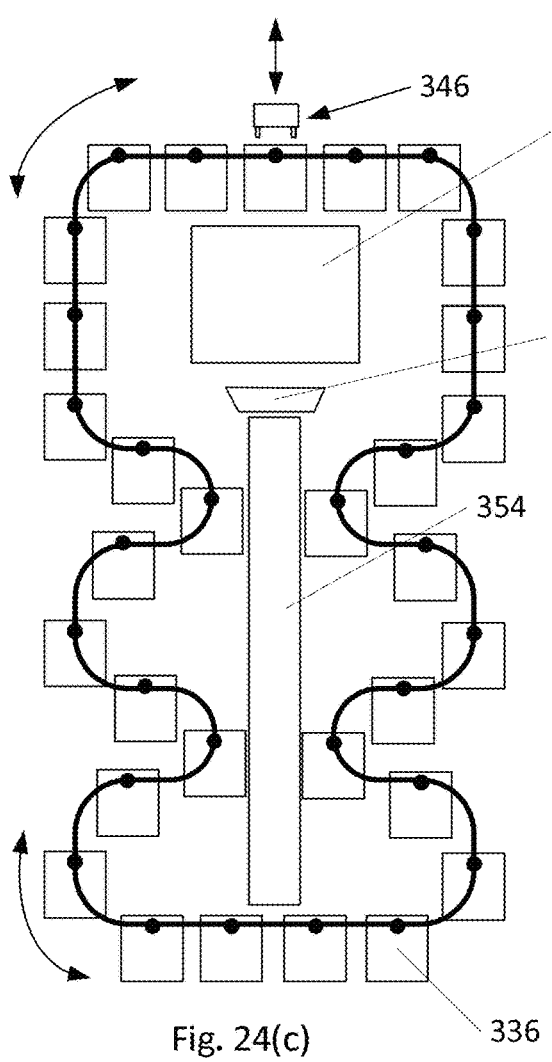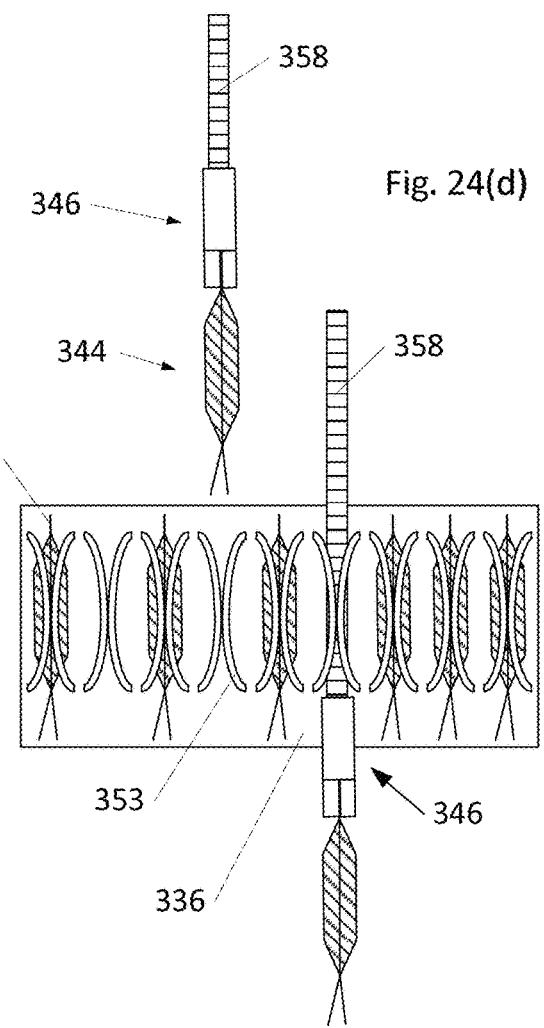
Fig. 24(c)
Fig. 24(d)
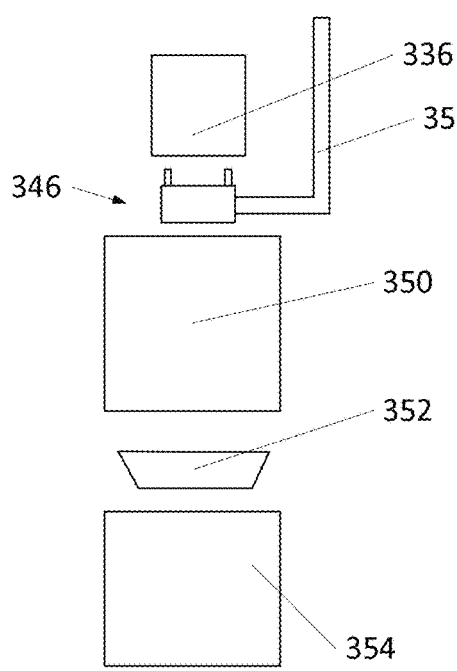
Fig. 25

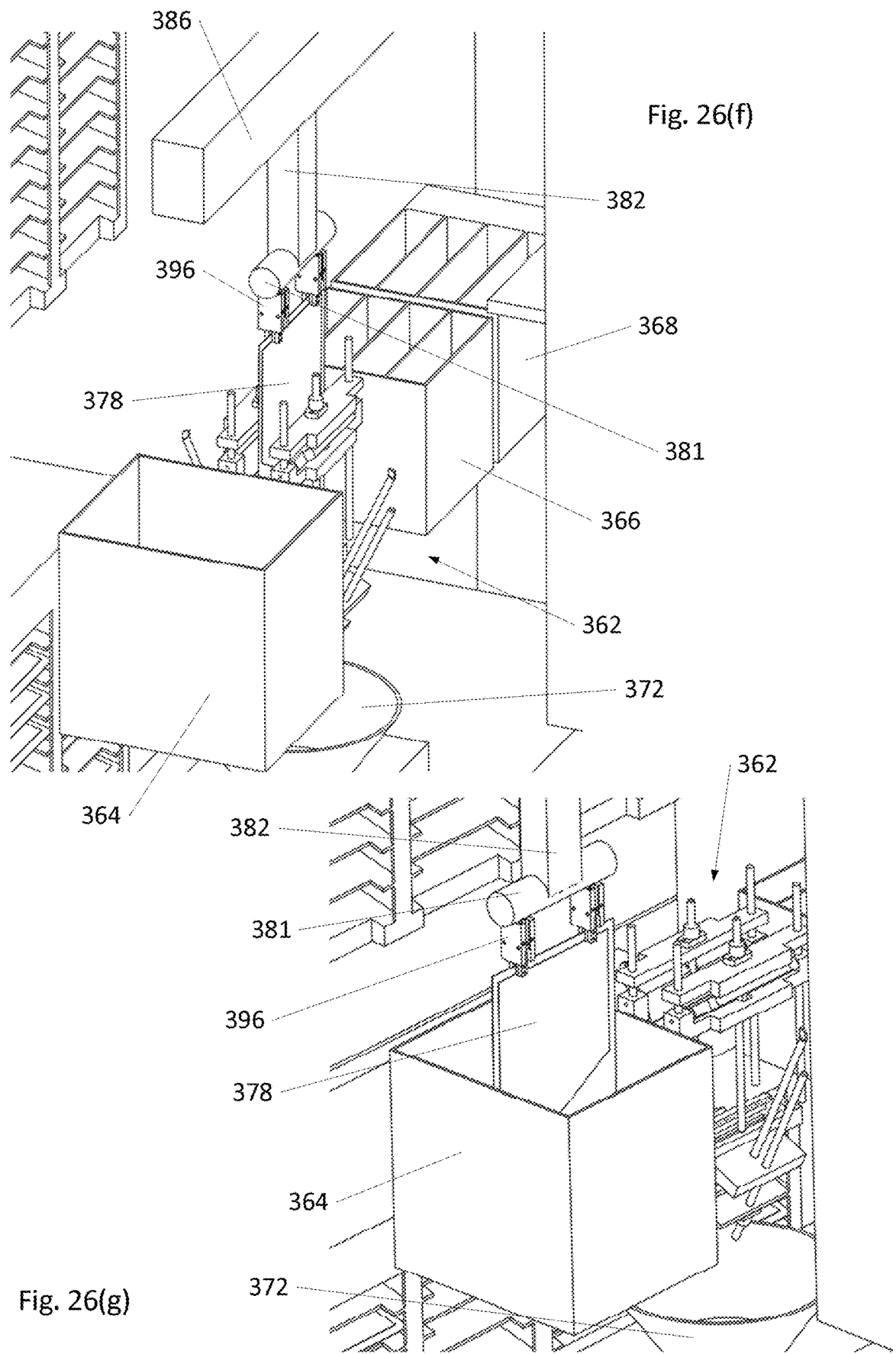

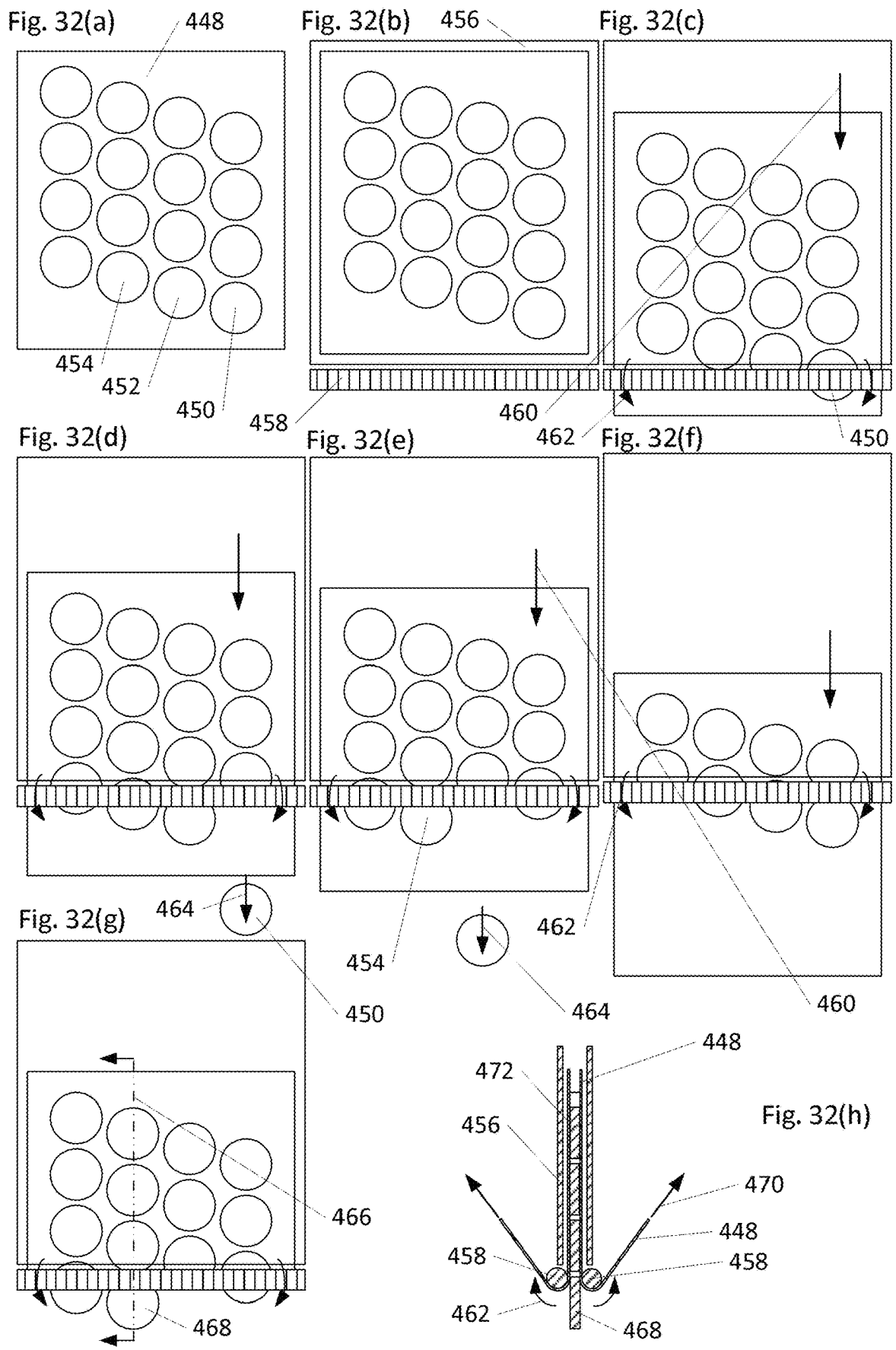

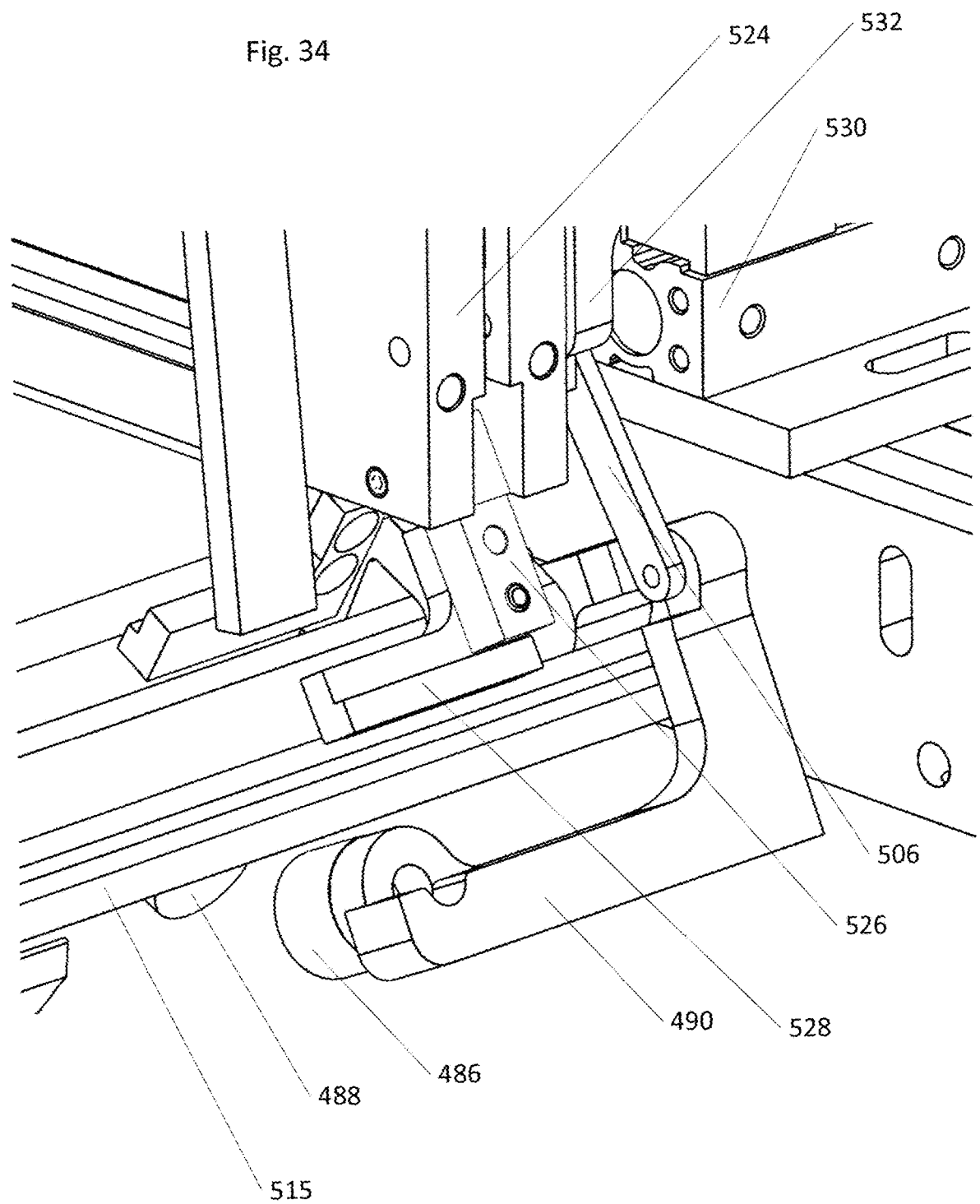

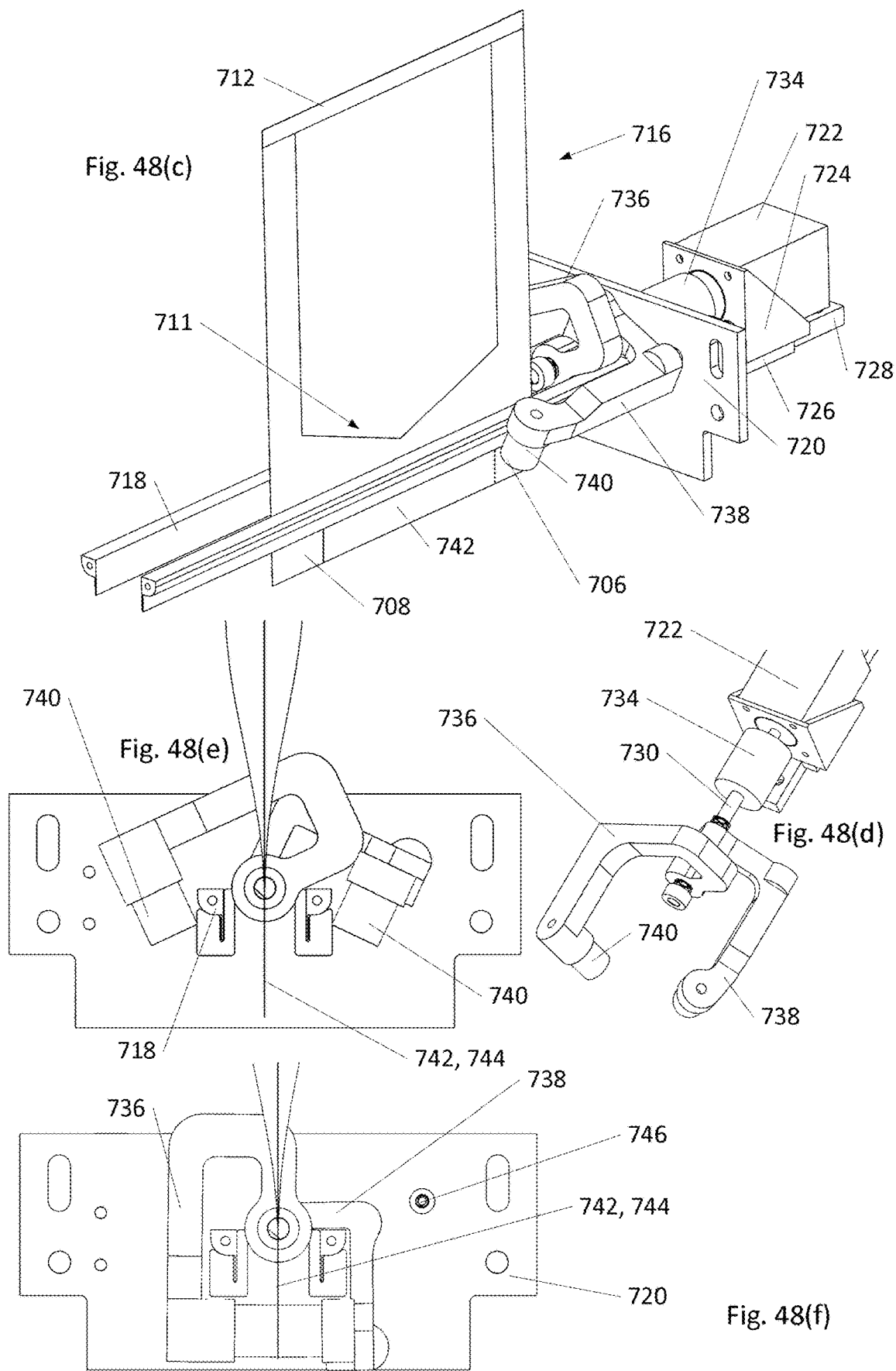

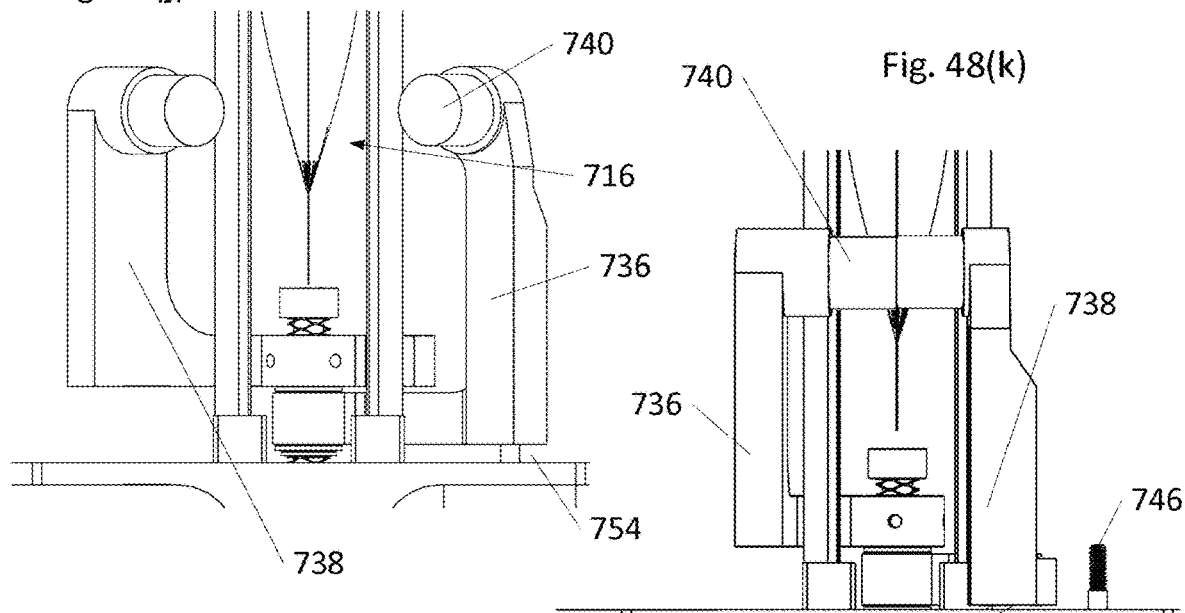
Fig. 48(j)
Fig. 48(k)
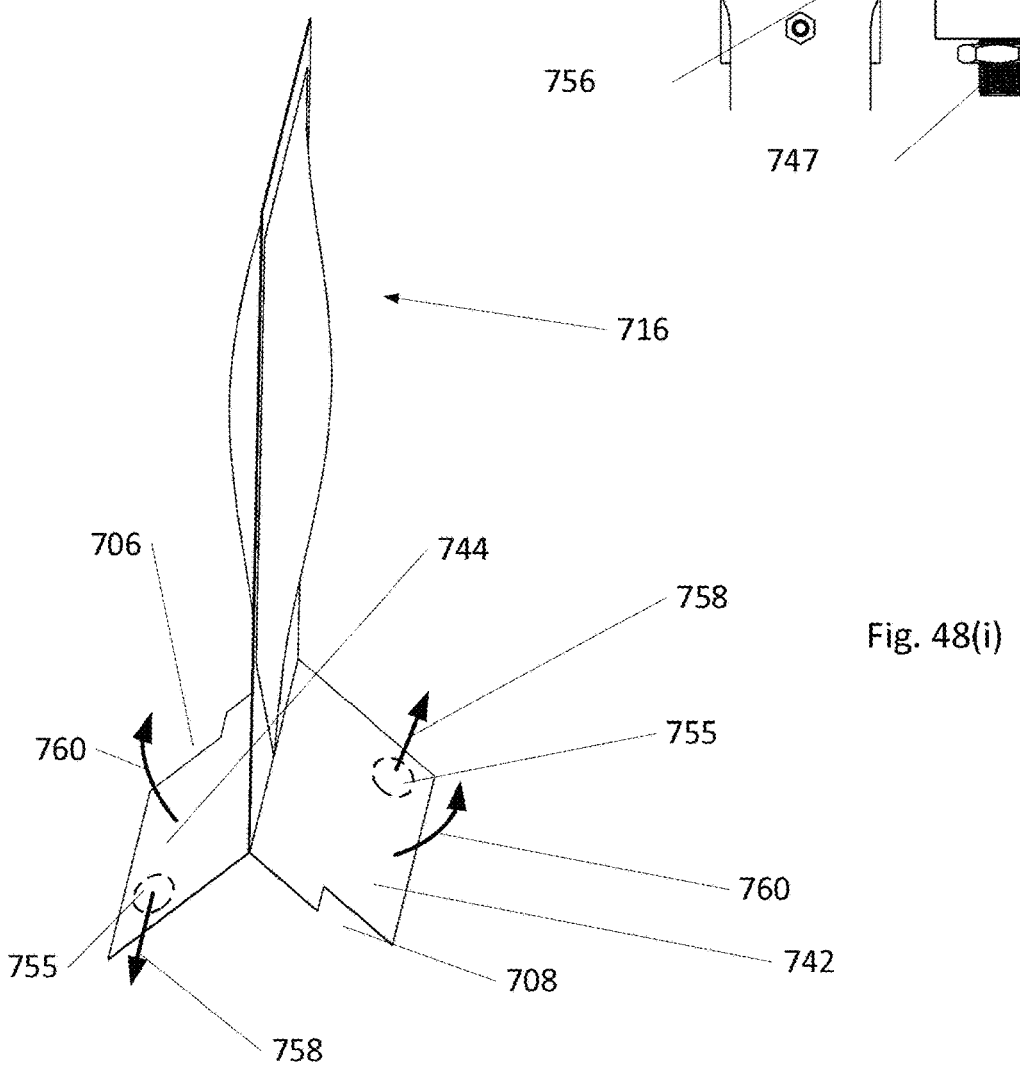
Fig. 48(i)

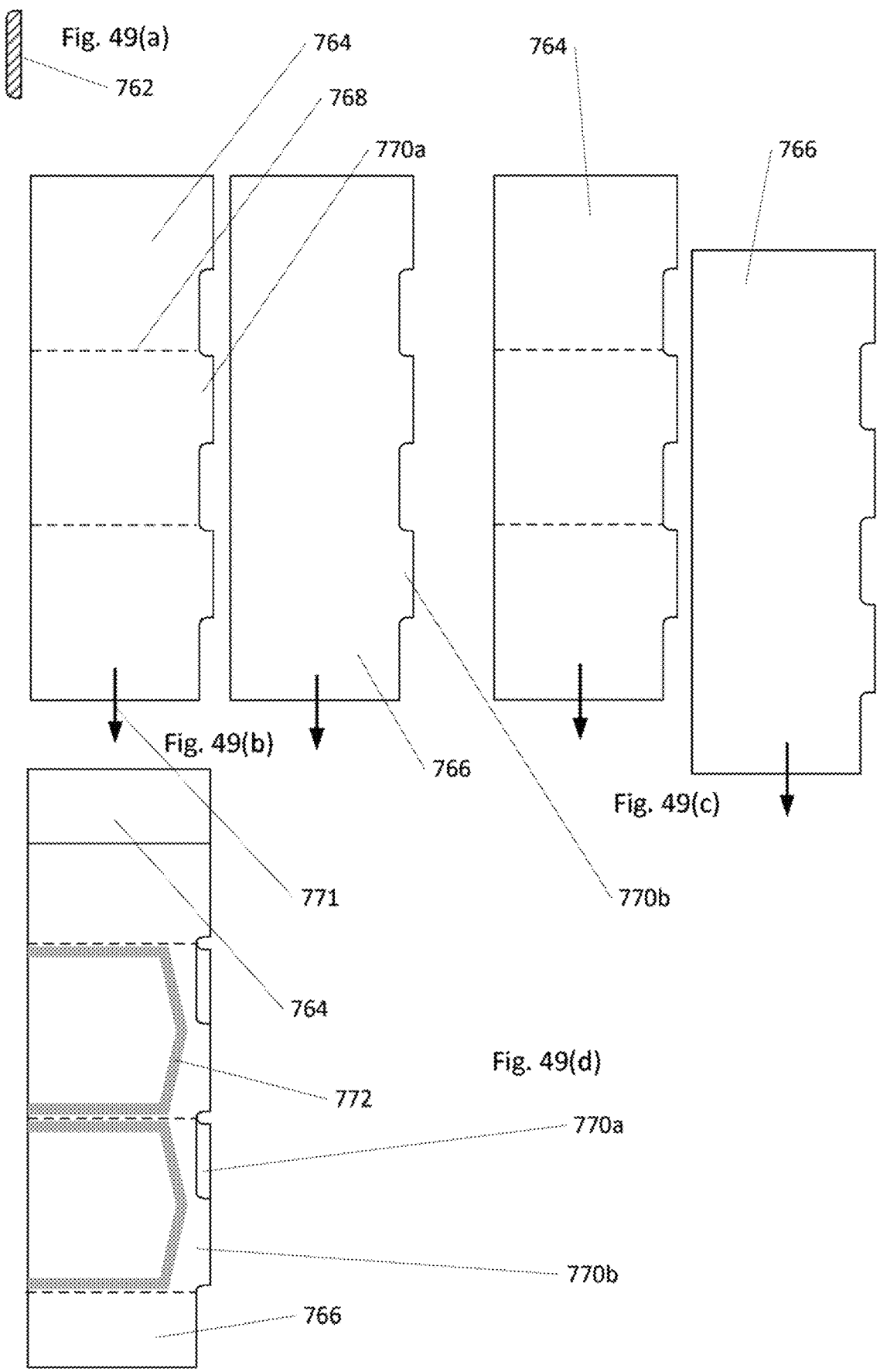

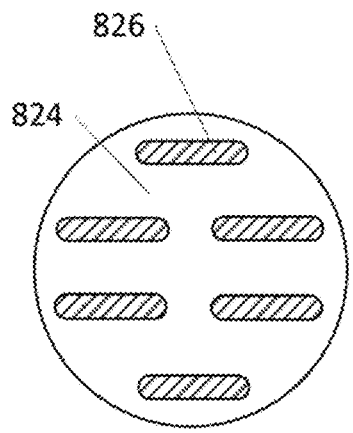
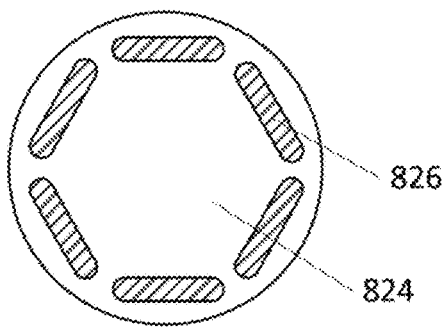
Fig. 52(a)　　　Fig. 52(b)
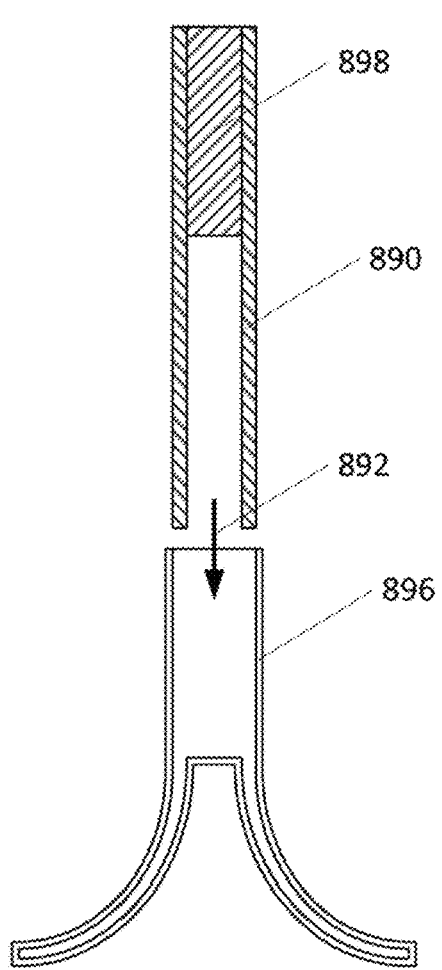
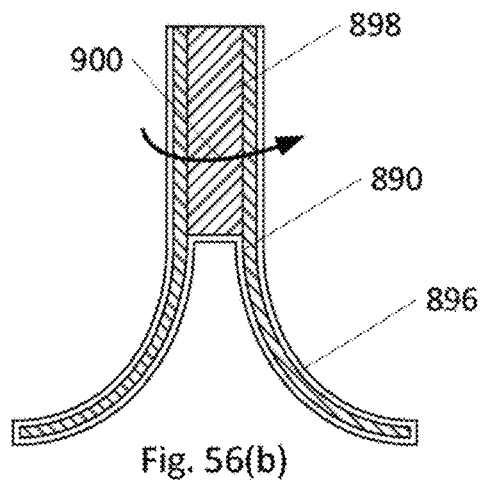
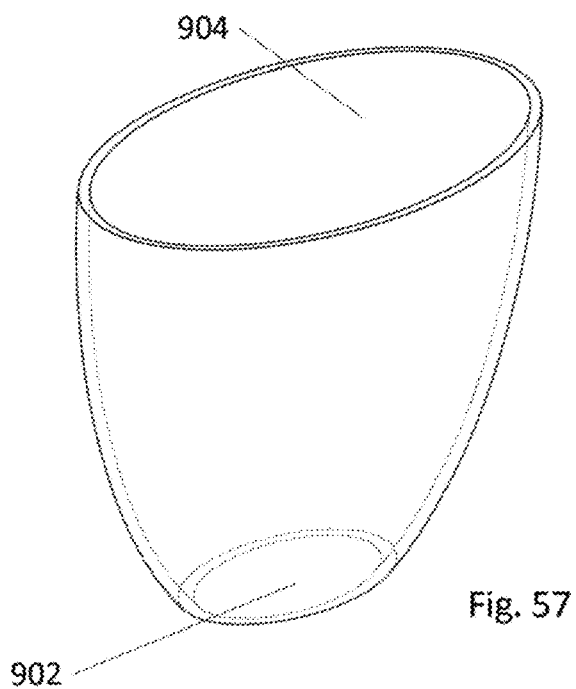
Fig. 56(a)
Fig. 56(b)
Fig. 57

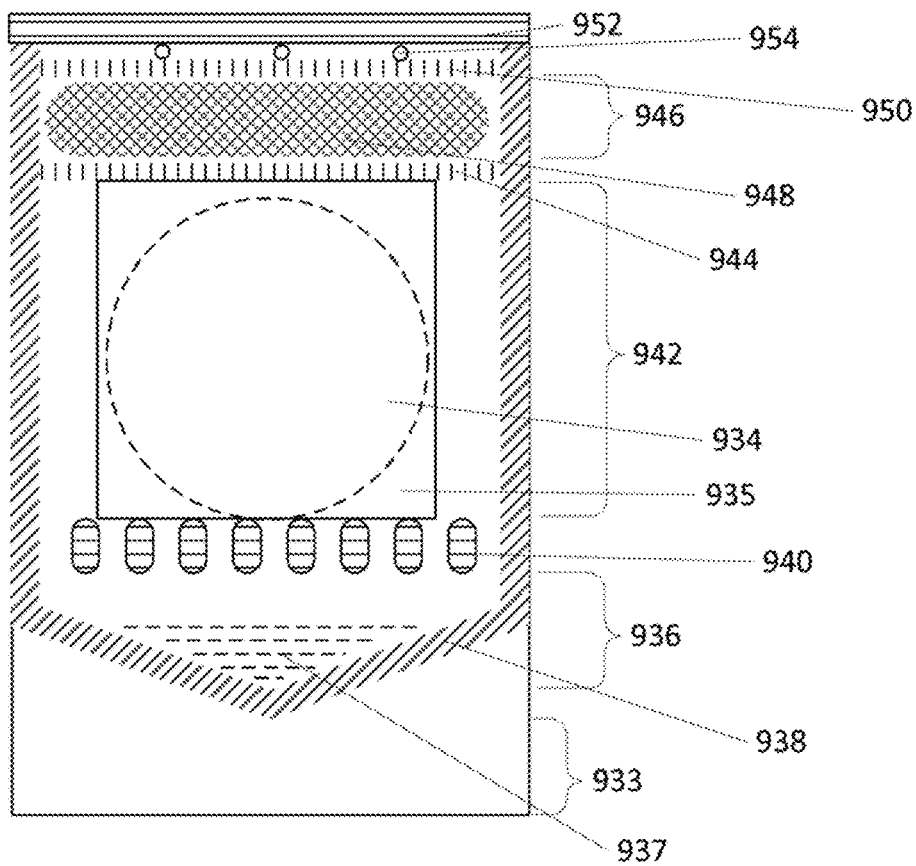
Fig. 60
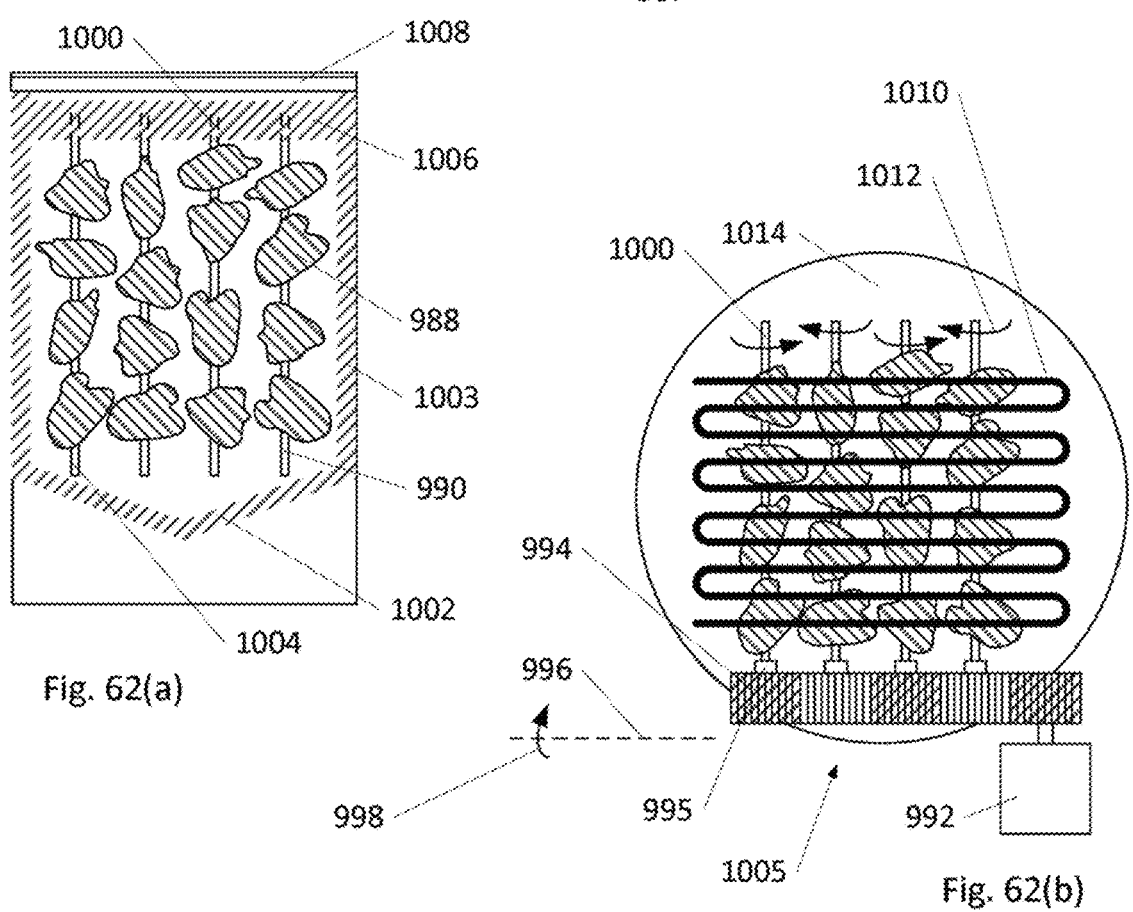
Fig. 62(a)
Fig. 62(b)

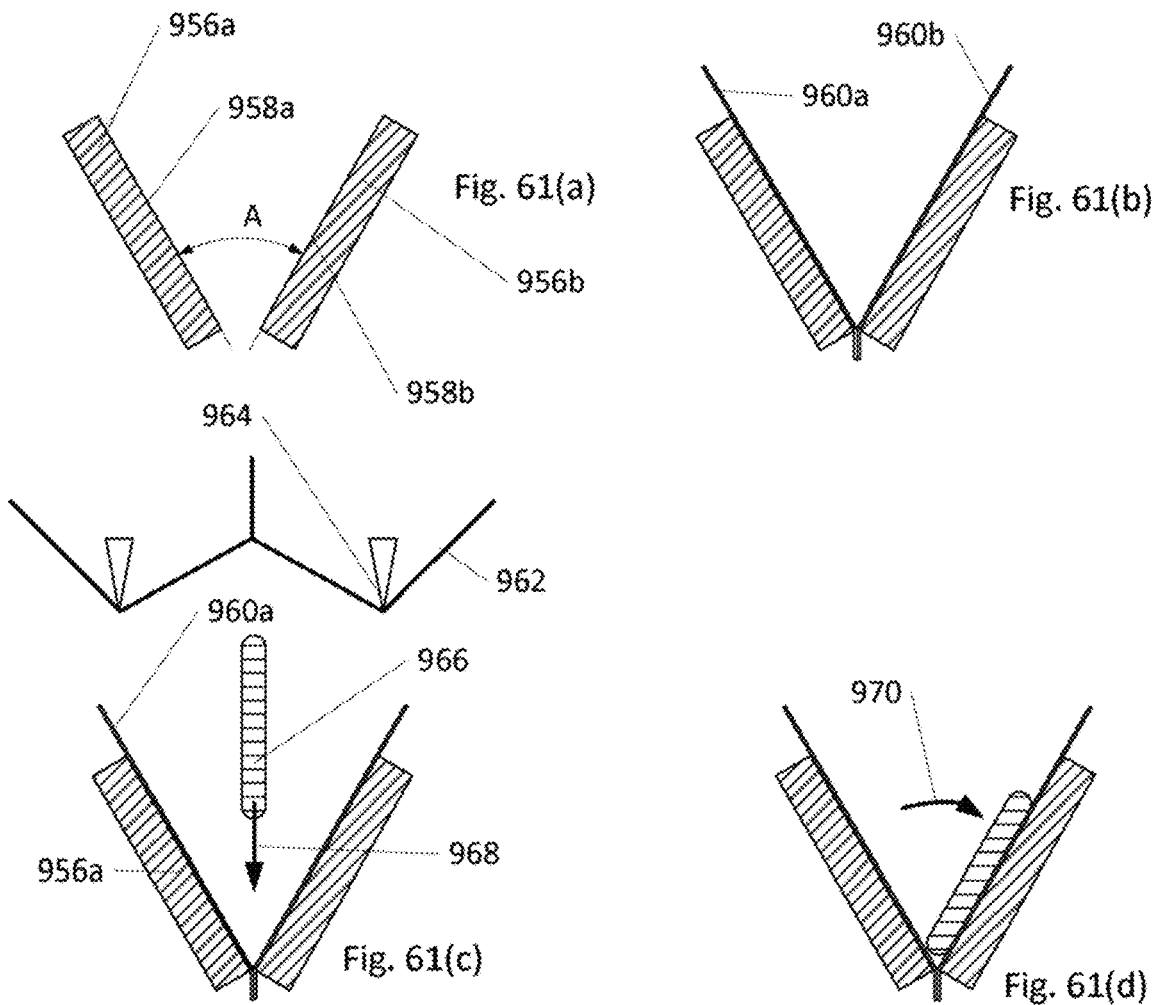
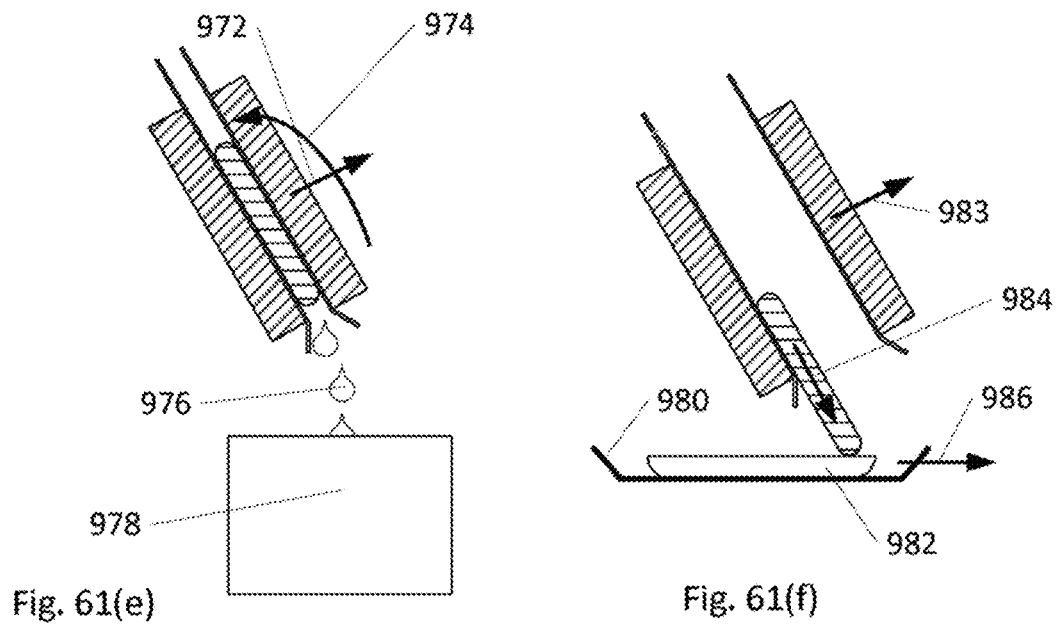
Fig. 61(a) Fig. 61(b) Fig. 61(c) Fig. 61(d) Fig. 61(e) Fig. 61(f)

Fig. 65
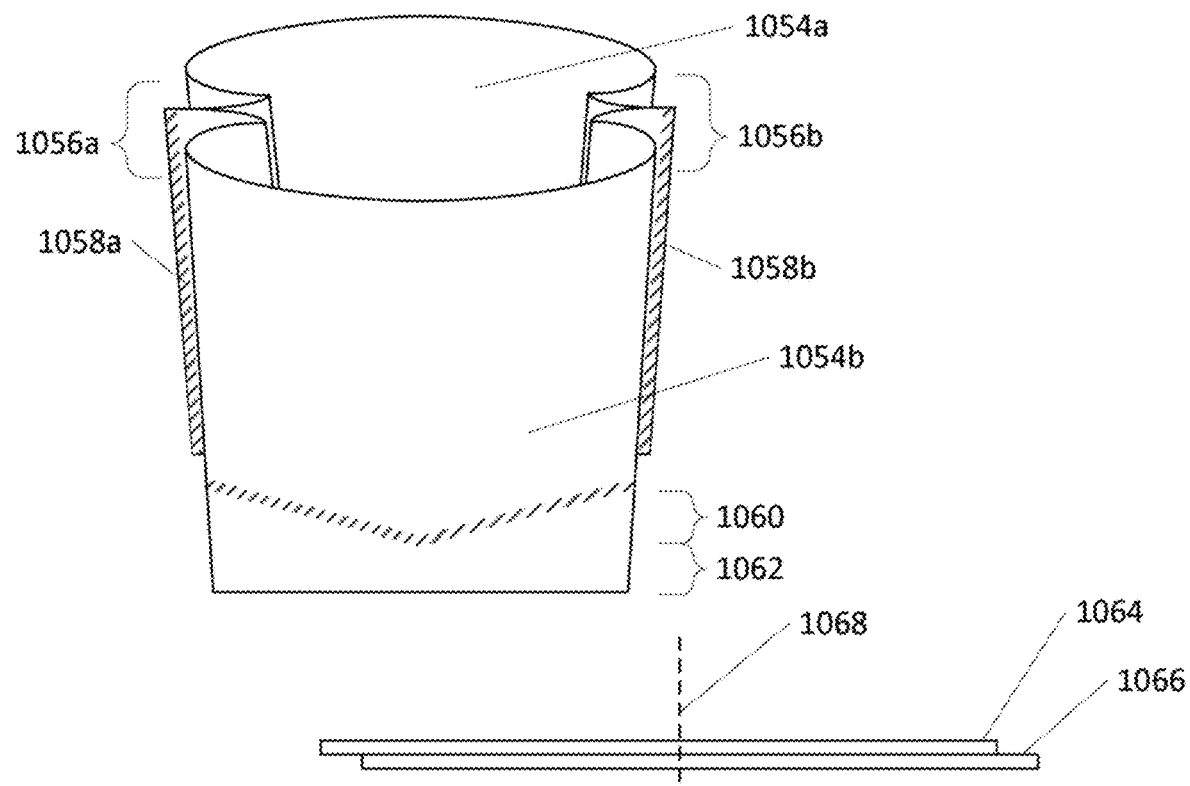
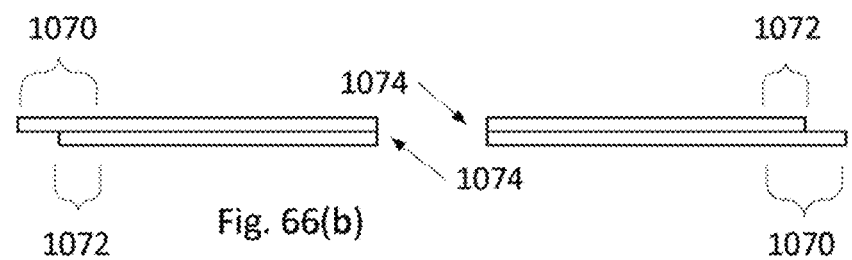
Fig. 66(a)
Fig. 66(b)
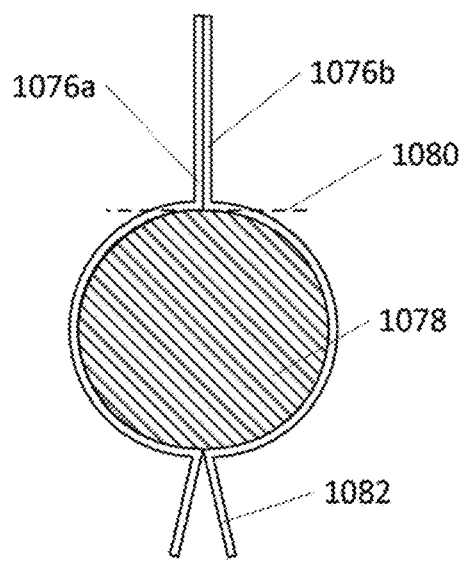
Fig. 67

METHODS AND APPARATUS FOR AUTOMATED FOOD PREPARATION

CROSS REFERENCE TO RELATED APPLICATIONS

The table below sets forth the priority claims for the instant application along with filing dates, and patent numbers as appropriate. Each of the listed applications is incorporated herein by reference as if set forth in full herein including any appendices attached thereto.

| Application | Continuity type | App. No. | Which was filed (YYYY-MM-DD) | Which is now | Referred to in this application as the | Docket # | Internal nickname |
|---|---|---|---|---|---|---|---|
| This application | is a continuation of | 16/182,563 | 2018 Nov. 6 | Pending | | NP-18-1 | NP2 |
| 16/182,563 | is a CIP of | 15/805,074 | 2017 Nov. 6 | Pending | 074 filing | NP-17-1 | NP1 |
| 16/182,563 | claims benefit of | 62/724,019 | 2018 Aug. 28 | Pending | | P-18-2 | P7 |
| 16/182,563 | claims benefit of | 62/670,043 | 2018 May 11 | Pending | | P-18-1 | P6 |
| 16/182,563 | claims benefit of | 62/588,913 | 2017 Nov. 20 | Pending | | P-17-4 | P5 |
| 16/182,563 | is a CIP of | PCT/US17/60253 | 2017 Nov. 6 | Pending | 253 filing | PCT-17-1 | PCT1 |
| 15/805,074 | claims benefit of | 62/522,671 | 2017 Jun. 20 | Expired | | P-17-3 | P4 |
| 15/805,074 | claims benefit of | 62/471,957 | 2017 Mar. 15 | Expired | | P-17-2 | P3 |
| 15/805,074 | claims benefit of | 62/456,008 | 2017 Feb. 7 | Expired | | P-17-1 | P2 |
| 15/805,074 | claims benefit of | 62/417,336 | 2016 Nov. 4 | Expired | | P-16-1 | P1 |
| PCT/US17/60253 | claims benefit of | 62/522,671 | 2017 Jun. 20 | Expired | | P-17-3 | P4 |
| PCT/US17/60253 | claims benefit of | 62/471,957 | 2017 Mar. 15 | Expired | | P-17-2 | P3 |
| PCT/US17/60253 | claims benefit of | 62/456,008 | 2017 Feb. 7 | Expired | | P-17-1 | P2 |
| PCT/US17/60253 | claims benefit of | 62/417,336 | 2016 Nov. 4 | Expired | | P-16-1 | P1 |

FIELD OF THE INVENTION

This disclosure generally relates to the fields of robotics/automation and cooking/culinary arts.

SUMMARY

The automation of food preparation is of significant interest. A highly-automated food preparation system/machine/kiosk/appliance can offer significant benefits, providing a means of reducing labor that is frequently hard to find and costly and allowing installation in locations unsuitable for workers; increasing the availability of quality food and allowing access in more locations and at more times; reducing wait times; facilitating customization to individual tastes, nutritional requirements, and dietary restrictions; reducing the risk of foodborne illness caused by restaurant workers; increasing repeatability by making recipes more quantitative and ensuring they are followed accurately; etc.

Key issues associated with automated food preparation may be addressed by packaging, providing, and storing ingredients within sealed flexible packages (pouches)—with each pouch containing the amount of an ingredient required for a particular recipe, given the number of servings to be prepared 13 rather than in bulk form (e.g., contained within a large bin or hopper).

It is an object of some embodiments of the invention to assure high ingredient quality by protecting ingredients before use from exposure to the environment, since air and moisture can cause oxidation, desiccation, sogginess, staleness, and other degradation which reduce palatability, and require frequent and wasteful restocking with fresh ingredients.

It is an object of some embodiments of the invention to assure food safety and hygiene by minimizing or eliminating durable components of the apparatus coming into direct contact with ingredients, since otherwise there is danger (without perfect cleaning, which is difficult to achieve) of harmful microbes growing (within residues of food remaining on surfaces) which can then enter uncontaminated food, or of cross-contamination from other ingredients (including allergens such as peanuts), and if ingredients are not well protected, insects and other vermin may infest them.

It is an object of some embodiments of the invention to offer meal variety by providing dispensing methods and apparatus that are compatible with a very large range of ingredients, including those that might be too delicate, too large, too moist, etc. to dispense by other methods.

It is an object of some embodiments of the invention to provide efficient and non-wasteful dispensing of ingredients by such that virtually the entire amount of ingredient provided for a particular meal is delivered and there is little or nothing left behind It is an object of some embodiments of the invention to minimize maintenance of systems which automate food preparation, and reduce the need for human intervention.

Other objects and advantages of various embodiments of the invention will be apparent to those of skill in the art upon review of the teachings herein. The various embodiments of the invention, set forth explicitly herein or otherwise ascertained from the teachings herein, may address one or more of the above objects alone or in combination, or alternatively may address some other object ascertained from the teachings herein. It is not necessarily intended that all objects be addressed by any single aspect of the invention even though that may be the case with regard to some aspects.

In a first aspect of the invention a method for manipulating a flexible package comprising flaps, includes: (a) providing a flexible package wherein the package comprises at least one flexible film comprising a left portion and a right portion with each portion having an inside and an outside surface with the inside surfaces facing each other and wherein the left and right portions have regions that are sealed one to the other and wherein each portion comprises a distal flap; (b) contacting the flap of the left portion using first contacting means; (c) contacting the flap of the right portion using second contacting means; (d) moving the two contacting means and separating the two flaps from one another.

Numerous variations of the first aspect of the invention are possible and include, for example: 1) the moving comprising pushing or pulling on the flaps; 2) the contacting means selected from the group consisting of i) suction cups, ii) adhesive pads, iii) clamps, iv) pins, v) microstructured adhesive, and vi) electrostatically-attracted pads; 3) moving each flap to a position and orientation where it can be grasped by clamping means.

In a second aspect of the invention a method for manipulating a flexible package comprising flaps, includes: (a) providing a flexible package wherein the package comprises at least one flexible film comprising a left portion and a right portion and wherein the left and right portions have regions that are sealed one to the other and wherein each portion comprises a distal flap; (b) introducing deflecting means between the flaps; (c) moving the deflecting means relative to the flaps; whereby the flaps are separated from one another.

Numerous variations of the second aspect of the invention are possible and include, for example: 1) wherein the flexible package comprises a loop of flexible film configured to allow access to the deflecting means; 2) further comprising moving each flap to a position and orientation where it can be grasped by clamping means.

In a third aspect of the invention a method for dispensing at least one substance from a sealed flexible package, includes: (a) providing a sealed flexible package containing at least one substance wherein the package comprises at least one flexible film comprising a left portion and a right portion with each portion having an inside and an outside surface with the inside surfaces facing each other and wherein the portions are partially sealed to one another to form at least one compartment containing the at least one substance and wherein the seal comprises at least one openable region and wherein each portion comprises an unsealed flap; (b) grasping the flap of the left portion using left grasping means; (c) grasping the flap of the right portion using right grasping means; and (d) moving the left and right grasping means to apply tension to the flaps; whereby the openable region of the seal is opened and at least a portion of the at least one substance is dispensed from the at least one compartment.

Numerous variations of the third aspect of the invention are possible and include, for example wherein the first and second grasping means comprise at least one clamp.

In a fourth aspect of the invention a flexible package containing at least one item wherein the package includes: (a) at least one flexible film comprising a left portion and a right portion with each portion having an inside and an outside surface with the inside surfaces facing each other; and (b) wherein the portions are partially sealed to one another to form at least one compartment containing the at least one item; and (c) wherein the seal comprises at least one openable seal region; and (d) wherein each portion comprises an unsealed extension at one end; and (e) wherein each extension is narrower than a sealed region of the portion from which it extends; and (f) wherein the two extensions do not completely overlap.

In a fifth aspect of the invention an apparatus for use with a sealed flexible package having a substance contained in a cavity and comprising at least one flap, the apparatus includes (a) means for holding and positioning a sealed flexible package; (b) grasping means to grasp at least one flap of the package; (c) movement means to move the grasping means relative to the package cavity.

Numerous variations of the fifth aspect of the invention are possible and include, for example wherein the substance is flowable and further comprising expelling means to expel the substance from the package selected from the group consisting of i) at least one squeegee, ii) at least one roller, and iii) at least one inflatable bladder.

In a sixth aspect of the invention an apparatus for use with a flexible package containing at least one flowable substance, includes: a) means for holding and positioning a flexible package; b) retractable impingement means configured to impinge on the package to discharge the at least one flowable substance from the package.

Numerous variations of the sixth aspect of the invention are possible and include, for example: 1) wherein the impingement means retracts by rotating; 2) wherein the impingement means is selected from the group consisting of i) squeegee, ii) roller, and iii) inflatable bladder.

In a seventh aspect of the invention a method for dispensing at least one substance from a sealed flexible package, includes: (a) providing a sealed flexible package containing at least one substance wherein the package comprises at least one flexible film comprising a left portion and a right portion with each portion having an inside and an outside surface with the inside surfaces facing each other and wherein the portions are partially sealed to one another to form at least one cavity containing the at least one substance and wherein the seal comprises at least one openable seal and wherein each portion comprises an unsealed extension at one end and wherein each extension is narrower than a sealed region of the portion from which it extends; (b) grasping the extension of the left portion using first grasping means; (c) grasping the extension of the right portion using second grasping means; (d) moving the first and second grasping means to pull the two extensions away from one another; whereby the seal is opened and at least a portion of the at least one substance is dispensed from the cavity.

Numerous variations of the seventh aspect of the invention are possible and include, for example: 1) wherein the first and second grasping means move along a path that is at least partially curved; 2) wherein the first and second grasping means each comprise a clamp having leading and trailing portions; 3) wherein the first and second grasping means move substantially below the flexible package when grasping the extensions.

In an eighth aspect of the invention a storage device for flexible packages having at least one edge, includes: (a) at least one upper surface oriented at a non-zero angle to the horizontal and configured to support a flexible package resting thereupon and comprising a lower end; (b) at least one stop proximate the lower end of the surface configured to contact an edge of the package and prevent motion of the package past the lower end whenever the pouch is not actively withdrawn from the device.

Numerous variations of the eighth aspect of the invention are possible and include, for example: 1) wherein the surface comprises a cutout at its lower end to allow access to an edge of the package by a mechanism for withdrawing the package; 2) variation (1) wherein the mechanism further comprises at least one gripper; 2) further comprising an actuator that generates vibration to cause the package to move along the surface toward its lower end; 3) further comprising at least one ramp to guide a leading edge of the package to a known position within the device and wherein the at least one ramp does not prevent removal of the package from the device; 4) variation (2) wherein the storage device further comprises a pair of upper and a pair of lower ramps positioned to guide opposite portions of the edge of the package; 5) wherein the surface can accommodate a plurality of flexible packages at different positions; 6) variation (3) wherein the storage device further comprises controllable retaining means for flexible packages stored at different positions within the device.

In a ninth aspect of the invention a method for dispensing an ingredient from within a package into a receptacle beneath the package, includes: (a) relatively lowering the ingredient to make contact with the receptacle; (b) relatively moving the receptacle in a direction that causes at least a portion of the ingredient to change its orientation; (c) allowing the ingredient to exit the package and enter the receptacle.

Numerous variations of the ninth aspect of the invention are possible and include, for example wherein the ingredient has a first side and a second side and wherein the receptacle is moved in a direction to controllably cause the first side to face upwards when the ingredient has at least partially entered the receptacle.

In a tenth aspect of the invention a method for dispensing an ingredient onto a substrate, includes: (a) allowing or causing an ingredient to relatively descend toward a substrate; (b) relatively moving the substrate in a direction that causes the ingredient to rotate as it descends further; wherein the ingredient is laid onto the substrate in a desired orientation.

In an eleventh aspect of the invention a chain of continuously-joined flexible packages for storing and dispensing a plurality of items, includes: (a) at least one continuous flexible film having a longitudinal axis and comprising a left portion and a right portion and wherein the portions are at least partially sealed to one another to form a plurality of individual compartments each holding at least one item; (b) an openable seal adjacent to each compartment and oriented at an angle smaller than 90 degrees to the longitudinal axis.

Numerous variations of the eleventh aspect of the invention are possible and include, for example: 1) wherein the orientation of the seal is substantially parallel to the longitudinal axis; 2) further comprising at least one flap adjacent to each openable seal; 3) further comprising reduced-strength features proximate at least some compartments selected from the group consisting of i) perforations and ii) scores.

In a twelfth aspect of the invention a method for manipulating a flexible package comprising flaps, the method includes: (a) providing a flexible package wherein the package comprises at least one flexible film comprising a left portion and a right portion with each portion having an inside and an outside surface with the inside surfaces facing each other and wherein the portions are partially sealed to one another and wherein each portion comprises an unsealed flap; (b) inserting the flaps between a pair of counter-rotating rollers; then (c) engaging clamping means to clamp each flap against the surface of one roller; then (d) separating the two rollers and two flaps from one another.

Numerous variations of the twelfth aspect of the invention are possible and include, for example: 1) further comprising unsealing at least a portion of the seal; 2) further comprising providing attracting means for attracting each flap to one roller; 3) variation (1) wherein the attracting means is selected from the group consisting of i) vacuum, ii) adhesive material, iii) microstructured adhesive, and iii) electrostatic attraction.

In a thirteenth aspect of the invention a device for grasping a flexible package having at least one edge and transporting the package between locations, includes: (a) grasping means for grasping an edge of the package; (b) rotating means for rotating the package around a substantially horizontal axis from an initial orientation to a final orientation.

In a fourteenth aspect of the invention an automated method for preparing food using a plurality of ingredients, includes: (a) readying a plurality of ingredients by transferring the ingredients from at least one storage device to at least one temporary holder using first mechanical grasping and relocating means; (b) grasping and transferring an ingredient from the temporary holder to a dispenser as needed using second mechanical grasping and relocating means; (c) dispensing the ingredient into a receptacle.

Numerous variations of the fourteenth aspect of the invention are possible and include, for example: 1) wherein first mechanical grasping and relocating means and second mechanical grasping and relocating means are the same; 2) wherein first mechanical grasping and relocating means and second mechanical grasping and relocating means are not the same; 3) further comprising altering the temperature of an ingredient within the at least one temporary holder.

In a fifteenth aspect of the invention an automated system for preparing food from ingredients contained in packages, includes: (a) storage means for storing a plurality of packages; (b) heating means for heating ingredients within packages; (c) automated transfer means configured to transfer packages from the storage means to the heating means; (d) automated dispensing means; (e) automated transfer means configured to transfer packages from the heating means to the dispensing means.

Numerous variations of the fifteenth aspect of the invention are possible and include, for example wherein the heating means is selected from the group consisting of i) a hot liquid bath, ii) a convection oven, iii) a microwave oven, iv) an infrared heater, v) a solid-state radio frequency (RF) oven, vi) hot air, and vii) steam.

In a sixteenth aspect of the invention a method for automatically disposing of an empty or unusable flexible ingredient package, includes: (a) grasping the package with a mechanical grasper; (b) repositioning the package above a waste container; (c) releasing the package from the grasper into the container.

In a seventeenth aspect of the invention a method for preparing food for a food consumer, wherein the food requiring both heated and non-heated ingredients, includes the consecutive steps of: (a) dispensing at least one ingredient into a receptacle; then (b) heating the at least one ingredient within the receptacle; then (c) dispensing at least one additional ingredient into the receptacle; (d) conveying the receptacle to a food consumer.

In an eighteenth aspect of the invention a flexible package for storing and dispensing a plurality of ingredients, includes: (a) at least two compartments arranged one above the other when the package is oriented for dispensing; (b) a peelable seal below each compartment, the peelable seal comprising at least one non-horizontal region.

In a nineteenth aspect of the invention an apparatus for dispensing the contents of an upright flexible package comprising two film regions and an openable seal between the two film regions located below the contents of the package wherein the flexible package further comprises extensions of the films below the seal, the apparatus includes: (a) actuated gripping means configured to grip the package along two opposite vertical edges in locations proximal to or lower than the openable seal; (b) actuated moving means configured to move the gripping means in opposite directions to horizontally tension the lower portion of the package and the extensions; (c) actuated grasping and tensioning means for grasping the extensions and tensioning them to open the seal.

In a twentieth aspect of the invention a method for unsealing and dispensing a flexible package having an openable seal and flaps extending below the seal, includes:

(a) orienting the package upright with the openable seal toward the bottom of the package; (b) grasping the package along two opposite vertical edges; (c) pulling the two edges in opposite directions.

Numerous variations of the twentieth aspect of the invention are possible and include, for example wherein the peelable seal has the shape of a chevron having an apex at the bottom, and wherein the package is grasped at a height substantially equal to or lower than the height of the apex.

In a twenty-first aspect of the invention a method for dispensing a food ingredient from a package, includes: (a) providing a sealed package containing a food ingredient wherein the package comprises at least one flexible film comprising a left portion and a right portion with each portion having an inside and an outside surface with the inside surfaces facing each other and at least a portion of the inside surfaces contacting the ingredient and wherein the portions are sealed to one another to form at least one cavity containing the at least one ingredient and wherein adjacent to the at least one ingredient, the sealing comprises at least one openable region and wherein the package comprises two opposite edges and two unsealed flaps beneath the seal; (b) gripping the package near the two edges and pulling outwardly on the package to apply tension to it; (c) separating and reorienting the flaps; (d) clamping the flaps and applying tension to them; wherein the package is opened.

Numerous variations of the twenty-first aspect of the invention are possible and include, for example wherein the seal comprises a chevron having an apex at its bottom and wherein the gripping is substantially at or lower than the height of the apex.

In a twenty-second aspect of the invention a device for applying tension to at least one portion of a sealed flexible package (e.g. a flap portion) to open the package and dispense the contents from within the package, includes: (a) a moveable upper clamp configured to move along an upper clamp path and comprising an upper clamping surface configured to contact a portion of a flexible package from above; (b) a moveable lower clamp below the upper clamp configured to move along a path at least partly common with the upper clamp path and comprising a lower clamping surface configured to contact the portion from below; (c) movement means to move at least one of the upper clamp and lower clamp while the portion contacts upper and lower clamping surfaces.

Numerous variations of the twenty-second aspect of the invention are possible and include, for example: 1) further comprising guiding means to guide the upper and lower clamps to move at least partially along the upper clamp path; 2) further comprising urging means to urge the upper clamp downward against the portion, wherein the urging means is selected from the group consisting of i) weight, ii) mechanical spring, iii) gas spring, iv) at least one magnet, v) at least one electromagnet, vi) at least one electropermanent magnet, vii) electrostatic element, and viii) adhesive; 2) further comprising support means configured to prevent the upper clamp from descending as low as the lower clamp; 3) further comprising at least one blade having a lower edge around which a portion of a flexible package is partially wrapped and redirected; 4) further comprising a high friction material on the upper and lower clamping surfaces.

In a twenty-third aspect of the invention a method for applying tension to portions of a flexible package to open the package, includes: (a) providing a moveable upper clamp able to move along an upper clamp path and having an upper clamping surface configured to contact a portion of a flexible package from above; (b) providing a moveable lower clamp below the upper clamp able to move along a path at least partially in common with the upper clamp path and having a lower clamping surface configured to contact the portion of the flexible package from below; (c) introducing a portion of a flexible package into the space between upper and lower clamping surfaces; (d) moving at least one of the upper or lower clamps until the portion of the package contacts both upper and lower clamping surfaces; e) moving the upper and lower clamps in a direction that applies tension to the portion thereby opening the package.

In a twenty-fourth aspect of the invention a dispenser for a flexible package, includes: (a) two substantially symmetric and aligned pouch unsealing and dispensing subsystems facing one another; (b) mechanical means for increasing the gap between the subsystems and for decreasing the gap while maintaining alignment of the two subsystems.

In a twenty-fifth aspect of the invention a flexible package containing at least one substance, includes: (a) at least one flexible film comprising a left portion and a right portion and wherein the portions are partially sealed to one another to form at least one compartment containing the at least one substance; (b) a seal comprising at least one openable region; (c) an unsealed extension of at least one portion of the film; (d) at least one region within the at least one unsealed extension having apertures to allow passage of pushing means.

Numerous variations of the twenty-fifth aspect of the invention are possible and include, for example wherein left and right extensions are provided, with each extension including an aperture, and wherein the apertures of the left and right extensions are in different relative locations.

In a twenty-sixth aspect of the invention a method for manipulating a flexible package comprising unsealed extensions, the method includes: (a) providing a flexible package wherein the package comprises at least one flexible film comprising a left portion and a right portion and wherein the portions are partially sealed to one another and wherein each portion comprises an unsealed extension having an aperture; (b) pushing on a left portion extension by passing pushing means through the aperture of the right portion extension; (c) pushing on the right portion extension by passing pushing means through the aperture of the left portion extension; whereby one extension is separated from the other.

Numerous variations of the twenty-sixth aspect of the invention are possible and include, for example reorienting the extension sufficiently to allow it to be clamped by clamping means.

In a twenty-seventh aspect of the invention a method for automatically emptying an ingredient within a flexible ingredient package into a vessel and disposing of the package, includes: (a) grasping the package with a grasper; (b) dispensing at least a portion of the ingredient into a vessel located beneath the package and overlying a waste container; (c) relatively positioning the vessel so it is no longer located beneath the package or overlying the waste container; (d) releasing the package from the grasper and allowing the at least partially emptied package to fall into the waste container.

In a twenty-eighth aspect of the invention a method for manufacturing a flexible package, includes: (a) providing first and second flexible films; (b) forming aligned apertures in first and second films while the two are in proximity; (c) feeding the first film toward a sealer along a first path; (d) feeding the second film toward the sealer along a second path longer than the first path; (e) sealing together the two films; whereby a flexible package is produced wherein the location of the apertures in the first film and the second film are not aligned.

In a twenty-ninth aspect of the invention a method for opening a flexible package, includes: (a) providing a package having two flaps with non-aligned apertures; (b) inserting pins through the apertures of the flaps; (c) moving the pins to separate the flaps; whereby the package is opened.

Numerous variations of the twenty-sixth aspect of the invention are possible and include, for example grasping the separated flaps and applying tension to them.

In a thirtieth aspect of the invention a method for opening a flexible package, includes: (a) providing a package having first and second flaps each with apertures; (b) inserting a first pad through the aperture in the first flap; (c) clamping the second flap between the first pad and a second pad; (d) inserting a third pad through the aperture in the second flap; (e) clamping the first flap between the third pad and a fourth pad; (f) the pads to separate the flaps; whereby the package is opened.

Numerous variations of the thirtieth aspect of the invention are possible and include, for example wherein grasping the flaps further comprises tensioning the flaps.

In a thirty-first aspect of the invention a method for heating an ingredient, includes: (a) providing an ingredient within a first pouch; (b) providing a second pouch that surrounds the first pouch; (c) opening the second pouch to expose the first pouch; (d) heating the ingredient through the first pouch; (e) opening the first pouch to remove the heated ingredient.

In a thirty-second aspect of the invention a method for heating an ingredient, includes: (a) arranging two plates with inner surfaces facing one another and separated by an angle between zero and 180 degrees; (b) dispensing an ingredient onto the inner surface of at least one plate; (c) moving at least one plate until the inner surfaces are substantially parallel; (d) heating at least one plate; (e) separating the plates; whereupon the heated ingredient leaves the plates and enters a receptacle.

Numerous variations of the thirty-second aspect of the invention are possible and include, for example: 1) further comprising covering the at least one plate with a heat-resistant cover; 2) wherein the cover is retained by vacuum.

In a thirty-third aspect of the invention an automated method for supplying a meal, includes: (a) receiving an order; (b) providing a receptacle; (c) providing flexible packages containing ingredients; (d) determining from the order the ingredients required and the packages containing them; (e) successively dispensing the required ingredients from the identified packages into the receptacle; (f) heating or cooling ingredients which requires heating or cooling.

In a thirty-fourth aspect of the invention an apparatus for automated food preparation, includes: (a) storage means for storing flexible packages each containing at least one ingredient; (b) grasping means configured to grasp the packages; (c) a dispenser configured to unseal each package and dispense the at least one ingredient; (d) a receptacle configured to receive the at least one ingredient from each package; (e) positioning means for moving the packages to the dispenser; and (f) a container for depositing each at least partially empty package.

Numerous variations of the thirty-fourth aspect of the invention are possible and include, for example: 1) wherein the storage means comprises a plurality of cubbies; 2) wherein the grasping means comprises a gripper configured to grip each package at its upper edge; 3) wherein the dispenser comprises moving clamps configured to grasp and apply tension to a portion of each package to open it; 4) wherein the clamps are configured to grasp flaps of the package; 5) wherein the dispenser comprises a blade having an edge around which flaps of the package are partially wrapped.

In a thirty-fifth aspect of the invention a method for automated food preparation, includes: (a) providing a flexible package containing at least one ingredient; (b) providing a motion stage, a dispenser, and a receptacle below the dispenser; (c) grasping a first portion of the package; (d) moving the motion stage to position the package in proximity to the dispenser; (e) grasping at least a second portion of the package; (f) opening the package to discharge the at least one ingredient into the receptacle.

Numerous variations of the thirty-fifth aspect of the invention are possible and include, for example: 1) wherein the opening comprises peeling a peelable seal of the package; 2) wherein the opening further comprises substantially peeling apart two walls of the package.

In a thirty-sixth aspect of the invention a flexible package for cooking a food item, includes: (a) a food item compartment enclosed by a heat-resistant material; (b) a permeable support below the food item compartment; (c) a liquid compartment below the permeable support; (d) a grease-absorbing filter above the food item compartment; (e) at least one openable seal.

In a thirty-seventh aspect of the invention a storage device for a plurality of flexible packages, includes: (a) a flexible package support comprising a plurality of substantially coplanar tilted surfaces; (b) an individually-controllable vibration means coupled to each tilted surface; (c) a stop at the lowest end of the device.

In a thirty-eighth aspect of the invention a method for fabricating a perforated flexible package from two continuous webs of film, includes the steps of: (a) providing a first and a second web of film; then (b) perforating the first and second film; then (c) advancing the first film towards sealing means along a part of length A while advancing the second film towards sealing means along a path of length B where B is greater than A; then (d) sealing the first and second film together to form a package.

In a thirty-ninth aspect of the invention a flexible package for self-contained cooking of an ingredient contained therein, includes: (a) at least two flexible films each having a bottom and a top edge; (b) a cavity for an ingredient; (c) an openable discontinuous seal between the films below the ingredient cavity; (d) a cavity for liquid below the seal; (e) a first openable seal between the films below the cavity for liquid; (f) a second openable seal between the films above the ingredient cavity; (g) filtration material above the second openable seal; (h) at least one aperture in at least one film above the second openable seal.

Numerous variations of the thirty-ninth aspect of the invention are possible and include, for example wherein at least a portion of at least one film is heat resistant.

Numerous additional variations of the aspects are possible and may include for example, variations associated with one aspect of the invention being applied to other aspects. Other aspects of the invention will be understood by those of skill in the art upon review of the teachings herein. Other aspects of the invention may involve combinations of the above noted aspects or variations of aspects of the invention. It is intended that variations of one aspect of the invention may be applied to other aspects of the invention and that various features of one or more aspects of the invention be useable in other aspects of the invention and even that sub-combinations of various features of one or more aspects of the invention may provide new aspects of the invention. Combinations are considered appropriate so long as the combinations do not remove all functionality provided by individual components. These other aspects of the invention may provide various combinations and sub-combination of the aspects presented above as well as provide other configurations, structures, functional relationships, processes for making, and/or procedures for using that have not been specifically set forth above.

BRIEF DESCRIPTION OF THE DRAWINGS

FIGS. 7(a)-(b) illustrate a dispenser for a chain of pouches.
FIGS. 8(a)-(k) illustrate a dispenser.
FIGS. 9(a)-(b) illustrate a method for dispensing.
FIGS. 13(a)-(b) depict a dispenser.
FIG. 13(c) is a view of a pouch.
FIGS. 13(d)-(g) depict a dispenser.
FIGS. 14(a)-(b) illustrates a dispenser.
FIG. 14(c) is a view of a pouch.
FIG. 14(d) is a view of a pouch and portion of a dispenser.
FIGS. 16(a)-(d) depict a storage device for pouches.
FIGS. 17(a)-(d) illustrate storage devices for pouches.
FIGS. 18(a)-(d) are views of a storage device for pouches.
FIG. 19(d) illustrates removal of a package.
FIGS. 19(e)-(f) are views of a storage device for a package.
FIGS. 20(a)-(n), FIGS. 21(a)-(n), and FIGS. 22(a)-(b) depict movements of pouches in storage devices.
FIGS. 23(a)-(f) illustrate steps in inserting a pouch into a storage device.
FIGS. 24(a)-(c) depict systems comprising storage and/or dispensing.
FIG. 24(d) shows removal of a pouch from a storage device.
FIG. 25 illustrates a system comprising storage and dispensing.
FIGS. 26(a)-(g) depict automated food preparation apparatus.
FIGS. 33(a)-(b), FIG. 34, FIGS. 35(a)-(b), FIGS. 36(a)-(b), FIGS. 37(a)-(c), and FIGS. 38(a)-(f) depict a dispenser.

FIGS. 48(c)-(h) depict a dispenser.
FIG. 48(i) shows movements of a pouch.
FIGS. 48(j)-(k) depict movements of a dispenser.
FIG. 49(a) illustrates a punch.
FIGS. 49(b)-(d) illustrate a process for making a pouch.
FIG. 52(a)-(b) show methods of placing ingredients.
FIGS. 56(a)-(b) show an apparatus for blending.
FIG. 57 shows a device for pouch filling.
FIG. 60 shows a pouch for heating or cooking an ingredient.
FIGS. 61(a)-(f) depict a sequence for heating or cooking an ingredient.
FIGS. 62(a)-(b) illustrates an apparatus and method for heating or cooking an ingredient.
FIG. 65 illustrates a design for a pouch.
FIGS. 66(a)-(b) depict a method for manufacturing a pouch.
FIG. 67 shows a pouch having a shaped cavity.

DETAILED DESCRIPTION OF THE EMBODIMENTS

Pouches and Other Containers, Ingredients

Dispensing of ingredients from containers by simply tilting/inverting the container, or providing a passage through the container bottom—and relying on gravity alone—can be very inefficient for many ingredients (i.e., a significant percentage of the container contents will remain in the container after dispensing), and often involves contamination of system components. Key problems associated with automated food preparation may be addressed by providing ingredients in containers or packages which can be handled by suitable apparatus, processes, and algorithms in various embodiments of a food preparation system. In this regard, properly-designed flexible packages (hereinafter typically called "pouches") are particularly advantageous in terms of ingredient quality (e.g., freshness), food safety, and the wide variety of ingredients that can be stored and dispensed (e.g., low, medium, and high-viscosity liquids; solids; powders; gels; pastes; moist solids; liquid/solid mixtures; and gases). Among the benefits of pouches over alternative packages such as hoppers and other rigid containers are: 1) low cost; 2) compact (small overall volume; can be stored closely together, especially when empty) and lightweight; 3) environmentally friendly, using less material and often fully recyclable; 4) easily made in different sizes and shapes; 5) can serve as pulseless, peristaltic-like pumps to dispense flowable ingredients without contact over a wide range of viscosities; 6) can be evacuated, provided with barrier layers, and filled with gasses to prolong shelf life, avoid oxidation, etc.; 7) can easily be opened by cutting, peeling, etc.; 8) can be opened to their full width to release large items; 9) allows ingredients to be cooked (e.g., sous vide), warmed, or cooled within the pouch; 10) can be subdivided into compartments; 11) easily sealed, can be re-sealed if desired; 12) allows "on the side" ingredients such as salad dressing to be delivered directly to customers in convenient form; 13) can be used for in-pouch processing such as coating (e.g., with breadcrumbs), mixing, beating, blending, marinating, and other operations involving multiple ingredients (e.g., a pouch containing fish can be emptied into another pouch containing a coating mix which is then sealed and tumbled); 14) if pouches contain just a single serving/portion, allows exact portion control, perfect inventory tracking and traceability, and removal of expired product without contaminating other product; and 15) enables novel and inventive designs allowing dispensing that is non-contact and efficiently discharges virtually the entire ingredient from the pouch (e.g., by passing the pouch around a blade).

Figure 1:
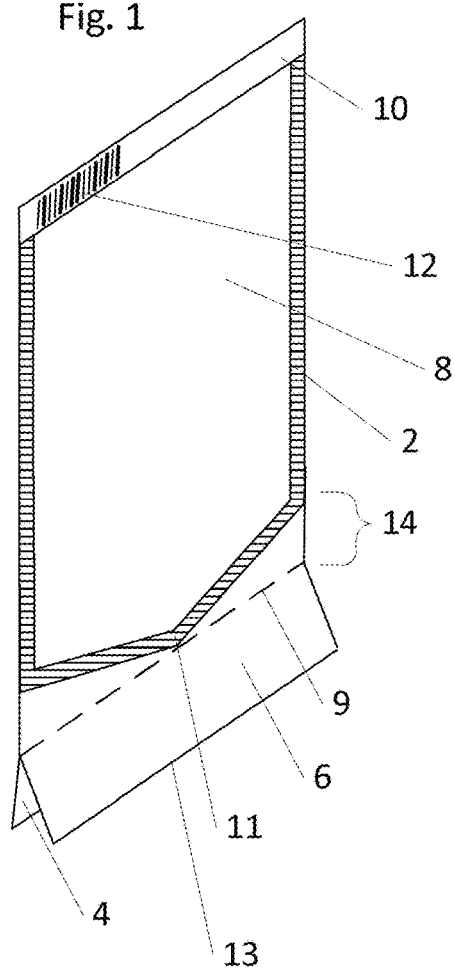
FIG. 1 depicts a typical flexible package used in some embodiments.

A representative pouch used in some embodiments of the invention and able to contain one or more food ingredients, a fully-prepared meal, etc. is shown in an upright orientation in FIG. 1. Such a pouch is intended to be simple in construction so it can be produced costly-effectively by manufacturing lines for pre-made pouch lines or in form/fill/seal machines known to the art of flexible packaging. Pouches may have very different appearances than as shown, especially if vacuum packed. Pouches may be made in different shapes and sizes (e.g., wide for items such as steaks, chicken breasts, fish fillets, cheese and bread slices, tortillas, and sliced tomatoes; or narrow for asparagus). Pouch contents may be as-supplied or in a partially-processed state (e.g., ingredients added to a pouch for use at a later time during the preparation process of a specific meal). Hereinafter, the term "ingredient", "substance", or "food item" shall generally refer to any and all contents of a pouch, including multiple distinct ingredients which may co-occupy a pouch, as applicable. The pouch can be made from various film materials including combinations of materials (e.g., in different layers) such as polymers and metals. For longer term storage of food, for example, the pouch may comprise a barrier layer known to the art such as EVOH or a metal film, as is typically found in a retort pouch. Pouch materials may include polyethylene films, polyethylene terephthalate (PET) films, multi-layer films such as polyethylene/nylon, films containing a polymer and a metal foil, films containing a polymer and a sealing material, films containing absorbers of gas (e.g., oxygen, ethylene), etc.

As constructed, the pouch of FIG. 1 typically comprises two flexible films which are sealed (e.g., heat-sealed) together (though a single film folded at the top may be used in some embodiments) with seal 2 that may be permanent or openable (e.g., peelable); typically unsealed, opposing distal "flap" extensions/portions of films 4 and 6 at the bottom, having top bend lines 9 and lower edges 13; and at least one cavity or compartment 8 for ingredients. Some pouches may however use one relatively rigid film and one flexible film, in which case a single flap associated with the flexible film may be adequate if the other film is rigid enough (e.g., if thermoformed) to allow peeling away of the flexible film by pulling on one flap. The cavity may result from the deformation of the flexible walls of the pouch or may be pre-formed (e.g., thermoformed), etc. A top seal 10 is formed (e.g., by heat or ultrasonic sealing) at the top of the pouch after loading (and in some cases, after removal of at least some of the air within, and sometimes, introduction of an inert gas); this seal need not be openable. A bar code (1-D, 2-D) or other method of identification (e.g., RFID or NFC tag) on the pouch allows machine reading of pouch-related information, and may be located on seal 10 or elsewhere. Human-readable information such as expiration date may also be provided. Seal 2 is openable in its lower region 14, and to facilitate opening may have a "V" or chevron shape as shown, with an apex 11. In some embodiments seal 2 is peelable (e.g., at least one film may comprise a peelable heat sealable material known to the art of packaging) allowing the pouch to be unsealed by pulling apart the flaps, which may be shorter than those shown in FIG. 1. Seal 2 may be openable in its upper (vertical in FIG. 1) regions, especially for ingredients which are most thoroughly dispensed by opening all or most of the pouch during dispensing (i.e., separating the films comprising the pouch almost entirely from one another, though usually not including seal 10).

Figure 2:
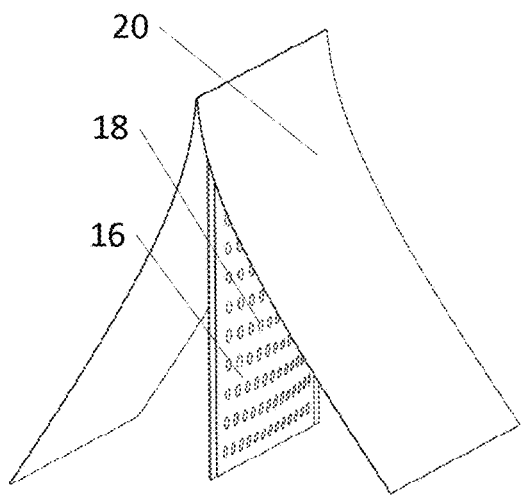
FIG. 2 illustrates a pouch having an inner pouch.
Figure 3:
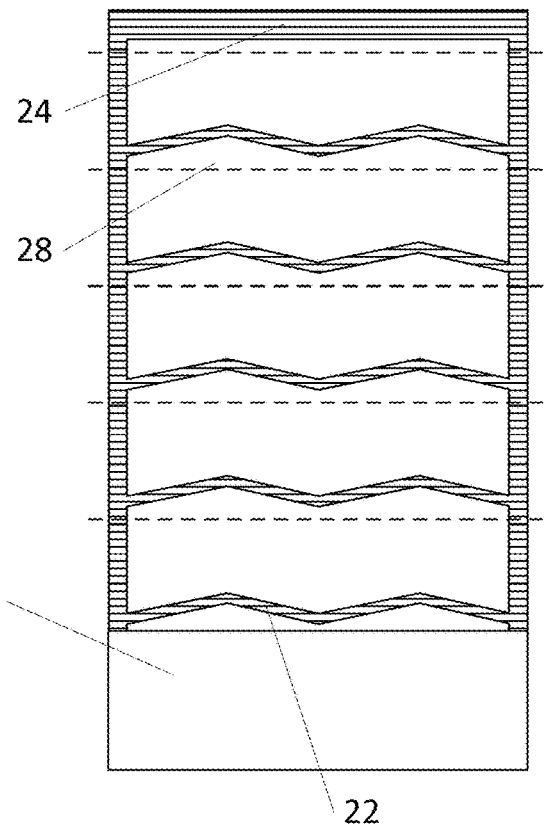
FIG. 3 shows a pouch having multiple compartments.

Pouches may have complex constructions. For example, a pouch intended to dispense an ingredient consisting of small pieces (e.g., a powder) may comprise an inner pouch 16 as in the 3D view of FIG. 2 with holes 18, surrounded by films 20 on at least one side, the films forming an outer pouch which is attached to the inner pouch (e.g., at the tops of inner and outer pouches. The outer pouch may be made to press on pouch 16 walls (and obscure holes 18) by vacuum packing pouch 20, etc., preventing any item from leaving pouch 16 prematurely, before the outer pouch is opened. In some embodiments, pouches may include other provisions and fitments, whether internal or external. For example, pouches may include elements which assist with the process of dispensing (such as stiffening the pouch near an upper edge), or which help protect the ingredients within (e.g., elements which reduce the risk of crushing), or which improve recyclability, etc. Seals need not be straight, horizontal, or vertical, but can be for example, angled with respect to the direction of peeling. For example, FIG. 3 depicts a pouch having zig-zag seals 22 that are peelable, as well as a top seal 24 and flaps 26 at the bottom. If desired each compartment may be filled no higher than fill line 28 shown, allowing room for a squeegee to impinge on the pouch squeeze out items in each compartment in sequence. Depending on the ingredients, compartments may be isolated not by liquid-tight seals/walls but by porous or partial barriers (e.g., for solid foods such as sliced meats or vegetables). Pouches may be subdivided into multiple cavities. If ingredients interact and should not be combined until shortly before the food is consumed, they can be kept isolated (e.g., lettuce and salad dressing may be kept separate until needed). If a pouch with multiple compartments is peelable, in some embodiments it may have horizontal cavities stacked one above the other, so that a pouch dispenser—if it begins to peel the pouch from its bottom—will successively release the contents of each compartment. Pouches can be very tall (along the vertical axis) to allow for more and larger compartments.

Perforated or gas-permeable pouches may be used to allow respiration for certain ingredients (e.g., spring mix lettuces, celery, cucumbers, tomatoes, bananas, broccoli, leeks) and/or provide drainage of excess moisture to prevent spoilage. If perforated, very small holes/micro-perforations (e.g., 5-300 microns diameter) may be desirable to control respiration (e.g., one or more 100-micron holes in a pouch) but also to minimize the risk of contaminants and/or insects from entering the pouch or ingredients escaping. Such perforations can be produced by lasers or mechanical perforating techniques known to the art. Alternatively, at least a portion of the pouch may comprise a woven, nonwoven, or mesh material.

A variety of food items (single ingredients or combinations thereof) may be dispensed from a pouch whose inner surfaces are non-wettable (e.g., superhydrophobic, using the technology of LiquiGlide, Cambridge, Massachusetts). If the intent is to dispense the ingredient fully and as quickly as possible into a receptacle (e.g., dish or vessel) as is typically the case, such dispensing may consist essentially of opening the pouch at its bottom and allowing the item to fall out. However, without superhydrophobic surfaces, which may be too costly especially for single-use pouches, or for more controlled dispensing, novel apparatus and methods as described herein are favorably employed.

Food items may be classified as Type 1, 2A, or 2B, and dispensed efficiently, depending on their properties, using one or more of three optimal approaches, though non-optimal dispensing of a particular ingredient may also be implemented (e.g., if the optimal approach is not available). Type 1 items are flowable with a wide range of viscosities; these can be dispensed very effectively in some embodiments by methods and apparatus that implement a peristaltic squeezing/displacement/expressing approach in which i) the pouch is opened at the bottom (fully or partially); and ii) pressure is applied to the flexible walls of the pouch either generally to compress them, or to locally compress the walls and move the region of compression downwards, displacing the pouch contents toward the opening (or through an extrusion nozzle, if provided). In some cases in which the pouch is sealed with a peelable/burstable seal at its bottom and with a suitable ingredient, step i) is not needed, since pressure buildup within the pouch will open it, but this should be well-controlled. Flowable items include a wide variety of liquids ranging from oil to nut butters to guacamole, and are not limited to pure liquids, gels, or pastes, in that they may contain solids combined with a volume of liquid sufficient to allow the item to flow. Type 2A and 2B items, in contrast, are not particularly flowable, and would more likely be crushed than dispensed if pressure were applied to the pouch with the item inside. Type 2A items may be relatively heavy, large, with small surface/volume ratios, and/or are dry, and do not tend to adhere to the pouch inner walls, while Type 2B items may be relatively light, small, have larger surface/volume, and/or are moister, and tend to adhere to the walls. These tendencies are influenced by the state of the ingredient and the composition and condition of the walls, such as their surface energies. Type 2A ingredients may be dispensed in some embodiments by merely opening the pouch and letting them fall out (however, the pouch may be shaken, jerked, accelerated, or vibrated (e.g., by the gripper(s) holding it) in a controlled way so as to promote dispensing but avoid dispersing the item anywhere than intended (e.g., outside a dish, where it could contaminate the system)). Examples of type 2A items include many nuts and iceberg lettuce. However, if this simple approach is attempted for type 2B items (e.g., canned tuna, beans, sautéed vegetables), a significant fraction of the item will typically remain in the pouch, leading to waste, the risk of an unpleasant odor if the item starts to spoil, attractiveness to vermin, and more difficult pouch recycling.

According to some embodiments, type 2B items can be very effectively dispensed by methods and apparatus which peel the walls of the pouch completely apart, such that the item within loses the support of the walls and falls. Depending on size, shape, moisture content, etc., this may be adequate to dispense them. For more challenging items or portions thereof, additional methods and apparatus can be applied to ensure efficient and complete dispensing such as ensuring that 1) the angle between the walls as they are peeled apart is optimal, and 2) providing for one or more blades (as in FIG. 27(c') of the 074 and 253 filings) having a small radius of curvature at its lower edge around which the firm forming the walls of the pouch can be wrapped, and ensuring that the plane of each film changes its angle (is redirected) significantly as it passes over the edge. It has been observed that items which are small, moist, high surface/volume and/or lightweight and which initially adhere to the film usually cannot negotiate the tight turn as the film advances around the blade, due to such properties as stiffness, and therefore fall off the film as desired. Thus, according to some embodiments, a given food item may be classified according to the best method of dispensing it, and the appropriate method and/or apparatus selected. For example, if an item is classified as Type 1, squeezing the pouch may be selected as the preferred dispensing approach (e.g., for efficiency and speed) rather than just opening the pouch, which may not work well if ingredients tend to adhere to the walls, or opening and peeling the pouch. If the item is type 2B, then peeling the pouch entirely apart and passing the films of which it is comprised over blades as in FIG. 27(c') of the 074 and 253 filings may be selected as the preferred dispensing approach. In contrast, pouches for Type 1 or 2A ingredients may not be easily openable except in region 14 (FIG. 1).

In some embodiments certain regions of the pouch seal are made weaker and/or faster-yielding than others. This can be useful so as to allow peeling only in certain regions (e.g., the chevron portion of the seal) while preventing it in others (the sides of the pouch), to allow peeling of an internal seal (e.g., between compartments) but not external seals (separating ingredients from the environment), allowing the pouch to vent in a desired location in case pressure builds up internally (e.g., due to steam and air heating while the pouch is heated). Variations in seal strength can be achieved by methods including a) applying two or more sealant materials to the film used in making the pouch; b) applying a sealing inhibitor to certain regions of the pouch; c) weakening the seal in certain regions by lightly sealing it to a temporary surface which is then peeled off or using a seal material that can be weakened (e.g., by exposure to radiation); d) varying the sealing temperature or pressure in different regions by i) using sealing dies which are differentially heated, ii) using dies having surface topography (some surfaces of the die being lower than others to reduce contact pressure), iii) sealing with a die of variable hardness (e.g., comprising silicone rubber or other temperature-stable elastomer, possibly filled to enhance thermal conductivity), or iv) sealing against a platen comprising materials of variable hardness (e.g., elastomers of two different durometers); e) using a die comprising multiple pieces and/or flexible elements, such that certain regions can be left in contact with/press against the film for a longer time than others; and f) sealing certain regions more than a single time.

Figure 4A:
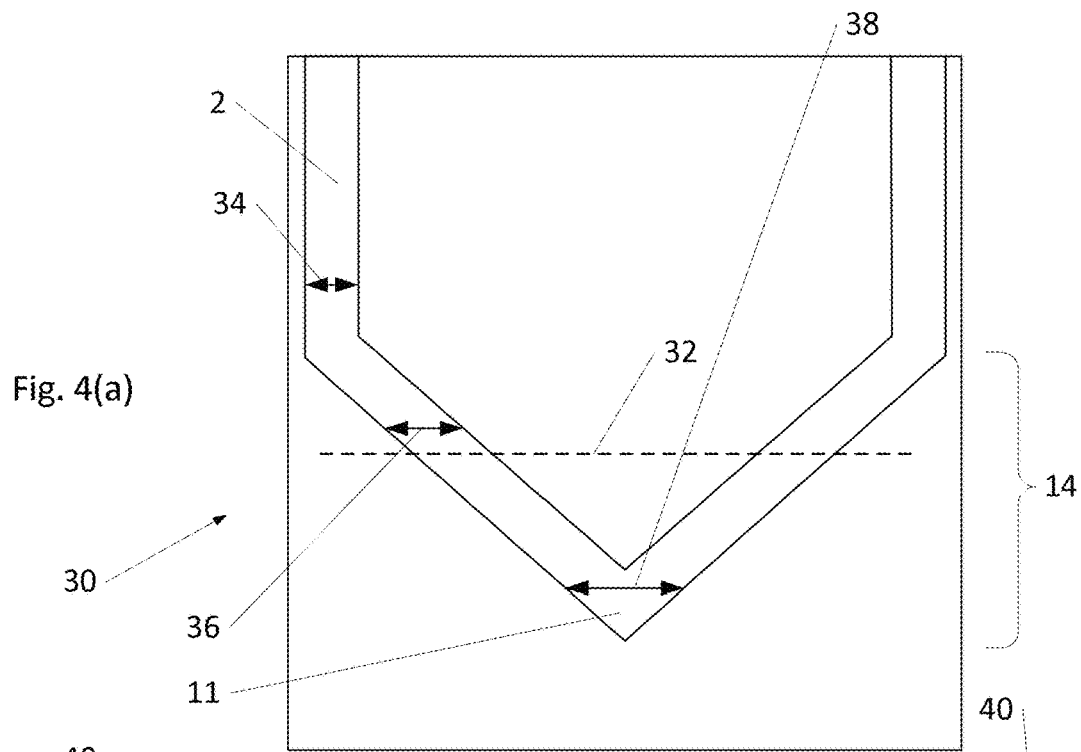
FIGS. 4(a)-(b) depict a pouch having seals with different dimensions.
Figure 4B:
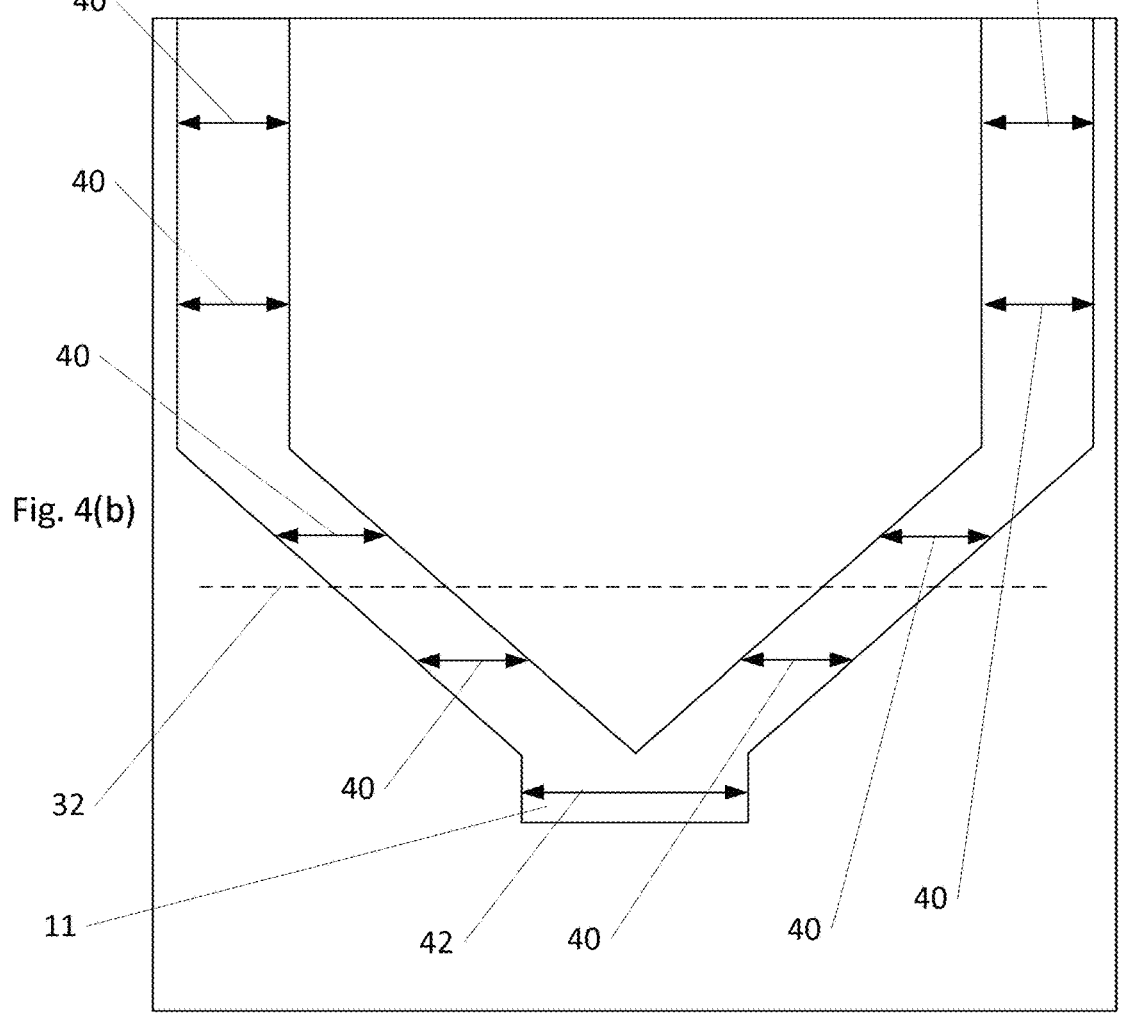

In some embodiments it is desirable that the force required to peel the pouch be fairly constant, for example, in order to better control the tension of the pouch during peeling, which affects the bending radius of the pouch film as it passes around the blade (smaller bending radii improve ingredient detachment from the film). The required force at any moment in time during peeling is normally proportional to the width of the seal being peeled at that time. If the seal has a chevron design such as in region 14 of FIG. 1 and the seal width is constant as shown in pouch 30 in the elevation view of FIG. 4(*a*), the peeling force needed to peel the pouch along horizontal (i.e., parallel to the top edge of the pouch) peel front 32 will vary along the seal since the width at the peel front varies (e.g., 34, 36, 38). However, by adjusting the seal geometry as in the elevation view of FIG. 4(*b*) to make the total horizontal width constant regardless of the location of the peel front, the peel force also becomes constant. Thus width 40 is used for the seal throughout except in the region of apex 11 where width 42 is twice that of width 40.

In some embodiments the film of which an ingredient pouch is made can also be a flexible circuit. With suitable design, such a circuit may allow measurement of temperature, freshness, pouch distortion, fill level, weight, internal pressure (which may indicate leaks or spoilage), etc. The circuit can incorporate built-in strain gauges, capacitive sensors, RFID, vibration sensing, and other elements such as batteries, antennas, data logging circuitry, and GPS. The status of the pouch can be determined from a distance or in contact with it, using for example near field communication, backscatter radio/RFID, passive or active RFID, etc. Using appropriate circuitry, the status and entire history of the pouch from the time it is fabricated (or the ingredient packaged) to the time at which it is opened can be determined.

Figure 5:
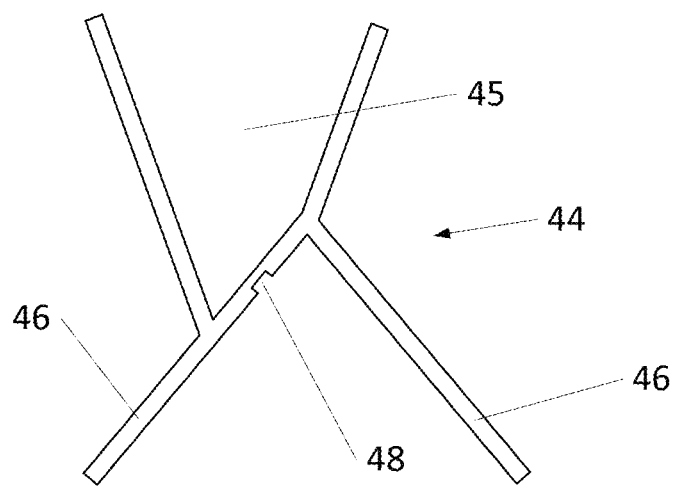
FIG. 5 illustrates a scored pouch with flaps.

In some embodiments, especially for Type 1 and 2A ingredients, pouches may be designed to break in a well-controlled way when forces are applied; this may be used in some embodiments in lieu of peeling them to open them. For example, in the cross-sectional elevation view of FIG. 5, a pouch 44 having an interior 45 includes two flaps 46 and a scored region 48 near the bottom (in the case shown, the pouch is asymmetric, but in some embodiments, it may be symmetric). Scoring can be done by methods including laser or mechanical scoring. When tension is applied to the flaps, the pouch will split along score line 48, releasing its contents. In some embodiments, pouches may be made to rupture in specified locations through the use of heat. For example, a pouch can be melted along a particular line by including conductive traces (or wires) within the pouch films, and applying current to them to induce Joule heating. Or, the pouch can be placed in contact with heated elements such as wires. Multiple scores are also possible. If the score is along a diagonal or has a chevron shape, less force may be used to rupture it, and a variable-width opening can be achieved. Scoring vs. peelable seals can be advantageous for pouches which will be heated after sealing, since heating may reduce peelability, or for pouches which cannot easily be made from peelable films.

Figure 6:
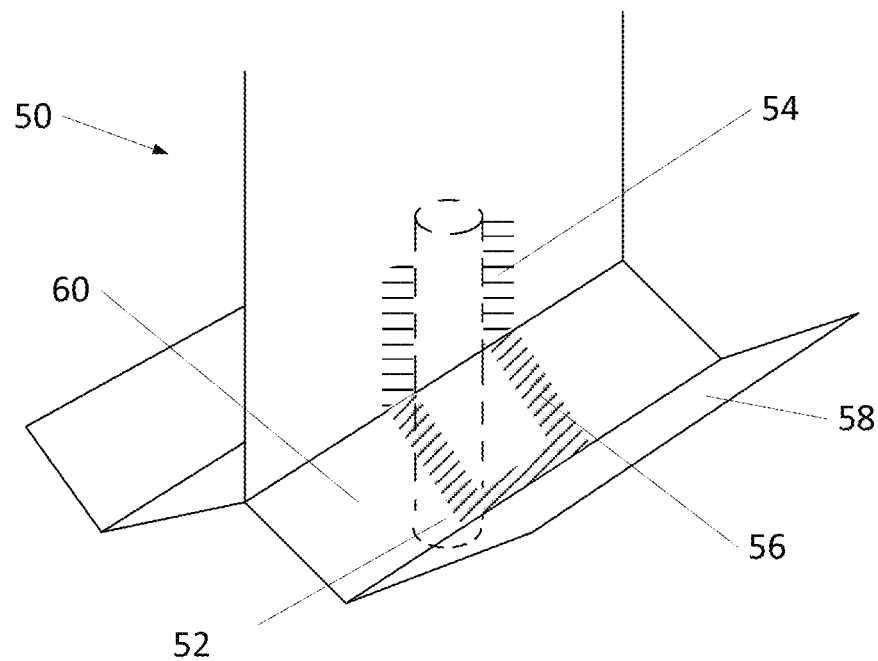
FIG. 6 is a view of a pouch comprising a tube.

The rate at which a Type 1 ingredient leaves the pouch—especially if low viscosity—may be controlled (e.g., eliminating spontaneous dripping so that flow rate is entirely controlled by squeegee motion and can be made consistent) by including a tube (e.g., rigid or semi-rigid plastic, preferably of the same material as the pouch, for recyclability) or similar shape in the pouch, around which the pouch is sealed (peelably or non-peelably) along the upper sides of the tube, such that the inside of the pouch communicates with the inside of the tube. This is depicted in the 3D view of pouch 50 in FIG. 6. Tube 52 provides more flow resistance and establishes a well-controlled width for the pouch opening regardless of the exact amount peeled. Alternatively, the pouch may include a seal that forms a tube-like shape below the chevron. Pouch 50 can be sealed around the upper region of the tube using a peelable or non-peelable seal 54, and sealed around the lower region using a peelable seal 56 (e.g., a U-shaped seal that also seals the tube bottom as shown in the 3D view of FIG. 6, such that by pulling on flaps 58 (e.g., while wrapped around blades, not shown but which may be located in the figure where the flap meets pouch wall 60), the pouch can be opened, exposing the lower end of tube 52, which protrudes and can reach below the pouch. The diameter and length of the tube can be selected according to the ingredient viscosity at the expected dispensing temperature, the desired flow rate when squeezed, etc. A casing such as casing 726 of the 074 and 253 filings, or other means, such as application of vacuum to one side of the pouch or clamping means, can be used to stabilize and stiffen the tube, though in some embodiments maintaining tension on the flaps will suffice. Such an arrangement can be used, for example, to deposit a sauce, dressing, etc. into a specific location in a dish or other substrate (or ingredient within the dish). By moving the dish relative to the tube/pouch, complex patterns may be "printed", including 3D printed (multilayer) structures. The pouch may be lowered and/or the dish raised as much as possible such that the tip of the tube is near the surface onto which the ingredient should be deposited.

Pouches in some embodiments may be formed from combinations of metal foil or vacuum-deposited metal with paper or polymer. For example, parchment paper (on the inside surface of a pouch) laminated to aluminum foil, can allow cooking with a conduction heat source, even of foods that might not be too compatible with aluminum. Or, a pouch may comprise a polymer sealed to two elements (e.g., rectangles) of metal foil that are adjacent to an ingredient within. Thus, the polymer elements of the pouch can provide robustness and a peelable seal, while the metal elements allow the ingredient to be heated/cooked by contacting the foil elements with a heated plate, etc.

Peelable pouches may comprise two peelable films (e.g., heat sealable) sealed with the sealing layers of the films in face-to-face contact. Alternatively, they may comprise a single peelable film in contact with a plain film (e.g., polyester, polyethylene, polypropylene, nylon) or other substrate (e.g., paper, metal foil, TYVEK®). The second case may be advantageous in some embodiments in that it allows the plain film to be optimized for another function, such as printability, opacity, color, mechanical and barrier properties, etc. Moreover, the second case may provide for greater seal uniformity and lessen the risk of shredding the film(s). Since heat sealable coatings may not be perfectly uniformly dispersed and there can therefore be local, random variations, when two such films are bonded, there may be regions having little sealable material, and regions having an excess of sealable material. The former regions may bond poorly, potentially allowing pouch rupture at low pressure, while the latter regions may bond too strongly, initiating a tear in the film(s).

Manufacturing pouches which are both recyclable and have the desired mechanical and/or barrier properties is currently a major challenge for the packaged food industry, since films with the desired properties typically are laminated from multiple layers of different materials which are difficult/impossible to separate for recycling. In some embodiments, a pouch may be produced from multiple materials which are not laminated across their entire surface as usual, but only at the edges or in other specific locations. While such a pouch may not have the same mechanical properties as a laminated pouch, its barrier properties are similar. To recycle such a pouch, one need only trim away the laminated regions; the unlaminated regions, comprising the majority of the material, then separate and can be easily recycled.

In some embodiments, a pouch that is at least partially peelable may be made from a two-layer film in which both layers may be the same material (for recyclability) or different (e.g., a metallized coating on the inside surface of the films. The strength of the peelable seal can be made to be less than that of the bond between the two layers (such that the pouch normally will peel into two pieces) but should not be excessive. Then, if the pouch begins to tear/shred, rather than the entire film tear through as can happen with a one-layer film, the inner layer will separate and remain with the film on the other side of the pouch.

Providing an intentionally weak region of a seal to allow venting of the pouch is possible as discussed, and such a region may preferably be located in the upper portion of the pouch. In some embodiments it is desirable to prevent the escape (or entrance) of anything other than fluids, in which case small perforations, or an incorporated piece of TYVEK®, GORE-TEX®, woven or nonwoven cloth, or screening can be incorporated downstream of the weak region of the pouch as a barrier.

In some embodiments a pouch might use a zipper(s) such as those found in ZIPLOC® bags in lieu of or in addition to a peelable seal.

In some embodiments the pouch can comprise a liquid-absorbing material to absorb liquids from ingredients (e.g., meat, fish). This material is preferably retained in the pouch by being fastened to it, by being located in a separate compartment, etc. In some embodiments the pouch comprises both a primary compartment for the ingredient, and a separate "capture" compartment into which excess liquids can drain. In some embodiment variations, the pathway to the capture compartment is equipped with a check (one-way) valve, which may for example comprise a flap of the material of which the pouch is made which overlies a hole in the primary compartment, and which prevents liquid from returning to the primary compartment. In some embodiment variations, the capture compartment contains a liquid-absorbing material.

Ingredients within pouches may include those that are fresh, frozen, freeze-dried, dehydrated, partially dehydrated, high pressure processed, irradiated, aseptically packaged, etc. Freeze drying, dehydration, etc. allow for larger amounts of food to be provided from small pouches, and reduces weight that needs to be transported when restocking the apparatus. Water or other liquids can be added either from pouches, tanks/reservoirs inside the system, from a water supply outside the system, etc. Unlike food, water if pure (e.g., filtered, UV-sterilized) cannot contaminate components of the machine if in contact with them, and so need not be kept from contacting them.

Many ingredients can be stored in a frozen state and defrosted as needed. For example, ingredients in a pouch containing minimal air can be defrosted (and also heated and/or cooked, if desired) by immersion in warm or hot liquid such as water. While this process can take some time, it is suitable for ingredients comprising a pre-ordered meal, or a meal consumed in quantity during peak hours. Based on historical demand, a number of pouches can be processed this way, even simultaneously. Reheating in water, as well as cooking sous vide, is not affected significantly by total heating time, so ingredients in pouches removed from a bath at different times will be comparable.

Growing Ingredients

Ingredients need not be supplied to automated food preparation apparatus in the state in which they will be used. For example, ingredients can grow (e.g., lettuce), sprout (e.g., mung beans), ferment (e.g., yogurt, kefir), soften (e.g., beans soaked in water), age (e.g., cheese), marinate (e.g., steak immersed in marinade), rise (e.g., bread dough), be ground (e.g., coffee or flour), etc., all within the machine.

Produce can be grown within the automated food preparation machine using techniques such as hydroponics, aeroponics, and sprouting. If produce is grown this way, it can be extremely fresh and flavorful since it can be harvested immediately before consumption and does not require pesticides. Moreover, washing of ingredients can be eliminated and the effort and expense of restocking the machine can be reduced, since ingredients not yet harvested remain fresh for extended periods; produce restocking only then requires transporting small, lightweight items such as seeds. Ingredients may be grown within pouches at least partially. For example, a hydroponic/aeroponic nutrient solution may be inside a pouch along with the plant roots, while outside the pouch the rest of the plant grows. Or, a two-compartment pouch might include a lower compartment for nutrient solution, and a permeable (e.g., perforated) upper compartment for the remainder of the plant. Ingredients may also be grown in other containers than pouches (e.g., rigid containers), and may be grown in large contiguous quantities or small, isolated quantities. Appropriate growing media such as sponges made from peat, rockwool, etc. can be used (e.g., incorporated into pouches or other containers). In some embodiments the normal growing arrangement (roots at the bottom) may be modified (e.g., locating roots at the side, roots at the top) so as to facilitate harvested ingredients falling into a dish or vessel below. In some embodiments crops are grown in the normal orientation (roots at the plant bottom, receiving nutrient solution (e.g., via spray) and receive light from above), but at least some crops are temporarily rotated to another orientation (e.g., horizontal, inverted) during harvesting so that harvested ingredients fall without needing to be touched into a serving dish or other vessel. It may be desirable in some embodiments that an ingredient is grown in fairly small volumes and weights that are portion/serving-sized, thus minimizing the need to cut apart the ingredient into smaller units. However, such processing may still be desirable: lettuce leaves, for example, can be trimmed in their upper extremities, or individual leaves can be cut at the stem.

In some embodiments ingredients may be grown on a continuous translating or rotating surface such as a conveyor belt, dish, or drum, having the properties required to support the plant (e.g., open porosity). If needed (e.g., for fruits) pollen can be dispersed within the growing environment. Lighting (e.g., LED lighting with optimized spectral characteristics) can be provided, and customized for each growing ingredient, as can temperature and humidity. Automated, robotic pruning/harvesting mechanisms may be used in some embodiments, and in some embodiments, ingredients may be induced/constrained to grow in particular shapes and forms by the apparatus, so as to improve growing conditions, facilitate harvesting, etc. In some embodiments ingredients may be detached from their roots when ready to harvest, or cut higher up, by automated cutters or other automated mechanisms that pluck, shear, break, tear, twist, crush, or otherwise process the plant in order to isolate the desired portion of the ingredient from portions that are not to be consumed at the time (or ever: these can be collected for composting, etc.) Methods of cutting can include laser (e.g., excimer or femtosecond lasers which ablate the plant material without burning), high-pressure waterjet cutting, ultrasonic cutting (e.g., a blade coated with a disposable film, or a disposable or cleanable tensioned vibrating wire), a saw blade, string, or cable (similar to a string trimmer used in gardening), etc.

Harvested ingredients can be transported (e.g., by falling directly) from the location in which they're grown to a dish for serving, or to a vessel for further processing. Ingredients not used soon after harvesting can be kept reasonably fresh by spraying regularly with water, etc.

In some embodiments, machines for automated food preparation can include bioreactors or similar apparatus allowing cultured meat, fish, or poultry to be grown within the machine, e.g., within portion-sized pouches, molds, or other containers.

First System

FIG. 7(a) depicts a 3D view of the supply, dispensing, and waste collection portions of a food preparation system wherein pouches 61, shown empty for clarity and sealed on all sides, are combined into a chain 62 and wherein the pouches are opened and dispensed from individually along side edge 64, i.e., an edge parallel to the long axis of the chain. As shown in the figure, chain 62 may generally move horizontally in direction 63 as more and more pouches are opened for dispensing. However, as shown in the elevation view of FIG. 7(b), chain 62 may be redirected (e.g., by passing over diagonal rollers or brushes, not shown) so that portions of the chain can move vertically in direction 65 as well as horizontally, while still allowing dispensing from side edges 64 of the pouches. Pouch chain 62 may have transverse perforations 66 other than near the top of the chain. It can then be opened if needed by fully peeling one wall away from the other in the direction 67 as already described, and allowing each wall to then hang from the unperforated portion of the chain at the top. Depending on the amount of the wall peeled, the perforations may be broken/torn to varying lengths. In some embodiment variations, in lieu of perforations, the chain may be scored, and in some embodiment variations, the walls may be cut while peeling. In some embodiment variations, the pouches are already separated and simply hang from a continuous strip at the top edge. In some embodiment variations, flaps 68 may be provided near the side seal of each pouch to assist with opening the pouch, as described elsewhere herein. The side seal may be equipped with a chevron seal to aid in peeling. The details of dispenser 70 are not shown for clarity, but may be similar to dispensers described elsewhere herein such as the side-entry dispenser of FIG. 14(a) below. The chain may be stored on a spool in a supply case 72, or may be folded in an accordion-like manner as shown. After dispensing into a receptacle such as dish 74 below the dispenser, the chain may be collected on spool 76 which rotates in direction 78. In some embodiments the chain has sprocket holes at its top edge to aid in feeding it and supporting it (using sprockets).

Pouch chains that move horizontally (e.g., FIG. 7(a)) are in some embodiments desirable for several reasons: a) ease of filling with ingredients (rather than fetch a new pouch, just advance the chain); b) speed and ease of dispensing and disposing of empty pouches (fetching the pouch from a distance isn't needed, and removal of empty pouches occurs while the chain is indexed). Horizontal pouches can also be spliced (joined together) more easily than vertical chains, in which there are two layers of film everywhere, which must remain separable. In a horizontal chain, the pouches are more independent and a margin between pouches can be provided to allow cutting and splicing: the margin can comprise a single film layer or two layers that are bonded together non-peelably. Horizontal chains can be homogeneous (typically for a multi-dispenser system) or heterogenous (typically for a single-dispenser system) in terms of the ingredients they contain. Heterogenous chains may contain all the ingredients needed for a meal, arranged in the normal sequence of dispensing; if an ingredient is not wanted, it can be dumped or the chain can index further so as to skip the pouch containing it.

Dispensers such as those of FIG. 7(a) or 7(b), or other dispensers, can be incorporated into a compact and rapid system for automated food preparation such as that of FIGS. 29(a)-(d) of the 074 and 253 filings, or into other systems. For example, a rotary system can comprise a group of dispensers such as that of FIG. 7(a), e.g., each for a different ingredient, arranged radially with a turntable underneath on which dishes move from station to station as the turntable rotates. Supply cases 72 can be located at a larger radius than the dishes, and spools 76 can be located at a smaller radius (e.g., near the system center). Once a dish is fully loaded, it can be transferred (e.g. by a radial conveyor) to a box for pickup.

Individual Pouch Dispensing

The function of the dispenser is to dispense ingredients from pouches efficiently, i.e., to eject as much of the pouch contents as possible, do so quickly (e.g., in 2-3 seconds), and do so with hardware that is as simple and inexpensive as possible. Moreover, the subsystem should be able to dispense an ingredient without physically contacting it, such that the ingredient only contacts the inner surface of the pouch/strip and does not contaminate any portion of the machine, thus obviating the need for cleaning (whether in-situ or after removal) or replacement. FIGS. 8(a)-(f) depict 3D views of a "universal" dispenser used in some embodiments for dispensing ingredients from an individual pouch. The dispenser is universal in that it can dispense any of Type 1, 2A, or 2B ingredients since it has the ability to open the pouch, express flowable contents inside, and peel it apart around blades and in a direction that is appropriate for Type 2B ingredients. In some embodiments dispensers based on FIGS. 8(a)-(k) (and other universal dispensers such as those of FIGS. 13(a)-(b) and (d)-(g) can be more specialized (e.g., for use in a multi-dispenser machine) and only provide a subset of the functionality. For example, a dispenser for type 2A and 2B ingredients only need not comprise apparatus to express flowable ingredients, while a dispenser for type 1 and 2A ingredients only may comprise different apparatus for opening the pouch (e.g., in which pouch flaps are tensioned horizontally, or at a smaller upwards angle, or even downwards if space permits, and may include blades to change the direction of tensioning rather than using them also to detach adherent ingredients.

In machines having multiple types of dispenser, the controller (computer, microcontroller, etc.) may select the appropriate type of dispenser for a given ingredient.

Figure 8A:
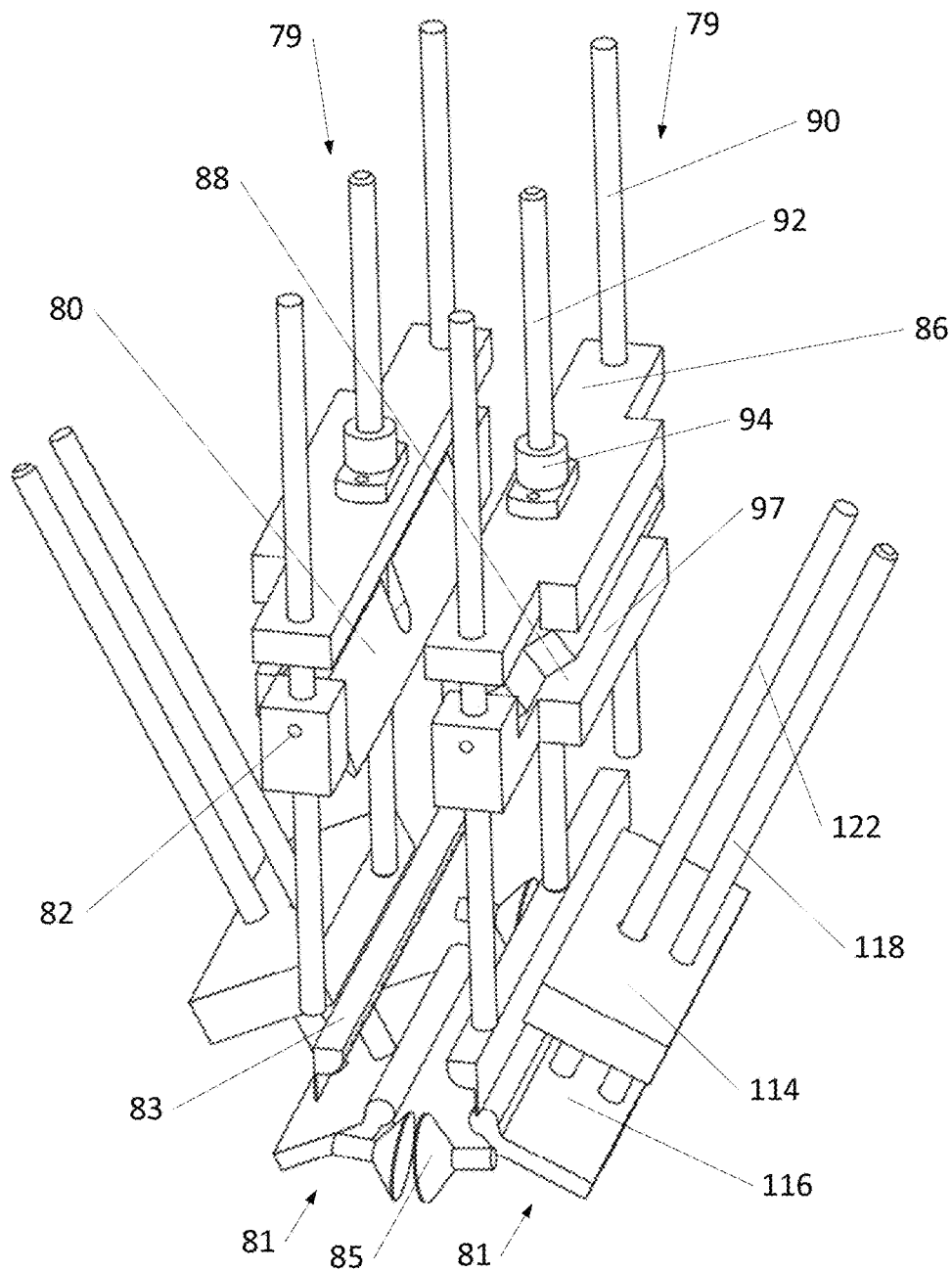

In FIG. 8(a), the main components of the dispenser are seen. The dispenser overall may comprise two each of a squeezer 79 (also FIG. 8(b)) and a peeler 81 (also FIG. 8(c)), and may comprise blades 83 and moveable vacuum cups 85 used in conjunction with the peeler. Opening a pouch such as that of FIG. 1 may involve the sequential steps of 1) separating and reorienting the flaps so they can be clamped by the peeler clamps; 2) clamping the flaps securely with the peeler clamps; and 3) moving the clamps so as to apply tension to the flaps and open the pouch.

The squeezer, used for Type 1 food items, serves to impinge a squeegee, roller, or similar (hereinafter "squeegee" unless noted) against the wall of the pouch and move downwards toward the pouch opening, pushing out the item. The squeezer may be designed so the squeegee can retract away from the pouch (e.g., to allow it to be loaded). In the embodiment shown, the squeezer achieves movement to and away from the pouch, and downwards movement economically, with a single motor as actuator. The squeezer may comprise tilting squeegee 80 which tilts around pivot 82 and has inner working end 84 that contacts the pouch outer wall, upper member 86, lower member 88, at least one guide rod 90, lead screw 92 and nut 94 fixed to the upper member. It may further comprise standard items known to the art such as a motor to turn the lead screw, power transmission components (e.g., gears, pulleys) connecting the motor and lead screw, various brackets to support motor and guide rod(s), a spring (not shown) or similar (e.g., compression, gas, constant force, cable passing over a pulley connected to a weight) that urges lower member 88 upwards, and an optional spring that tilts the working end of the squeegee down, none of which are shown. The squeegee may also be weighted so it normally tilts down without a spring. The upper member comprises a boss 96 at its bottom that can press on the on the end of the squeegee opposite its working end to tilt the squeegee, and bushings/bearings that allow it to slide on the guide rod(s). The lower member comprises a stop 97 which prevents the squeegee from tilting past a certain point, and bushings/bearings surrounding the guide rod(s). The squeegee may have relief 98 to allow its working end to tilt downwards without the squeegee interfering with the lead screw; a relief in the lower member (shown) may also be provided if needed. Both the upper and lower members are able to slide on the guide rod(s).

Figure 8D:
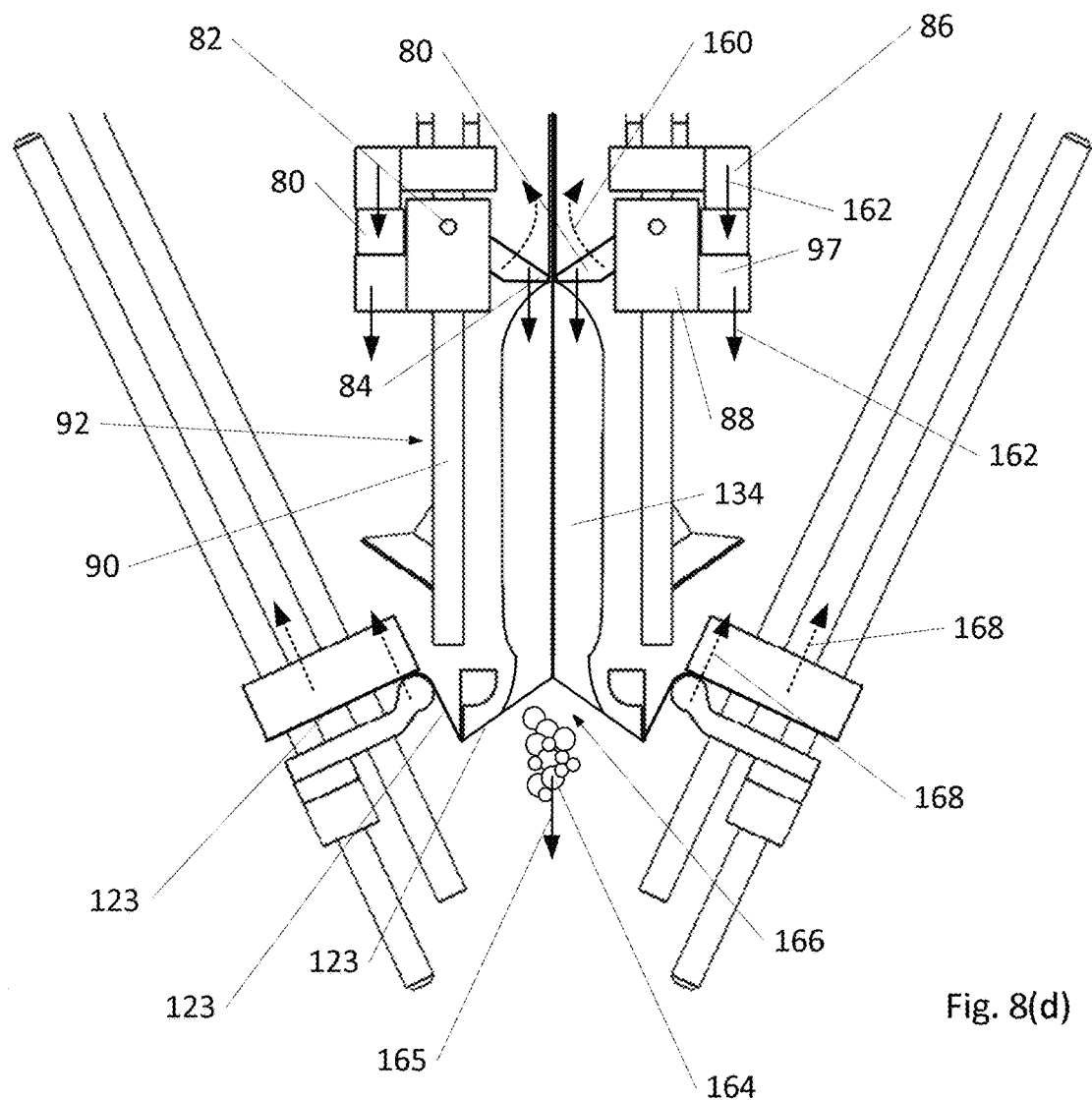
Figure 8K:
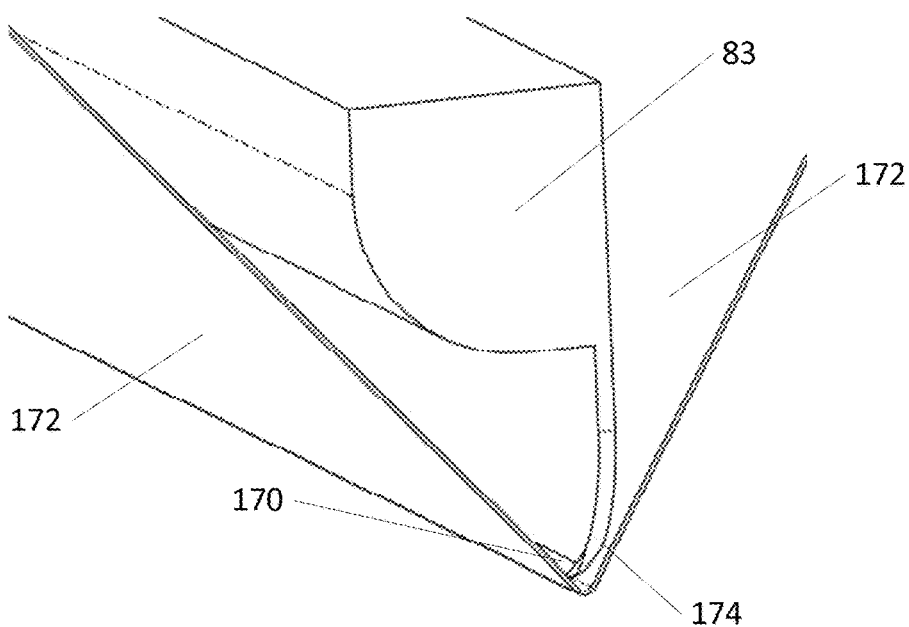

As shown in the elevation view of FIG. 8(d), in operation the squeezer motor rotates lead screw 92 forcing nut 94 downwards, and with it, upper member 86 to which it is attached. Since lower member 88 is urged upwards by a spring, boss 96 on the upper member pressing on the end of the tilting squeegee first causes the squeegee to rotate about pivot 82 until working end 84 contacts the pouch outer wall (this rotation 160 has already occurred in FIG. 8(d)), at which time the outer end contacts stop 97 on the lower member (the gap seen the figure between upper and lower members is not required). As the upper member continues to move downward, the upper member, lower member, and squeegee travel downwards in the direction 162 toward the pouch outlet as a unit, causing squeegee 80 to slide along the pouch and push out the contents. During this motion, friction with the pouch outer wall and the reaction force from the contents within produce a moment on the squeegee which also helps to maintain it in the desired orientation, with its working end contacting the pouch. While the squeegee is moving, gripper(s) 100 (FIG. 8(e)) gripping the pouch at its top securely hold it in position. The pouch may open when its contents are pressurized by action of the squeezer, or it may be peeled open by the peeler before activating the squeezer, etc. Once the squeegee has traveled low enough that the majority if not all of the pouch contents have been expelled, the squeezer is reset: the motor reverses direction, causing upper member 86 to rise, and allowing the spring acting on lower member 88 to make it rise as well. At some position, depending on the spring characteristics, the upper member will move further than the lower member, allowing squeegee 80 to tilt again so it retracts from the pouch and its working end is down. The pouch may be withdrawn from the dispenser by the gripper(s) once the squeegee has retracted. FIG. 8(d) also depicts food items 164 falling in direction 165 from pouch outlet 166 once pouch has been peeled open by lower and upper clamps in direction 168.

In some embodiments only one squeezer is used, and a substantially rigid plate adjacent to the opposite wall of the pouch is provided. Then, the single squeegee generates the force needed to dispense the item after tilting to squeeze both pouch walls between its working end and the plate. In some embodiments in lieu of one or more moving squeegees, one or more inflatable bladders 102 are used as shown in the elevation views of FIGS. 9(a)-(b) to squeeze pouch 104, e.g., one supported by gripper(s) 100 attached to an arm 106, over a dish. In FIG. 9(a) the bladders 102 re deflated, allowing the pouch to be inserted into a dispenser, while in FIG. 9(b), they are inflated as indicated by arrow 106, expelling the pouch contents 108 in direction 110 toward dish 112. In some embodiment variations, the bladder is designed (e.g., through a vertical gradient in cross-section or stiffness, or by being designed with multiple chambers) so that it inflates initially towards the top (squeezing the pouch at the top first), and the inflation then propagates downwards. A single bladder may be used in conjunction with a rigid plate.

The peeler can be seen in FIG. 8(c), and may comprise upper clamp 114, lower clamp 116, lead screw 118, nut 120 fixed to the lower clamp, and at least one guide rod 122 (one shown). Not shown are standard items such as a motor, power transmission components, brackets, and a spring (e.g., a gas spring or other spring, possibly with a relatively constant force) to urge the upper clamp downwards. In some embodiments in lieu of a spring, upper clamp 114 can be made heavy enough that its weight is sufficient to clamp the pouch flap 123, and no spring is needed. Both the upper and lower clamps may comprise bushings/bearings allowing them to slide along the guide rod(s). In operation, once the flap of a pouch (FIG. 8(e)) has been introduced into the gap between upper and lower clamps by the vacuum cups, the motor rotates the lead screw, causing the lower clamp to rise and pinch the flap between the two clamps. Continued rotation of the screw causes the two clamps to rise as a unit and due to the spring pushing the upper clamp downwards, maintain a strong grip on the flap which allows tension to be applied to it so the pouch can be peeled open/unsealed. Peelers may be mounted so that the rods are at an angle to the vertical as in FIG. 8(f) (which brings the clamps at their lower end of travel closer to the flaps, and can provide for more constant-angle peeling) or at other angles. For example, if blades are not used, peeler rods may even be horizontal.

Figures 10A, 10B:
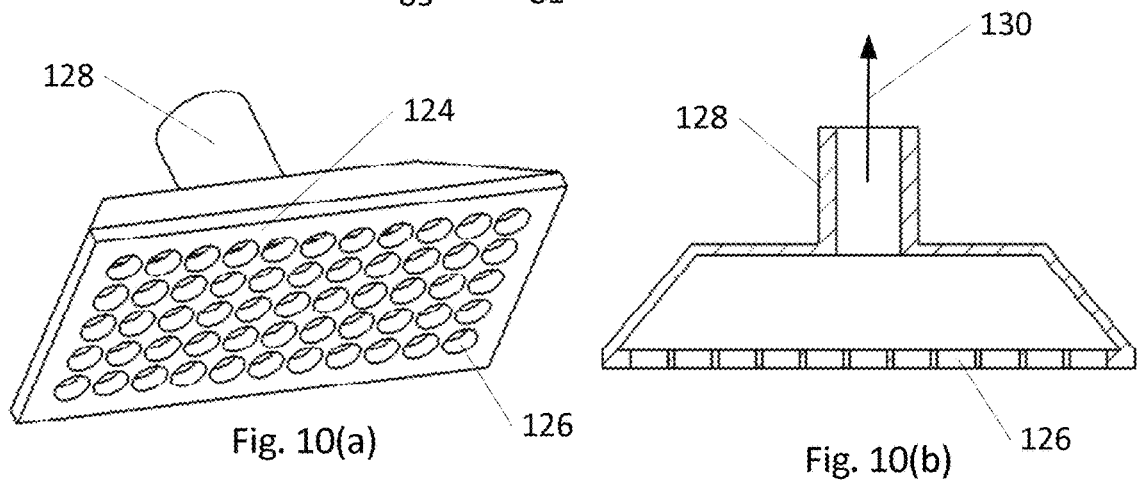
FIGS. 10(a)-(b) are views of a suction device.

The upper and lower clamps are designed to not interfere with the motion of at least two vacuum cups connected to a vacuum source which may be provided to engage/couple to/grasp the pouch flaps so as move them toward the clamps. Alternatives to vacuum cups include temporary and reusable adhesives, electrostatically-attracted pads, suction cup tape (Inventables, Chicago, Illinois), microstructured adhesive (e.g., SETEX™ (nanoGriptech, Pittsburgh, Pennsylvania)), and expanding elements which enter holes in the flaps. Vacuum cups 85 may be circular as shown in FIG. 8(*a*), rectangular as shown in FIGS. 10(*a*)-(*b*), or another shape. In order to minimize vacuum loss and attain strong traction on the flaps, which may comprise a stretch-resistant material such as PET, the contacting surfaces 124 of the cups may be flat as in the 3D view of FIG. 10(*a*) or the cross-sectional view of FIG. 10(*b*), and provided with a multitude of holes 126 and outlet 128 for air flow in direction 130. They may also be flat with a series of surface grooves that communicate vacuum over the contacting surface. By being designed to be flat rather than the standard concave shape, the flap is not forced to buckle or wrinkle as it might be if drawn into a concave cup, which can create a gap/air leak between the cup and flap that can greatly reduce the traction force. Even when substantially flat, the contacting surfaces of the cups may be soft/elastomeric to allow them to conform to small-scale irregularities in the flap.

Vacuum cups 85 may be mounted on moveable supports driven by actuators, neither shown, allowing them to move the flap, once it is grasped, toward the clamps. In the embodiment shown, the vacuum cup moves in a circular path that is approximately centered on the upper edge of the flap, such that the flap need not slide vertically relative to the cup as the cup reorients it. The moveable cup supports can be a simple arm to the side of the dispenser, driven by a stepper motor or rotary solenoid, for example. The arm may also serve to conduct vacuum to the cup, or tubing can be used, etc. In some embodiments the cups holding a given flap may be moved outwards (i.e., away from one another) as well, e.g., before or while moving the flap toward the clamp, which can help stretch (if the material is elastic) or at least tension and flatten the flap, since the flap may be distorted by the contents of the pouch. Simultaneous rotating and outwards movement may be achieved by using a lead screw (e.g., with a high pitch) and nut to rotate and translate the cups: lead screws on opposite sides of the dispenser may therefore have opposite handedness. Outwards movement prior to rotating can be achieved using linear actuators known to the art. If the motion of the cups away from one another occurs prior to the motion that moves the cups toward the clamps, the cups can achieve frictional traction on the flap while the flaps are pressed between opposing cups to provide a normal force and/or by using some level of vacuum. Once the opposing cups have separated, vacuum can provide the necessary traction to flatten the flap.

The dispenser may comprise one or more blades 83 over which the films comprising the walls of the pouch are bent and redirected while the pouch is peeled. The blades 83 in the 3D view of FIG. 8(*k*) may be long and supported at their ends by mounting means, not shown. The blades may have a thick portion for rigidity, combined with a thin portion whose lower edge 170 can be made reasonably sharp (e.g., several thousands of an inch radius), depending on the film 172 used to make the flap and pouch (e.g., PET is robust to being wrapped around even a relatively sharp blade). However, to avoid piercing/tearing the film, the blade should be wider than the film and the film kept away from any corners, or if that is not practical, then the blade can incorporate curve 174 at its corners (FIG. 8(*k*)). Since the films are thin (e.g., 0.5-4 mils) they can conform easily to the blade edge when under tension and thus the radius of their inner surfaces (on which food residues may be adhered) is also small: this helps food residues fall off the film.

FIG. 8(*e*) depicts a 3D view of a pouch 132 comprising pouch body 134 (containing an ingredient cavity) and flaps 123 having top edges 125, grasped by one or more grippers 100 which can deliver the pouch to the dispenser. In the figure, the seal of pouch 132 is not chevron-shaped at the bottom, but in some embodiments it is. Grippers may be much wider than those shown in the figure, especially if a single, e.g., central gripper is used. The grippers are attached to an arm (not shown) moved by a motion stage (not shown) providing at least the Z (vertical) axis of motion if the pouch will be peeled open. In the version shown, the dispenser allows for the pouch to enter the dispenser from the top, from the bottom, or from the sides, a choice that may be determined by the pouch storage location (e.g., from below if the pouches are stored below the dispenser). In FIG. 8(*f*), the pouch is within the dispenser at a particular height, supported by the grippers. The height in some embodiments is such that lines 9 are aligned with the rotation axis of cups 85, and in some embodiments may be sensed by suitable sensors which detect edge 13, a marking on the pouch, etc. During pouch loading, the cups can be moved out of the way, but once the pouch is in position, they are moved against the flaps as in FIG. 8(*g*). The position of the flaps can vary, and the flaps may not be planar as shown, due to distortion of the pouch caused by its contents. However, since the cups are moved to the position shown where they are opposed and sandwich the flaps, at minimum the portions of the flaps adjacent to the cups are forced to be in the required location. In some embodiments, vacuum is not applied to the cups until they have sandwiched the flaps. In some embodiments, the cups engage the flaps more centrally and then slide outwards to the positions near the vertical edges of the pouch as in FIG. 8(*f*); if this is done before the cups start to move the flaps, reduced vacuum, or no vacuum, may be used.

Peeling/unsealing of a pouch that has not previously been opened is an active process that requires the application of forces to directly and controllably separate the films that are sealed together (in some embodiments the forces can be reduced significantly such as by pre-weakening the seals (e.g., using a light-degradable adhesive similar to that used in wafer dicing tapes in the semiconductor industry)). While useful in some cases (with flowable ingredients), it is in many cases undesirable to achieve opening by merely applying pressure to the pouch, since this can result in rapid, uncontrolled ejection of the pouch contents. Prior to unsealing it for the first time. the pouch should be fully sealed to prevent premature release of its contents or exposure to the environment.

FIGS. 8(*g*)-(*j*) depict elevation or partial elevation views of a peeling sequence of the peelers in operation. In FIG. 8(*g*), the pouch is in position, ready to be peeled. In FIG. 8(*h*), cups 85, with vacuum turned on, have rotated away from one another in direction 136, pulling flaps 123 (which deform easily while passing lower clamp 116 if needed) with them in direction 138 and reorienting the flaps until they are near or touch the lower surface of upper clamps 114. In FIG. 8(*i*), the cups may have continued to move in direction 142 (e.g., to get out of the way), and the lead screws have been rotated to raise the lower clamps in direction 140 and pinch the flaps between the upper clamps 114 and lower clamps 116, and the upwards motion of the two, moving as a unit, has continued somewhat further such that the flaps are wrapped around the edges of the blades. A further small upward motion of the clamps pulling on the flaps will cause the lower seal of the pouch to be opened, which for a Type 1 or 2A item is all that is required of the peeler. For a type 2B item, however, the clamps continue to move upwards. In FIG. 8(*j*), the clamps have moved upwards and simultaneously, the grippers have moved the pouch downwards to maintain an approximately constant tension in the film, and the pouch has been partially peeled, such that a portion of each pouch wall is now being exposed and is either already bent over the blades or still upstream (in the direction the film is moving) of the blades on its way to the blades. In some embodiments a compliant element is provided to facilitate this, especially if the film is relatively stiff: a spring may be provided in the arm supporting the grippers, for example. The cups have rotated further in FIG. 8(j), such that they do not interfere with the upward motion. As the pouch is peeled, some items 152 (e.g., heavier, larger) will fall towards a receptacle in direction 154 without assistance as the supporting pouch walls 155 are pulled apart. Other items 156 may adhere temporarily to the film inner surface, possibly sliding downwards along it but not falling off. However, as those items approach the edge of blade 83—the lowest point of the film and where the film suddenly changes direction—in most cases they will detach in direction 158, also entering the receptacle.

Figure 8I:
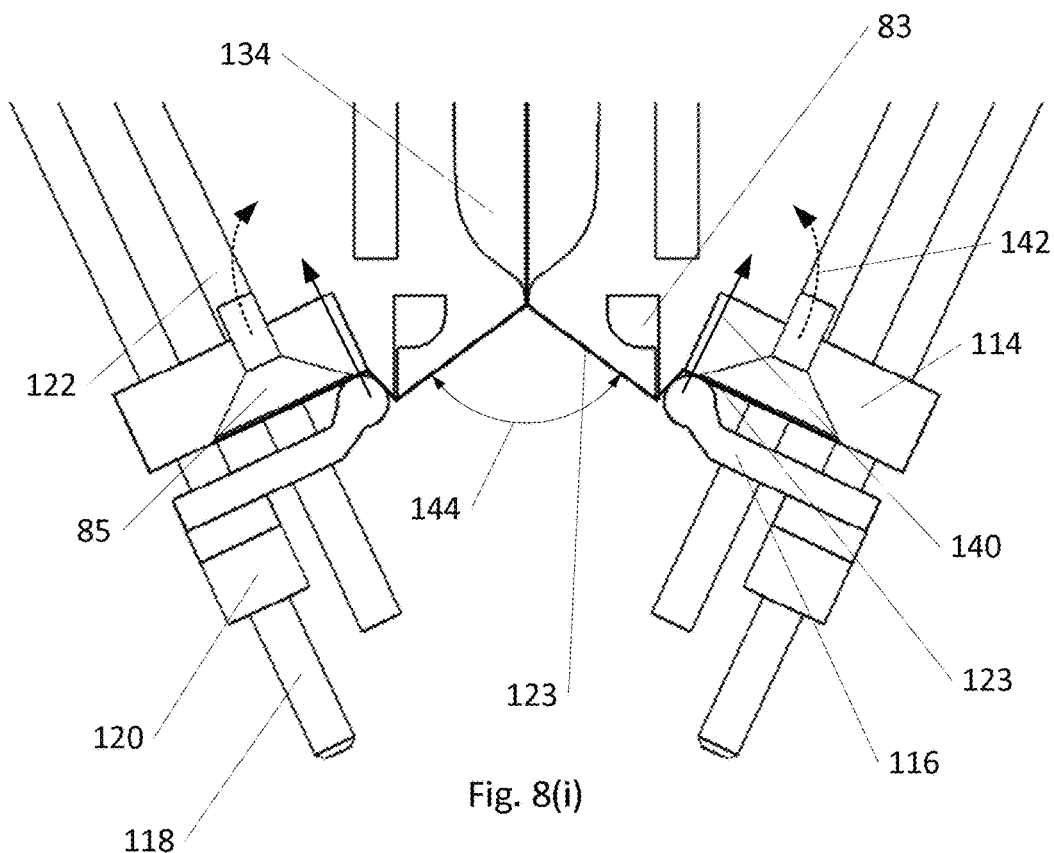
Figure 8J:
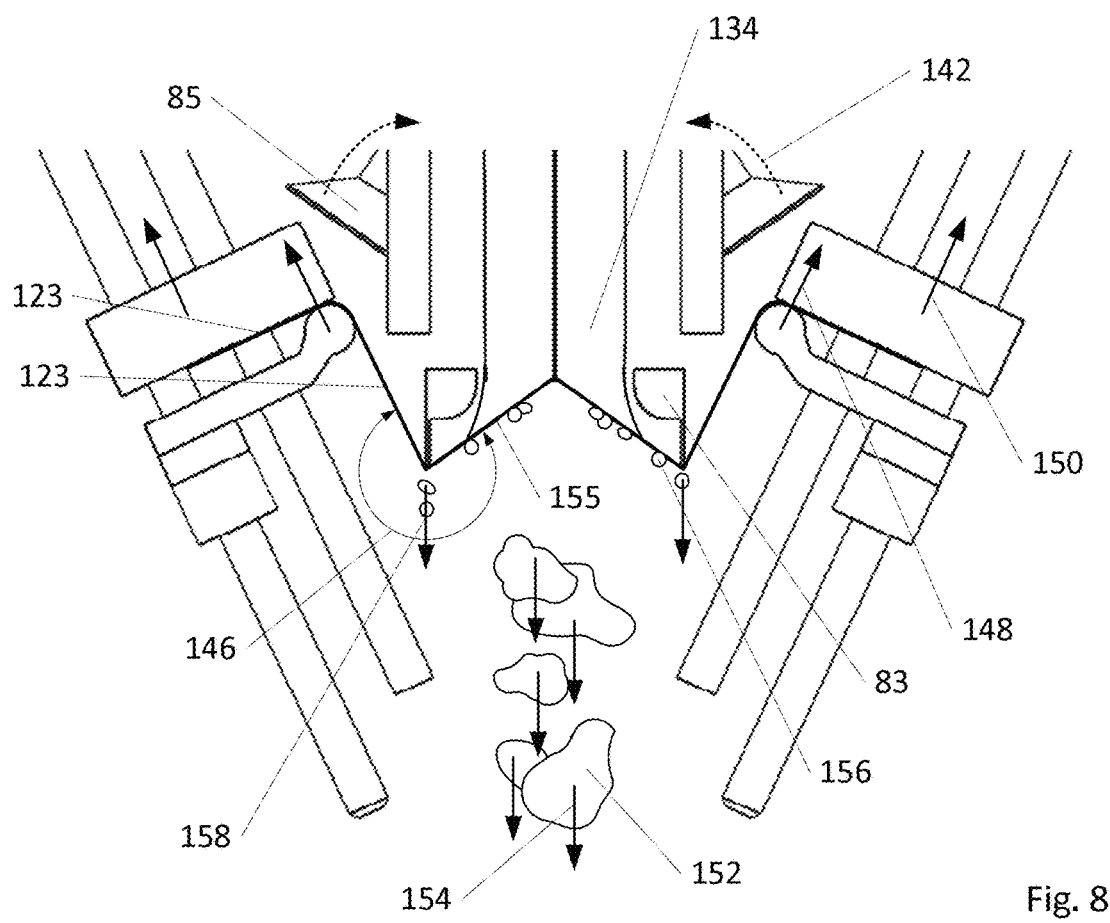

At the time shown in FIG. 8(i), the angle 144 between the two flaps has been established, and by that of FIG. 8(j), the angle 146—representing the change in direction of the film as it wraps around the blade edge—is also established. Angle 144 can be changed if desired by adjusting the pouch position within the dispenser using the Z motion stage: a parameter that can be varied according to the particular food item. A small angle 144 provides a steeper film surface, encouraging moist adherent food items to slide toward the blade edge, and also increasing angle 146. For some items (e.g., hummus), however, a small angle 144 makes it difficult for the bulk of the item to break free of the film, and a larger angle 144 may be preferred. Thus, angle 144 can be adjusted according to stored data (e.g., in a database, in a code on the pouch) for a particular food item; the data may include other parameters associated with dispensing the item, such as the squeegee speed and the clamp speed, and the type of item (1, 2A, or 2B), thus instructing the machine controller which dispensing technique should be used. In FIG. 8(j) it may be noted that trajectory 148 of lower clamp 116 and trajectory 150 of upper clamp 114 are parallel to the film downstream or (above) blades 123, given the angled mounting of the peeler lead screws and guide rods. Thus, if desired the angle 146 can be maintained throughout peeling as long as angle 144 is also constant. As the clamps rise along the rod, the grippers holding the top edge of the film descend in a synchronized movement so as to maintain a controlled (constant or variable) tension in the film. If the film tension is too low, then it will not conform well to the blade edges and food residues may fall off at the blades; if the tension is too high, the film may stretch undesirably or break. Especially if the film is stiff, an element such as a spring in the arm supporting the grippers may be used to provide compliance and help maintain proper tension. It may be appreciated from FIG. 8(j) that the blades serve a further purpose of preventing the clamps from pulling sideways on the pouch as they move.

Once the clamps have moved to their highest desired position for a given pouch (whose height may vary), the pouch walls have been fully peeled. In some embodiments the upper seal of the pouch is peelable, while in others it is non-peelable. Moreover, at some point the pouch cannot be further peeled because of the grippers grasping it at its top. If there is some head space in the pouch above the food item, then at the end of the upward stroke of the clamps the film forming the head space may be between the blades. To allow the maximum amount of peeling, the grippers may be lowered more than usual just before peeling ends to increase angle 144.

Once peeling has ended, the motion of clamps and grippers may be reversed, such that the peeled, empty pouch is pulled upwards through the dispenser. Once the clamps have reached their lowest position (or sooner), the lower clamp separates from the upper, releasing the flap and allowing the pouch to be removed and disposed of. The position of the cups may be reset to prepare for the next pouch.

Figures 11A, 11B:
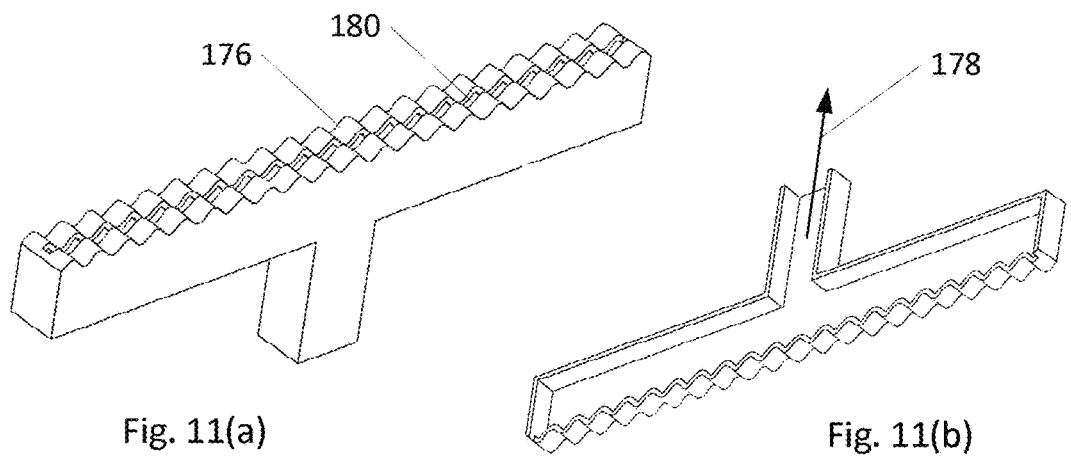
FIGS. 11(a)-(b) depict a detachment device.

In some embodiments to supplement the action of the blades in removing adherent portions of food from the inside walls of the pouch, other methods and apparatus may be used. For example, using an actuator to vibrate or tap the film (preferably contacting its clean outer wall) between the pouch and blade or downstream of the blade, or vibrating the blade, can be useful. Passing the film (e.g., between pouch and blade) over a surface having ripples 176 such as that shown in the 3-D view of FIG. 11(a) or the 3-D sectional view of FIG. 11(b), can cause food items to detach. The film may be caused to conform at least partly to the surface by providing vacuum in direction 178 through a slot 180 (as shown) or holes in the surface, if the lateral tension in the film is not excessive.

Figures 12A, 12B, 12C, 12D:
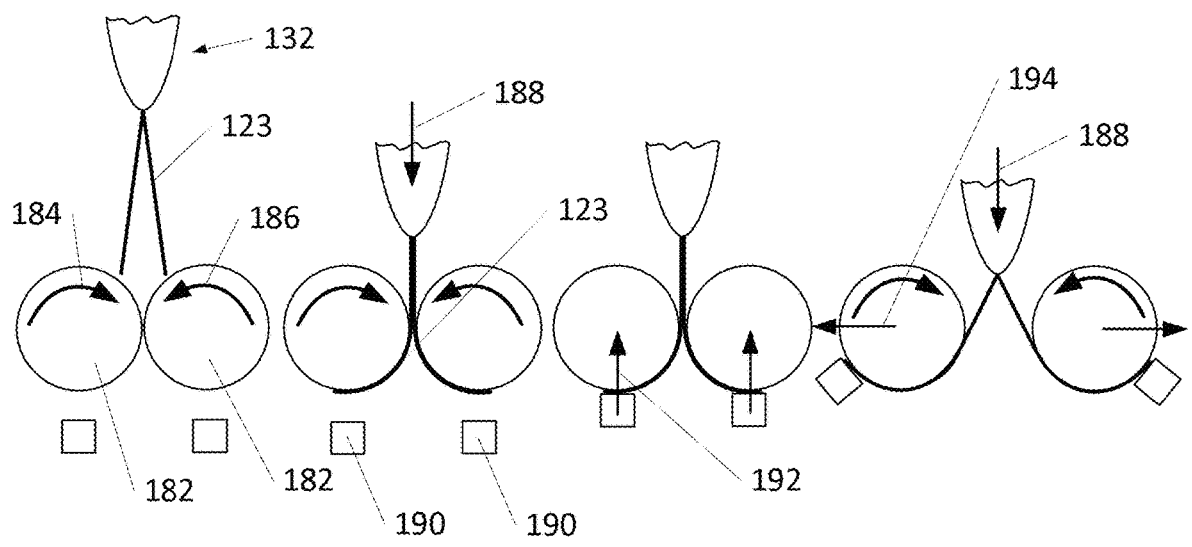
FIGS. 12(a)-(d) illustrates a portion of a dispenser.

FIGS. 12(a)-(d) are elevation views of a method and apparatus used in some embodiments to grasp flaps 123 of pouch 132. In FIG. 12(a), the flaps are shown approaching the nip between two counter-rotating rollers 182 rotating in directions 184 and 186, provided with surfaces which attract the flaps to them (e.g., as the result of vacuum supplied through apertures in the rollers (e.g., apertures only exposed at the bottom of the rollers), or as the result of other approaches discussed above in the context of vacuum cups). In FIG. 12(b), pouch 132 has moved in direction 188 and the rollers have engaged the flaps and the flaps are attracted to and are conforming to the roller surfaces. In FIG. 12(c), clamps 190 located below as shown, or to the sides of the rollers, have moved in direction 192 and pressed against the flaps by translating and/or rotating, to sandwich the flaps between clamps and rollers and positively grasp them. During this step, the rollers may cease rotating. In FIG. 12(d), the rollers, with the clamps still in contact, have separated in direction 194 to provide a space between them for the food items to be dispensed. The rollers may continue to rotate as shown while the pouch descends, or remain in the orientation of FIG. 12(c). In some embodiment variations, the rollers move so that the pouch film is pulled and directed over blade edges as in FIG. 8(i) and pulled as the rollers continue to move (e.g., along a track such as the J-shaped track of FIG. 13(d)). In other embodiment variations, the pouch is peeled by continuing to rotate the rollers so that the walls roll up around them.

Figure 13F:
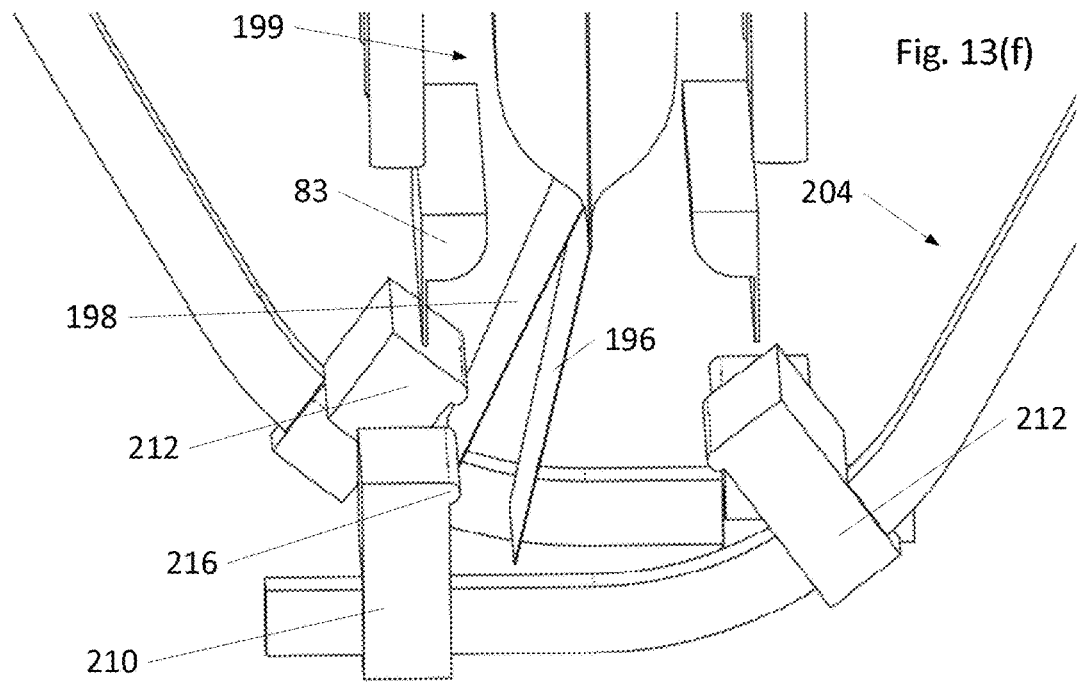
Figure 13G:
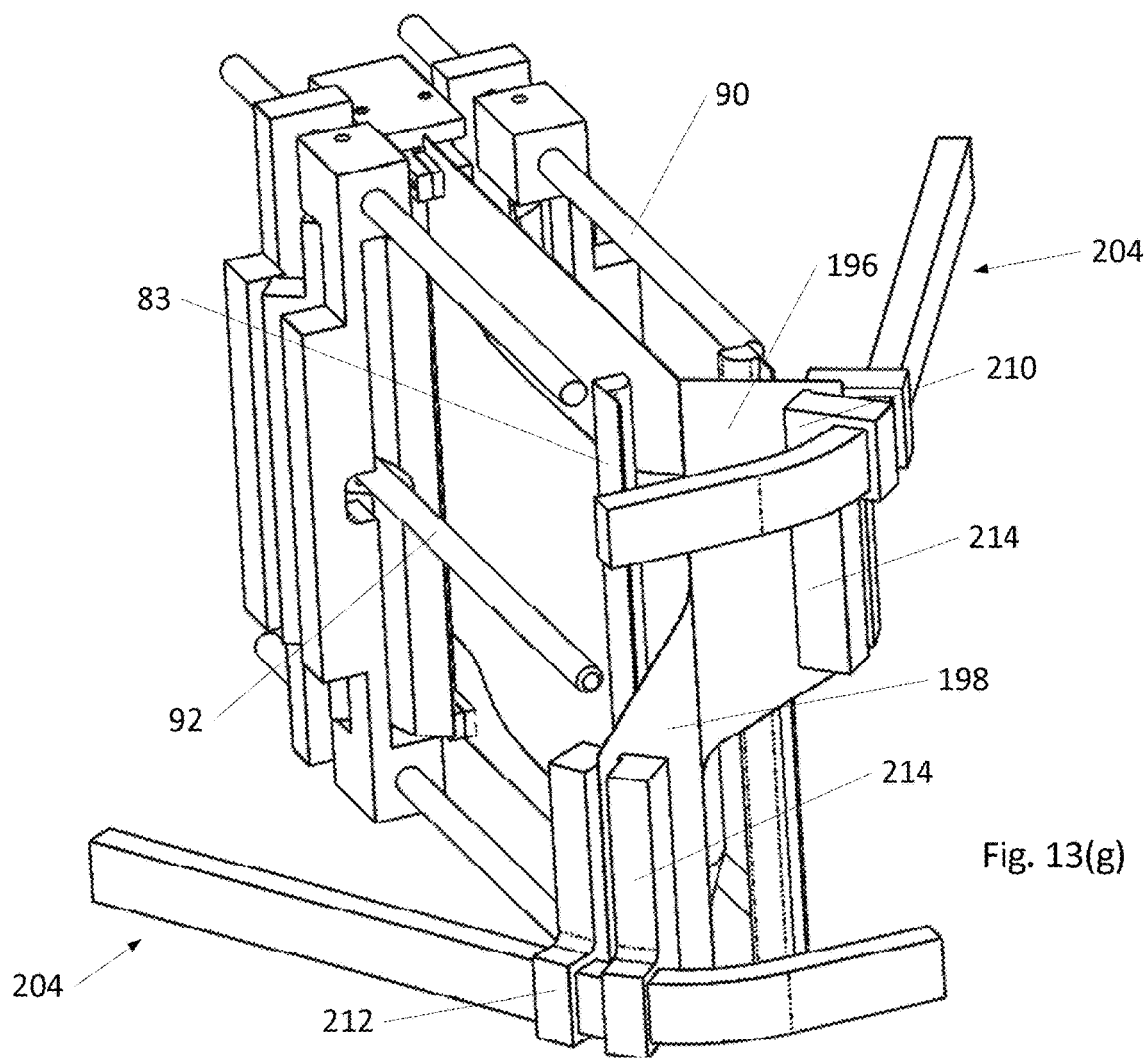

FIGS. 13(a), (b), and (g) depict 3D views of a dispenser used in some embodiments which incorporates squeezers similar to that of FIG. 34 and blades 83, but employs another method and apparatus (and a modified pouch 199) for grasping and moving the flaps. In this embodiment, the pouch flaps are not the full width of the pouch as in the 3D view of FIG. 13(c), but are cut (e.g., die or laser cut) or punched so there are areas where one flap does not overlap the other, and there is a gradual transition 197 from the flap to the full width of the pouch wall, e.g., using a fillet that avoids sharp convex corners. Such "partial" flaps 196 and 198 can be grasped without first separating them, using clamps which can move beneath the pouch and then move along a path that allows at least partial peeling. They may also be shorter than normal flaps since reorienting them to reach peeler clamps is not needed (the clamps travel to the flaps instead). FIG. 13(c) also indicates other aspects of the pouch, such as a peelable seal 200 that is chevron-shaped at the bottom and includes the vertical portions at or near the pouch edges, as well as a top seal 202 which may or may not be peelable. Differences in appearance of pouch 199 in FIG. 13(c) vs. other figures can be ignored. In the embodiment of FIGS. 13(a)-(g) the pouch may be introduced from the top of the dispenser, or introduced from the side and then lowered.

As shown in FIG. 13(a), two tracks 204 are provided having curved section 206 as well as straight section 208 (which may be angled, as with the rods of FIG. 34) or a curved section (possibly with a different radius than the straight section, or variable radius). At the lower end of the curved section a short straight (shown) or curved section 209 may also be provided, and may be shorter than shown. One track is located close to one vertical edge of the pouch shown in FIG. 13(a), while the other is arranged with circular symmetry (around a vertical axis) close to the opposite edge. Riding on each track (e.g., using linear bearings, now shown) are at least a trailing clamp 210 and a leading clamp 212 which can move along the curved track but cannot rotate with respect to the track. In some embodiments one clamp may be attached to the other (e.g., through a pivot) such that only one is directly guided by the track. The clamps are designed with lateral extensions 214 (FIG. 13(g)) which allow them to grip the flaps along a wide area, while allowing the tracks to be outside the area in which food items will fall, avoiding contamination of the tracks. As the clamps move upwards along the track, leading clamp 212 is leading and trailing clamp 210 is trailing. The upper ends of the clamps may be provided with convex tips 216 to better grip the flaps when the clamps are not mutually parallel. Clamps may be propelled along their respective tracks by an actuator and associated hardware not shown, such as a motor fixed to the clamp which turns a pinion that engages rack-like teeth on the track, or turns a friction wheel that engages the surface of the track, or turns a winch that pulls on a cable wrapping around the track, etc. Alternatively, clamps may be attached to a flexible member such as a cable, chain, or belt, or to hinged rigid members, and pulled or pushed along by an actuator located elsewhere. In some embodiment variations, only the trailing clamps are actuated and the leading clamps are urged toward the trailing clamps (once the leading clamp has moved partway along the track) by a spring or other element, and thus are pushed along by the trailing clamps.

FIGS. 13(d)-(e) depict in elevation view how the flaps can be pinched between the tips of the leading and trailing clamps on both tracks (FIG. 13(d)) and then pulled apart so that the flaps contact the blade edges 213 as in FIG. 13(e) after clamps have moved as shown by the dashed arrows. Further motion of the clamps as they climb the tracks will then serve to peel the pouch. As is shown in the 3D view of FIG. 13(f), as long as the clamps are widely separated when the pouch is loaded, then the flaps will enter the gap between the trailing and leading clamps, and regardless of the flap orientation, the clamps will be able to grip them as long as they're long enough. In some embodiment variations, the clamps are actively moved to the positions of the flaps by sensing those positions using a sensor such as a camera and machine vision. In some embodiments pouches have more than two partial flaps that are interleaved, such that clamps from one track can engage odd-numbered flaps and those from the other track can engage even-numbered flaps; this can provide a more uniform peeling force. In some embodiments the tracks may also serve to twist the clamps as they move. A dispenser based on the design of FIG. 39, if intended mostly for a Type 1 or 2A food item, may have shorter and possibly simpler (e.g., straight and horizontal, or arc-shaped) tracks.

In some embodiments a dispenser with curved tracks can be used with pouches having full-width flaps if the flaps can be slightly separated enough to allow clamps similar to those described above—or clamps which are much narrower and which slide in horizontally—to grasp the flaps from both sides.

FIG. 14 depicts 3D views of a dispenser 218 used in some embodiments which incorporates squeezers and peelers similar to those of FIG. 8, but employs another method and apparatus, and optionally a modified pouch, for delivering the pouch flaps to the peeler clamps, in lieu of moving vacuum cups or similar. The pouch 199 enters from the side of the dispenser in direction 220 as in FIG. 14(a), and in doing so the flaps 222 are spread apart in directions 223 by a fixed (or moving) deflector 224 such that the flaps enter the gap between upper and lower clamps (FIG. 14(b)). If the flaps are well aligned and the front end 225 of the deflector is narrow, or if the flaps are initially separated slightly (e.g., by vacuum or air jet), then the deflector 224 can reliably fit in between them. However, in some embodiment variations, the flaps may be formed into a shape which facilitates this. FIG. 14(c) depicts a flap which has been formed into a D-shaped loop 226 and then sealed below (and possibly above) the loop to its neighboring flap with a temporary (e.g., peelable) seal 228 so that it retains this shape; in some embodiments the "D" shape of loop 226 may be much larger (e.g., the two flaps may be joined together lower down, possibly even at the bottom of the non-formed flap. The deflector of FIG. 14(d) can then easily enter the loop, peeling or otherwise separating the pouches at the seal as the pouch moves relative to it in direction 227. If the loop is not near the seal at the bottom of the pouch, the flaps may also be sealed together above the loop.

Pouches that are peelable or otherwise allow their walls to be mostly separated allow for the most flexibility in dispensing and therefore can accommodate the greatest variety of food items; however, pouches containing Type 1 or 2A items need only be able to be opened at their bottoms. Universal dispensers which can handle Type 1, 2A, and 2B items are described above; however, in a machine handling a limited number of items, or using multiple dispensers (using different ones to handle different item types) this may not be required. A dispenser for a Type 1 item only packaged in a pouch with a burstable seal might involve only a squeezer such as that of FIG. 8(b) or B. A dispenser for a type 2A item might involve only a peeler such as that in FIG. 8(c) and means for bringing the pouch flaps to the clamps such as vacuum cups or a deflector, while one for a type 2B item may add blades and have clamps with longer travel. Simpler means for opening non-burstable pouches with Type 1 items or pouches with type 2A items may also be used, such as using relatively large or multiple vacuum cups able to grasp the flaps with significant force and directly pull apart the flaps. Such arrangements may also be used in peelers, which need a longer stroke.

Depending therefore on the type of food item and type of pouch, dispensers may therefore include any combination of means for grasping flaps (e.g., vacuum cups), means for pulling flaps apart (e.g., peelers), means for squeezing the pouch (e.g., squeezers using squeegees or bladders), and means for bending and redirecting the film (e.g., blades). In some embodiments elements may serve more than a single role simultaneously.

Figure 15:
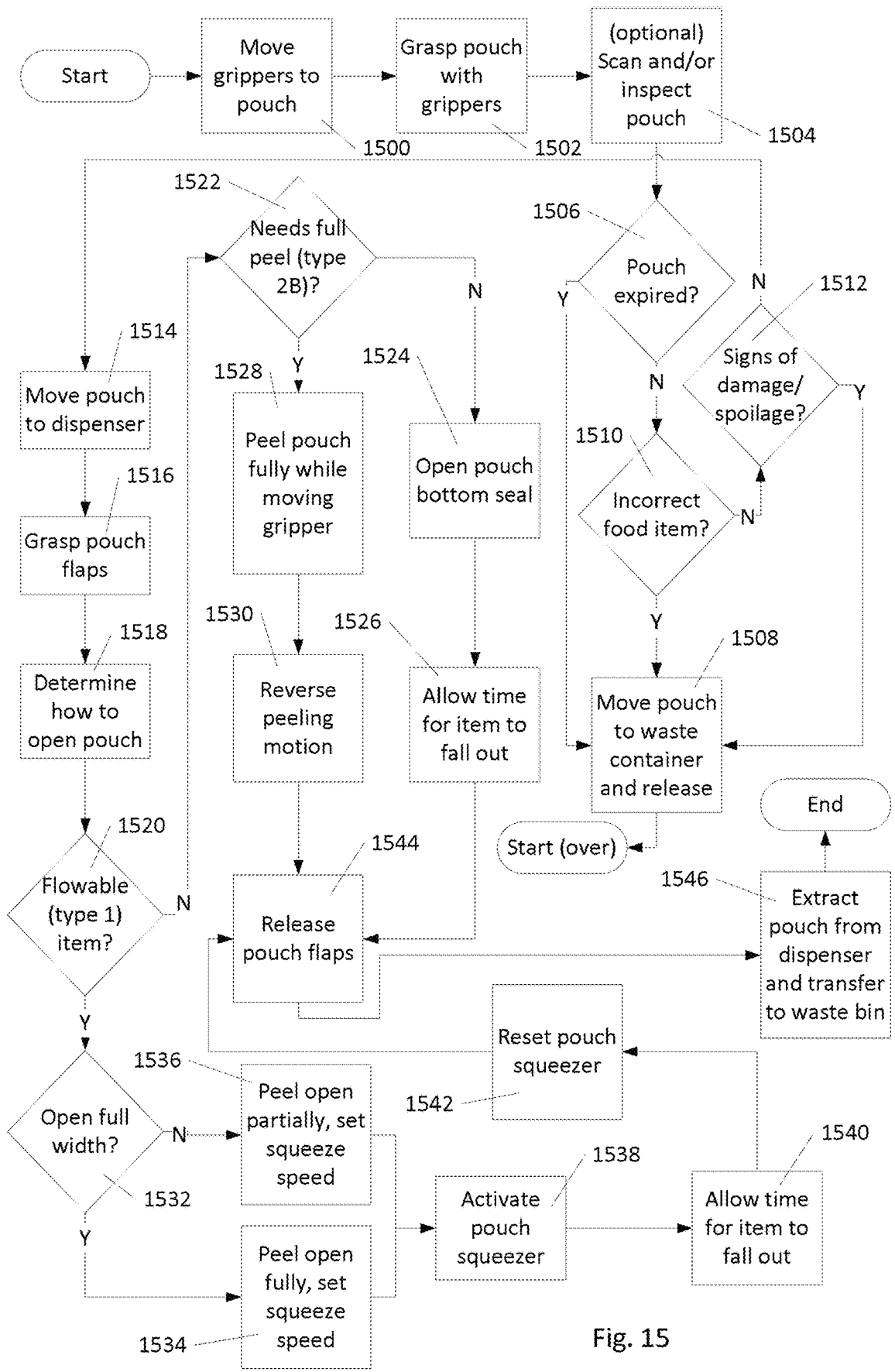
FIG. 15 is a flowchart for dispensing a food item.

FIG. 15 depicts a flowchart from start to end for dispensing a food item from a pouch and into a receptacle such as a dish or cooking vessel according to some embodiments, and assumes a universal dispenser able to dispense food items of all types, and use of a peeler to open the pouch regardless of the type. Multiple dispensers, each more specialized, can also be used, with slight modifications to the process flow. Boxes in the flowchart represent a series of action and decision steps which are both carried out in a process and implemented in algorithms and code executed by a controller. In box 1500, the gripper(s) (e.g. those shown in FIG. 8(*e*)) are moved to the location of a pouch that is to be dispensed. A map of pouch locations within the pouch storage area of the food preparation system may be generated ahead of time (e.g., by scanning bar codes on each pouch) or a suitable pouch may be identified when needed (e.g., as the grippers, equipped with a means of reading data from the pouch (e.g., a code contained in a bar code or RFID tag) approach a pouch). In box 1502, the grippers have grasped the pouch (e.g., on its upper edge/seal). In box 1504, the pouch is optionally scanned and inspected to determine any information that is not already known. For example, the expiration date of the pouch, and the food item(s) within, may be known by the controller upon reading the code and referencing a database. This data may be however verified at this time as a precaution. The pouch may also be inspected for possible damage. For example, if a force sensor such as a load cell is provided in the arm to which the grippers are attached, and the pouch hangs freely from the grippers, the pouch weight can be measured and compared to an expected or previous weight. Any significant weight loss likely indicates a ruptured pouch. Or, the pouch may be placed in the view of a camera and machine vision system provided with algorithms that can detect color and/or shape changes that may indicate that the ingredient has spoiled (e.g., signs of mold), has become crushed, etc. Assuming that scanning and inspecting is performed, then in Box 1506, the controller determines whether the pouch has expired. If not, the process continues but if so, it is moved to a waste container (box 1508). The system may regularly purge expired pouches so this determination is unnecessary. In Box 1510, the controller determines whether the food item is the correct one needed; normally that may be the case and the process continues but if not, the pouch is disposed of or optionally re-classified if otherwise good and returned to storage. In Box 1512, the controller determines via sensor input whether the pouch contents are damaged or spoiled. If not, the process continues, but if so, the pouch is disposed of. If the pouch is disposed of for any reason, the process starts over again. If the pouch passes all tests, it is moved to the dispenser (box 1514).

Once in the dispenser the flaps are grasped (box 1516) and if not already done, the controller determines (box 1518) the approach to dispensing it will use, based on the food item type (1, 2A, or 2B). Per box 1520, if the item is not Type 1, then it is necessary to determine if it Type 2A or 2B in box 1522. In box 1524, if the item is not Type 2B (thus, type 2A), the pouch is opened at its bottom seal (either fully all at once, or partly/gradually, to control the outwards flow) to discharge the item, and time is allowed (box 1526) for the item to come out. If the item is of Type 2A, then the pouch is peeled fully open (box 1528) by the dispenser while the gripper moves to support the pouch and provide tension in the film. With peeling completed, the peeling motion is reversed (box 1530). Per box 1520, if the item is Type 1, then based on parameters of the specific ingredient (e.g., viscosity), the controller determines (box 1532) whether to peel open the pouch to its full width (and if so, how quickly) or just partially (e.g., forming a narrow funnel by partially peeling a chevron or diagonal bottom seal). If it is to be opened fully (box 1534), this is done by the peeler, and a speed is set for squeezing, also based on parameters of the specific ingredient (e.g., if very viscous such as peanut butter, a lower speed may be required to avoid stalling the actuator). If the pouch is to be partially opened (box 1536), this is also done by the peeler, and a speed also set for squeezing; this speed may be set lower than that used when the pouch is fully open, since the opening is narrower and flow cannot be as rapid (if too squeezing is attempted, pressure of the item inside may itself further open the pouch). In box 1538, the squeezer is activated, in box 1540, time is allowed for the ingredient to completely fall out, and in box 1542, the squeezer is reset to prepare for the next pouch. Lastly, regardless of pouch type, the flaps are released (box 1544) and the pouch is extracted from the dispenser and disposed of (box 1546). In some embodiments, rather than merely waiting a certain time for items to fall out of the pouch, the weight of the pouch or that of the receptacle into which the item is falling, can be monitored, and when the weight gain reaches a threshold indicating the pouch is empty or nearly so, the process is allowed to continue. In some embodiments the pouch is accelerated or jerked upwards, vibrated, shaken, etc. just before the pouch is withdrawn from the dispenser and while the receptacle is still in place. This can loosen any food item drops or particles still clinging to the pouch and reduce the risk of it dripping or falling during withdrawal and contaminating the system.

Though an ingredient may be categorized of Type 1 or 2A, it may not adequately dispense if so handled, e.g., due to variations in the specific food item, temperature, humidity, etc. Thus, weight loss of the pouch, weight gain of the receptacle, or motion of ingredients leaving the pouch can be sensed, and if the evidence suggests ingredients remain within, then full peeling can be implemented according to the (slightly more time-consuming) 2B approach.

Individual Pouch Storage

Individual pouches—as opposed to pouch chains—can be stored for use in an automated food preparation system in a number of ways. FIG. 16(*a*) depicts a 3D view of a feeder drawer 230 used in some embodiments to hold pouches, which can be removed by being picked up with grippers on their upper edges. Whereas a simple drawer may be translated entirely to position a particular pouch beneath the grippers, the feeder drawer in FIG. 16(*a*) actively feeds pouches 232 toward a pickup end 234. In some embodiments of the feeder drawer, the pouches are provided with overhanging hangers 236 (see the 3D view of FIG. 16(*d*)) at their top edges 233, and the hangers fit into the gaps between turns of helical springs 238 on both sides of drawer housing 240. The springs rest on ledges 241 in the drawer housing near the top (see the 3D view of FIG. 16(*b*)). By rotating the springs, the pouches are transported along them toward the pickup end. The springs may be turned by short coaxial shafts 242 at one or both ends which are motorized (e.g., they all may be turned by a single motor using gearing, belts, chains, etc.). If shafts are provided at both ends, then the springs may be slightly stretched to keep them straight. In some embodiments to reduce friction between the springs and ledges, the springs are supported on long shafts 244 (at least equal in length to the springs) that counter-rotate in direction 246 beneath them as shown in the elevation view of FIG. 16(c); these shafts may also deliver torque to the short shafts through gearing, etc. To facilitate insertion of the pouch hangers into the springs, and ensure they are parallel and equally-spaced, a cap 248 (see the 3D view of FIG. 16(d)) may be provided over each spring having funnel-like surfaces 250 which direct the hangers between the turns of the spring. In addition to picking up pouches, the grippers can reject pouches by pushing them downwards and out of the housing (e.g., through a slot in the floor), bending or breaking the hangers while so doing. Pouches with stiffeners near their upper edges, such as the pouch of FIG. 28(a) but with the top seal bent portion extended outwards to overhang the pouch on both sides, may be advantageous. Drawers may be stacked in multiple tiers and translated short distances along their long axes to provide gripper access to the pickup ends of drawers below.

FIGS. 17(a)-(d) depict 3D views of pouch storage wheels 251 wherein pouches 252 are arranged in a circular pattern around a hole 253 and can rotate in directions 249. In FIG. 17(a), a single wheel with a horizontal axis is shown in which pouches may be withdrawn in direction 254. FIG. 17(b) shows a section view of the same wheel, while FIG. 17(c) depicts a group of three wheels which may be rotated independently or ganged together. FIG. 17(d) depicts a vertical axis wheel with inner and outer ring-shaped walls 255 and a ring-shaped floor; pouches may be loaded or withdrawn in direction 257 or the opposite direction (through apertures in the floor). The wheel rotates in directions 261. Not shown are dividers which are used in some embodiment variations to separate the pouches from one another. Though pouches may generally be lightweight (e.g., 0.25-0.5 lb.), in horizontal-axis wheels, pouches on the lower portion of the wheel might normally slide out. To prevent this, clips such as spring clips (not shown) can be provided to retain them, yet allow removal when the pouch is grasped by grippers. As shown in FIG. 17(a), pouches can be removed from the top (12:00) position of the wheel by pulling them out in direction 254, parallel to their major surfaces. This allows for example a pouch to be retrieved from a wheel below the level of the dishes and pulled up into a dispenser above the dishes. However, pouches can also be pulled out at other angles such as those shown in FIG. 17(b), wherein the pouches may first be withdrawn parallel to their major surfaces and then redirected vertically upwards in direction 256, if needed to be transported vertically.

FIGS. 18(a)-(c) depict 3D views of a shelf-like storage device for storing pouches, having a front 257 and a rear 259. FIG. 18(b) is a sectional 3D view, while FIG. 18(c) is a closeup view of an area outlined in FIG. 18(a). The shelf comprises a housing 258 and a plurality of individual cubbies 260 equipped with supports 262 which are angled such that a pouch inserted into the rear of the cubby top end first and placed onto the support will slide downwards until its upper, leading edge rests against stops 264 (as shown in the 3D view of FIG. 18(d)) at the front end of the cubby. Other designs of stops may be used, such as stops which intercept the upper edge when it is close to the support, but which allow the pouch to easily pass through when the edge is raised. In some embodiments motion of the pouches (e.g., lightweight pouches) can be assisted by vibrating the shelf, etc. Pouches in all cubbies will all have their top edges at approximately the same position, facilitating grasping by the gripper(s), regardless of pouch height/length, which may vary according to the item inside. To ensure that the gripper(s) can positively grasp the top edge of the pouch, cutout 266 is provided at the lower end of each support.

Once grasped, the pouch can be pulled out of the cubby by a motion that is horizontal, parallel to the support, or similar. Since the pouches are flexible, their edges can deform temporarily when the pouch is pulled so that they clear the stops. For transportation of a shelf containing pouches, a panel can be placed over the front surface of the shelf to retain the pouches in case vibration or shock would otherwise cause them to move significantly.

Figure 19A:
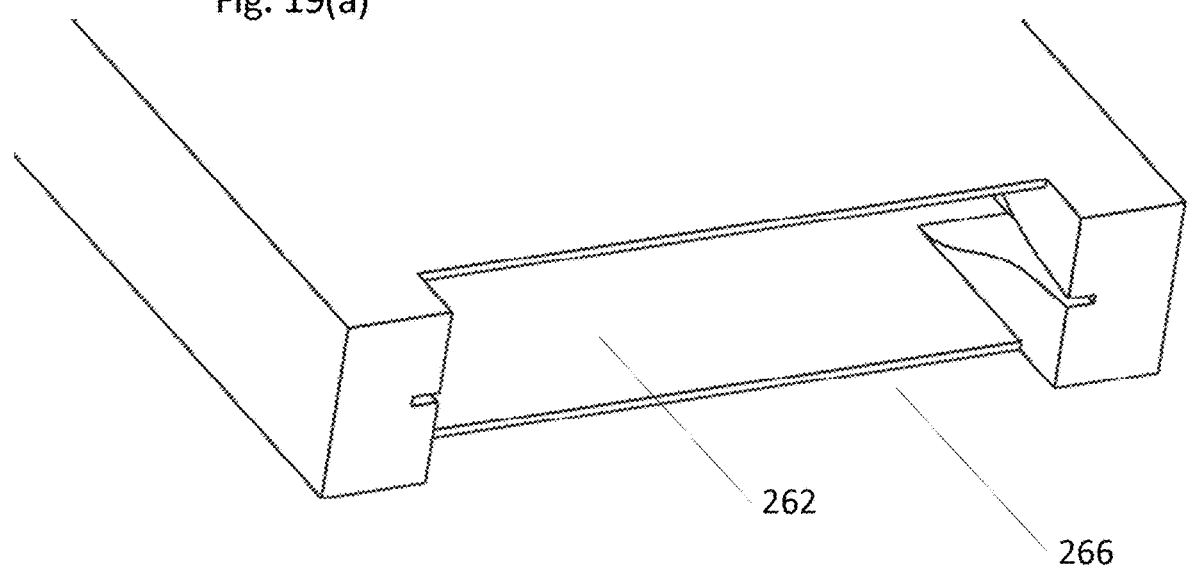
FIGS. 19(a)-(c) depict a storage device for a flexible package.
Figure 19B:
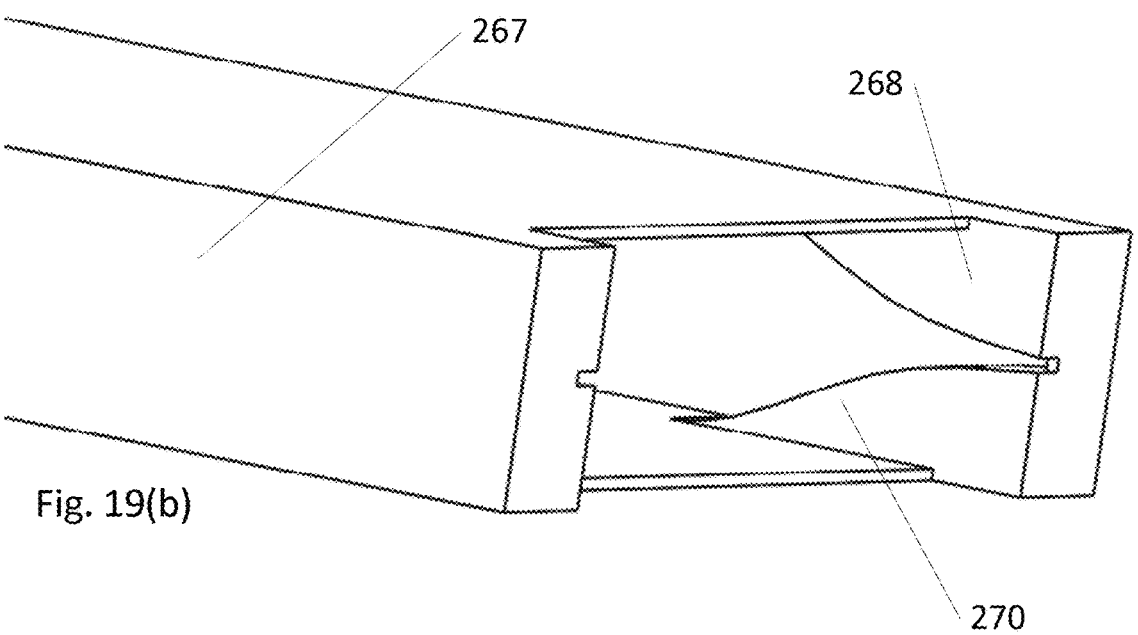
Figure 19C:
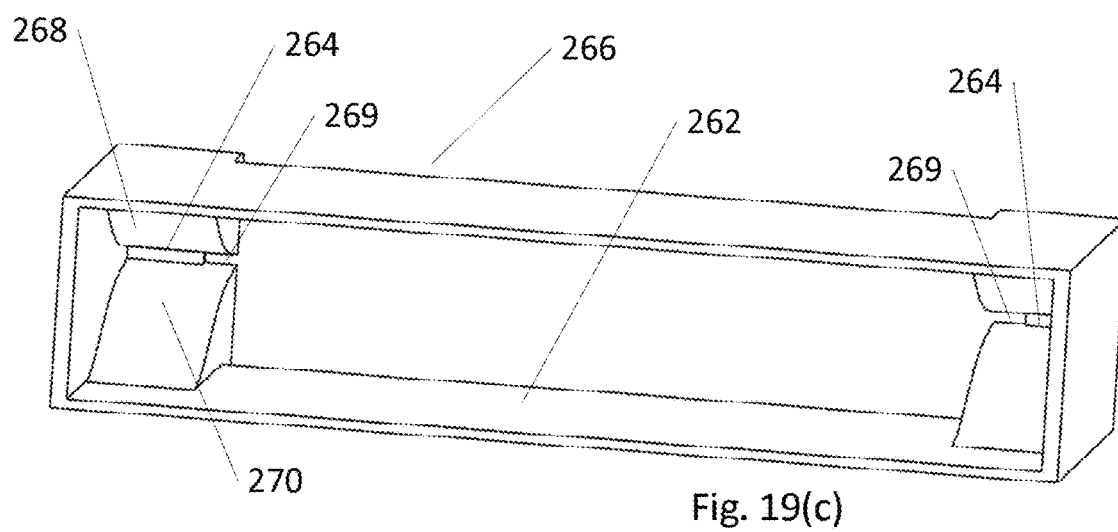

A pouch such as that of FIG. 1 may be loaded at the rear of a cubby such as that of FIG. 19(a). Cubbies need not be self-contained as in FIG. 19(a) but can be a portion of a monolithic shelving unit, shelf, or module, in which case the sides 267 of the cubby (adjacent to the ramps in FIG. 19(b)) may not be needed, if other elements prevent sideways movement of the pouch. Then, if the cubby is tilted (e.g., 10-40 degrees from the horizontal) and possibly, through the use of vibration (e.g., for lightweight pouches), the pouch will slide until its upper edge (near the top seal) comes to rest against the stops, establishing a known, repeatable position within the plane of the support. Vibration may be imparted to pouches to help them—especially those lighter in weight—to move downwards and rest their upper edges against the stops (FIG. 19(c)). This vibration can be done during pouch loading, before pouch use, or just before pouch extraction from the cubby. Such vibration may be imparted in various ways including i) incorporating a vibrating device in the grasper, and making contact with the cubby to transmit vibration to it; or ii) incorporating a vibrating device in the entire shelf, a shelf module, or an individual cubby. In some embodiments vibration isolation (e.g., supporting springs) may be used so that only the element of interest is vibrated, not other elements in the system.

The stops are designed to be wide enough to prevent the pouch from travelling too far, but narrow enough to allow the pouch to deform so it can be pulled out of the cubby through gaps 269 (and the center region of the cubby which is free of ramps) by graspers or similar means introduced at the front of the cubby (FIG. 19(d)). Since heavier pouches may, due to their momentum as they slide, continue past the stops, it may be preferable in some embodiments to use a smaller angle from the horizontal, accompanied by vibration of the cubby. In some embodiments the top seal of the pouch may be stiffened (e.g., by bonding one or more extra thicknesses of material to it).

In some embodiments cubbies such as those in FIG. 18 may be provided with one or more ramps located near the end of the cubby at which the pouch is extracted. In the 3-D views of FIGS. 19(a)-(f), cubbies with two ramps 268 (upper) and 270 (lower), as well as bottom supports 262, cutouts, 266 and stops 264, are shown. The ramps—located only near the vertical edges of the pouch (see FIG. 19(b)), outside the sealed volume so they don't block passage of the pouch—serve as funnels, guiding the upper edge of the pouch to a known position along an axis perpendicular to the plane of the cubby support (in the figure, to a position halfway up the cubby). Thus, through a combination of the tilted surface of the cubby support (and optional vibration), the stops, and the ramps, the pouch moves to a position in which the jaws 272 of grasper 274 may repeatably engage the pouch through the cutout as in FIG. 19(d), without the need, in some embodiments, for active sensing. However, in some embodiments sensing of the pouch position relative to the cubby or grasper jaws may be implemented using approaches that include mechanical, optical, and capacitance-based sensing.

As shown in FIG. 19(d), grasper 274 may comprise grasper jaws 272, grasper fingers 276, a grasper body (e.g., actuators such as pneumatic cylinders 278 and mounting components), and a rotary actuator 280 such as a geared stepper which rotates grasper 274 around pivot 282 so as to adjust the pouch angle to closely match the cubby, dispenser, etc. To reliably grasp pouch 284 without slipping, the inner surfaces of the jaws may be covered with a material such as 3M Gripping Material (3M, Saint Paul, Minnesota), a soft elastomer, etc. Cubbies may be individual as in FIGS. 19(*a*)-(*d*) or may be designed without a top as in FIGS. 19(*e*)-(*f*) so when stacked vertically, the support of one cubby serves as the top of another below it.

In some embodiments cubbies such as those in FIG. 18(*a*) or FIG. 19(*a*) may be provided which can hold more than a single pouch each, which can greatly increase the number of pouches that may be stored in a single food preparation machine. For example, several pouches may be arranged in tandem (in the sense of tandem parking for cars: one pouch in front of another), with provision made to load one or more pouches into a cubby at a time, and release one pouch at a time from the cubby. Pouches within the cubby may at least partly overlap other pouches. While all pouches in a given cubby may contain the same ingredient in some embodiments, in other embodiments, different ingredients (e.g., the ingredients used to make a particular dish) accessed in a particular order may be loaded into and removed from a single multi-pouch cubby.

In some embodiment variations, gates/barriers/stops may be provided within the cubby which prevent pouches behind the "lead pouch" (that nearest the front cutout (FIG. 18(*c*), 19(*a*)) from moving to the lead position until the lead pouch has been removed from the cubby at least partially. Such gates can be opened by withdrawing them horizontally or vertically, rotating them (e.g., if shaped like a partial cylinder), flattening them (e.g., deflating if inflated, collapsing by applying vacuum), etc. FIGS. 20(*a*)-(*n*) depict cross-sectional elevation views of a sequence for loading and unloading a tandem cubby holding three pouches, and comprising support 286, stop 288, and two moving gates: Gate 1 (290) and Gate 2 (292) (shown for clarity as moving up and down, but may rotate, etc.). In FIG. 20(*a*), pouches have yet to be loaded into the cubby. In FIG. 20(*b*), Pouch 1 (294) has been inserted, and since no gates are closed, it slides until its top edge 295 contacts the stop as shown in FIG. 20(*c*), where it awaits being grasped and removed. In FIG. 20(*d*), Gate 2 has been closed in direction 297 behind Pouch 1 (294) so that when loaded, Pouch 2 (296) cannot prematurely enter the space now occupied by Pouch 1. In FIG. 20(*e*), Pouch 2 has been loaded, and has slid to the position behind Pouch 1 in FIG. 20(*f*); Gate 1 has then been closed behind Pouch 2. In FIG. 20(*g*), Pouch 3 (298) has been loaded, while in FIG. 20(*h*), Pouch 1 has been grasped and removed. In FIG. 20(*i*), Gate 2 has opened in direction 299 allowing Pouch 2 to slide to the stop. In FIG. 20(*j*), Gate 2 has closed in direction 301 behind Pouch 1 in preparation for allowing Pouch 3 to advance. In FIG. 20(*k*), Gate 1 has been opened, allowing Pouch 3 to slide so it is just behind Pouch 2. In FIG. 20(*l*), Pouch 2 has been removed, and in FIG. 20(*m*), Gate 2 had opened allowing Pouch 3 to slide to the stop. Finally, In FIG. 20(*n*), Pouch 3 has been removed. As the motions are clear, not all motion/direction arrows have reference numbers.

If the cubby support (i.e., floor) 286 is covered with a high friction material (e.g., rubber, 3M Gripping Material) such that pouches cannot normally slide even though the support is tilted, then vibrating the support (e.g., with inexpensive cell phone-type vibration motors) or the entire cubby may be used to control feeding of pouches toward the stop. For example, if the support is subdivided into separate sections (e.g., there are three supports, one for each pouch in a three-pouch cubby) and if each support is provided with its own vibration source, then by controlling these individually, each pouch may be fed to a desired resting location with the cubby without disturbing other pouches. A sequence for loading and unloading a tandem cubby using this principal is shown in the cross-sectional elevation views of FIGS. 21(*a*)-(*n*). In FIG. 21(*a*), three tilted, substantially coplanar supports A (302), B (304), and C (306) are shown, and stop 308 similar to stop 288 is provided. Supports A, B, and C need not be separate elements, but can be a single element able to vibrate differentially in different regions, or comprise multiple elements joined by a continuous surface that allows for independent motion of the supports (e.g., a thin film, elastomer). In FIG. 21(*b*), Pouch 1 (298) has been inserted onto Support A and Supports A, B, C are vibrated (e.g., along the direction 310 shown, or parallel to the support surface, or in another or in multiple directions) so that the pouch can cross the entire cubby. In FIG. 21(*c*), Pouch 1 has traveled to Support B after which vibration (similar arrows as 310) of Support A has (optionally) ceased as it is not currently needed, while both Supports B and C are vibrated so that pouch can continue to move forward. In FIG. 21(*d*), Pouch 1 has travelled to Support A and come to rest against the stop, where it is ready to be grasped and removed, and vibration is stopped. In FIG. 21(*e*), Pouch 2 (296) has been inserted onto Support A, which along with Support B is vibrating so that (as shown in FIG. 21(*f*)), Pouch 2 can slide to Support B. In FIG. 21(*g*), Pouch 3 (298) has been inserted onto Support A while it is vibrated (if needed), and in FIG. 21(*h*), vibration has stopped. At this time, all three pouches are loaded in the cubby.

In FIG. 21(*i*), Pouch 1 has been removed from the cubby. In preparation for being grasped, in FIG. 21(*j*) Supports B and C are vibrated and Pouch 2 has advanced to the stop. Support A may also be vibrated, so as to achieve simultaneously what will occur in FIG. 21(*k*). In FIG. 21(*k*), Supports A and B are vibrated to allow Pouch 3 to move forward to Support B. In FIG. 21(*l*), Pouch 2 has been removed, and Supports B and C are vibrated so that Pouch 3 can move to Support 3. In FIG. 21(*m*), Pouch 3 has come to rest against the stop and vibration has ceased. Lastly, in FIG. 21(*n*), Pouch 3 has been removed.

Approaches such as those in FIGS. 21(*a*)-(*n*) may be implemented using the machine controller to either open and close the gates, or turn on and off vibration.

Other methods of loading multiple pouches into a cubby and fetching the pouches are used in some embodiments. For example, the cubby support 311 may be covered with a conveyor belt 312 running over outer pulley 313 and inner pulley 316 which is optionally provided with regularly-spaced flights 314 as in the cross-section elevation view of FIG. 22(*a*). The flights project from the belt and can help to avoid pouches overlapping one another; in some embodiments they are not continuous across the width of the belt, but only wide enough to engage pouch 316 near its edges (much like the stops of FIG. 18(*d*)), and may in some embodiments serve as stops. The belt may be moved actively in direction 318 or in the opposite direction (for loading pouches by the inner end) by a motor or other actuator in some embodiments, while in other embodiments (e.g., if supported by low-friction bearings) the belt may be made to move passively (e.g., due to the weight of pouches placed on it). To prevent the belt from passively moving more than intended, a mechanism (e.g., spring-loaded) can be provided that is actuated by the weight of the pouch when it is near the front (right end in FIG. 22(*a*)) of the cubby, or by the pouch's front edge, preventing belt motion when actuated. Once a pouch has been removed, the belt moves again if there is a pouch on it until that pouch reaches the front. If the belt is moved actively, it can be moved based on sensing of pouches on the belt, or the machine controller—which normally will "know" how many pouches are in a given cubby and how many have been removed from it—will advance the belt when needed, or simply advance it after every pouch is removed, regardless. In some embodiments the belt need not be tilted as shown, but can be horizontal for example.

In some embodiments, rather than provide multiple actuators or use passive movement of a belt, the belt is designed to not move on its own, and the grasper—used to remove pouches from the cubby and bring them to the dispenser—may also be used to advance pouches within the cubbies. For example, in the cross-sectional elevation view of FIG. 22(b), while the jaws 320 of grasper 322 have closed on the top edge of the pouch, a hook 324 fixed to the body of the grasper engages a flight behind the pouch. When the grasper moves to withdraw the pouch, the belt is also forced to move in direction 326 as the flight is advanced. FIG. 22(b) depicts the configuration after the pouch—which had previously been resting against another flight—has already moved forward partway. In some embodiment variations, the belt moves only when pulled and then stops quickly, while in other embodiment variations, once tugged by the hook, the belt is provided with a mechanism that keeps it moving until it reaches the next detent position (at which the next pouch is ready to be grasped). In some embodiments, pulley 315 can be driven through a coupler by an actuator fixed to grasper 322.

In some embodiments pouches located within a single tandem cubby can be accessed regardless of their position by arranging for the grasper to reach far into the cubby. The grasper body may be made long enough and/or openings may be provided in the cubby to allow access of the grasper as well as its support structure.

In some embodiments the grasper is able to load pouches into cubbies when so commanded by the machine controller, not only remove them. This capability allows pouches (e.g., multi-compartment pouches) whose ingredient has only been partly dispensed, to be replaced in a cubby. It also allows the machine to load pouches that are supplied to it in a different format than already within a cubby (e.g., within a box) to arrange pouches in cubbies for easy and rapid access, and to re-arrange pouches within cubbies by removing them from some cubbies and replacing them in other cubbies. If pouches are stored more or less vertically (similar to the those in the drawer storage unit of FIG. 16(a)-(c)), then pouches can be simply lowered into position. If, however, pouches are stored in tilted cubbies such as those in FIG. 18(a) or 19(a)), loading requires in some embodiments additional apparatus. FIGS. 23(a)-(f) depict cross-sectional elevation views of a sequence in which a grasper 328 with grasper jaw 330 is provided with a pouch "paddle" 332 to allow loading a cubby with a pouch 334. The pouch support may have the form of a flat continuous paddle, one or more relatively rigid, possibly slender rods, or similar, and may be moveable (e.g., retractable as shown) if the grasper continues to hold the pouch during dispensing (in other embodiments a different grasper may be used) and there is an interference between paddle and dispenser components (e.g., the squeegee of the squeezer). In FIG. 23(a), a pouch is held by jaws 330 with the paddle retracted, while in the next step of FIG. 23(b), paddle 332 has been extended in direction 333. In FIG. 23(c), grasper 328 has rotated in direction 335 to approximately match the angle of the cubby into which the pouch will be loaded; pouch 334 is held in this orientation paddle 332 beneath it, which may only support it in a narrow area (e.g., down the center of the pouch). In FIG. 23(d), the pouch has been loaded into a cubby, and inserted far enough that the upper edge is beyond the cubby stops. In FIG. 23(e) the grasper jaws have opened, releasing the pouch, which then can slide down until its upper edge is against the stop as in FIG. 23(f). Also in FIG. 23(f), the grasper has moved away from the cubby and the paddle has retracted. In some embodiments paddles may be at least partially extended when removing a pouch from a cubby, to prevent the pouch from suddenly tilting to a vertical orientation if that is undesirable.

If pouches are loaded into cubbies by a technician, the bar code, RFID, or other identifying, machine-readable code on it can be scanned by passing the pouch before a scanner before loading it into a cubby. The entrance to the cubby can be provided with a sensor (e.g., photoelectric) so that the controller knows in which cubby the just-scanned pouch is placed. If cubbies are loaded by the machine itself (e.g., from a box left inside the machine by a technician making a restocking visit), then pouches can be scanned (e.g., passing them before a fixed scanner) just before placing them into cubbies, and since the controller knows which cubby receives which pouch, the sensor may not be needed. In some embodiments, pouches are loaded into cubbies randomly, and then scanned to identify which ingredients are where, as well as pouch parameters such as expiration date; a scanner for that purpose may be incorporated into the grasper or associated hardware, or may be more remote if it has a longer working distance (e.g., a long-range barcode reader).

In some embodiments, shelves may comprise cubbies, while in other embodiments, shelves may comprise modules which comprise cubbies. In the latter embodiments, modules serve as smaller shelving units which can be a) combined to form larger shelves; b) can be individually removed and replaced in the machine; c) can mutually interlock to facilitate transporting several modules at once. Modules or shelves may also be insulated, and may include doors (e.g., rollup or accordion-style) to prevent possible loss of pouches during transportation and maintain internal temperatures better. Shelves or modules can be collapsible (e.g., accordion-style) or be rigid, and can be reusable or single-use.

In some embodiments, cubbies, modules, or entire shelves may be able to tilt temporarily for loading so that when loading a pouch from the "front" (i.e., exit end) of a pouch, the cubby is oriented with the cubby exit is the highest region of the cubby, rather than the lowest region as usual. In some embodiments, the pouch may be swung while hanging from the grasper as in FIG. 23(a), or suddenly decelerated, so that its lower end (i.e., the flaps) enter the cubby.

FIG. 24(a) depicts an elevation view of a pouch storage system comprising a set of pouch boxes 336 which are attached to a continuous belt (or chain) 338 through pivots 340, allowing them to remain upright as the belt moves. Boxes can contain a significant number of pouches and ca have a controlled environment within (e.g., temperature, humidity) that is specific to the ingredients within. Boxes are preferably spaced apart such that they can move without mutual contact. In some embodiments, pouch boxes can be manually loaded by rotating them around their pivots (e.g., by 90 degrees) or around other pivots, or by disconnecting one end and swinging them out (e.g., around a vertical axis)

to provide access. Boxes can also be fully detached from the chain, allowing them to be quickly replaced (e.g., with a box full of fresh pouches). Boxes may be subdivided into other boxes, and may be insulated to keep their contents at temperature while being transported. Boxes may include doors (e.g., rollup or accordion-style). Boxes can be loaded in bulk elsewhere, e.g., automatically just after they are sealed, and then brought to the machine and quickly attached to the belt during restocking.

The belt is supported and moved (e.g., bidirectionally per arrows 341 as shown) by pulleys 342 at the top and bottom. A machine using such a storage system can include at least one storage system such as that of FIG. 24(a) (e.g., on either side of a dispenser and dish transport). In some embodiments, pouch boxes (which may be elongated) are supported by pivots and belts at both ends; only one belt and set of pivots can be seen in the figure, however. Pouch boxes may contain pouches in any desired orientation (e.g., tilted as shown in FIG. 18(a), but in the example shown, pouches are arranged vertically within the box, like they are shown in FIG. 16(a), with their top seals at the top. However, in this case they may have no hangars to support them within the box. Rather, they may rest on their flaps, be retained by clips (e.g., made from compliant material such as spring steel) which allow them to be inserted or removed from either the top or the bottom of the box, or they may be held within cavities shaped like the pouch itself, and which support the pouch around the chevron seal so as to minimize weight on the flaps, which may distort them.

When a pouch box is at the top of the belt, pouches 344 inside can be accessed by using a grasper 346 to grasp the top seal area of the pouch and then withdraw it in direction 348. While the grasper may need to move in and out of the plane of the figure to access different pouches in a box, it need not move over a large vertical distance.

FIG. 24(b) depicts a similar system but in which the use of extra pulleys allows multiple boxes to be accessible at the top; this facilitates transfer of pouches from one box to another. Moreover, there is now enough space so that the dispenser 350, dish 352 (with dish transport, not shown), and waste bin 354 can be included within the loop formed by the belt of boxes. In this configuration, pouches can be grasped by the grasper and—assuming the pouch box allows for pouches to exit from its underside—decoupled from the box and lowered into the dispenser below where the ingredient can be dispensed. Since the boxes cannot easily move in and out of the plane of the figure, the grasper, dispenser, and dish are designed so they can move along that axis, thus allowing any pouch to be accessed. Alternatively, the box may contain a feeding mechanism for pouches such as rotating springs 238 of FIG. 16(b), which bring the pouches to a specific location and then may drop them through an aperture in the box floor. Preferably, the grasper accesses the pouch without passing through the box and may be attached to the dispenser; thus, once one pouch is accessed, the system can move so as to prepare to access another pouch (e.g., in another box). In some embodiments a first grasper descends through the box and then immediately hands off the pouch to a second grasper (e.g., as in FIG. 27) such that the first grasper can exit the box quickly, allowing such preparation. However, in some embodiments only one grasper is used, either entering the box from above or from below. If the latter, pouches may be loaded into the boxes inverted (top seal down) and the grasper is able to invert the pouch before using. In some embodiments pouches are pushed out of the box by a mechanism (e.g., located above) and fall into mechanism which allows them to be held during dispensing, e.g., by a grasper that is part of the dispenser. In some embodiments the first grasper, dispenser, and second grasper are able to move along an axis perpendicular to the figure, while the boxes, waste bin don't move along that axis. The dish may move along that axis for some purposes (e.g., delivery to the customer) but in these embodiments doesn't have to move between ingredients, since the dispenser can move over the bin (e.g., located behind it, along that axis) to drop an empty pouch, etc. In these embodiments, a dispensing sequence may involve 1) moving the dispenser under a specific pouch; 2) bringing the pouch into the dispenser; 3) moving the dispenser over the dish; 4) dispensing; and 5) moving the dispenser over the bin to discard the pouch. If the dispenser moves, it may be split into two portions such as in FIGS. 40(a)-(b). In some embodiments the bottom of each box is open and pouches may be retained, e.g., by spring clips which hold them by on their vertical seals; this allows a grasper to simply push pouches straight down into the dispenser (which can to move perpendicular to the plane of the figure to select the intended pouch).

FIG. 24(c) depicts an arrangement similar to that of FIG. 24(b), but in which the belt follows a more complex path that allows more boxes/pouches to be included within the machine without excessively increasing its height. FIG. 24(d) shows a cross-sectional elevation view of a pouch box having within it a number of pouches, held in place by retaining clips 353, which can be spring-like. In the figure, one pouch is being lowered into the box by a grasper, while another pouch is being lowered out of the box and is about to enter a dispenser.

In some embodiments pouch boxes are not attached to a belt, but are simply stacked vertically (e.g., along one or more sides of the machine). In such a case, boxes are actuated to individually slide outwards (e.g., one at a time) and back so that their contents can be accessed, somewhat like a file drawer can open and close.

In some embodiments pouches are placed in pouches with their top seals 356 down, and are withdrawn from the bottom of the box by grasper 346 held by support 358. The grasper can flip them over so their flaps are at the bottom before introducing them into the dispenser. Or, the pouch can be allowed to fall onto a specially-shaped chute or other surface that catches them momentarily, allowing them to be grasped, or causes them to tilt and at least partially invert, facilitating grasping of the top seal, etc. In some embodiments clips retaining pouches are released by a mechanism near the dispenser.

Machines having multiple dispensers (e.g., each with a different ingredient) may be configured similarly to those of FIGS. 24(a)-(c), but with fewer boxes per dispenser (e.g., just one as shown in FIG. 25). In such a machine, the pouch box may be arranged to move along an axis normal to the plane of the figure, or can rotate if shaped like the pouch holders of FIG. 17(a) or 17(d), or may use pouch feeders such as FIG. 16(b). Pouches may be arranged in the box with their top seals 356 up as in FIG. 24(d), or can have their top seals down (e.g., internally they can include ramps such as those in FIG. 19(b)) and are pulled from the bottom of the box by the grasper shown, then flipped over before entering the dispenser.

In some embodiments machines may store ingredients in highly-insulated chambers (e.g., vacuum or aerogel-insulated) to reduce the power consumption required for operation, and allow ingredients to remain edible even after a power failure of reasonable length. Such machines may incorporate a "cold" fetching system that works entirely within the chamber, and which brings pouches to an external pouch transport system which can bring the pouch to the dispenser and possibly participate in dispensing its contents. Pouches may pass through a single opening in the chamber that is normally kept closed, and which may incorporate a double door.

Second System

Figure 44A:
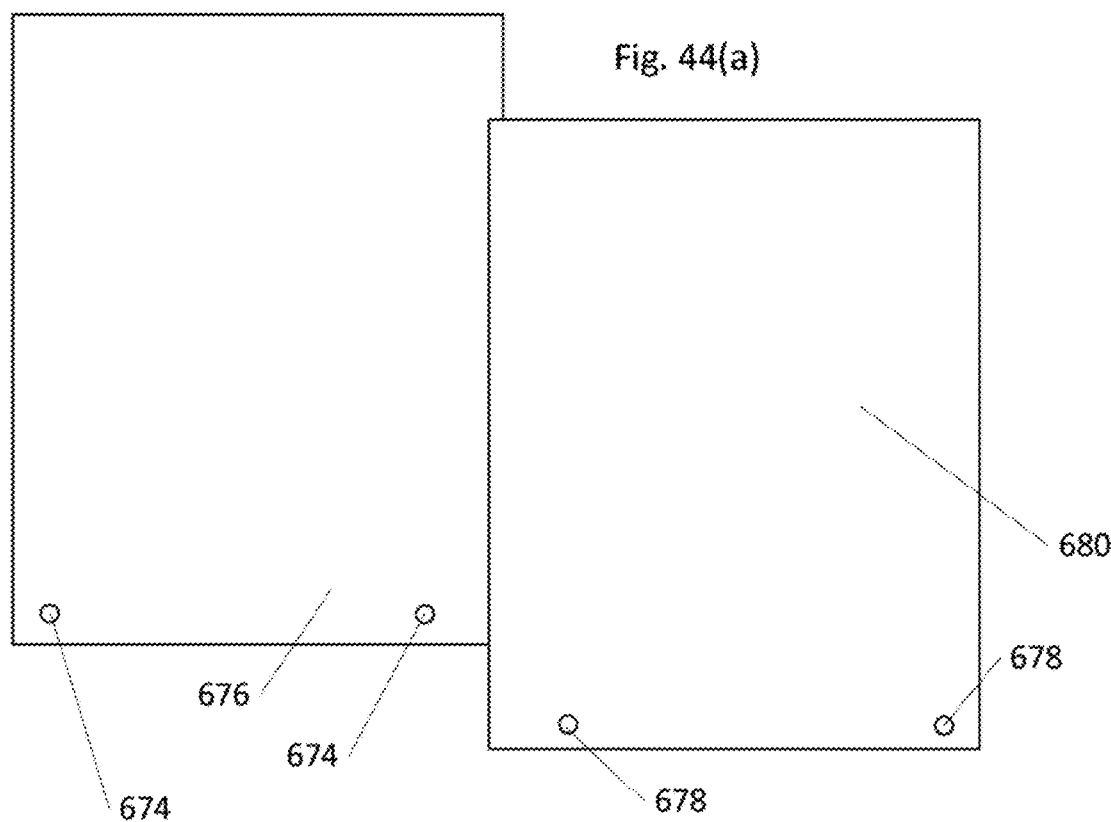
FIGS. 44(a)-(b) depict a perforated pouch.
Figure 44B:
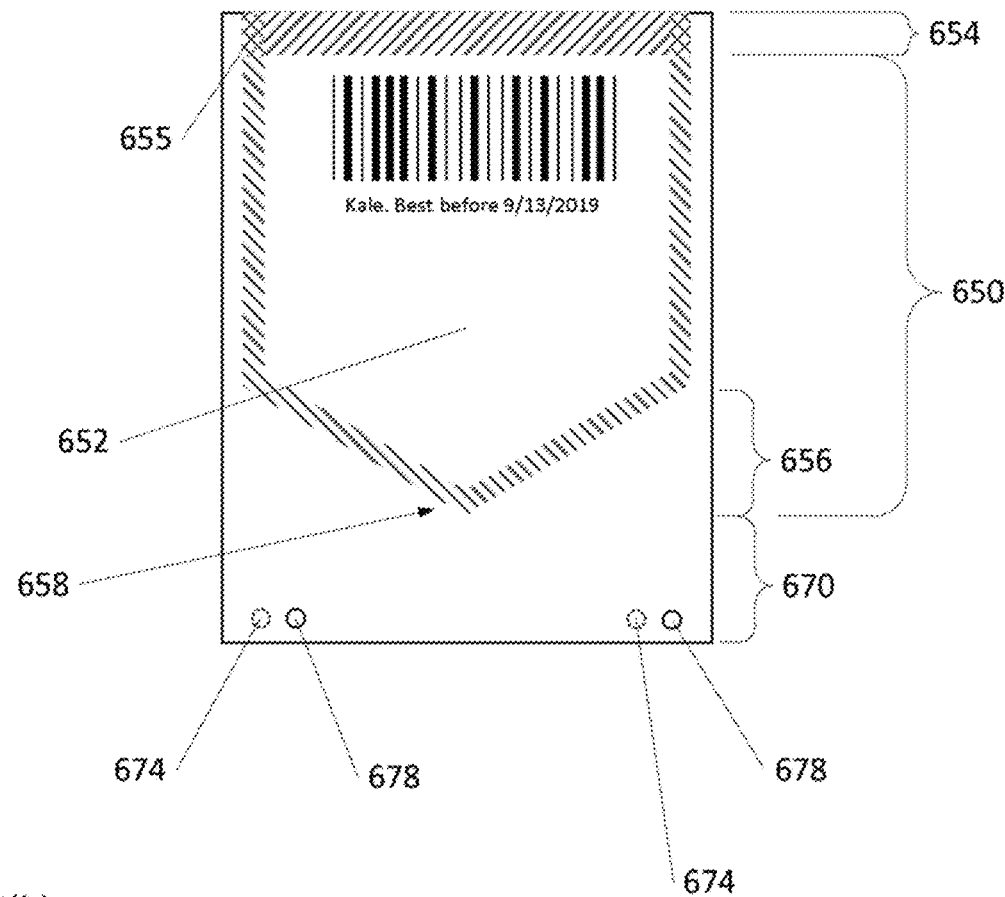
Figures 45A, 45B:
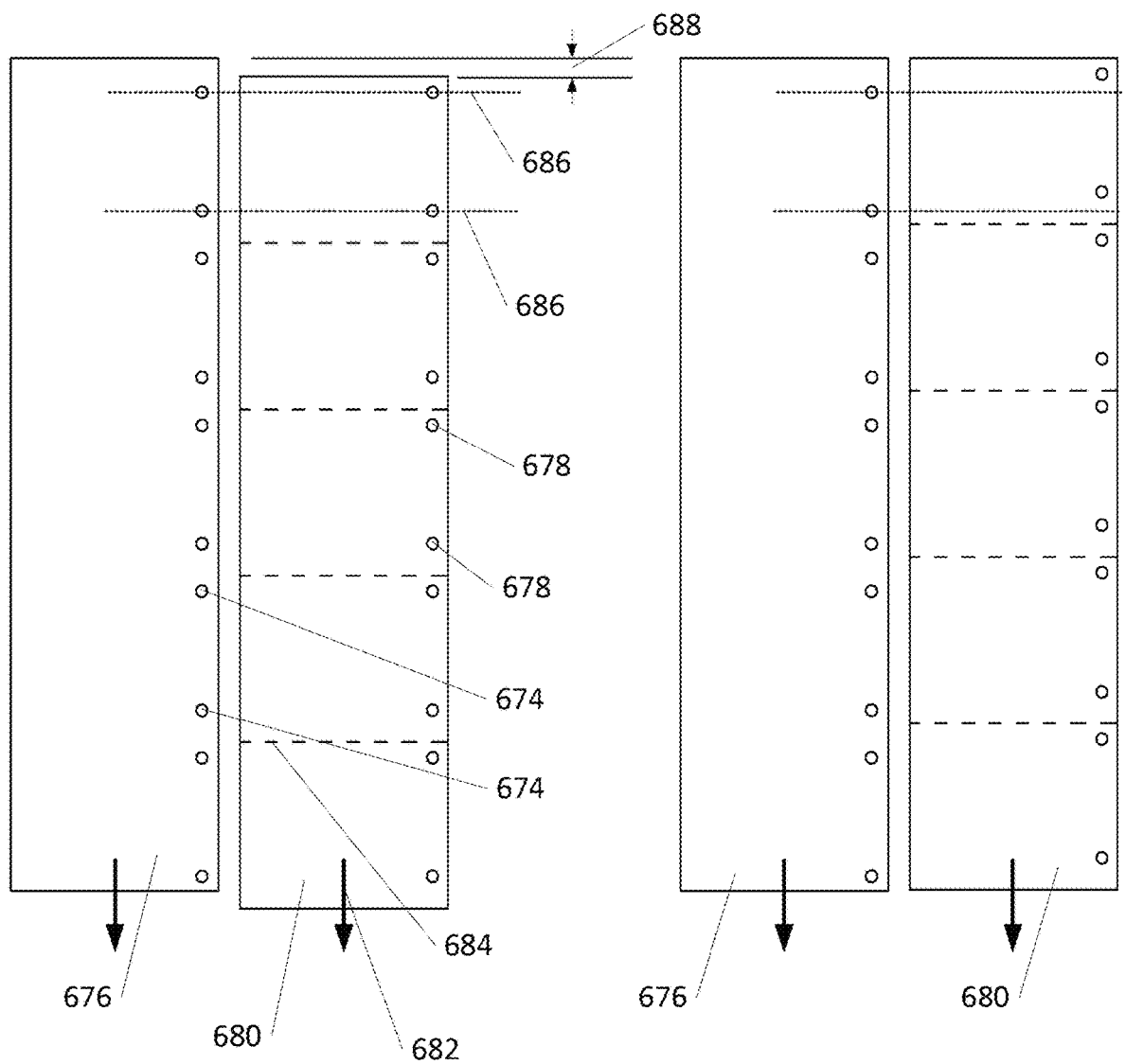
FIGS. 45(a)-(d) illustrate a process of manufacturing a pouch.
Figure 45C:
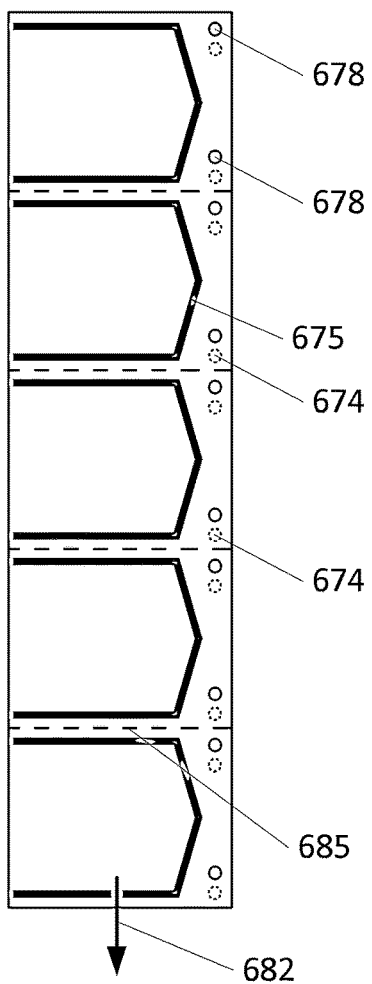
Figure 45D:
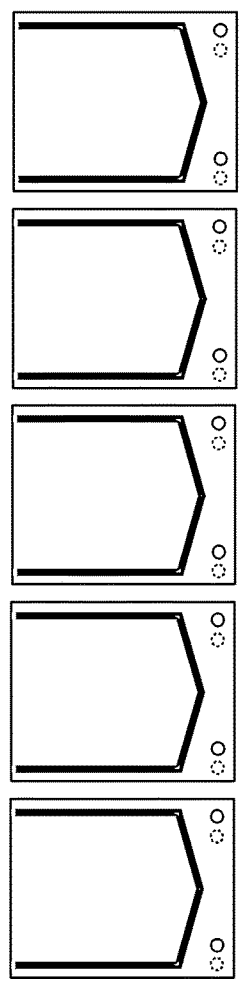

A system intended to serve multiple customers, using shelves and a single dispenser such as that of FIGS. 8(a)-(k), is shown in the 3D views of FIGS. 26(a)-(g). In the front view of FIG. 26(a), major components of the system are shown. Four shelves 360 of the kind shown in FIG. 44 are provided, two on each side of the system, though more or fewer can be used. While this arrangement of shelves may be suitable for a vending-type kiosk, other arrangements may be more suitable for other formats. For example, in a food truck format for preparing food automatically, there may be shelves against the driver's side of the truck and dispensers along the passenger/delivery window side of the truck. In the current arrangement, space may be provided between pairs of shelves as shown to allow for windows in the enclosure which permit customers to view the meal preparation process from the sides of the machine if desired. Dispenser 362 is located toward the center of the system in the embodiment shown, with waste bin 364 in front of it, and with a "mise en place" pouch holder 366 (designated "MEP") and pouch heater 368 behind it. The waste bin may be used to hold empty pouches, or pouches which have been rejected (e.g., pouches past their expiration dates). The bin may be larger than shown and may advantageously be located close to the dispenser to minimize the likelihood that any food residue remaining on a pouch will fall or drip elsewhere than into the bin. The MEP may be used to temporarily hold pouches that have been fetched from a shelf and which will shortly be used in the preparation of a meal; it may comprise individual compartments separated by dividers 371, which support pouches in a substantially vertical orientation, allowing the system's grippers to easily deposit a pouch into a compartment and retrieve it later. The heater may be used to heat the contents of pouches before they are dispensed, though in some embodiments ingredients may be heated while still in the shelves, or once dispensed into a dish. The heater may comprise apparatus implementing one or more heating methods such as microwave/RF heating, immersion in a hot water bath, a convection oven, etc. that are compatible with the materials of the pouch and the ingredients within. The heater may also comprise individual compartments separated by dividers as shown, and a moveable, actuated lid, such as sliding lid 370 seen in FIG. 26(e), which in the case of microwave heating, for example, provides a radiation barrier. In some embodiments the MEP and heater may be combined into a single unit.

Below the dispenser is dish 372, which can be moved by a dish transport 374 allowing the dish to be located under the dispenser in one or more positions and/or orientations such as toward the front of the system (e.g., if empty dishes are manually inserted by the customer, or for delivery to the customer of a meal), etc. In some embodiments the transport may provide two or more axes of motion, such as both X and Y (per the coordinate system on FIG. 26(a)), or Y and rotation about the Z axis. Below the dish transport is service module 376 which may house electronics such as the system controller and power supplies, as well as refrigeration equipment that maintains the system or portions of it at the required temperature, vacuum pumps, etc.

Figure 26A:
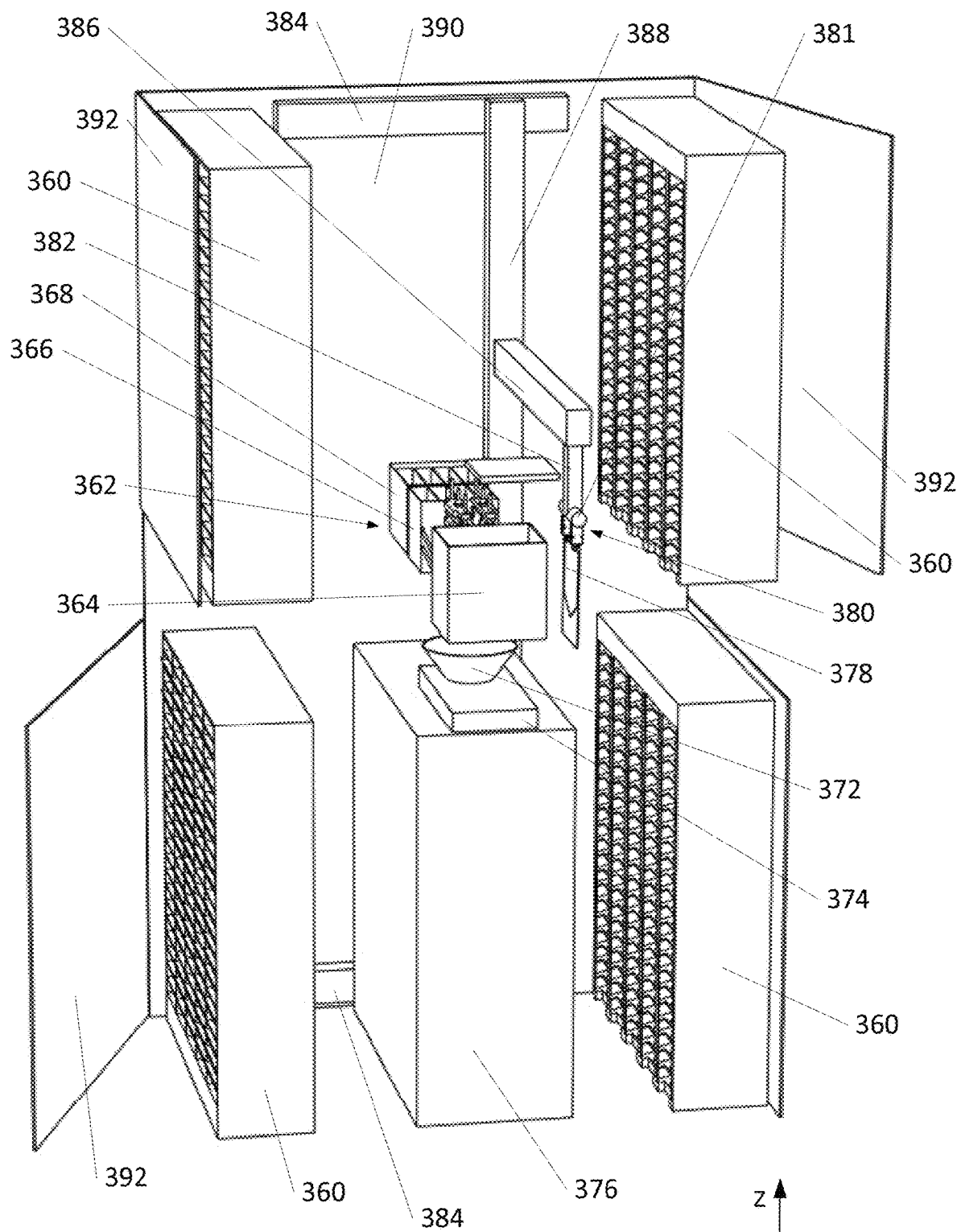

In the embodiment shown, pouches 378 are transported by a manipulator comprising graspers 380 having grippers (e.g., pneumatic) fixed to a rotary actuator 381 similar to 280 supported by arm 382 which is moved along the X, Y, and Z axes by X (384), Y (386), and Z (388) linear stages, respectively. In other embodiments, other stages, including those with rotary joints may be used. The rotary actuator allows pouches to be fetched either from (or in some embodiments returned to) shelves on left or the right side of the system, and allows the pouch to be re-oriented vertically (e.g., FIG. 26(d)) to reduce the effective width of the grippers so they can enter the dispenser and descend within it, and more optimally orient pouches for insertion into the heater, MEP, and waste bin. A vertical gantry configuration is depicted in FIG. 26(a), comprising two X axis stages (one at or near the top of the apparatus, and one at or near the bottom), which move a Z stage, which in turns moves a Y stage. The arm is attached to the carriage of the Y stage in the embodiment shown. The system is enclosed by panels, several of which are shown in FIG. 26(a). The X stages are fastened to rear panel 390, and access panels 392 are provided on the sides of the system which can rotate to provide access to the rear of each shelf, allowing pouches can be loaded individually or in groups. Alternatively, entire shelves may be swapped out (e.g., an empty shelf for one that is pre-loaded with pouches), speeding up the restocking procedure for the machine. Mounted to the arm or to the rotary actuator (e.g., between the grippers) in some embodiments is a camera or scanner (optical, RFID, NFC, etc.) which can be used to read codes on the pouch before grasping it (or at other times, such as during an inventory-recording mode of the system). The camera/scanner may be mounted so it can function regardless of the orientation of the rotary actuator.

Figure 26B:
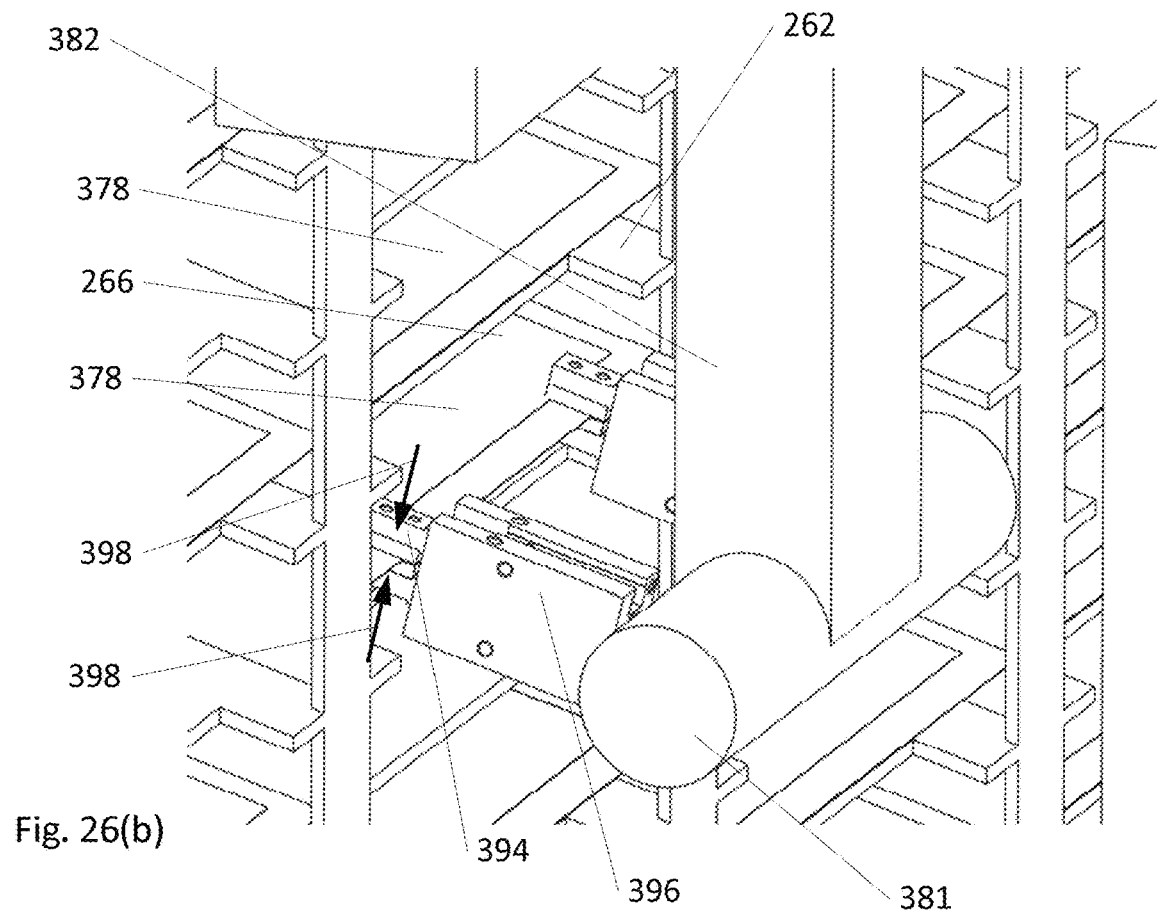
Figure 26C:
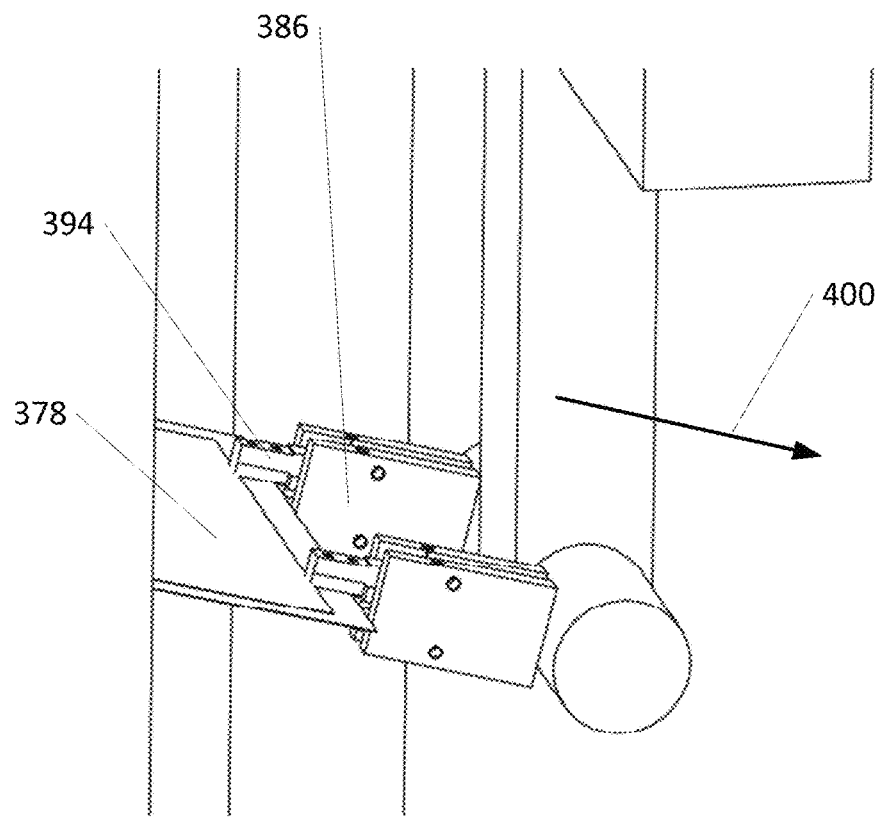
Figure 26D:
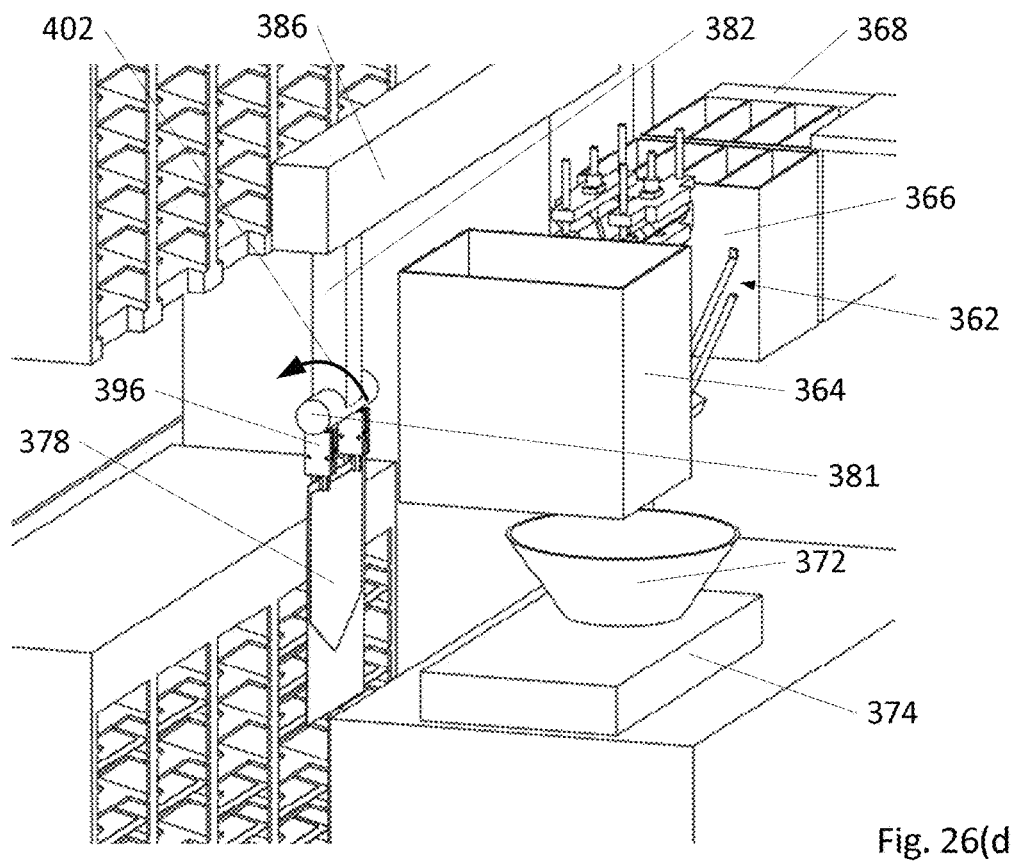
Figure 26E:
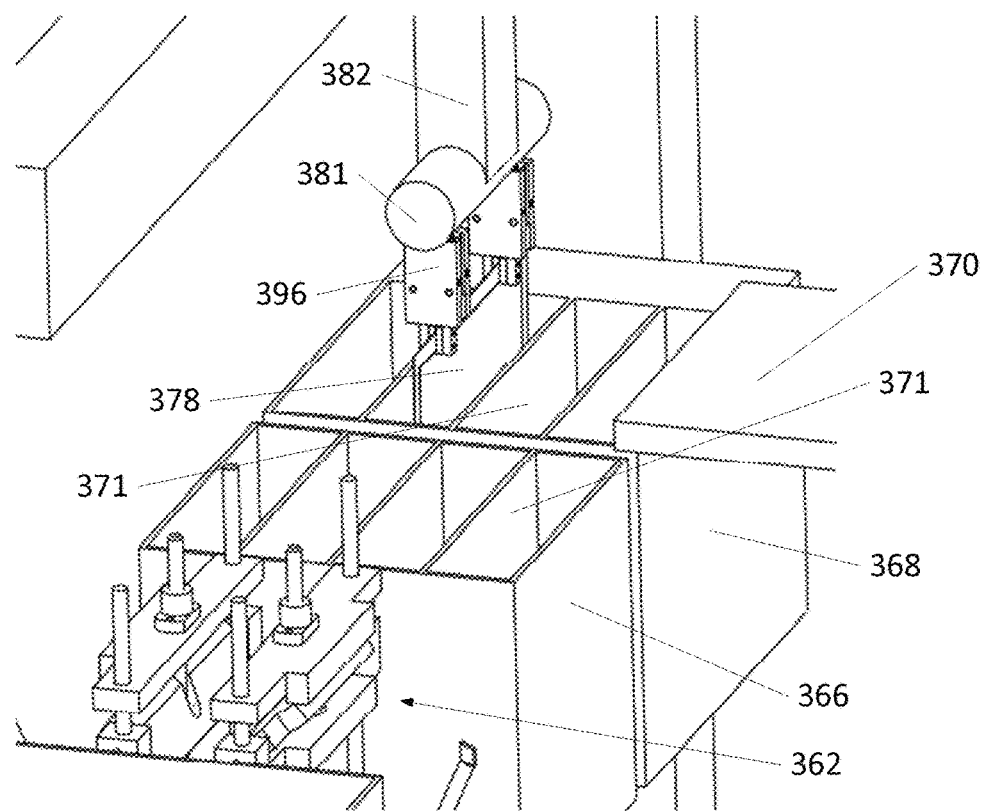

FIGS. 26(b)-(g) depict 3-D close-up views of steps in a process whereby a pouch is fetched from the cubby of a shelf, delivered to the heater for heating (assuming the ingredient (e.g., black beans for a burrito bowl) requires heating), then brought to the dispenser to dispense the food item, and then carried to the waste bin to dispose of the empty pouch. In FIG. 26(b), the controller has rotated the rotary actuator so that the jaws 394 of grippers 396 are substantially parallel to support 262 and the pouch, and well oriented to grasp the upper portion of pouch 378. The controller then moves the grippers close to the pouch and within the cutout 266 of the cubbies, then closes the jaws in directions 398 around the upper portion (e.g., top seal) of the pouch, grasping it. In FIG. 26(c), the controller has moved the arm 382 using, for example, the X and Z stages (e.g., parallel to the support and the gripper jaws), pulling the pouch out of the cubby along direction 400 (e.g., parallel to support 262) while deforming it slightly to release it from the cubby stops. Depending on the design of the cubby stops, the controller may also raise, lower, or (if a twisting axis is provided) twist the gripper pouch slightly to help release it from the cubby. In FIG. 26(d), the pouch has been completely removed from the cubby and the controller has reoriented the rotary actuator in direction 402 so that the pouch is hanging vertically. In FIG. 26(e), the controller has moved the necessary stages so that the pouch is above a compartment of the heater and is being lowered into it, between dividers 371. While the pouch is within the heater, it may be held by the grippers, or else the grippers may release the pouch to allow the heater lid to be closed if needed. If the pouch does not require heating and is dispensing from it is not imminent, it may be placed in the MEP instead of the heater.

In FIG. 26(f), the controller has caused the pouch to be re-gripped (if it had been released) and using the necessary stages (e.g., Y and Z) has then removed the pouch from the heater (having had its contents heated), and has started to insert it into the dispenser. The controller has also moved a dish below the dispenser using the dish transport. During the dispensing process, the pouch may continue to be supported by the grippers. For example, if the pouch contains a Type 2B ingredient, the grippers may descend inside the dispenser as the pouch walls are peeled. In FIG. 26(g), the controller has removed the pouch from the dispenser using the necessary stages (e.g., Y and Z) and positioned in within the waste bin. Lastly, the controller opens the gripper jaws (not shown), dropping the pouch into the bin. If no further ingredients are to be added to the dish, the controller may move it forward (not shown) using the dish transport for delivery to the customer.

In some embodiments the rotary actuator or grippers may incorporate at least one paddle which can support the pouch from underneath when it is not vertical, e.g., when it is in the position shown in FIG. 26(c). The paddle allows pouches to be inserted into cubbies by the manipulator, in addition to being able to remove them from cubbies. Thus, a system with at least one paddle and in some cases, a camera, machine vision software, and/or additional degrees of freedom, can take pouches provided to it (e.g., in a box) and automatically insert them into cubbies, while recording the location and data about each pouch thus inserted. This may allow for faster system resupply than having a technician insert pouches into the cubbies manually.

The manipulator may also fetch and move pouches where are not inserted into the dispenser, but rather, placed into a chute or delivery compartment directly. Such pouches include ingredients which the customer requests to be "on the side" such as a sauce or a salad dressing, pouches which are close to expiration which are to be given to charity unopened, etc. The system can also dispense unpackaged items (e.g., fruit such as bananas) if they can be grasped, cutlery and napkins (e.g., packaged in a pouch), beverages (e.g., Capri Sun, Kraft Foods) in pouches, or snacks in pouches (e.g., trail mix, chocolates). In some embodiments the manipulator can dispense items in other than in flexible packages, such as in bottles. Grocery items, ready-to-eat meals/snacks, and packaged components of meal kits (e.g., to be used for home cooking) are among the items that can be provided to a customer.

In some embodiments the system may incorporate at least one additional manipulator, e.g., a secondary manipulator (e.g., one able to move in Y and Z) which can take over some of the functions of the dispenser described. For example, the primary manipulator may fetch pouches from a cubby and deliver them to the MEP or heater, while the secondary manipulator may remove them from the MEP or heater, bring them to the dispenser, participate in dispensing their contents, and move them to the waste bin. If the work envelopes of multiple manipulators overlaps, the system controller, knowing (e.g., through sensor feedback) the position of all elements of each manipulator, can issue commands that avoid any collisions.

In some embodiments systems similar to that of FIG. 26 may incorporate more than a single dispenser, single MEP, single heater, single dish transport, etc., single primary manipulator, etc. System elements such as these, as well as shelves and other elements, may be shared. For example, a system designed to prepare two meals at once and equipped with at least dispensers may draw pouches from a common shelf or set of shelves.

Pouch Grasping and Fetching

Grasping the top of the pouch repeatably and symmetrically (e.g., grasper centered on the pouch, pouch inserted into grasper the same distance everywhere) from a cubby like that of FIG. 19(d) can be challenging if the pouch doesn't slide against the stops evenly on both sides, slides preferably to one side or the other, or is inserted off-center, etc. Correcting this can be achieved in various ways, including i) vibrating the cubby so that the pouch settles at the stops more symmetrically (and optionally, detecting this condition with sensors such as optical or mechanical switches); or ii) enabling the grasper to rotate about an additional axis, so the grasper can be made parallel to the pouch edge (the edge orientation can be sensed, e.g., by switches built into the grasper). In some embodiments as long as the pouch is grasped securely even if not symmetric with respect to the grasper, adjustments can be made after the pouch is removed from the cubby. An error in the orientation of the pouch can be compensated for using one or more suitable actuators which can rotate the grasper jaws, while an error in the location of the pouch within the jaws can be compensated for by adjusting the position of the axis (e.g., Y axis) along which the grasper travels and/or adjusting the vertical (e.g., Z axis) position of the grasper at key pouch locations (e.g., the location at which the pouch is peeled open). Such errors can be identified by methods known to the art such as using machine vision, using mechanical, optical, capacitive, or acoustic sensors, etc. If the pouch is placed into an MEP (e.g., FIG. 26(a)) before being grasped again and brought to the dispenser, adjustments in its position and orientation can also be made during the second grasp, or afterwards.

Due to possible distortion of the pouch caused by the weight of the ingredient inside, or packing the ingredient under vacuum or excess pressure, the top edge of the pouch may not be very flat, making uniform grasping more difficult. To remedy this, the grasper in some embodiments comprises at least two separate pairs of jaws spaced apart and moveable relative to one another. With such a design, once the edge is grasped, the pairs can be moved apart in a way that applies tension to the top seal of the pouch to flatten it, if necessary.

Figure 27:
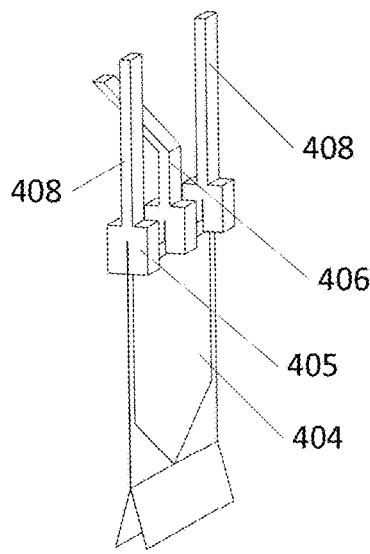
FIG. 27 shows an approach to handling a pouch.

In some embodiments, to speed up the process of food preparation, or provide better thermal insulation between cold and warmer areas of the machine, at least two separate robotic grasping/pouch transport systems may be used in the same machine, the first of which removes the pouch from storage and the second of which brings the pouch to the dispenser and optionally, participates in dispensing the ingredient. While the second system is doing this, the first system is free to fetch the next pouch, or the first system can return an incompletely dispensed pouch to storage while the second system brings a pouch from the MEP to the dispenser, etc. In some embodiments the first system may place a pouch in an MEP, pouch heater, etc., from which the second system then picks it up. In other embodiments, one system may directly hand off the pouch to the other. FIG. 27 depicts a pouch 404 held by three grippers 405 to facilitate hand-off. One gripper is moved by bent support 406, and two grippers are moved by straight supports 408. In some embodiments, this can be reversed, and in some embodiments, there can be two of each kind of support, or all graspers can use bent supports (some bent in the opposite direction than others). The use of both straight and bent supports enables, for example, the pouch to be initially held by a first grasper with a bent support, and, without colliding with this, second and third graspers with straight support can then grip the pouch in other locations, thus allowing the first grasper to release its grip. In some embodiments a bent grasper support can straighten itself out when not needing to be bent.

Pouch Variations

In some embodiments pouches may be used having specialized features. For example, the pouches shown in the 3D views of FIGS. 28(a)-(c) are intended to be fully peeled apart (except for their tops) using a dispenser such as that of FIGS. 8(a)-(k), e.g., in a system such as that of FIGS. 26(a)-(g). The pouches illustrated have flaps 410 at their bottoms which may be manipulated to open and/or peel the pouch, chevron-shaped seals 412 near their bottoms to facilitate peeling and/or form a narrow funnel-like opening if desired, etc. Vertical (e.g., peelable) seals 413 are also provided. To facilitate grasping of the pouch using the manipulator, to more positively and repeatably position the pouch within a cubby, and/or to facilitate reading of a machine-readable code (e.g., a bar code 415) or human-readable information 417) on the pouch, the pouches also have stiffening elements 414 or 416 near or coincidence with their upper edges and top seals 418, which keep the upper edges more straight and flat than they might otherwise be. In the case of FIG. 28(a), element 414 comprises a bend in the film forming the pouch and/or a thicker strip of material laminated to the upper portion of the pouch. In the case of FIG. 28(b), element 416 comprises a corrugated upper portion of the pouch. Both stiffening approaches may be implemented with suitably-shaped heated dies which form the pouch material (presumed to be a thermoplastic and/or a portion thereof (e.g., the pouch may have multiple layers) into the desired shapes. FIG. 28(c) shows a pouch which uses one or more D-shaped loops 420 (with the corners not necessarily as sharp as shown) formed from films 421 and 423. These are similar to those of FIG. 14(c), but near the pouch top edge for stiffening purposes, retained by seals such as 422. Pouches may also incorporate air- or liquid (e.g., water)-filled chambers near their tops as stiffeners.

Figure 28D:
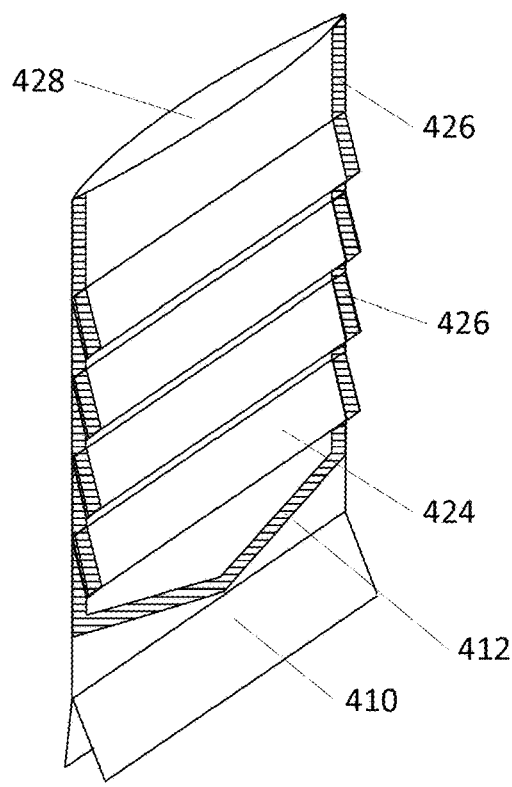
FIGS. 28(a)-(d) depict a variety of pouches.
Figure 28A:
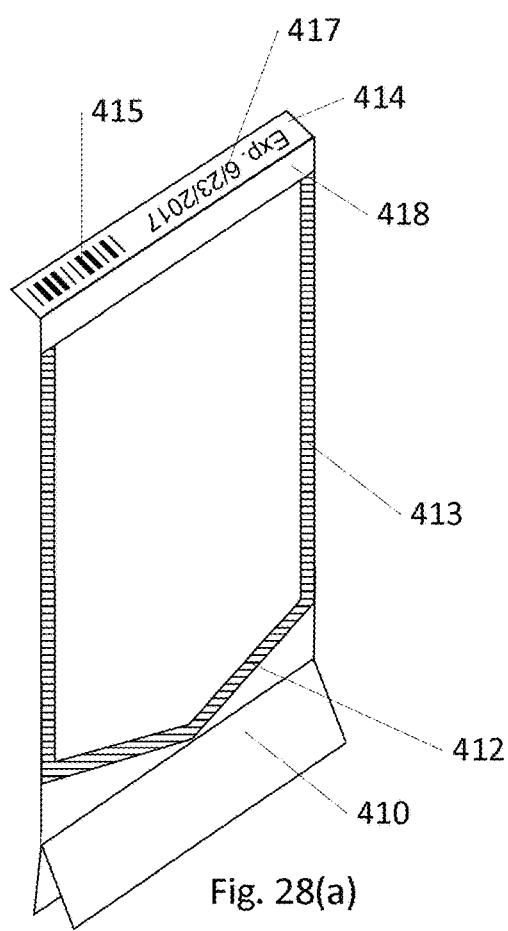
Figure 28B:
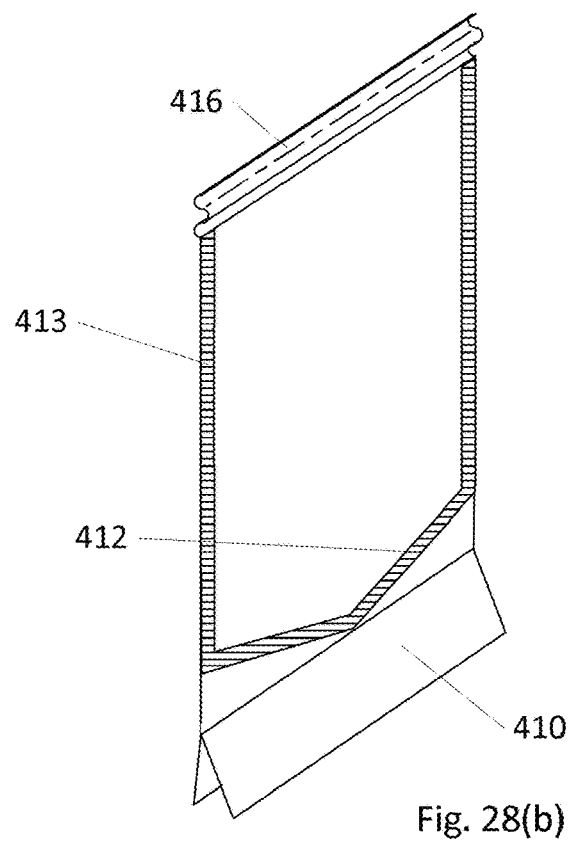
Figure 28C:
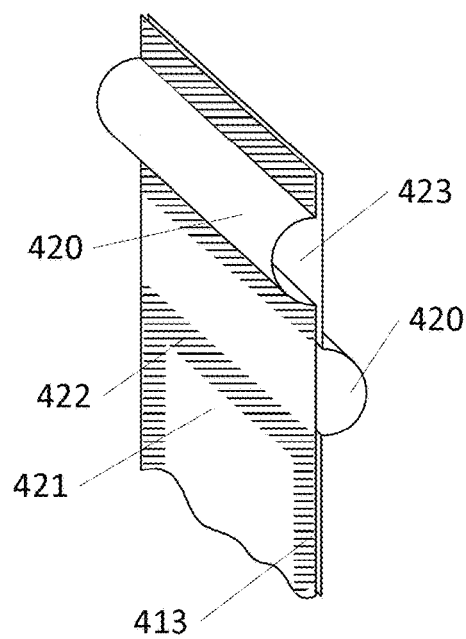

The pouch of FIG. 28(d) is designed to accommodate a significant volume of an ingredient while remaining fully peelable (i.e., up to the top seal, or including it), and minimally distorting the shape of its sides and flaps. It comprises one or more pleats 424 (four are shown) in which the film comprising one wall of the pouch has been folded, including the vertical seals 426. Some pouches may have pleats on both walls. When an ingredient is loaded into such a pouch through opening 428, the pleats can expand the internal volume.

Controlled Dispensing

Figure 29:
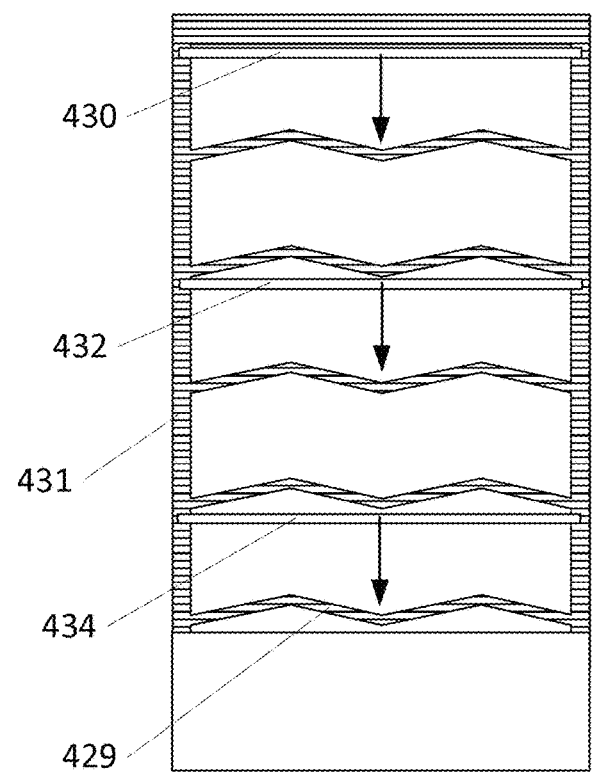
FIG. 29 illustrates dispensing from a pouch.

FIG. 29 depicts an elevation view of a pouch similar to that of FIG. 3 having zig-zag seals 429 as well as vertical seals 431. If the maximum fill levels shown in FIG. 3 are used, then there is room for a thin squeegee or roller to be placed again the pouch on one or both sides in the positions shown as #1 (430), #2 (432), and #3 (434). With the squeegee in position #3, a food item in the bottom compartment can be dispensed, assuming a Type 1 item, without disturbing items in upper compartments, by lowering the squeegee to expel the item. With the squeegee in position #2, the items in the next two higher compartments can be dispensed, and with the squeegee in position #1, the items in all compartments can be dispensed. Thus, the amount of a food item needed can be varied, and gradual dispensing from a multi-compartment pouch can be implemented by using a squeegee or roller the impingement height of which on the pouch can be varied.

Figures 30A, 30B, 30C, 30D, 30E:
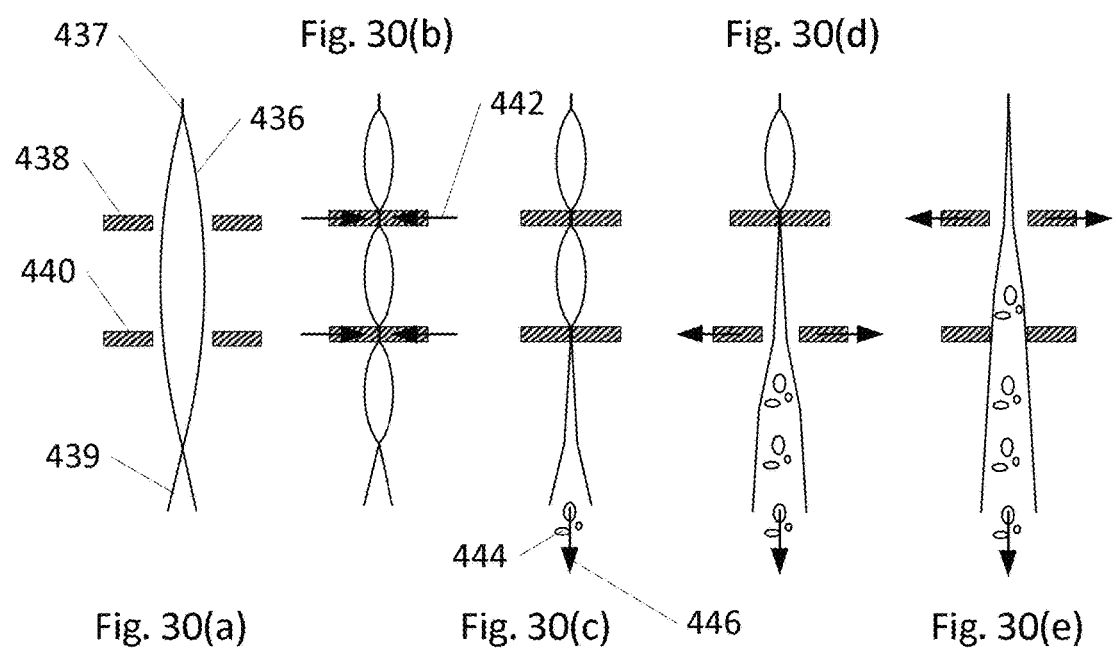
FIGS. 30(a)-(e) show a method for dispensing an ingredient.

FIGS. 30(a)-(e) show elevation cross-sectional views (in which the side seals are not visible) of a pouch that is not compartmentalized, but which through the use of multiple clamps, can be made to dispense ingredients gradually. In FIG. 30(a), pouch 436 with upper seal 437 and flaps 439 is unopened and upper clamp 438 and lower clamp 440 on either side of the pouch are separated so as to not significantly compress the pouch. In FIG. 30(b), both sets of clamps have moved in the direction of arrows 442 and compressed the pouch, dividing the food items within into multiple (three as shown) portions. The items may be of Type 1, or of Type 2A or 2B in some cases. In the case shown, a Type 2A item is assumed (i.e., the item can readily fall out of the pouch without assistance) but using moving clamps serving as squeegees, actual squeegees, full peeling, etc., other types can be accommodated. In FIG. 30(c), the pouch has been opened, allowing items 444 below the lower clamp to exit the pouch in direction 446. In FIG. 30(d), lower clamp 440 has also been opened, allowing more items to exit, and in FIG. 30(e), upper clamp 438 has also been opened, allowing all the remaining contents to exit.

Figure 31A:
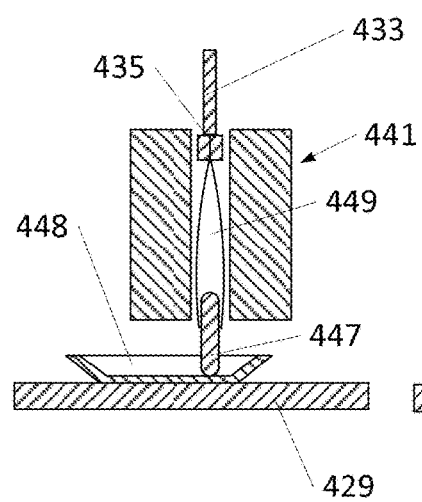
FIGS. 31(a)-(c) depict steps in dispensing an ingredient.
Figure 31B:
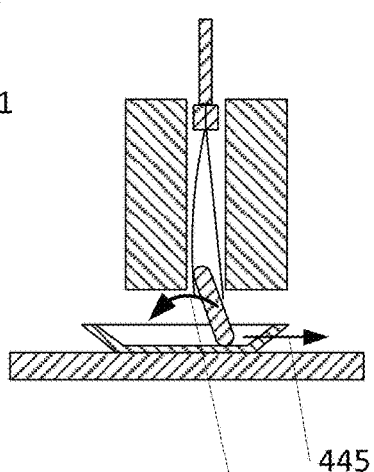
Figure 31C:
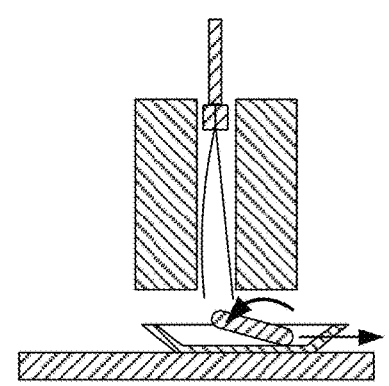

FIGS. 31(a)-(c) depict cross-sectional elevation views of a process in which a relatively large ingredient 447 can be controllably dispensed into a vessel 448 such as a dish by using coordinated/synchronous motion of the dish relative to the dispenser. For example, a slice of bread in a pouch within dispenser 441 may be laid down onto a plate, and a slice of a beefsteak tomato, piece of cheese, cold cuts, or a cooked hamburger patty may be laid onto the bread using this technique. The food item is initially substantially vertical as in FIG. 31(a) suspended by gripper 435 and arm 433, and enters the dish and makes contact with it, possibly off-center as shown in FIG. 31(b). As the item continues to leave the pouch 449, dish transport 429 moves dish 448 underneath the pouch in direction 445 (FIG. 31(c)), causing the item to reorient, tilting in direction 443 and eventually falling out of the pouch and onto the plate as desired. If the item has two different surfaces (e.g., a sunny side up egg) and a particular one should face upwards, this method can be particularly advantageous in ensuring the desired orientation. Also, such a method can minimize splashing of one ingredient descending into a dish containing another, especially when a preferred order in which ingredients are added (liquids after solids) cannot be used. In general, coordinated motion between dispenser and vessel has broad utility in automated food preparation. Coordinated motion between vessels receiving ingredients and the dispenser—such as motions which allow a particular ingredient to be placed in a particular location or orientation in a vessel, or on/adjacent to another ingredient already in the vessel, or to allow 2D or 3D printing or dispersion over a large area—may involve motions imparted to the vessel, a vessel carrier transporting the vessel, the dispenser, or a combination thereof. For example, the vessel may be transported on a carrier that is moved by an X/Y stage and/or rotates; such a stage can also serve to put a dish into a heating chamber, deliver a dish to the end user, etc.

FIGS. 32(a)-(g) show elevation views of a pouch having multiple pieces of a food ingredient (e.g., slices of pepperoni) which can be dispensed one at a time very controllably using rollers. Unlike dispensers for Type 1 ingredients which use squeegees or rollers which move downwards relative to the pouch, in the approach discussed here, the rollers move upwards with respect to the pouch, gradually releasing pieces of a food item. Such a high level of control can be combined with the ability to accurately control the position of a receptacle or food item (e.g., a pizza crust) so as to allow an ingredient (e.g., solid) to be placed precisely in the receptacle/on the item in a non-contact manner. As shown in FIG. 32(a), pieces such as piece 1 (450), piece 2 (452) and piece 3 (454) are arranged in the particular pattern shown, and are substantially immobilized in that pattern by one method or another such as vacuum packing, internal seals (continuous or discontinuous), the use of an internal perforated sheet which may be partly attached to the pouch (e.g., at the top), thermoformed pockets within one or both films of which the pouch is comprised, tension maintained on the sides of the pouch, etc. In this discussion the use of vacuum is assumed. Once the pouch has been opened, vacuum can no longer retain the pieces. Thus, the pouch has been inserted into a sleeve 456 having an interior width small enough to prevent pieces from passing one over and past the other. The sleeve may also have compliant elements which apply a constant pressure to the walls of the pouch to keep the pieces from sliding. FIGS. 32(b)-(f) depicts steps in the process of dispensing two pieces. In FIG. 32(b), the pouch is shown with sleeve 456, and below the pouch are a pair of rollers 458, one behind the other (alternatively, one roller and a substantially rigid backing plate may be used in some embodiment variations). In FIG. 32(c), the pouch has started to descend in direction 460 relative to the sleeve, and pieces such as pieces 1 and 2 are starting to become slightly compressed between the rollers which are rotating in direction 462. As the pouch continue to descend and the rollers roll, piece 1 (450) eventually is no longer compressed by the rollers as in FIG. 32(d) and falls out of the pouch in direction 464. After additional pouch and roller motion, piece 2 also falls, as does piece 3 (454) (FIG. 32(e)). By the time of FIG. 32(f), eight pieces have been released, one at a time. Since the pieces may shift slightly before release, the exact pouch position at which each piece is released may vary. However, if these positions are sensed (e.g., using machine vision), the pouch can be moved to the exact location needed to release a piece at the correct time.

Figure 32I:
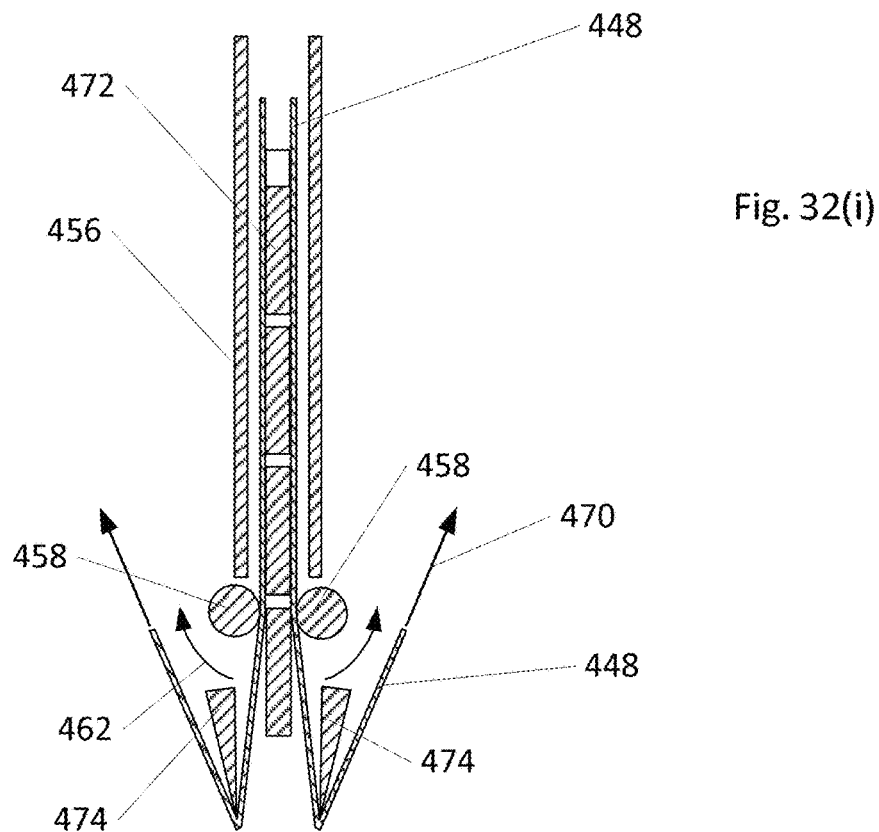
FIG. 32(i) shows a modified version of the apparatus of FIG. 32(h).

In the above figures, pieces exit the pouch even though the walls are still joined together (though external vacuum cups may be used to help separate them), or air may be introduced into the pouch to expand it, etc. FIGS. 32(g)-(i) depict a version of the arrangement of FIGS. 32(a)-f) in which the pouch does not only descend, but is also peeled, which can facilitate reliably dispensing the pieces. FIG. 32(g) depicts a pouch in a state similar to that of FIG. 32(e), but now the film beyond the roller has been wrapped around the roller as seen in the sectional view (section line 466) of FIG. 32(h), which shows piece 4 (468) nearly released as the film is pulled in direction 470 as well as still-retained pieces 472. In FIG. 32(i), the arrangement of FIG. 32(h) has been modified with the addition of blades 474 which can help dispense any residues that may remain on the film (e.g., for an ingredient that isn't very dry).

Figure 32J:
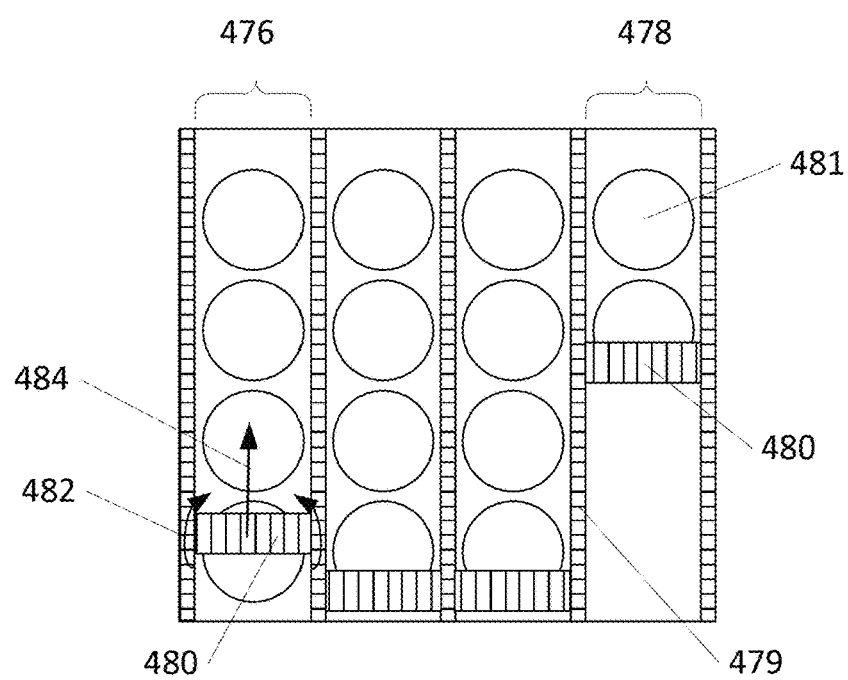
FIGS. 32(a)-(g) illustrate steps in dispensing an ingredient.
FIG. 32(h) shows a cross section of FIG. 32(g).

FIG. 32(j) depicts a pouch which also has its pieces dispensed in a highly-controlled way. In this case, the pouch is subdivided into vertical compartments (e.g., four) such as compartment 1 (476) and compartment 4 (478) by seals 479. Since the compartments are relatively narrow, they may not deform as much as one piece tries to pass another due to gravity, and so a sleeve may not be needed to prevent one piece passing another. Each compartment is provided with its own roller 480 which can be independently controlled. In the figure, the roller for compartment 4 has already risen so as to release two pieces of ingredient 481, whereas the roller for compartment 1 is rotating in direction 482, rising in direction 484, and preparing to release the first ingredient for that compartment. Once a roller has passed a piece, it can move further towards the pouch with minimal danger of crushing the piece, and then if desired, reverse its motion, pushing the piece downward.

In some embodiments, rather than individually dispense pieces of an ingredient as in FIGS. 32(a)-(g), ingredients can be dispensed in bulk but packaged and dispensed so as to retain a particular arrangement of the pieces within the package. Thus, for example, pepperoni slices meant to be distributed over a small circular pizza can be arranged in a suitable pattern within the pouch, and the pouch vacuum packed to prevent the slices from moving. Once the pouch is opened, it can be peeled open gradually while the pizza moves underneath in a coordinate motion. To prevent the slices from shifting their positions once vacuum is lost (assuming they don't adhere to the package film normally, or an edible adhesive is not used), the "conveyor" approach of FIG. 51 can be used. Or, the pouch can be compressed between two surfaces (e.g., by liquid-filled bladders) during dispensing.

Dispensers, Dispensing, and Pouch Manufacturing

Complete or nearly-complete dispensing of ingredients from pouches as described herein is not merely more efficient and less wasteful. It also reduces the risk of machine contamination by residual ingredients, reduces the potential for food spoilage odors, and reduces the risk of attracting insects and vermin.

Methods and apparatus disclosed herein can minimize or eliminate direct contact between machine and ingredients, with ingredients only contacting disposable/consumable materials, or those which can be easily removed for cleaning. Direct contact can easily contaminate the machine, cross-contaminate other ingredients, and necessitate regular and thorough machine cleaning (which can make unattended operation difficult if not impossible). Avoiding direct contact in a home appliance saves time and effort in cooking. In a public/vending-type machine, it reduces the need for service visits, greatly improves food safety, and eliminates the need for rinse liquids and waste disposal (e.g., water and drain plumbing), thus allowing the machine to be installed temporarily or permanently in a much larger variety of locations/venues.

Referring to dispensers such as those shown in FIGS. 8(a)-(k), the pouch sides, whose inner surfaces are exposed to ingredients and may have adherent residues, are at their lowest height as they pass over the blade edges (FIG. 8(i)). Thus, any ingredient on the surface will not be able to slide or fall upwards so as to contaminate the clamps or other parts of the dispenser, even if the ingredient does not detach and fall into a vessel placed below. Redirection of the pouch sides by the blades also allows the peeling motion induced by the peeler clamps to be other than downwards (toward the dish): a direction in which there is little or no room to move. Rather, the direction can be sideways/horizontal or preferably as shown, upwards.

With reference to FIGS. 8(a)-(k), FIG. 34, FIGS. 35(a)-(b), FIGS. 36(a)-(b), FIGS. 37(a)-(c), FIGS. 38(a)-(f) depict 3-D views of a dispenser designed to dispense ingredients of types 1, 2A, or 2B from a pouch having flaps at its bottom, such as the pouch of FIG. 1, whose seal is chevron-shaped at its bottom, the chevron having a lower tip or apex at the outside bottom of the sealed region. In some embodiments, not all aspects of the design shown in the figures herein will be present, and different aspects of the design may be replaced with other aspects, and elements may be added. In the design shown, the vacuum cups of FIG. 8(h) are replaced with pads (e.g. soft Sorbothane (Sorbothane, Kent, Ohio) which is naturally tacky) which may be perforated to provide vacuum or air to the pad surface. The peeler is provided with upper and lower clamps as in FIG. 8(c), but the squeezer shown in FIG. 8(b) is replaced with a design in which the squeegee can be extended or retracted by its own actuator(s), regardless of the squeezer's vertical position. Additional elements have also been incorporated, such as grippers and slides which prepare the pouch to allow easy separation of the flaps, and a film which guides the pouch into the dispenser even if the pouch is distorted, while protecting the dispenser from potential leaks in the pouch.

Figure 33A:
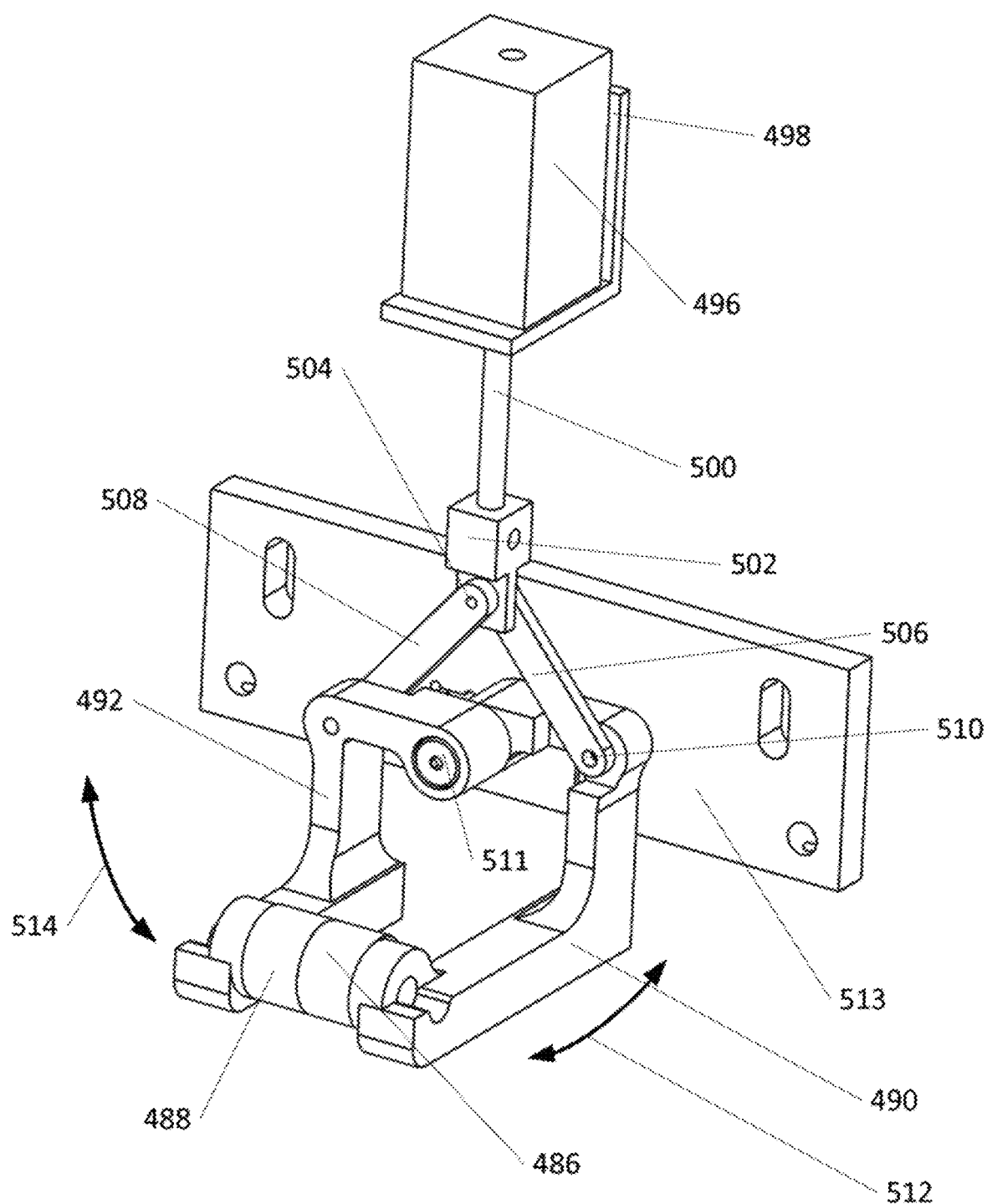
Figure 33B:
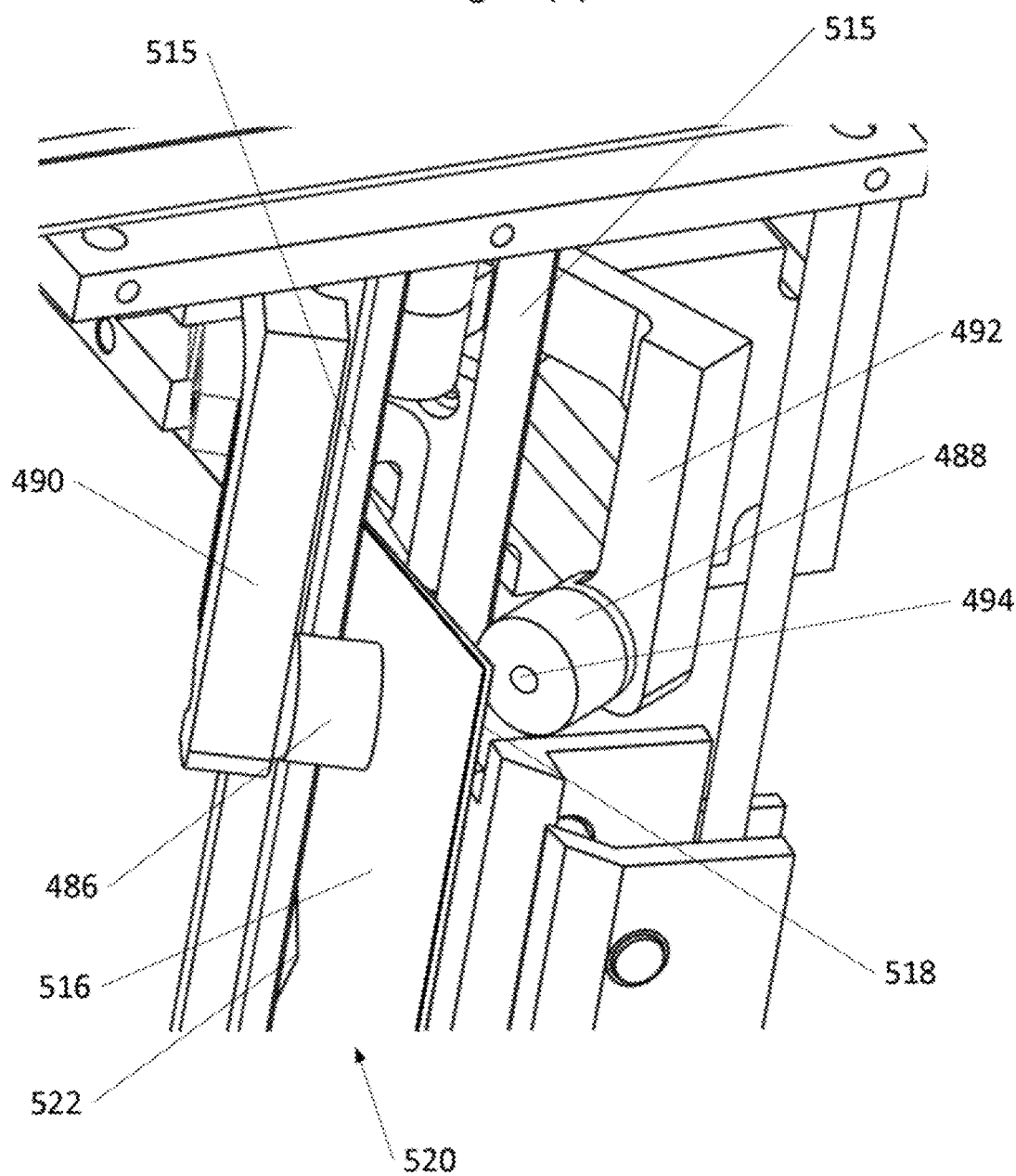
Figure 35A:
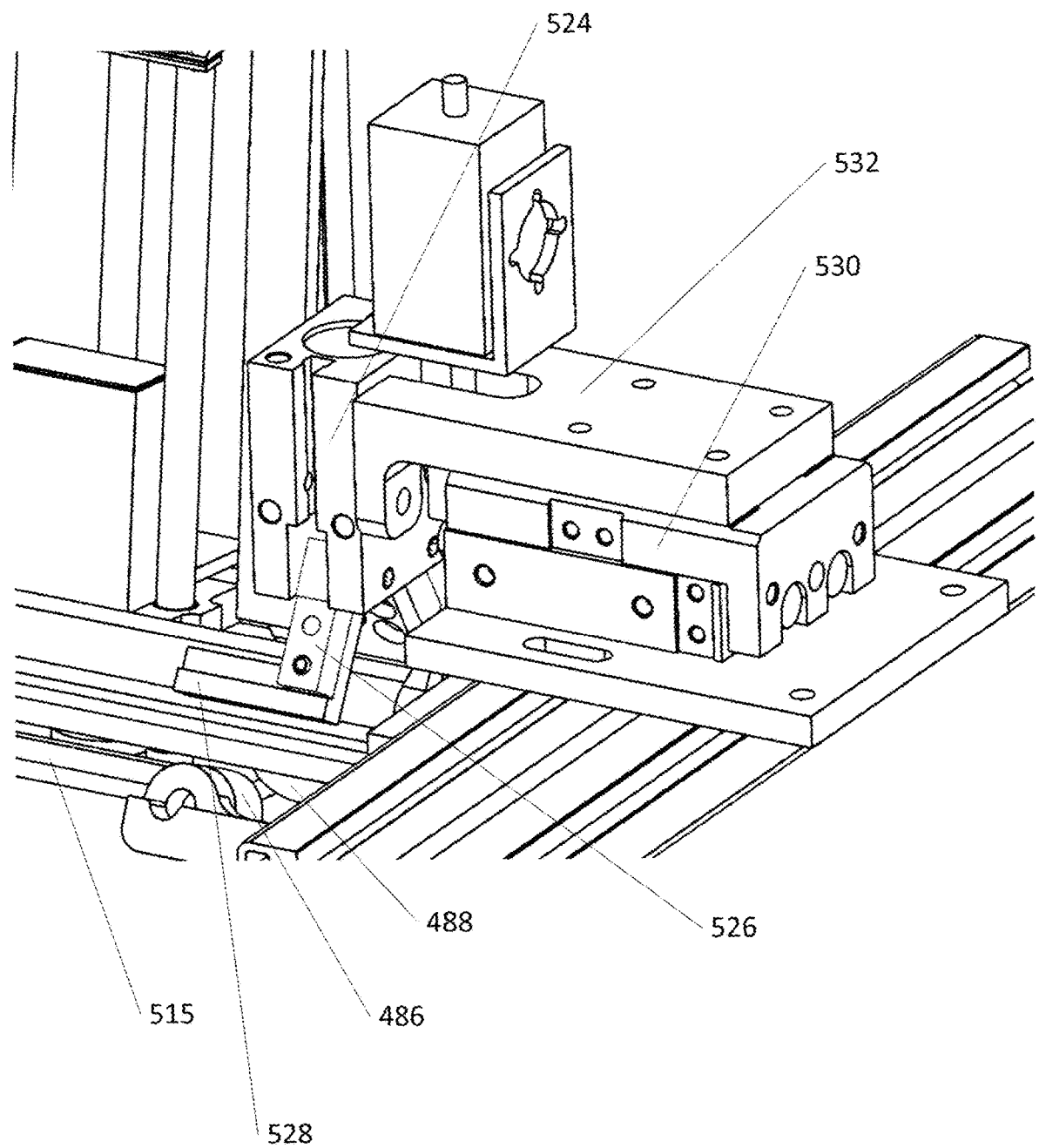
Figure 35B:
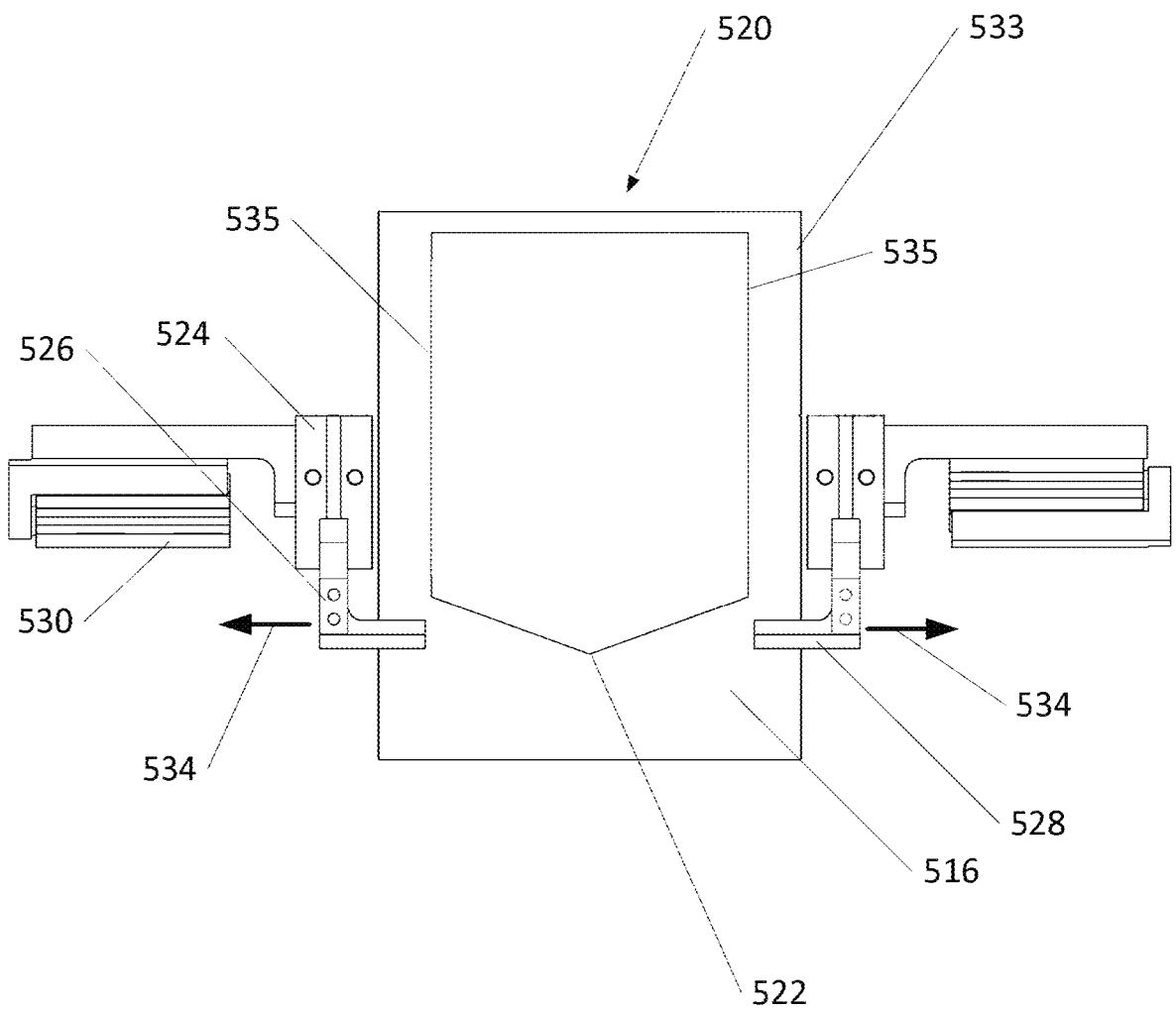
Figure 36A:
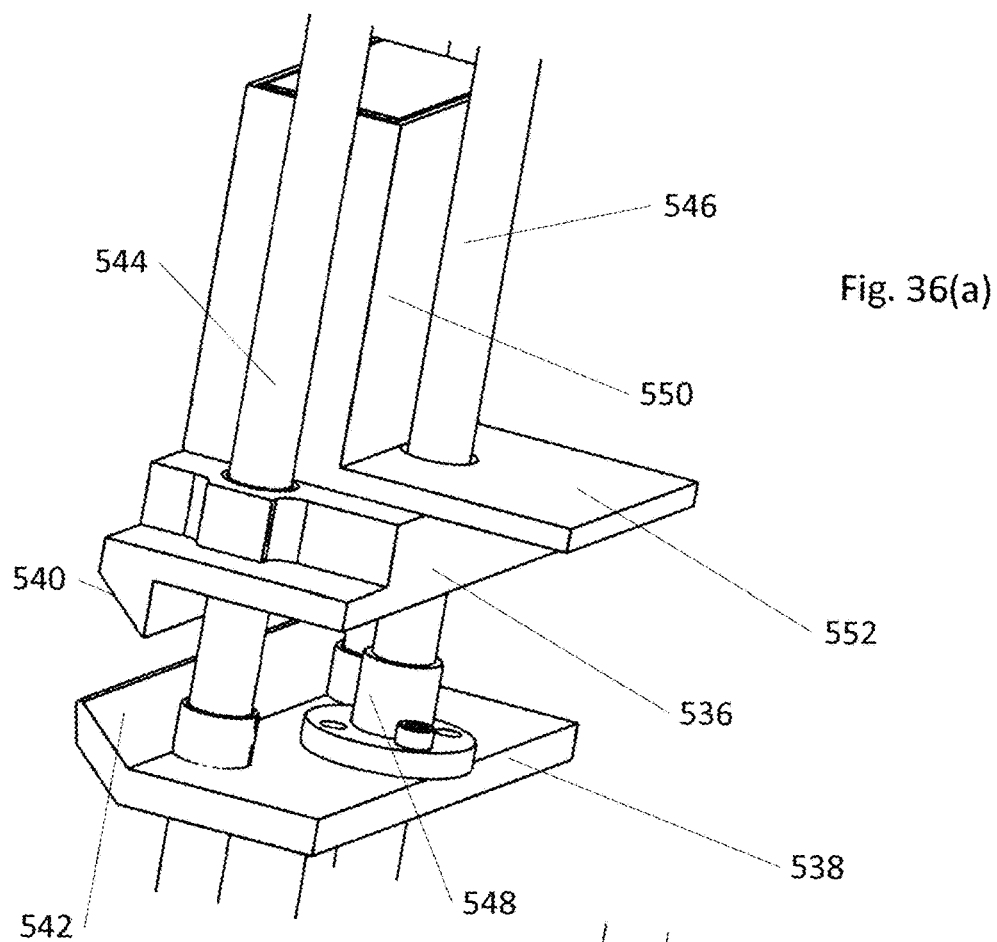
Figure 36B:
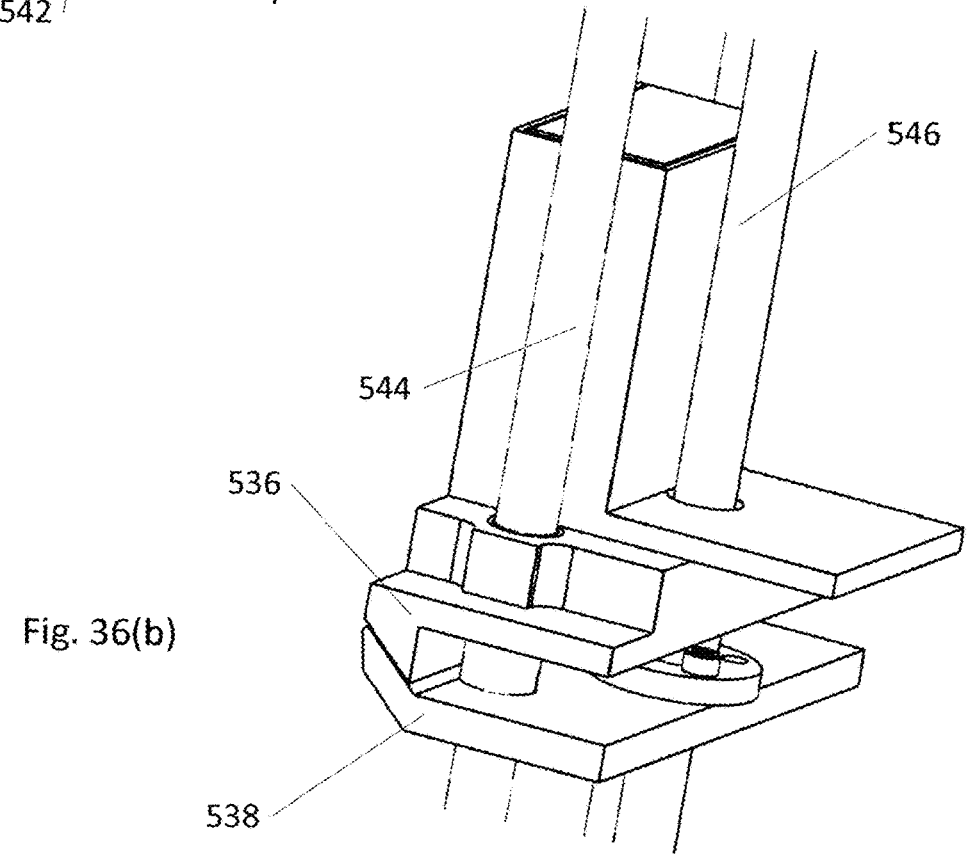
Figure 37A:
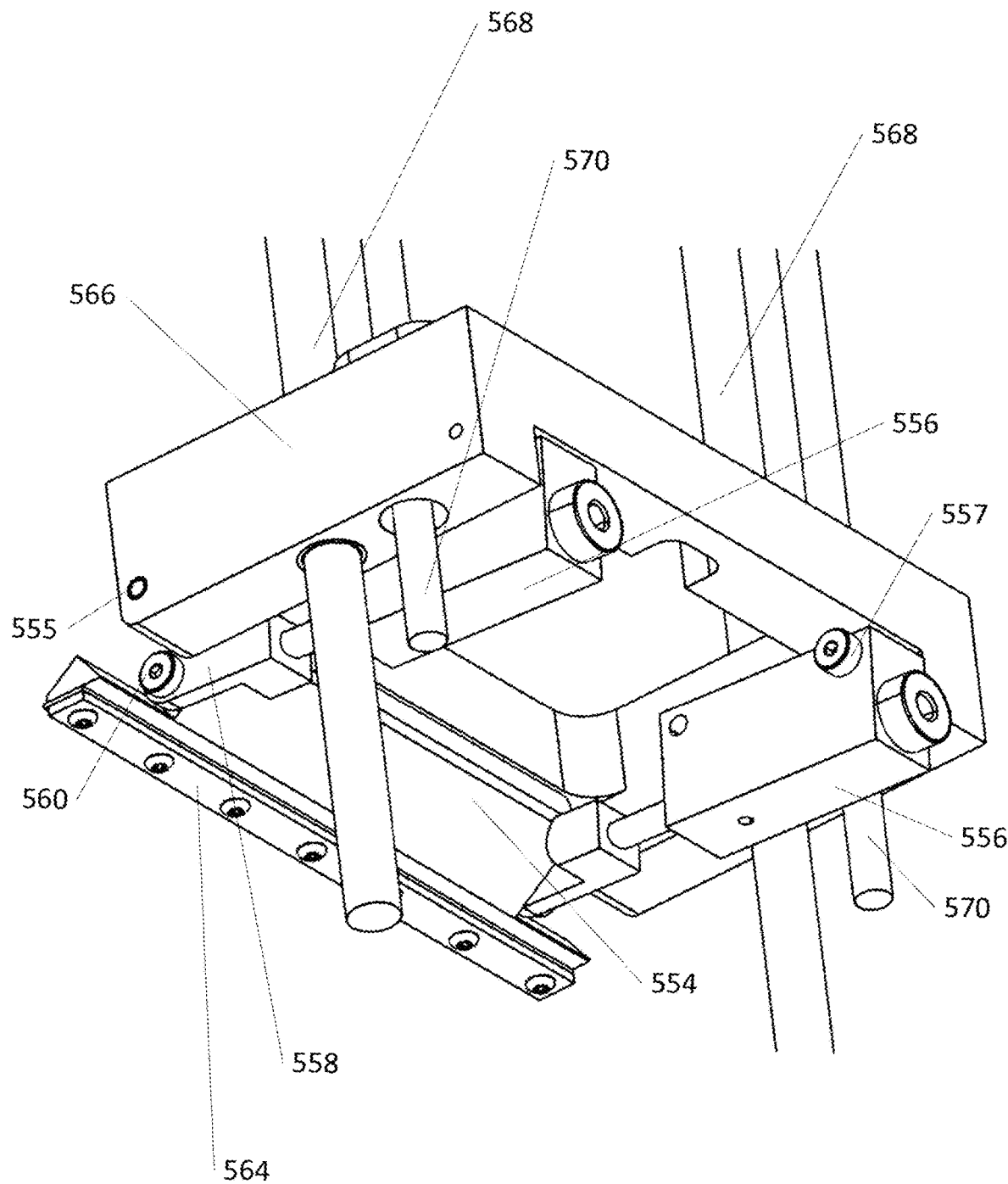
Figure 37B:
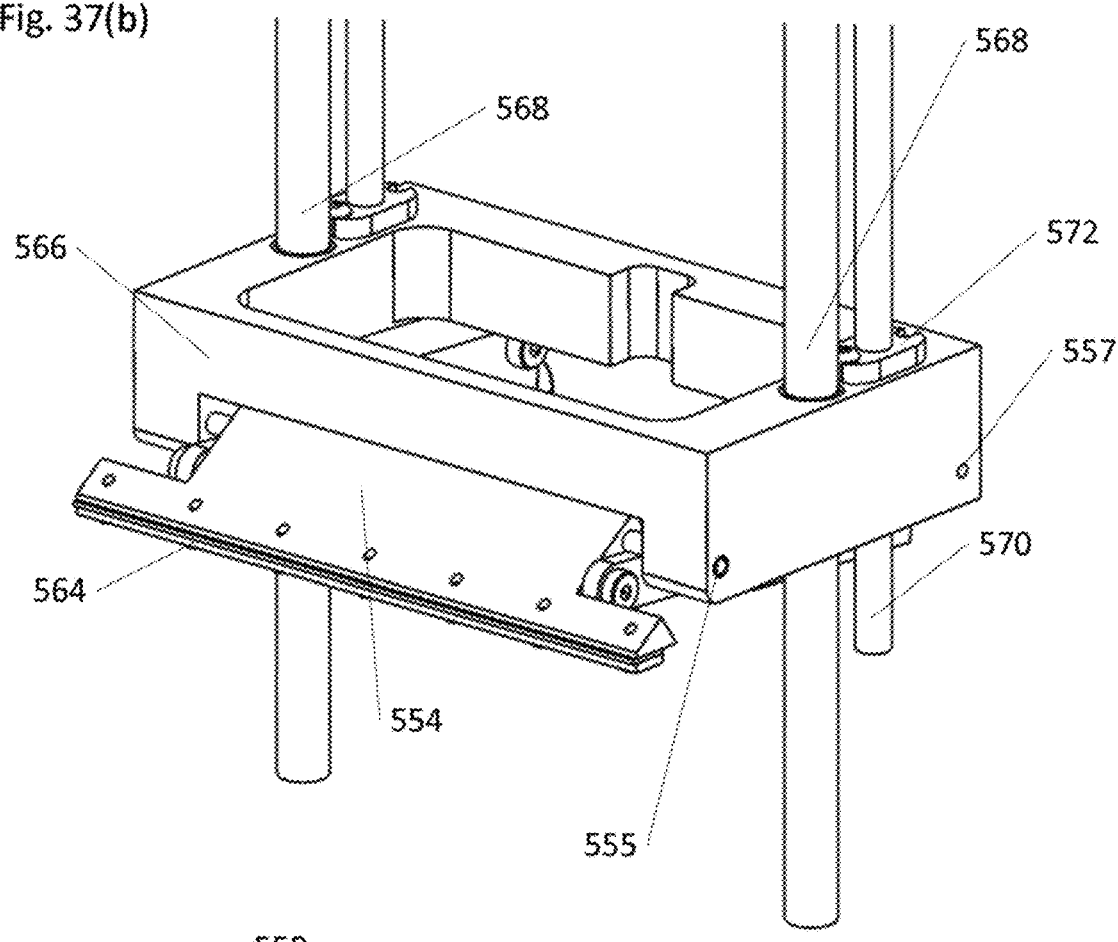
Figure 37C:
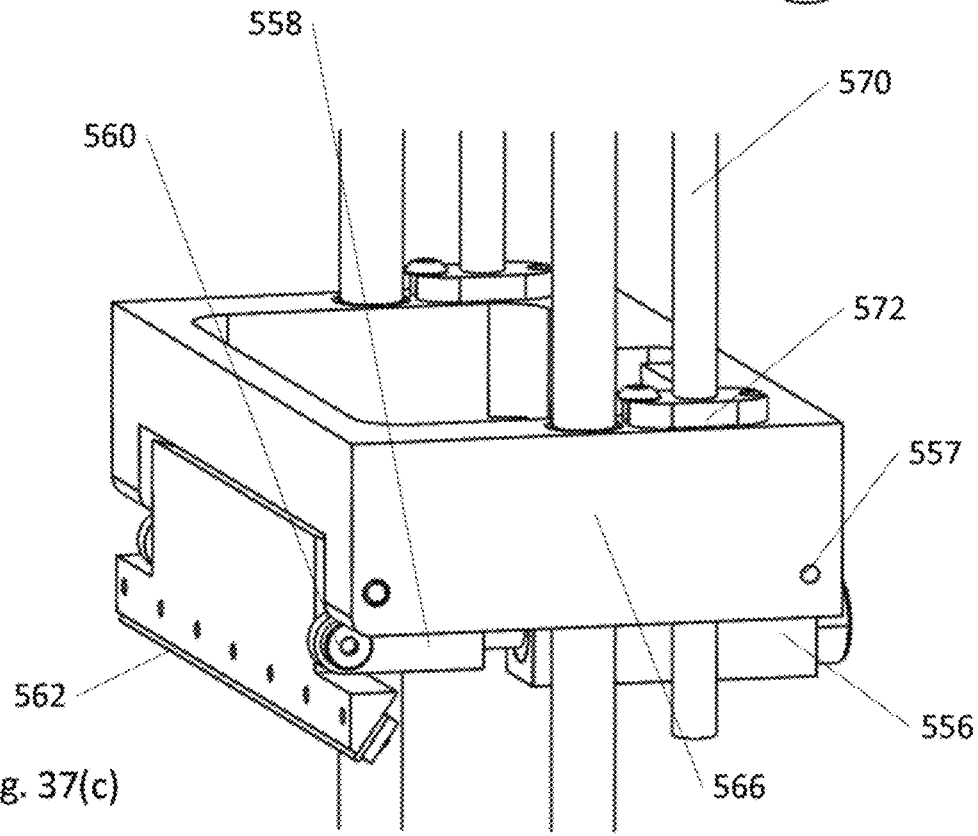
Figure 38A:
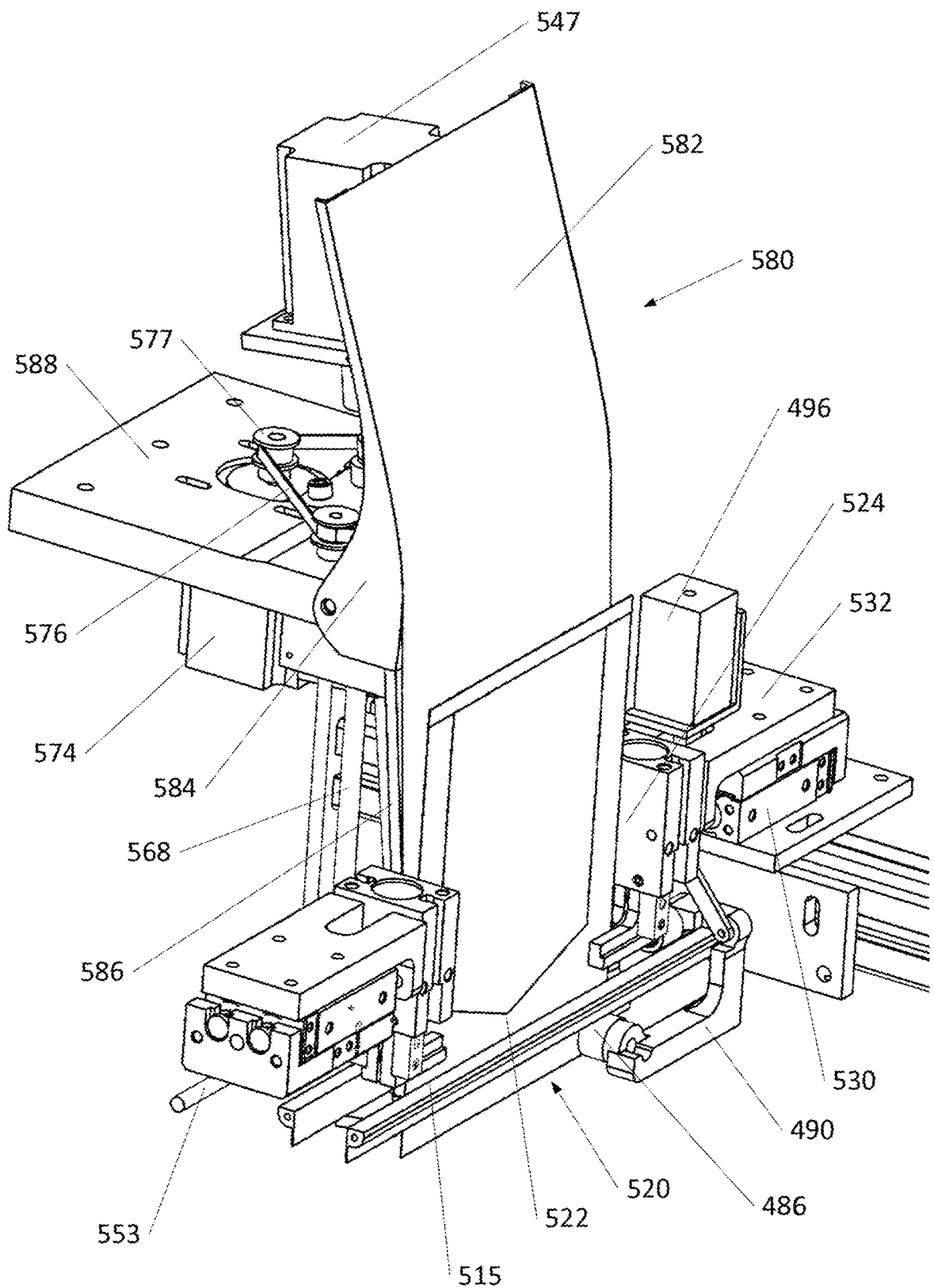
Figure 38B:
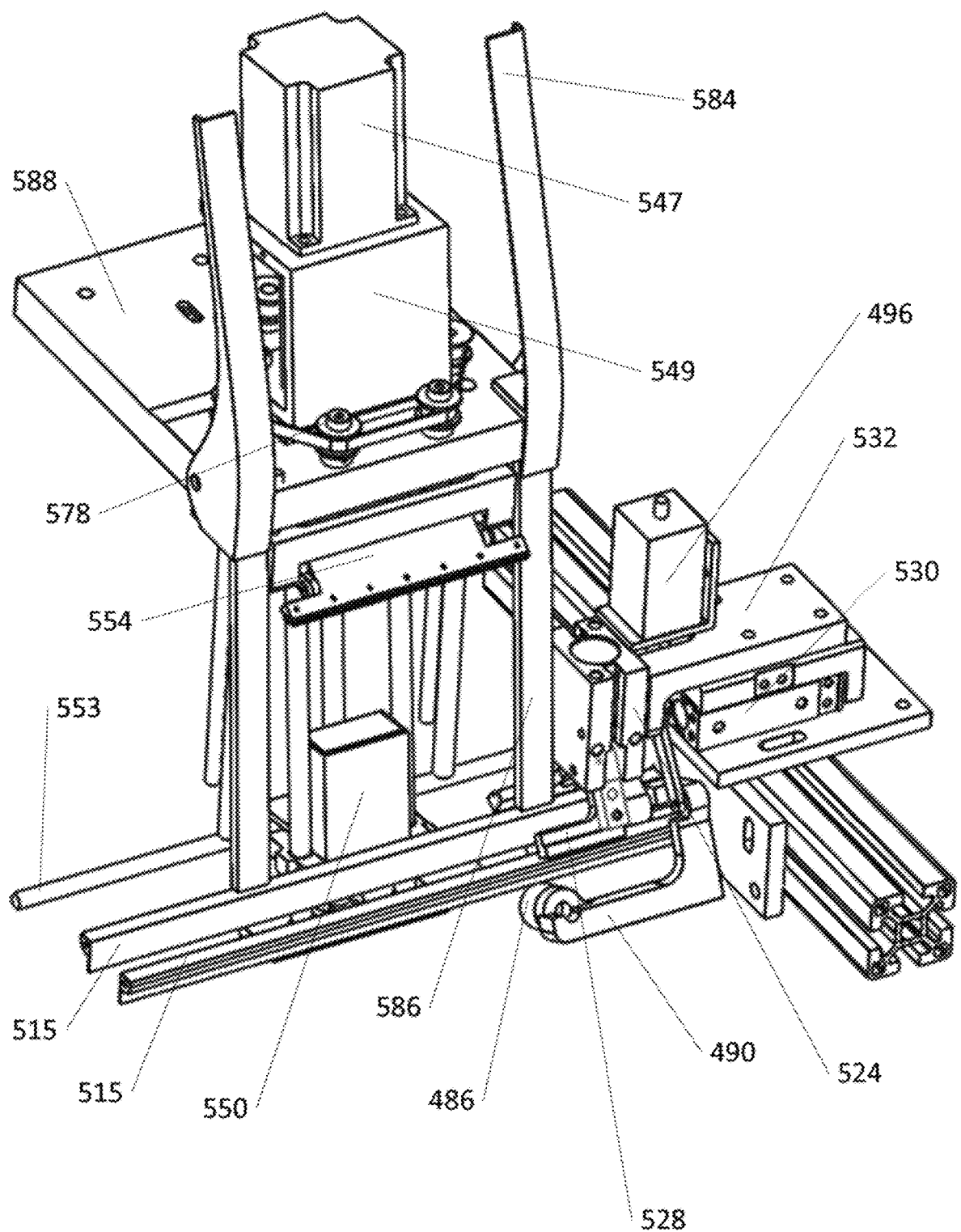
Figure 38C:
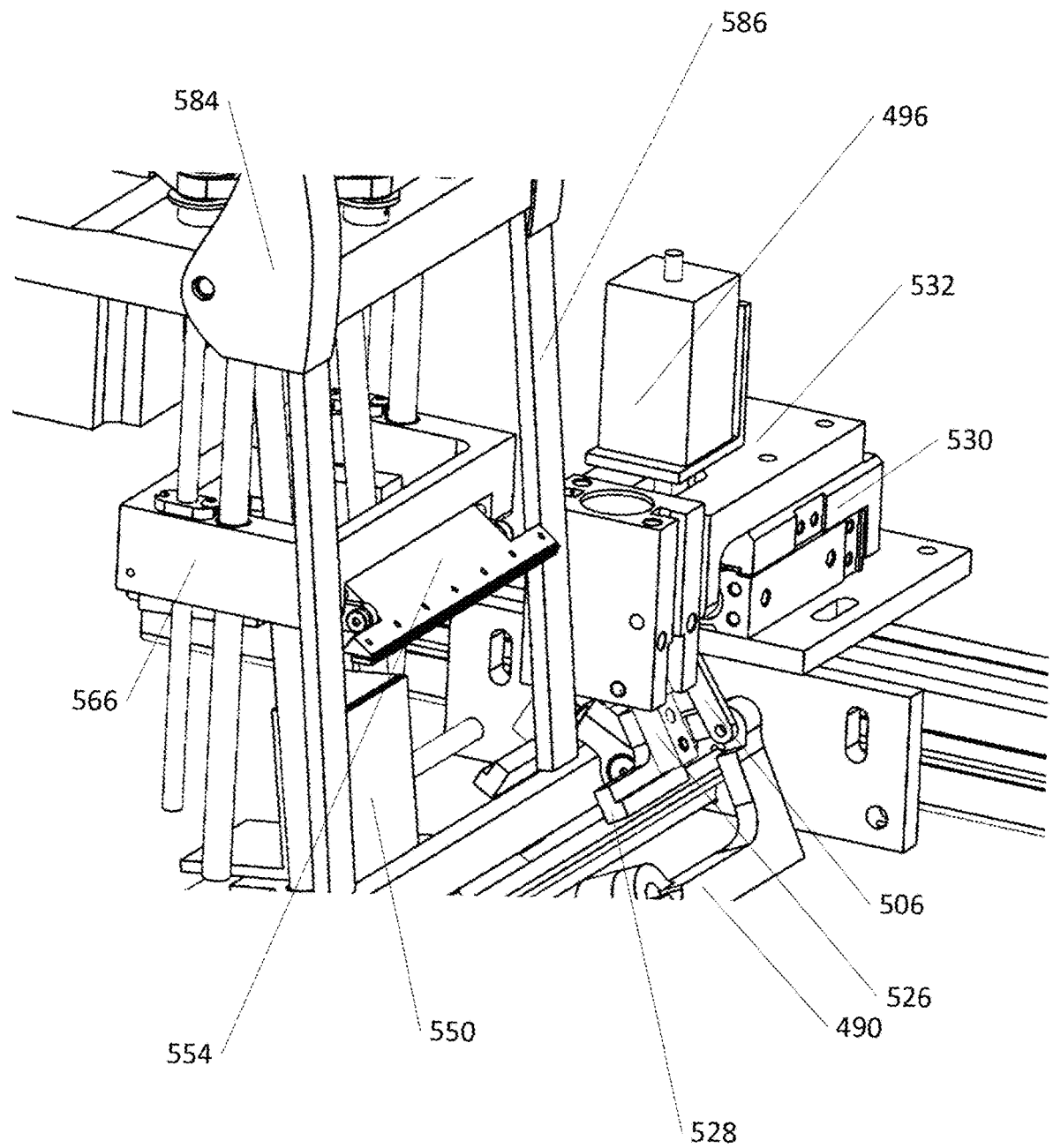
Figure 38D:
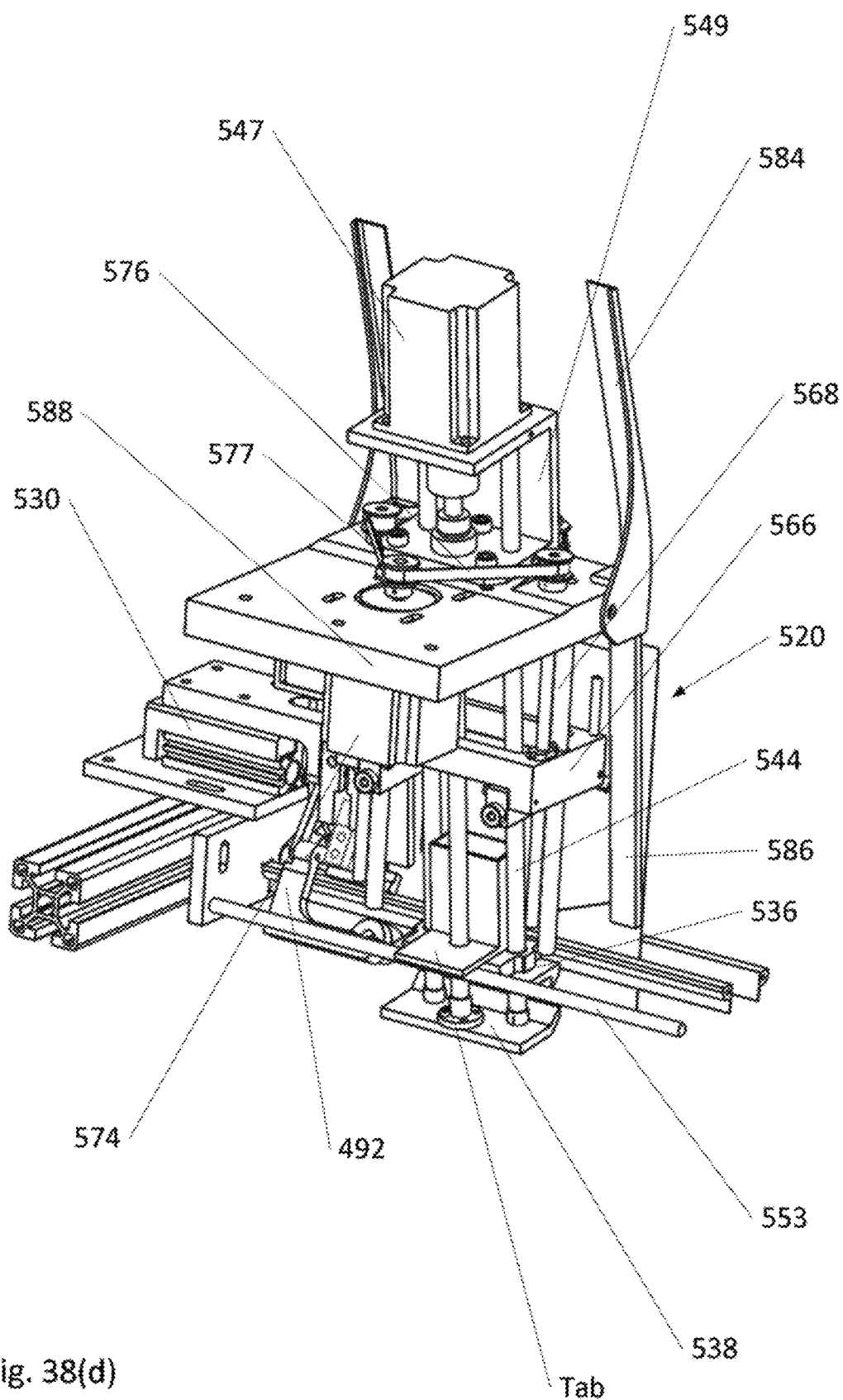
Figure 38E:
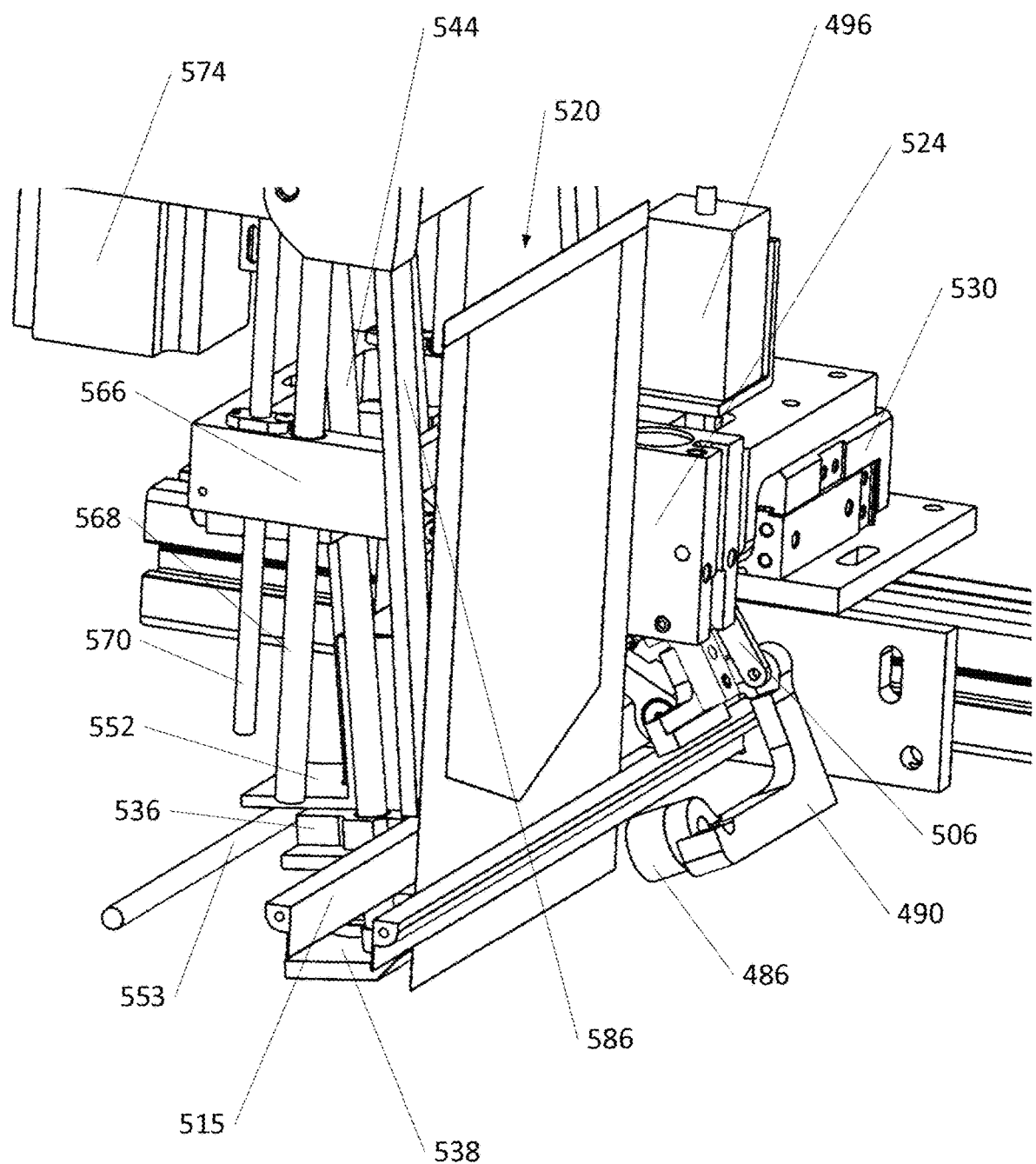
Figure 38F:
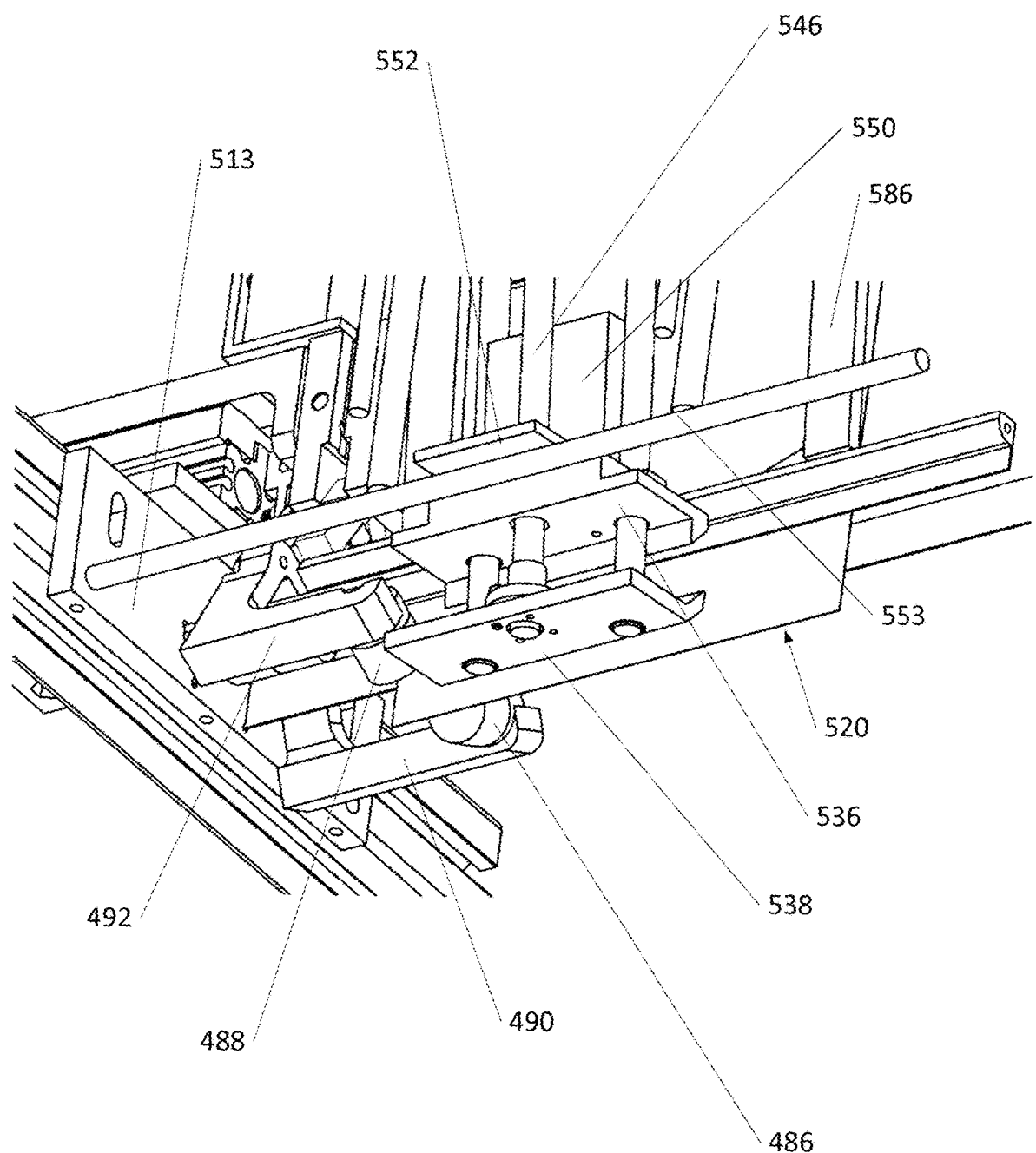

The dispenser can be subdivided into multiple subsystems. FIGS. 33(a)-(b) depict 3-D views focused on showing a spreader (i.e., a flap separating/reorienting/spreading subsystem) comprising arms and pads used to spread the flaps of the pouch, while FIG. 34 depicts a 3-D view that includes the spreader and a tensioner (i.e., a pouch tensioning subsystem). Tubing providing vacuum and/or air to the pads is not shown in the figure. FIG. 35(a) depicts a 3-D view focused on showing the tensioner, and FIG. 35(b) is a side elevation view of the pouch and tensioner clarifying how the pouch is tensioned. FIGS. 36(a)-(b) depict 3-D views focused on showing a portion of a peeler (i.e., a peeling subsystem), while FIGS. 37(a)-(c) depict 3-D views focused on portions of a squeezer (i.e., a squeezing subsystem). FIGS. 38(a)-(f) depict 3-D views of the dispenser and show multiple systems, including a guider (i.e., a guiding subsystem). In addition, the dispenser in some embodiments includes two blades (e.g., FIG. 8(k). In the figures shown herein, certain subsystems and components are not depicted for clarity, in cases where a subsystem is identical to or a mirror image of a subsystem that is shown. For example, only one spreader, one tensioner, one peeler, one squeezer, and one guider are shown in most figures, but in practice two would normally be used, with each disposed symmetrically about planes passing through the center of the dispenser (e.g., FIG. 40(b)).

The spreader of FIG. 33a serves to engage the pouch flaps and separate them from one another, reoriented the as in FIG. 8(h). Each spreader comprises one or more pads 486 and 488: one for each flap. Each pad is supported and moved by arms 490 and 492 (e.g., rotating arms which rotate about a pivot: the axis of rotation may in some embodiments correspond to the apex of the chevron). The pads may comprise Sorbothane, a reusable adhesive, SETEX or similar, a material such as Regabond-S (Exel Trading Company, Tokyo, Japan), an array of micro suction cups, an electroadhesion-based pad (Grabit, Sunnyvale, California), etc. The pads may also comprise a material that is not itself adhesive and not necessarily compliant, but to which a source of vacuum is attached. Vacuum may also be used with some materials as a supplement, as is shown by the vacuum port 494 in FIG. 33(b). The pads may incorporate sensors (e.g., tactile/pressure/mechanical, capacitive, optical) to sense the position of the lower edge of the pouch flaps or other indicia such as printed marks on the flap (or sensors may be used elsewhere to sense other features (e.g., the apex) or indicia on the pouch) and allow adjustment (e.g., vertical motion) to ensure reliable operation.

Substantially symmetric, simultaneous rotation of the two arms can be produced by various mechanisms including independent motors, motors with gearing, and the mechanism shown in FIG. 33(a), in which a linear actuator 496 supported by bracket 498 is provided which translates a lead screw 500. The lead screw is fastened to a connector 502 which includes pivots 504 for links 506 and 508 which rotate about the pivots. The lower ends of the links are connected to the arms through pivots (e.g., 510), while the arms turn about pivot 511 which is attached to support 513. Thus, when the lead screw is translated, the arms are rotated in directions 512 and 514 such that the pads move toward the center plane or separate from one another and move upwards. The arms are shaped so as to not interfere with blades 515. In operation, flaps 516 and 518 of pouch 520 having apex 522 are located in the space between the pads as in FIG. 33(b). When the pads converge toward each other, they push the flaps together toward the center plane (the flaps may initially be off to one side or to both sides). When the pads converge, they compress against the flaps and make good contact with them. Subsequent to this, the pads are separated by reversing the actuator, each one pulling one flap along with it and rotating the flap to an orientation where it can be pinched between the peeler upper and lower clamps.

Due to the weight and volume of the ingredient within the pouch and/or due to outside air pressure (if the pouch is vacuum packed) or due to the pressure of an internal gas (e.g., if packed with air or a modified atmosphere), the pouch may be distorted such that the flaps are no longer substantially planar as in FIG. 1, and may be quite curved to one side. Such curvature, along with the distorted shape of the pouch above the flaps, has the effect of stiffening the flaps and making them much harder for the spreader to separate and re-orient the flaps and deliver them to the peeler clamps. Pouch distortion may be especially pronounced with pouches made from films that are relatively stiff such as PET. Folding of the pouch as in FIG. 28(d), or forming (e.g., thermoforming) the pouch to increase the volume of its cavity can alleviate this, as can more advanced folding and pleating arrangements (e.g., origami-inspired). However, to the extent it represents an issue, a pouch tensioner may be included in the dispenser in some embodiments. A suitable tensioner should work regardless of the ingredient within the pouch. A tensioner used in some embodiments is shown partially in FIG. 34, and in more detail in FIGS. 35(a)-(b). The tensioner comprises a gripper 524 (e.g., pneumatic) equipped with fingers 526 and finger extensions 528, the latter of which may be lined with a non-slip material such as 3M Gripping Material. The gripper is fastened to an air slide table 530 or other actuator through a gripper mount 532. The table is able to move the gripper substantially horizontally (though in some embodiments a curved motion may be used) towards or away from the center of the pouch. The finger extensions may be positioned approximately at the height of the pouch apex, so that when the gripper fingers are closed, the pouch is grasped near its vertical edges at a height that is approximately coincident with the apex.

In operation, both air slides (in some embodiments only one may be used) are initially positioned inwards. Once the grasper (not shown), whose jaws hold the pouch by its upper portion, has lowered the pouch to a height suitable for dispensing (e.g., the height at which the finger extensions are approximately aligned with the apex 522) as in FIG. 35(b), the gripper fingers are closed near pouch vertical edges 533, outside the internal edges 535 of the vertical portions of the pouch seal. This causes the pouch to be securely gripped. Next, as is shown in FIG. 35(b), the grippers are pulled outwardly/away from one another by the air slides (or other means) in directions 534 to apply tension to the pouch; this motion can be linear or along an arc. The effect of this on the pouch is very significant as it causes the pouch to change its shape and in particular, causes the flaps to become substantially flat (and thus easier to separate and move) even with a fully-loaded pouch. The shape change has little or no impact on the pouch contents (which may be friable), however, the shape of the flaps is greatly improved. With the pouch under tension, the flaps are more flexible and easier to separate and reorient. The pads for example can converge on the flaps, separate them, lift/reorient them, and deliver them to the peeler clamps as described above.

Turning now to FIG. 36(*a*)-(*b*), each peeler comprises an upper clamp 536 and a lower clamp 538, the clamping surfaces of which are shaped to securely capture the pouch flap (which has passed around the blade best shown in FIG. 8(*k*)) and pull it upwards. Upper and lower clamping surfaces 540 and 542 are covered in some embodiments with a material such as 3M Gripping Material. In some embodiments as shown in the figures, the lower clamp rides (e.g., through bushings) along peeler guide rods 544 which are angled with respect to the vertical, and a lead screw 546 rotated by motor 547 supported by bracket 549 (FIG. 38(*a*)) is provided, along with lead nut 548 fastened to the lower clamp. Rotation of the screw causes the lower clamp to move upward or downward along the guide rods. The upper clamp comprises two holes which may also be lined with bushings. Passing through the holes are the peeler guide rods, and a clearance hole for the lead screw is provided. While the lower clamp is actively driven along the guide rods by the lead screw, the upper clamp is passively driven by the motion of the lower clamp. In some embodiments, weight box 550 having tab 552 is fastened to the upper clamp as shown. The weight box is filled with a dense material (e.g., brass) so as to increase the weight of the upper clamp, which itself may be made of a relatively heavy material such as stainless steel or brass. If the upper clamp is of significant weight, the gripping pressure of the upper and lower clamping surfaces on the pouch flap are increased, thus providing a more reliable grip. The angle of the upper and lower clamping surfaces, in addition to being optimal to allow contact with the flap, may also improve gripping since the flap is forced to bend sharply around the lower clamping surface. In some embodiments in lieu of or in addition to weight, the upper clamp can be urged against the lower clamp and travel along with it by providing a mechanical spring, a gas spring, a cable connected to a weight running over a pulley, a constant force spring, magnets (e.g., two magnets—one each on the lower and upper clamp—or one magnet on one clamp and a ferromagnetic material on the other), electropermanent magnets, electromagnets, etc.

Before peeling can be initiated, a gap is required between the lower and upper clamping surfaces as shown in FIG. 36(*a*), into which the pouch flap can enter as in FIG. 8(*h*). Initially, the upper clamp is retained so that it cannot move as low as the lower clamp; this is accomplished in the apparatus shown in the drawings by a support rod 553 (FIG. 38(*a*)) on which tab 552 fixed to the upper clamp rests when the upper clamp is in its lowest position. In FIG. 36(*b*), the lower clamp has moved higher along the rods, closing the gap between clamping surfaces and gripping the flap (not shown); FIG. 8(*i*) shows the flap being gripped (with clamps shaped differently than those in FIG. 36(*b*)).

FIG. 37(*a*) is a view of a squeezer (one of two) from below, while FIGS. 37(*b*)-(*c*) show views at a higher angle. The squeezer comprises a squeegee 554 which is mounted on pivots 555 so it can rotate to an extended position (e.g., FIGS. 37(*a*)-(*b*)) before use, or rotate to a retracted position (e.g., FIG. 37(*c*)) when not being used (to allow the pouch to enter the dispenser). Squeegees preferably span the entire width of the ingredient-containing compartment of the pouch, and may be wider still, extending into and even past the vertical seal. Squeegees may be translated, rotated, or both translated and rotated. To allow a pouch to enter the dispenser initially, the squeegee may be retracted. The squeegee is extended and retracted by two air cylinders 556 turning on pivots 557 or other actuator whose shafts are connected to two couplers 558 which connect to the side of the squeegee through coupler pivots 560. Once extended, drag forces acting on the squeegee as it moves downwards along the pouch or guider film (discussed below) produce a torque in the same direction as the cylinders, helping to keep it extended. When the squeegee is fully extended, the couplers rest against pivots 555, preventing over-extension.

The inward edge of the squeegee may be tipped by a material (e.g., PTFE) that has preferably low friction when sliding on the pouch walls or guider film, and may be somewhat compliant. The tip 562 may be sandwiched between the squeegee and a tip support 564 or just held in place with fasteners, adhesive, etc. In some embodiments, the tip may be replaced by one or more rollers (e.g., passively rotating). When the squeegees of both squeezers are extended, the gap between the tips may be small (e.g., no larger than the thickness of the films comprising the pouch and guider films, thus forcing the pouch contents in regions impinged by the squeegees to be expelled substantially completely.

The squeezer also comprises a frame 566 to which the squeegee is mounted through pivot 555, and which moves the squeegee downwards along the pouch when the frame is driven along two guide rods 568 by two lead screws 570, the latter turning within lead nuts 572 attached to the frame. The screws, equipped with pulleys, are rotated by a motor 574 turning pulley 577 which moves belt 576 running over idler pulleys 578 as in FIG. 38(*a*). Normally, the squeegee will be extended when the squeezer is descending, and will be retracted when it is ascending. The cylinders are mounted to the frame through pivots 557 which allow the cylinders to rotate as needed when extending or retracting the squeegee.

An optional guider 580 can be seen in FIG. 38(*a*), along with other subsystems. It comprises guider film 582, film supports 584, and pouch guides 586 (the latter are better seen in FIG. 38(*b*)-(*e*), in which film 582 is removed for clarity). Guider 580 serves as a "funnel" to deliver the pouch into the dispenser as it is lowered by the grasper, even if the pouch is significantly distorted, or swinging from side to side after it is moved. The film is a flexible material such as PET, polyethylene, polypropylene, or nylon, and preferably has a low surface energy, minimizing friction when the pouch and squeegee tip slides against it. It may also in some embodiments be made of a material similar to that of the pouch to avoid static charge buildup caused by tribocharging. The film is fixed at or near its top by two curved or tilted film supports attached to top plate 588, and may be secured to the supports in other locations. To the top plate is attached a number of other components as is evident from the figures. Lower regions of the film extend adjacent to the pouch guides, to which in some embodiments the film may be attached (e.g., at its lower ends). The guider film is generally loose and flexible enough in its lower regions that it does not interfere with the pouch entering between it and the opposite guider film. The pouch guides may be rigid or flexible, attached to the top plate, and may be spring-loaded as mounted if rigid. The gap between guides is greater (normally, or if the guide is deflected) than the thickness of the pouch in the region (e.g., the pouch seals along the sides of the compartment) that passes through the guides, so the pouch can move easily.

In some embodiments, the entire guider may be easily detached for the dispenser and removed (e.g., for cleaning after contamination by a ruptured pouch or by an ingredient falling from the open end of a pouch from which most of the ingredient has been already dispensed if the pouch is lifted out of the dispenser for disposal, etc.). In some embodiments, the guider film may extend further, so as to wrap around the blades and protect them from contamination as well. In some embodiments, the guider film may be provided in an extended shape (e.g., a web stored on a spool and taken up by another spool), a continuous loop, etc.). In such cases, damaged, worn, or contaminated sections of the film can be automatically moved out of position (with new/clean sections replacing them) and collected for disposal/recycling, or cleaned automatically within the system.

FIGS. 38(a)-(f) provide general views of the dispenser (as noted, only one of two subsystems normally present are shown for clarity), depicting the relationship between subsystems. The grasper—which holds the pouch at or near its top, introduces it into the dispenser, participates in dispensing (e.g., descending as more of the pouch is peeled open) and removes the pouch after dispensing—is not shown for clarity.

Figure 39:
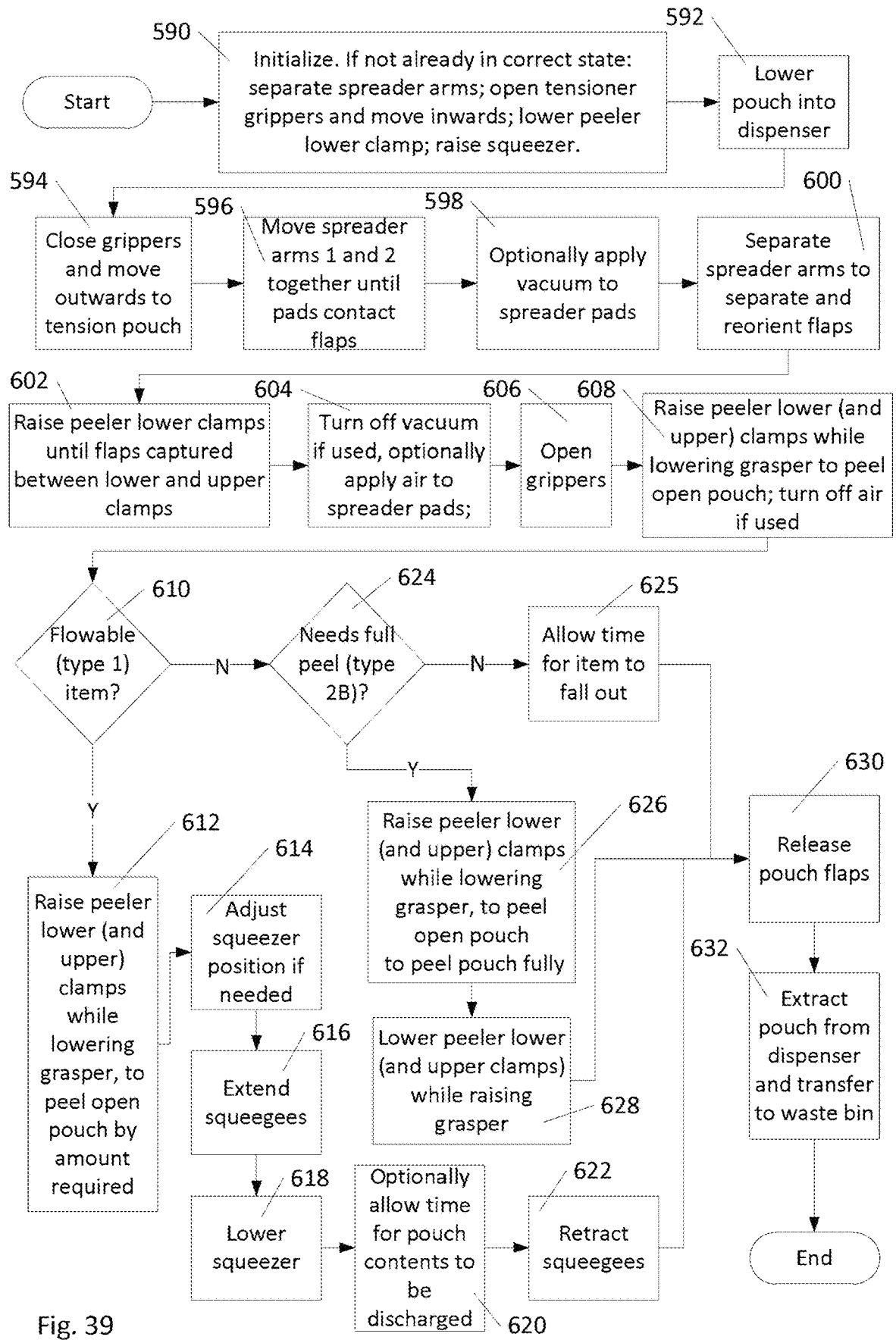
FIG. 39 is a flowchart for dispensing using a dispenser.

FIG. 39 depicts a flowchart for dispensing using a dispenser similar to that shown in FIG. 38(a)-(f). The flowchart assumes a pouch which is sufficiently distorted that tensioning is required. For a pouch that is less distorted/undistorted, certain steps can be bypassed (e.g., closing the grippers, moving the grippers outwards). The flowchart also assumes that the flaps are pulled to separate and reorient them, e.g., using the pads of FIG. 33(a). If the flaps are instead pushed (e.g., FIG. 46) then certain changes to the flowchart are required. Certain steps in the flowchart may in some embodiments not be in the strict chronological order shown or described herein, but may occur in a different order or simultaneously.

Before the start of the process, the grasper grasps the pouch and brings it to position at the entrance to the dispenser (e.g., between the guider films). Once the process starts, the dispenser is initialized (box 590) to move all actuators to their required initial states if not there already. For example: the spreader arms may be separated, creating a gap between the pads; the grippers of the tensioner may open to allow the pouch to enter the space between the finger extensions; the air slide tables may move the grippers inwards in preparation for moving outwards to tension the pouch once it is securely gripped; the peeler may be lowered so that the lower clamp is at its lowest position and the upper clamp rests on the support rod, creating a gap between the two clamps; and the squeezer may be raised to position the squeegee to squeezer out the contents of the pouch (for a Type 1 ingredient) and/or to not interfere with the peeler if the latter must travel a long distance upwards (for a Type 2B ingredient). Next, the pouch is lowered into the dispenser (box 592). Once the pouch has reached the correct height (e.g., aligning the apex of the chevron with the gripping portions of the finger extension (see FIG. 35(b)) or aligning the apex with the axis of rotation of the spreader arms, the grippers are closed (box 594) and then moved outwards, tensioning the pouch and substantially flattening the flaps. The spreader arms may then be moved together (box 596) until the pads firmly contact the flaps. In some embodiments, this can be done at least partially before tensioning, since it may be acceptable to make contact between pads and flaps even when the flaps are not flat.

If vacuum is used to assist pulling on the flaps, it may be delivered to the pads (box 598) if not already applied. Next, the arms are separated (box 600), moving the pads further from one another, and pulling the flaps apart and into a new orientation. When the flaps have entered the peeler (e.g., entered the space between lower and upper clamps), the lower clamps of the peeler are raised (box 602) until the flaps are sandwiched between the lower and upper clamps and thus are securely grasped. If vacuum has been used, it may now be turned off (box 604). To help separate the flaps from the pads to which they may tend to adhere, compressed air may be delivered to the pads at this time; once the flaps are separated, this can be turned off. Before moving the peeler to peel open the pouch (and in the case of Type 2B ingredients, continue to peel it, e.g., until most or all of the peelable seal is separated), the grippers, if used, may be opened (box 606). Then, the peeler lower clamps are raised; this also raises the upper clamps since the lower clamps push them upwards box 608). To avoid slippage of the flaps in the peeler or of the pouch in the grasper, or rupture of the pouch, and to maintain a desirable tension in the pouch films (especially as they pass around the blades for Type 2B ingredients) as the peeler rises, the grasper must descend. The relative speeds of movement of these can be determined geometrically and implemented open loop, or in some embodiments a sensor (e.g., a switch in contact with the film, preferably on its clean, outer surface) may be used to sense tension in the pouch and adjust the relative speeds accordingly. By incorporating some compliance in the grasper/pouch/blade/peeler system (e.g., mounting the blades compliantly, such as using leaf springs), controlled tension may be more easily achieved. Once the peeler is sufficiently raised, the pouch will be peeled open at the apex of the chevron. Opening the pouch is of course required for all types of ingredients.

If the ingredient is determined (box 610, e.g., by consulting a local or remote database with the code on the pouch) to be of Type 1 (e.g., flowable), it can be dispensed by use of the squeezer. Before this, it may be required to further open the pouch (box 612). The amount by which the pouch is peeled open (i.e., how much of the chevron is peeled: the region near the apex, the entire chevron to full width of the ingredient compartment, or an amount in-between) before using the squeezer depends on several factors. These include the ingredient viscosity, the desired width of the flowing ingredient as it issues from the pouch, and the desired flow rate. The squeezer speed (whether variable or fixed) may be adjusted according to factors such as ingredient viscosity, the desired size of the opening (if less than the full width), and the peel strength of the seal, and should not be exceeded since that may increase the pressure within the ingredient compartment of the pouch and potentially widen the opening or cause seal/pouch rupture. Before extending the squeezer's squeegees, the squeezer may be lowered to a suitable position (e.g., below the graspers) (box 614). Once in position, the squeegees can be extended (box 616) and lowered (box 618) until as much of the ingredient as desired has been dispensed. Some time may be required (box 620) for the ingredient to be discharged before the pouch is extracted from the dispenser, after which the squeegees may be retracted (box 622). In some embodiments to facilitate complete dispensing of the ingredient, the grasper may be raised, pulling the pouch upward through the squeegees: this may require that the pouch flaps are released or the peeler is lowered.

If the ingredient is not of Type 1, it may be of Type 2B (box 624). If so, then the peeler continues to rise while the grasper continues to descend (box 626) as already described. The motion of these is then reversed (box 628) beginning the process of removing the pouch from the dispenser, and also giving the ingredient more time (box 625) to fall off the pouch inner surfaces (e.g., while the surfaces pass around the edges of the blades). If the ingredient is of Type 2A, a delay may be provided for it to fall out of the pouch.

Regardless of the ingredient type, if the pouch flaps have not been already released, they may be released (box 630) and the pouch then extracted (box 632) from the dispenser once the dispensing process is completed. The pouch can then be transferred to a waste container.

Figure 40A:
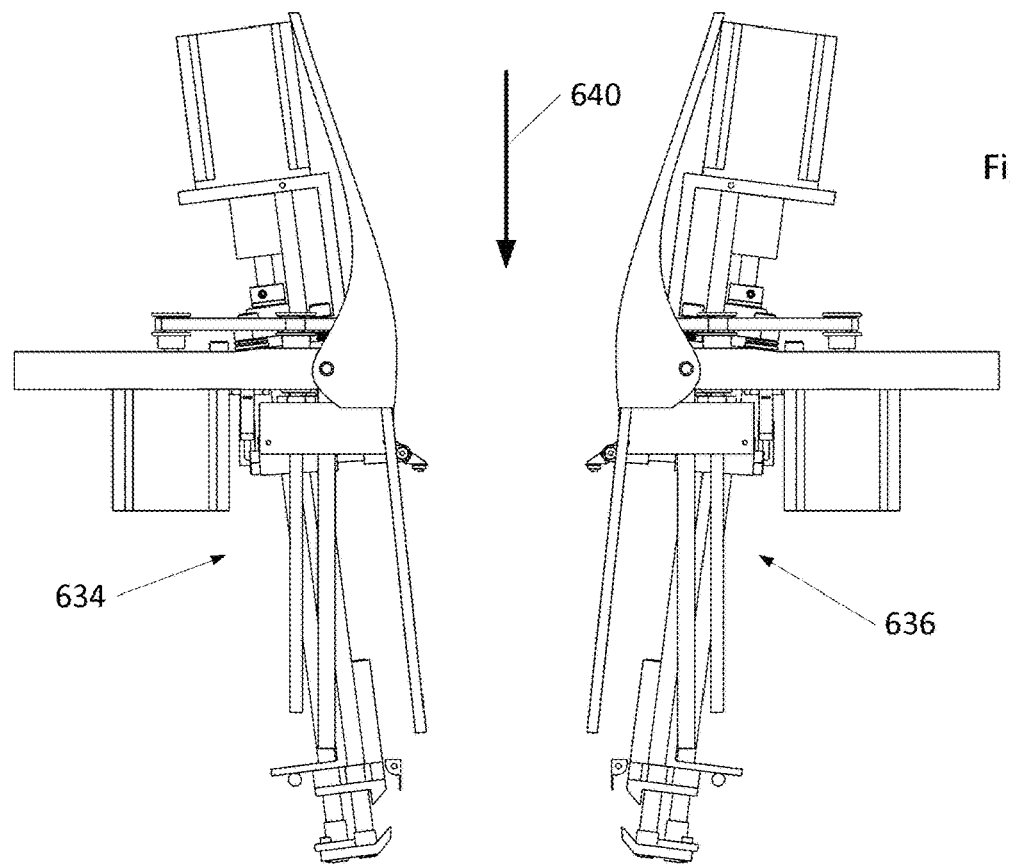
FIGS. 40(a)-(b) depict a dispenser.
Figure 40B:
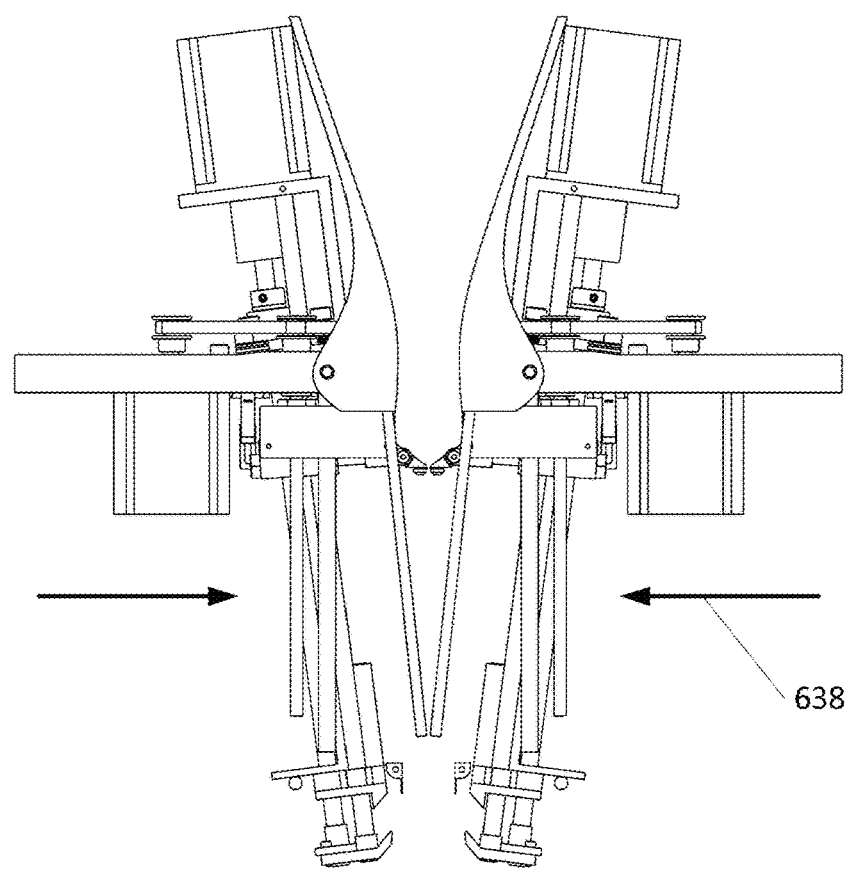

FIGS. 40(a)-(b) depict elevation views of a dispenser (with spreader and tensioner removed for clarity) in which the left half 634 and the right half 636 of the dispenser can be moved away from and toward one another. In FIG. 40(a) the two halves are separated as they may be for pouch loading/unloading and/or if necessary, cleaning, while in FIG. 40(b), they have moved in direction 638 to a position in which they can be used for dispensing from the pouch. The squeegees are shown extended in both figures, but may be retracted or extended. In some embodiments the squeegees can always be extended (with no actuators to extend/retract) since the dispenser halves can separate to allow pouch access and squeegee positioning. The pouch (not shown) may enter from above as shown by arrow 640, or sideways (e.g., perpendicular to the plane of the figure). In some embodiments both dispenser halves move, while in other embodiments only one may move. Movement can be linear, rotational, or a combination of the two; if rotational, the lower regions of the dispenser halves may remain approximately at the same location, while the upper regions rotate (e.g., clockwise and counterclockwise) to create a space between the two halves. Movement can be provided by various actuators such as electric motors or pneumatics.

Figure 41A:
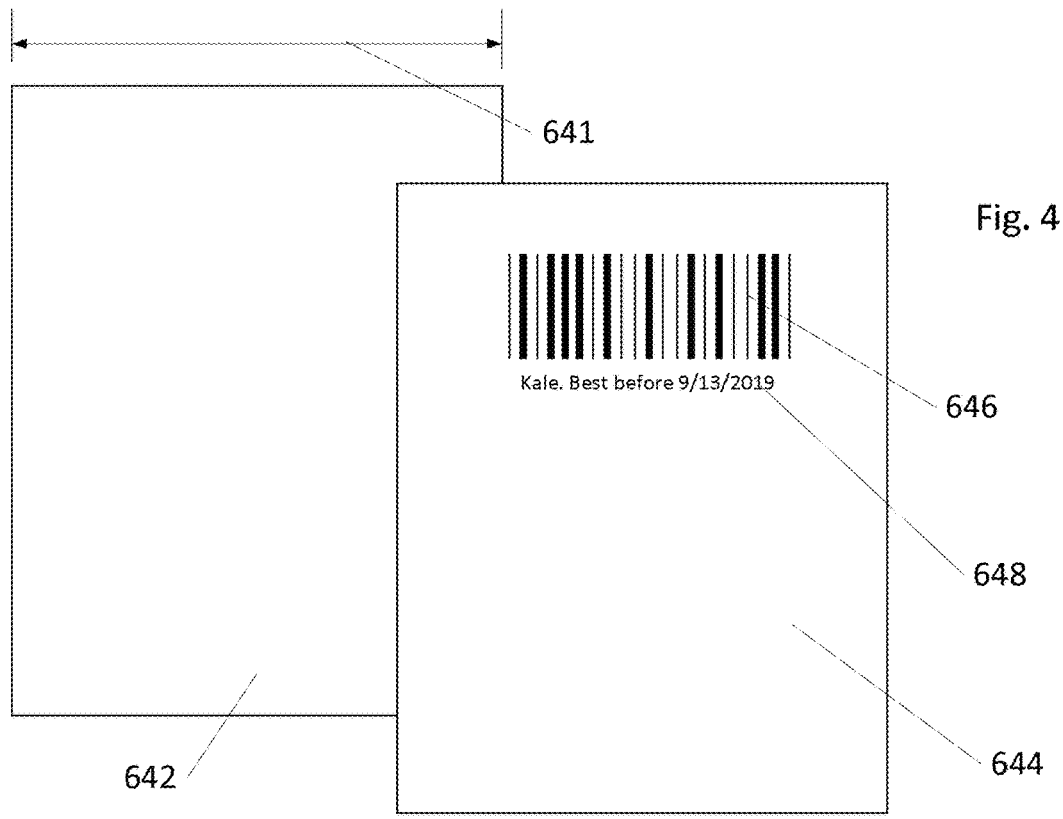
FIGS. 41(a)-(b) illustrate a pouch.

FIG. 41(a) depicts an elevation view of two films (which may be portions of a continuous web) having width (641) which are formed into a pouch. In some embodiments, one film (e.g., Film 1 (642)) comprises a material having a peelable heat-sealable coating on one surface, and the other film (Film 2 (644)) comprises a material having either a peelable heat-sealable coating on one surface, or no coating. At least one film (e.g., Film 2) may be imprinted with graphics, text, photos, and as shown, machine-readable code (646) (e.g., bar or QR code) and/or human-readable information 648 (e.g., description of contents, expiration date, weight as packaged, number of pouch compartments). In practice, this may happen after the pouch is made (i.e., the code and information may not be added to the films, but rather, printed on the pouches later). In FIG. 60(b) the two films have been combined (with the peelable coating(s) facing inwards) to form a pouch, by forming a peelable seal 650 that comprises the lower portion of a compartment 652 for an ingredient, and (after loading with the ingredient), by forming top seal 654 (which may be peelable or non-peelable) which seals the ingredient within the ingredient compartment by overlapping in region 655. The pouch may be grasped by the grasper in the area of the top seal, for example. The peelable seal in some embodiments comprises a chevron-shaped portion 656 at the bottom, the lowest region of which is apex 658. The lower portion of both films, beginning just below the apex, is unsealed, forming a pair of flaps 670, one for each film; peeling open the pouch comprises grasping and pulling on these flaps as described herein.

As shown, in some embodiments, the films may be misaligned (i.e., partially but not fully overlapped) such that when combined, the width of the pouch exceeds the width 641 of one film, and vertical regions 643 on either side of the peelable seal comprise only Film 1 or Film 2, since in such regions there is no overlap of the films. Having portions of the flap not overlap facilitates access of the arms to the flaps, and allows flaps to be pushed in regions 660 and 662 (optionally while being clamped between two bodies)—not just pulled—to separate and reorient them in preparation for clamping by the peeler. Pushing/clamping can be more reliable and repeatable than pulling, can allow for greater force (and reduce the need for pouch tensioning), and can avoid the possible need for tacky materials (which may become contaminated with dust, etc. or otherwise become less tacky), vacuum pumps, etc. Pouches such as that of FIG. 41(b) may be produced using two film webs which are misaligned.

Figure 41B:
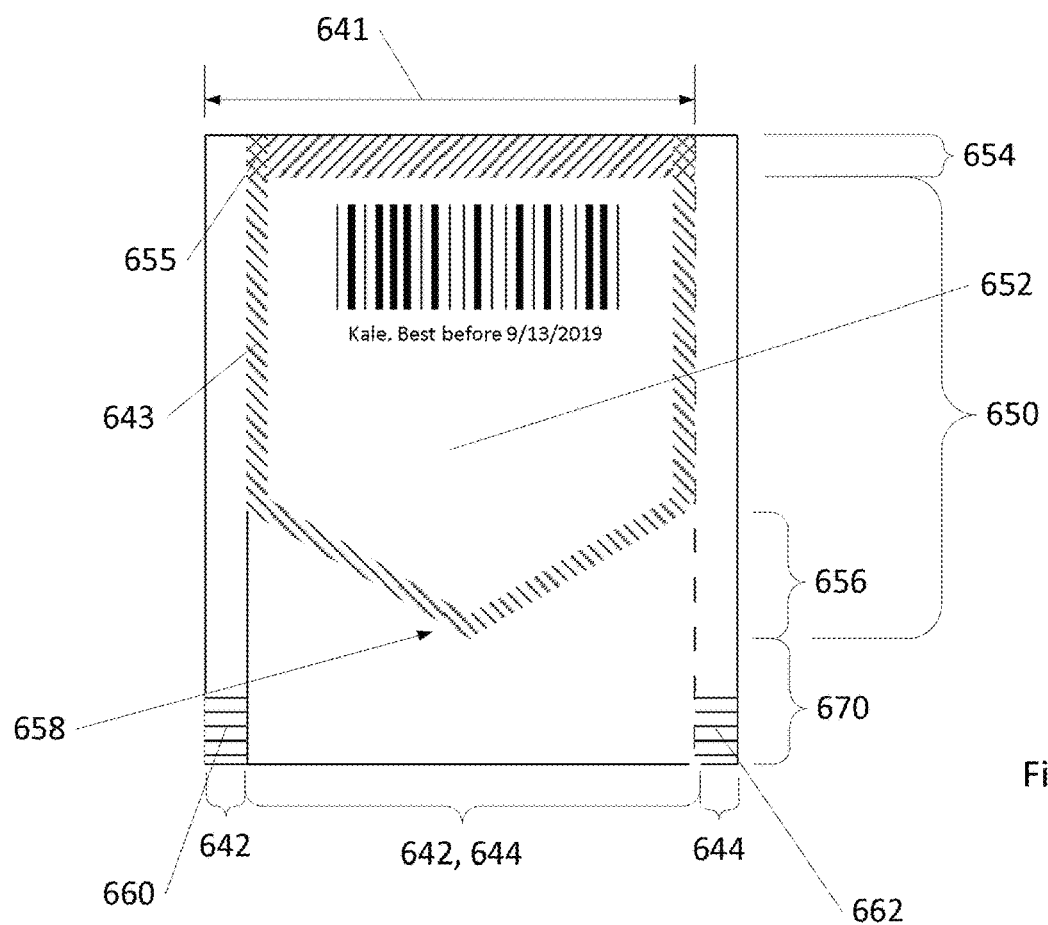

Separation and reorientation of such flaps can be achieved in some embodiments as shown in the elevation views of a pouch (at a right angle to those of FIGS. 41(a)-(b)) shown in FIG. 42(a)-61(f). Flap 1 (664) is a portion of Film 1 (642), whereas Flap 2 (666) is a portion of Film 2 (644). In the figure, the flaps are shown slightly separated and symmetric; in practice, distortion of the pouch may cause them to be in close proximity, and bent to the left or right (i.e., toward Film 1 or Film 2). For clarity in the figure, Flap 1 is shown being reoriented (and if applicable, separated from Flap 2) by moving clamps, while Flap 2 is shown as being stationary. However, Flap 2 would normally be reoriented/separated (e.g., simultaneously) in the opposite direction in the same manner.

Figures 42A, 42B, 42C:
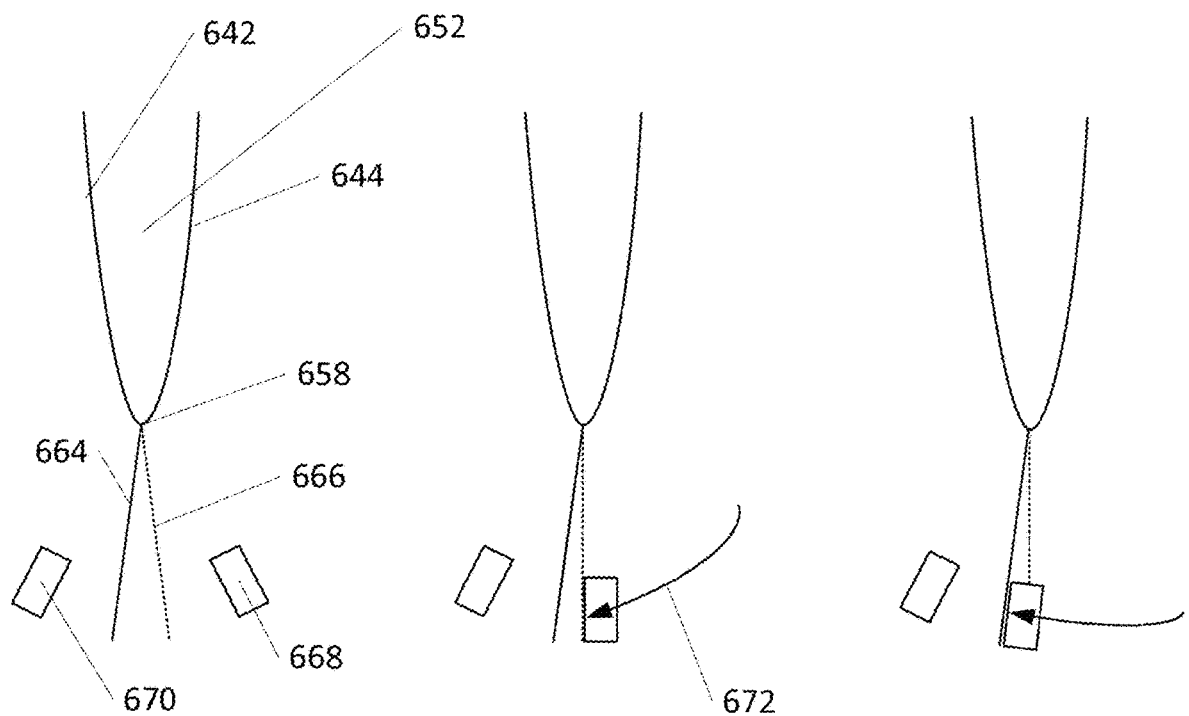
FIGS. 42(a)-(f) show steps in separating and reorienting flaps.

In FIG. 42(a), the flaps are shown with active clamp 668 on one side and passive clamp 670 on the other. The active clamp (e.g., supported by an arm) can be driven (e.g., by a stepper motor) so as to move (e.g., rotate about an axis coincident with the apex) in direction 672 to engage and reorient Flap 1. However, if Flap 1 is displaced too much, it may deform and slip off the clamp, since it is pushed by the clamp near only one end, not both. To prevent this, a secondary clamping element is used in some embodiments, e.g., a passive clamp which can engage the opposite/outside surface of the flap and apply clamping pressure that sandwiches the flap between the clamps and prevents slippage, especially if the surface of at least one clamp is high friction (e.g., 3M Gripping Material).

The passive clamp is able to move when moved by the active clamp, but in the embodiment shown, is prevented (e.g., by a stop, not shown) from moving counterclockwise past a certain angle (e.g., that shown in FIGS. 42(a)-(d)). In other embodiments, the passive clamp is held in a position such as that of 61(f) (i.e., more clockwise) by an actuated stop (one that can be switched on an off) and can be released so it descends to meet the active clamp and sandwiches/clamps the flap film. In some embodiments rotation of the passive clamp requires overcoming a resistance (e.g., lifting the weight of an arm supporting the clamp, overcoming torsion in a spring). In some embodiments the passive clamp is magnetically or electrostatically attracted to the active clamp (e.g., one or both may comprise a permanent magnet, electromagnet, electropermanent magnet, or ferromagnetic material); thus, when both clamps are near one another, they compress and trap the flap between them. In some embodiments both clamps are active. In some embodiments the passive clamp may be attached to and rotate with the active clamp (e.g., hinged so it can flip over to the other side of the flap).

Figures 42D, 42E, 42F:
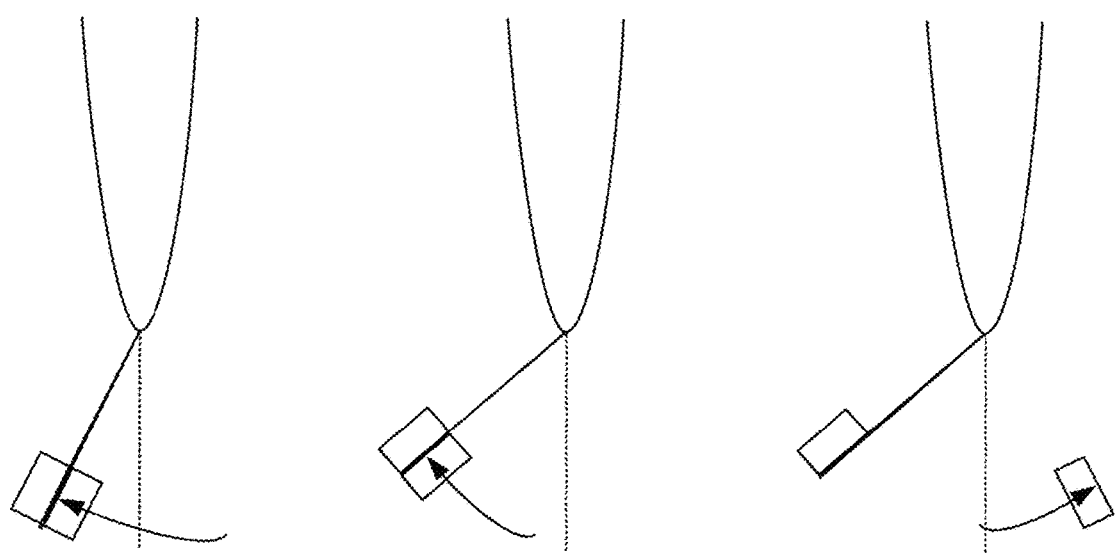

In FIG. 42(b), the active clamp has moved clockwise (the active clamp for Flap 2, not shown, may simultaneously move clockwise as seen from this angle). In FIG. 42(c), the clockwise motion has continued such that the clamp has come into contact with Flap 1, while in FIG. 42(d) the flap has been reoriented so as to also come into contact with the passive clamp. If the clamps are mutually attracted (e.g., magnetically), then Flap 1 is now captured. If not, then further clockwise movement of the active clamp will cause the passive clamp to exert a force (e.g., due to its weight or a spring), thus capturing Flap 1. In FIG. 42(*e*), the two clamps have moved to a position in which the flap is between the upper and lower clamps of the peeler and can be reliably grasped by raising the lower peeler clamp against the upper clamp. Once this has occurred, the active clamp can rotate counterclockwise away from the passive clamp (e.g., returning to its original position as in FIG. 42(*f*)). The passive clamp will return to its original position (or stay where it is, if held by an actuated stop) when no longer held by the active clamp and/or flap. If the two clamps are mutually attracted, then the passive clamp may rotate along with the active clamp until it is prevented from further rotation by the stop, if applicable.

Figures 43A, 43B:
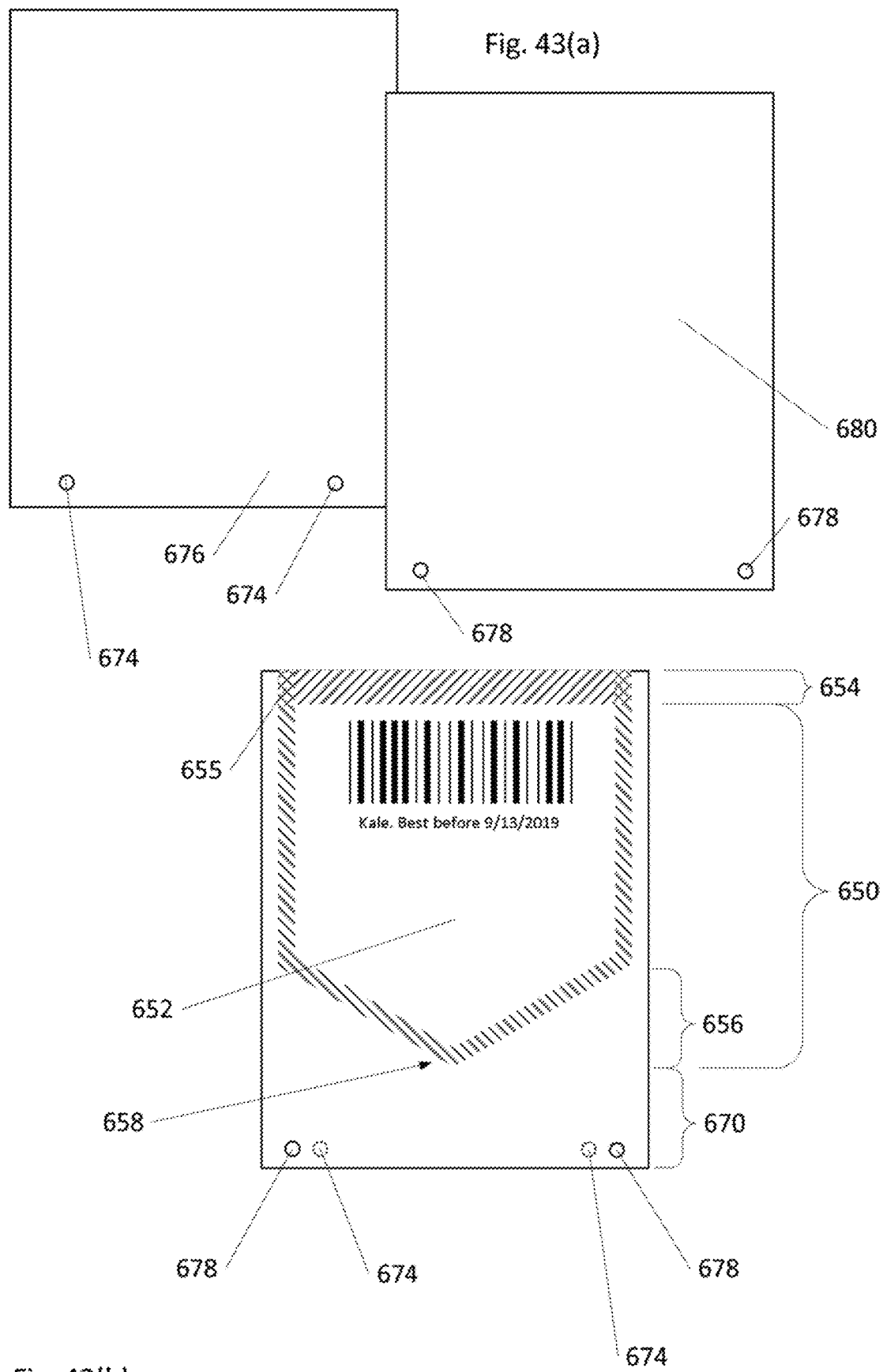
FIGS. 43(a)-(b) illustrate a perforated pouch.

In some embodiments in lieu of using a pouch formed from misaligned films, a pouch formed from perforated (e.g., pre-perforated) films may be used such as those shown in FIG. 43(*a*). While all perforations/apertures are within the flap area, perforations 674 in Film 1 (676) are in different locations than perforations 678 in Film 2 (680), such that when the two films are combined as in FIG. 43(*b*), the perforations don't overlap. To separate and reorient the flaps, a dispenser having arms each of which is terminated in a pin (rather than a pad as in FIG. 33(*b*)) can be used. The pins, which are curved in some embodiments, are arranged so as to pass through the perforations of one flap and press against the surface of the adjacent flap. Thus, when the arms rotate, for example, two pins contacting the inside surface of Flap 1 push on it to rotate it clockwise, while two pins contacting the inside surface of Flap 2 push on it to rotate it counterclockwise.

The pouch design of FIG. 43(*b*) can be difficult to fabricate in volume since films are normally punched together during pouch manufacturing and the perforations in one film cannot match those in the other. However, in some embodiments in which the perforations in one film are offset relative to those in the other film in one direction only as shown in FIGS. 44(*a*)-(*b*), and by using the method discussed below, manufacturing becomes much easier and economical. Indeed, such a design allows pouches to be manufactured at little if any premium over unperforated pouches, and allows several pouches to be made at a time using wide webs of film. Key to the manufacturing process is a) using punching to perforates both films at once while they are held together or close to one another, and b) before sealing the films together, causing one film to traverse a longer path after punching than the other. This has the effect of introducing a shift in the location of the perforations on one film with respect to the other. Steps in the process used in some embodiments are shown in the plan views of FIGS. 45(*a*)-(*d*).

For clarity, FIG. 45(*a*) depicts two narrow webs of film (only one pouch wide: in practice, wider webs with multiple pouches may be used) which are to be punched, sealed, and cut to form pouches such as those in FIG. 45(*b*). In some embodiments more than two films may be used. The two webs Film 1 and Film 2 are shown side-by-side for clarity, but in fact are superimposed such that, for example, the right edge of Film 1 is aligned with the right edge of Film 2. The figures also show just a short section of both webs corresponding to five pouches, not the entirety of both webs. The webs move in feed direction 682 shown (e.g., from supply rolls) past punches, sealing, and (optionally), cutting stations. Cutting line 684—along which the pouches will eventually be cut—is shown as a dashed line. In the first step shown in FIG. 45(*a*), each region of the webs corresponding to a pouch has been punched twice in locations shown by the dotted lines 686, resulting in a total of four perforations in the two overlapped films. In some embodiments mechanical punches may be used, while in other embodiments, other means of producing apertures in the film may be used, such as lasers or knives.

In FIG. 45(*b*), Film 2 has been "delayed" or shifted relative to Film 1 on its way to the sealing station, e.g., by forcing it to take a longer path (e.g., passing it around an additional roller or a larger diameter roller). The shift 688, or difference in path length, is calculated so as to cause the perforations in Film 2 to shift to a location in which they are offset from and no longer aligned with respect to those in Film 1 by the desired amount. Thus, when the films are sealed together (with Film 2 above Film 1) in the sealing station as shown in the second step of FIG. 45(*c*) to form seal 675, the perforations are perfectly offset. Perforations in Film 1 are shown dashed to indicate that they are behind Film 2. The third and possibly final step in producing pouches such as those in FIG. 45(*b*) is shown in FIG. 45(*d*), in which the pouches have been cut along the cutting line. In some embodiments singulating the pouches is deferred until after they are loaded, and in other embodiments (those using a continuous chain of pouches) it is not performed at all. If using wider webs, pouches are also cut parallel to the web motion direction to separate pouches/pouch chains.

FIGS. 46(*a*)-(*d*) depict 3D views illustrating the use of curved pins 690 in some embodiments to separate and rotate flaps 691*a* and 691*b* of a pouch similar to that shown in FIG. 44(*b*), so as to reorient and deliver the flaps to the peeler clamps. As shown in FIGS. 46(*a*)-(*b*), the pins are attached to clockwise hub 692 and counterclockwise hub 694 which turn on shafts (not shown) and are actuated to rotate clockwise or counterclockwise (as seen from one angle), causing the pins to pass through holes 696 and engage the opposite flap to push on it. In these figures, four motors may be used to rotate the hubs, or two motors with gearing, or links and a linear actuator such as those in FIG. 33(*a*) may be used. The upper part of the pouch is not shown for clarity. In FIG. 46(*a*), the flaps are together, while in FIG. 46(*b*), they have been pushed apart. In FIG. 46(*c*), they have been pushed apart even further, at which time the peeler clamps can engage the flaps and the pins can reverse their motion and retract from holes 696. In FIGS. 46(*c*)-(*d*), the hubs have been joined in pairs by struts 698 such that only one hub on each end needs to be rotated and the remaining hubs rotate passively on shafts (not shown). To minimize slippage of the pins on the film, the tips of the pins may be coated with a non-slip material, or may be sharp and penetrate the film (the pin may be much wider away from the tip, to prevent the pin from penetrating too far). The pins may also be hollow and provided with vacuum such that the film is forced tightly against it. In some embodiments the tips of the pin are larger than shown, and may be designed differently (e.g., as small suction cups).

Figure 47A:
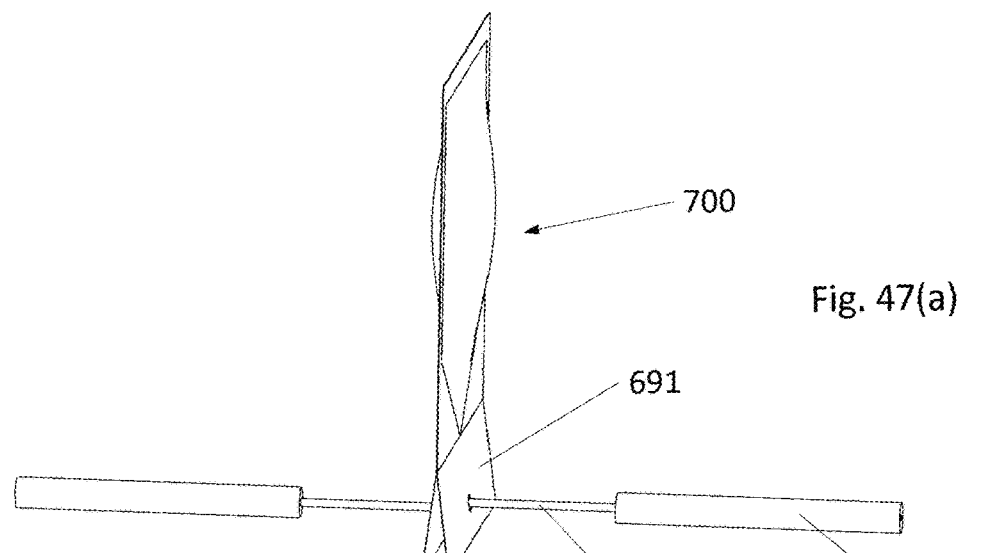
FIGS. 47(a)-(c) depict a method and apparatus for separating and reorienting flaps.
Figure 47B:
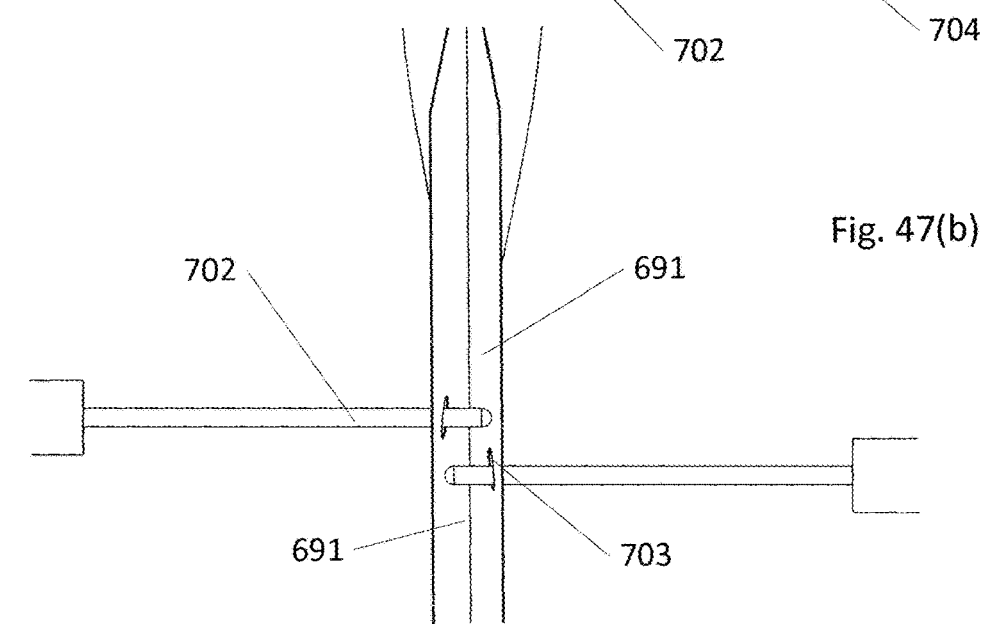
Figure 47C:
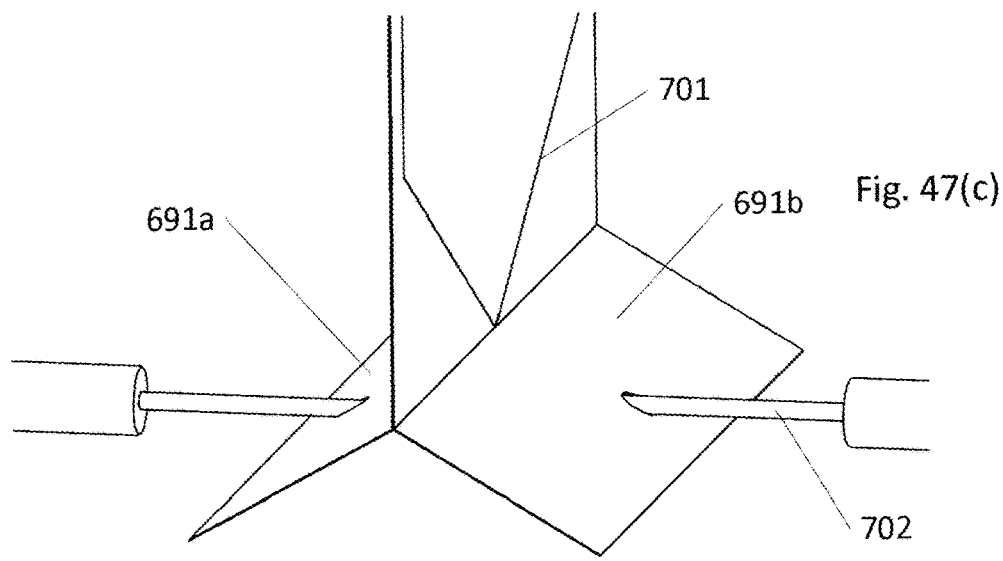

FIGS. 47(*a*)-(*c*) depict 3D views of an alternative mechanism for separating and rotating the flaps of pouch 700 with seal 701 and flaps 691*a* and 691*b* used in some embodiments; the mechanism uses an approach similar to that of FIG. 42(*a*)-(*f*). Perforations 703 (e.g., one per flap as shown) are provided in the flaps toward the center of each, but are offset from one another. Such offsetting can be readily achieved using the method shown in FIGS. 45(*a*)-(*d*). The flaps are separated and rotated by pins 702 moved by actuators 704 (e.g., air cylinder) which pass through the perforations and extend (e.g., horizontally), pushing on the flap surfaces opposite the perforations. In FIG. 47(a), the pins are only slightly extended, and the flaps are nearly together. A view from below the flaps of this situation is shown in FIG. 47(b). In some embodiments the pins may be hemispherical at their tips and in some embodiments the pins may be tipped with a high-friction material, may pierce the film, may be provided with vacuum, etc. In FIG. 47(c), the pins have extended much more, forcing the flaps to separate and rotate through angles large enough to allow them to enter the gap between the upper and lower peeler clamps. At this time, pins 702 can be retracted from holes 703. If necessary, the peeler clamps can be notched so as not interfere with the pins, or the clamps can be built as two separate pieces, each one on one side of the pins, possibly extending all the way to the corners of the flap, or the clamps can partially close around the flaps, allow the pins to retract, and then fully close.

In some embodiments pins similar to those of FIGS. 47(a)-(c) may be used for the entire process of unsealing and dispensing from the pouch in the case of Type 1 or 2A ingredients, without the need for the peeler of FIG. 36(a) or similar. In such embodiments, four offset pins are preferably used, with each pair of pins located close to the corners of each flap so as to avoid interaction with falling ingredients. The tip of one pin of each pair contacts flap 691a and the tip of the other pin of each pair contacts flap 691b, with both pins passing through apertures in the opposite flap. Since the objective is to apply tension to the flaps sufficient to open the pouch and not just separate/reorient them, the tips need to be able to have traction on the flaps they contact. In some embodiments this is achieved by making the tips sharp enough (at least at their tips, though they may be wider more proximally) to penetrate the flaps, or by providing a small hole into which the tips can enter, or by using high friction tips and clamping the flap between the tips and a moveable pad (similar to that of pad 740 on passive arm 738, below), with the pad resisting the motion (e.g., via a gas spring) and able to move parallel to the pin (e.g., horizontally). Thus by extending the pins, both flaps can be engaged and then tensioned so as to open the pouch and dispense the ingredient, after which the pins retract to allow the pouch to be removed from the dispenser. Flap apertures suitable for use in these embodiments can be formed with the method of FIGS. 45(a)-(d) as well. If small holes (for pin tips) are desired, these can be punched through both films simultaneously after the large apertures are punched and after the films have been shifted, just prior to sealing.

Figure 48B:
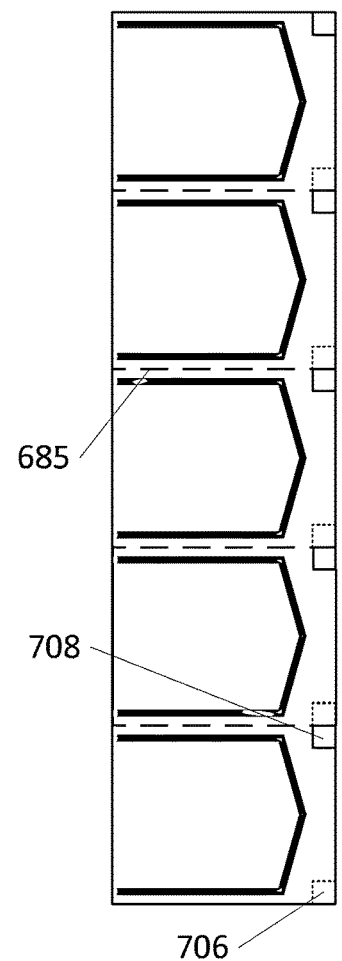
FIGS. 48(a)-(b) illustrate pouches and aspects of pouch manufacturing.
Figure 48A:
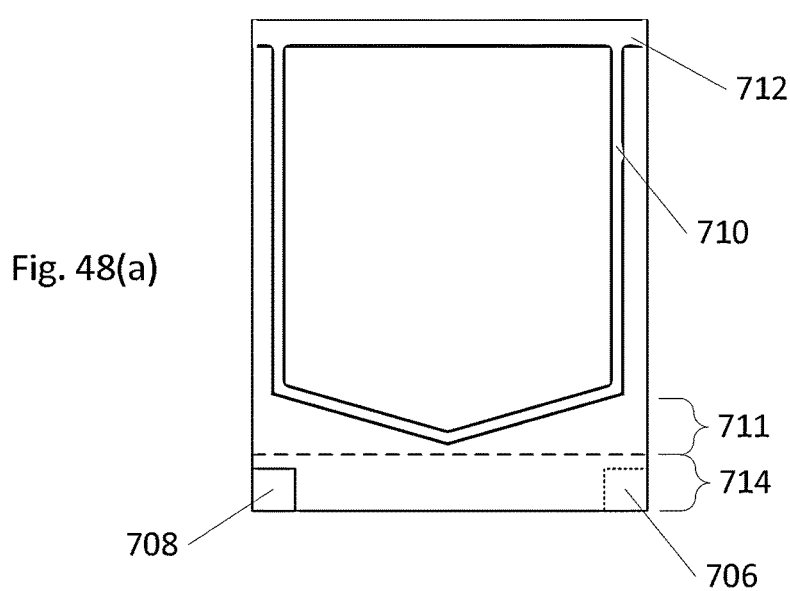
Figure 46A:
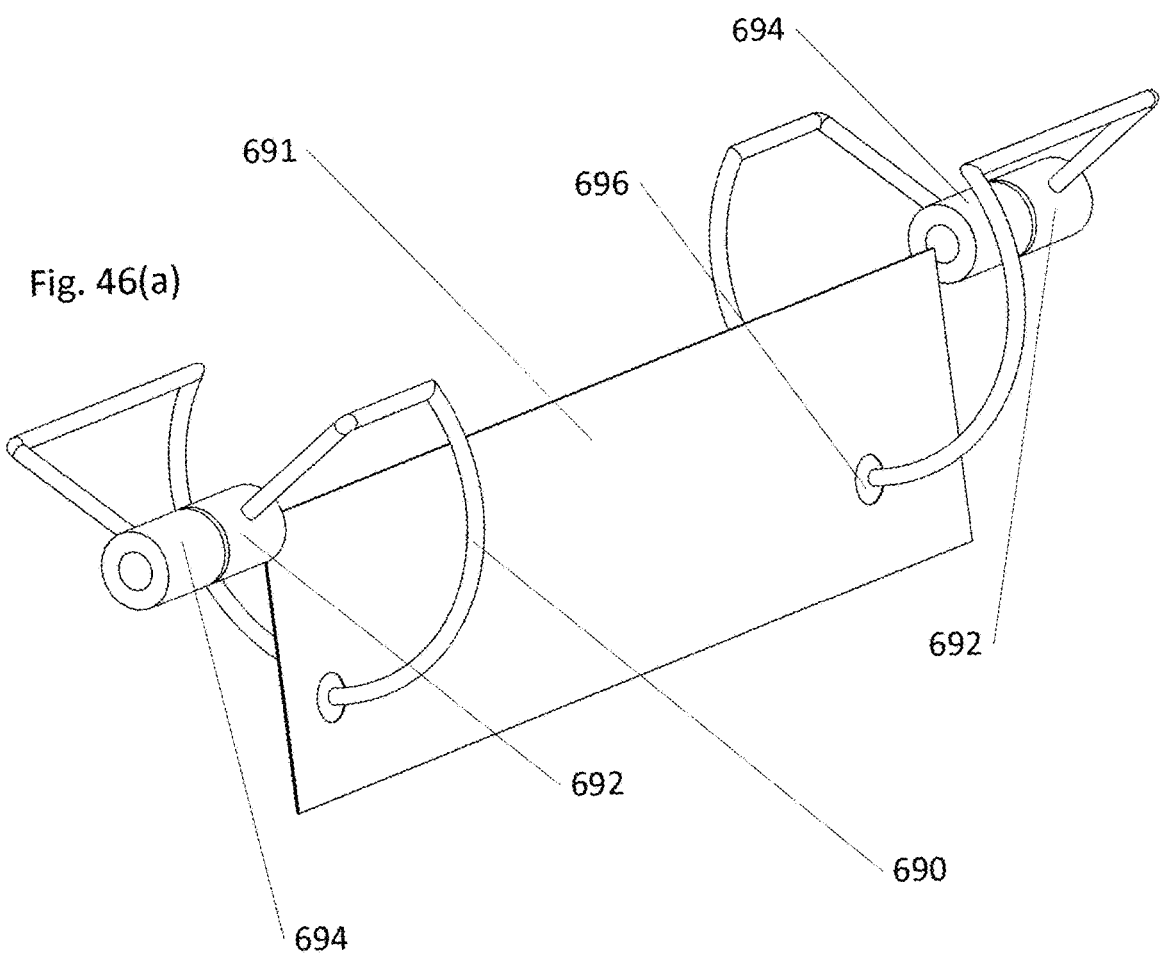
FIGS. 46(a)-(d) show a method and apparatus for separating and reorienting flaps.
Figure 46B:
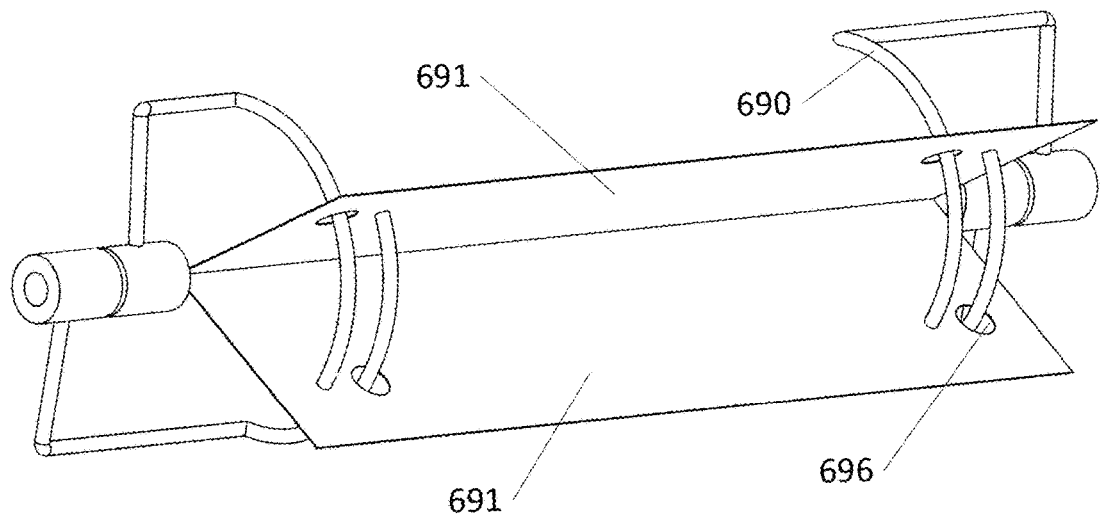
Figure 46C:
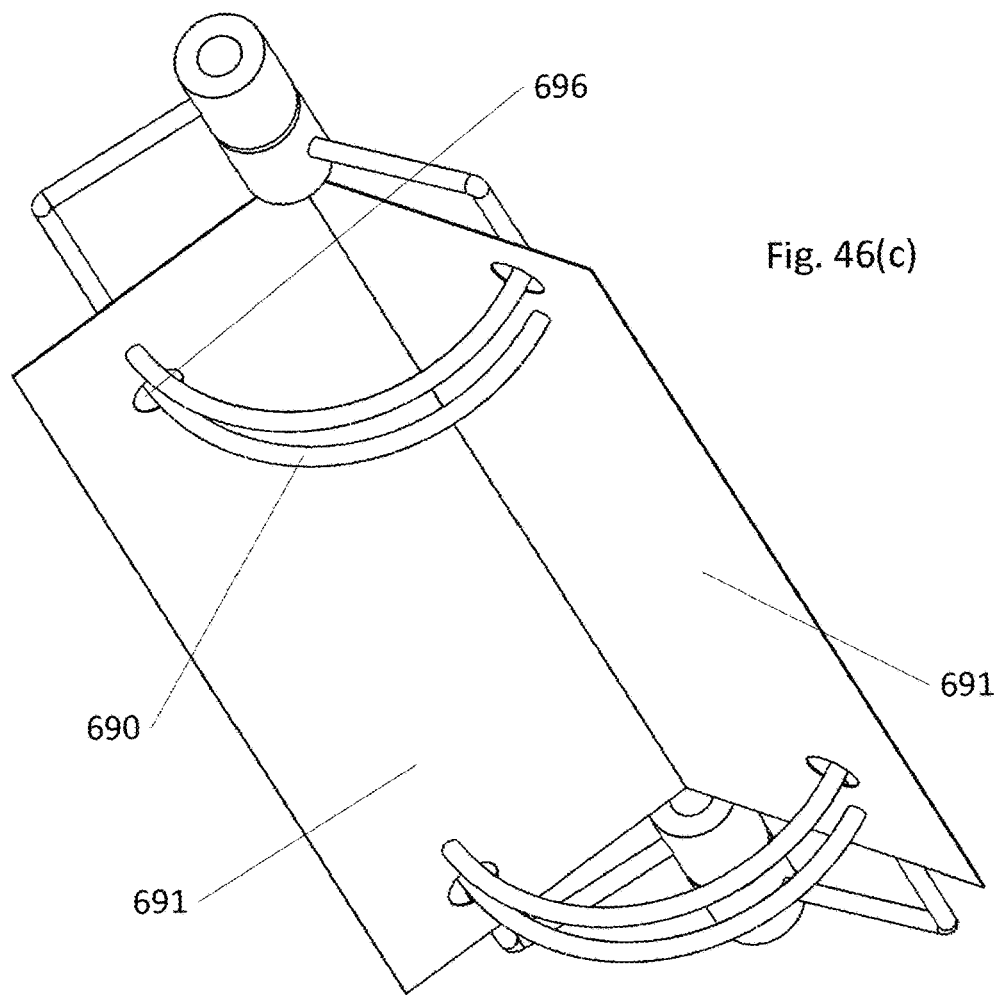
Figure 46D:
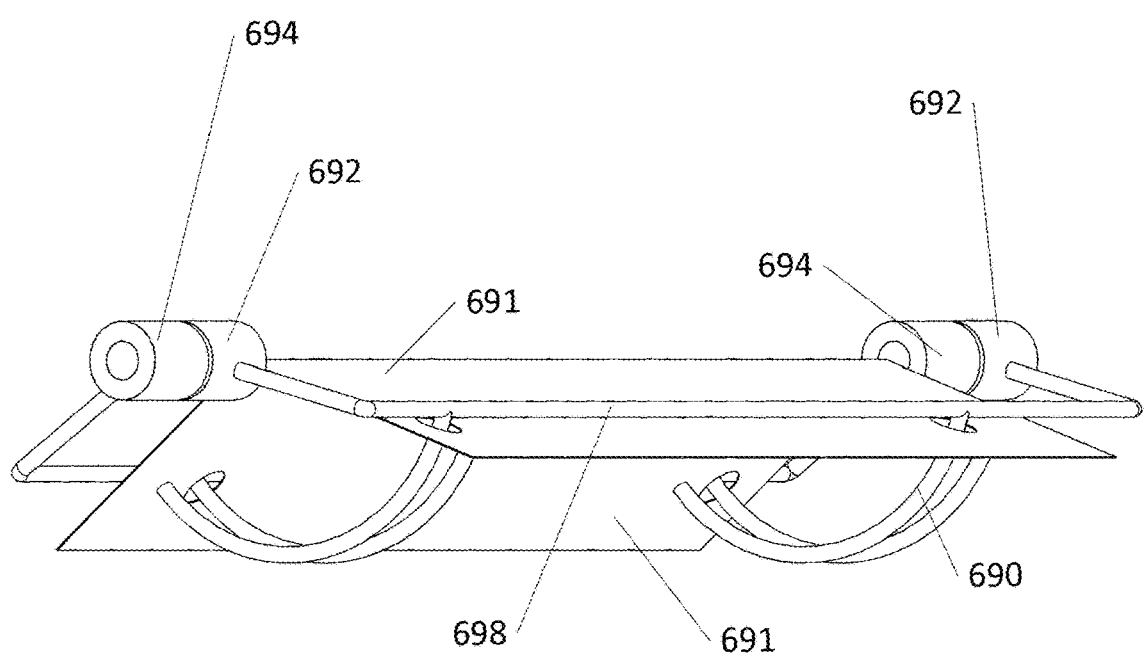

FIGS. 48(c)-(k) depict 3D and orthographic views of a portion of a dispenser for dispensing from a pouch including seal 710, top seal 712, flaps 714 and chevron seal 711 such as that shown in FIG. 48(a), in which one corner of each flap has notches or apertures 706 and 708. Film 1 has its right corner missing (indicated by a dotted line since Film 1 is in the background) while Film 2 has its left corner missing. FIG. 48(b) shows five pouches as they would be manufactured, before cutting them apart, as seen from the opposite site, with Film 1 in the foreground. Using the method shown in FIGS. 45(a)-(d), the pouches are produced by punching with the notches offset much like the perforations described above, in this case by an amount that puts the notch in one film adjacent to that in the other (FIG. 49(b)). The cutter can be aligned so that the punched notches are open on two sides as desired.

FIG. 48(c) is an overview of a portion of the spreading/rotating mechanism along with a notched pouch 716 and the blades 718 of a dispenser, while FIG. 48(d) shows the mechanism without the mount, blades, or pouch, for clarity. A dispenser may comprise two such mechanisms located at opposite ends of the blades; the mechanism is asymmetric and the two mechanisms are not mirror images, but rather, identical.

The mechanism in the embodiment shown comprises mount 720 which can attach to the dispenser or a nearby structure; stepper or servo motor 722; bracket 724 to mount the mount onto carriage 726 that can translate a short distance along rail 728 (other methods of allowing the motor to translate may be used, such as flexures); lead screw 730 (preferably with multiple starts); lead nut 732; a clamp (not shown) holding the lead nut to the mount; coupler 734 to join motor shaft 735 to the screw; two arms (736 fixed to the screw and rotated by the motor, and 738 passive) each ending in a pad 740 (preferably having a non-slip surface), standard and thrust bearings used inside and on the sides of the passive arm; at least two springs; a collar 752 which retains the arms, bearings, and springs on the screw, and an actuator (here a small air cylinder).

Figure 48G:
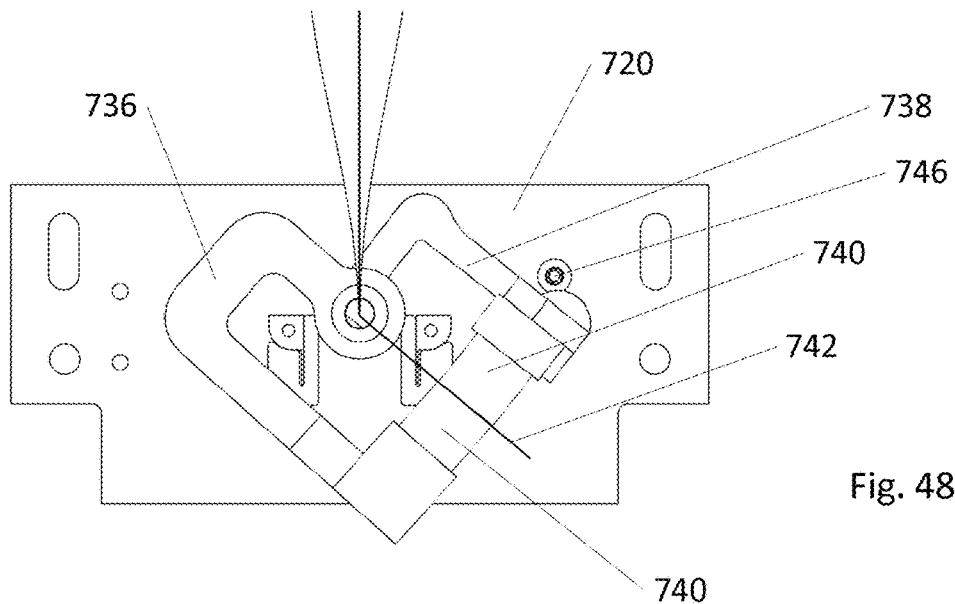
Figure 48H:
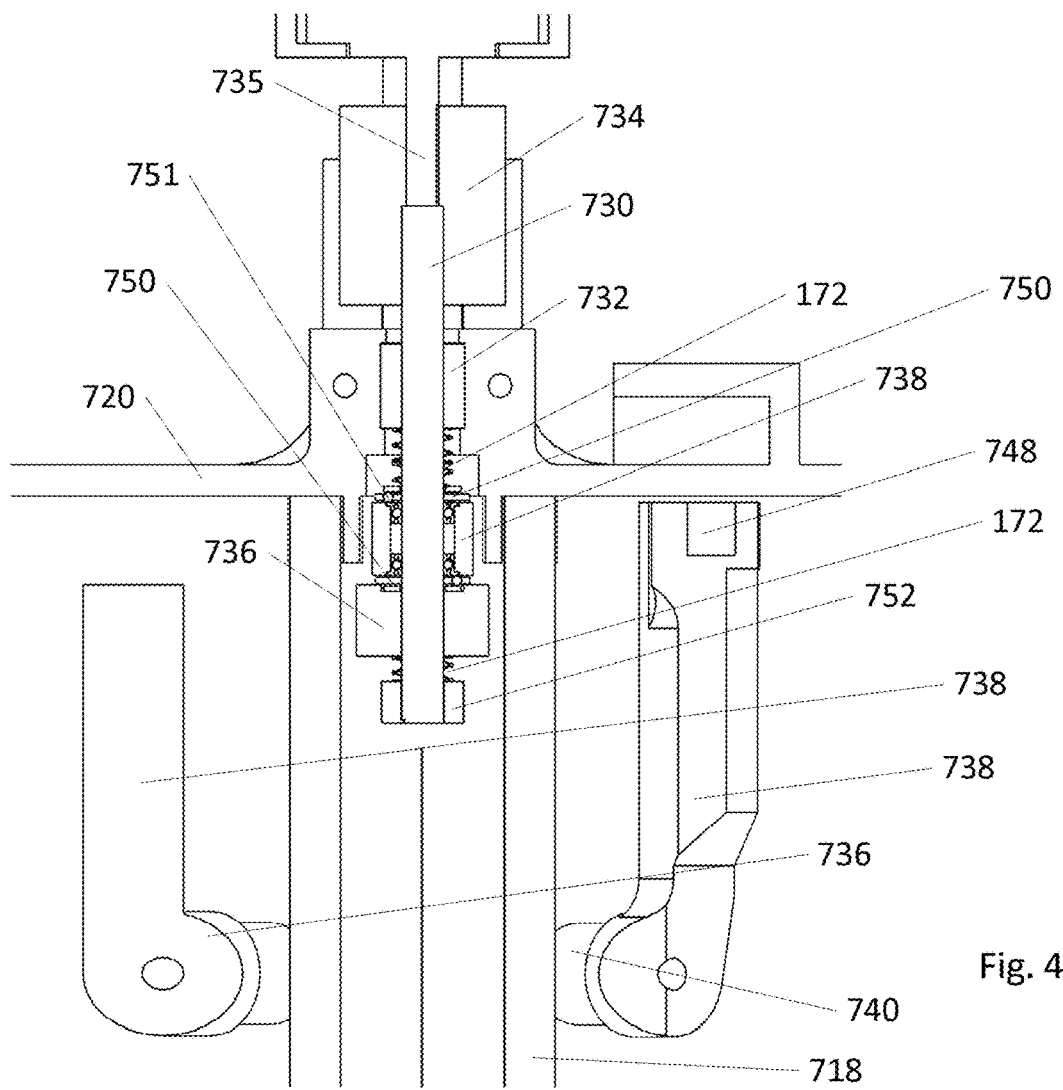

In operation, passive arm 738 is initially held in a raised position (FIG. 48(e)) by the extended rod 746 of the cylinder 747, which enters cavity 748 (FIG. 48(h)) in the arm. At this time, actuated arm 736 is rotated by the motor to a similar orientation, such that both pads are well away from the flaps of the pouch when the pouch enters the dispenser. In FIG. 48(f), the actuated arm has rotated, and the passive arm (which is weighted or spring-loaded in some embodiments) has been released by the cylinder so that the two pads surround right flap 742 (the pad of the passive arm contacts the flap through Notch 1) on both sides. In FIG. 48(g), the actuated arm has rotated further, pushing the passive arm (the pad of which presses tightly against the actuated arm's pad due to the arm's weight or a spring), clamping the right flap between the pads and rotating and separating it from the left flap 744. In this new orientation, right flap 742 is between the upper and lower clamps of the peeler, and by raising the lower clamp, can be captured. In this orientation (or in another orientation that can be reached by the passive arm), the passive arm's cavity is aligned such that the cylinder rod can enter it again and lock it in position, after which the actuated arm can return to its original position, the result being the configuration shown in FIG. 48(e), with the mechanism ready to repeat the cycle for the next pouch. Simultaneously (or at different times) the identical mechanism at the other end of the blades has re-oriented the left flap by clamping it between the passive arm's pad and the active arm's pad, the latter of which passes through Notch 2 to reach the left flap.

In FIGS. 46(a)-(d) and FIGS. 47(a)-(c), pins manipulate the flaps more or less symmetrically (in two locations, or roughly centered). The mechanism involving the notched flaps, on the other hand, manipulates the flaps asymmetrically (near one corner), and the flexibility of the flaps can lead to the flaps not entering the space between peeler clamps as evenly and completely as desired. In some embodiments a tensioning force is applied to compensate for this. FIG. 48(i) is a 3D view of the pouch, showing the flap notches, the contact location 755 of pads 740 which clamp the flaps, and the rotation of the flaps to reorient them so they can be captured by the peeler clamps. The figure also depicts the tensioning force 758 which applied by the pads as they are reoriented in direction 760, raising the flaps high enough in their entireties so that they enter the peeler clamps completely.

Referring to FIG. 48(h), which depicts a top sectional view of the mechanism used in some embodiments, it can be seen that a) the actuated arm (which appears as multiple pieces in the section view) is fixed to (e.g., using setscrews) and rotated by lead screw 730 passing through fixed lead nut 732; and b) the passive arm (which also appears as multiple pieces) rotates freely on bearings around the lead screw. The function of the lead screw and nut (and the carriage and rail) is to impart a linear motion to the pads (parallel to the lead screw axis) while the arms rotate, thus applying the tensioning force noted above. In other embodiments this linear motion might be achieved using a separate actuator and may not be simultaneous with flap rotation; however, use of a lead screw and nut allows for a simpler mechanism. The linear motion is shown in FIGS. 48(i)-(k), which are views of the mechanism from below. In FIG. 48(i), the arms are in the position of FIG. 48(e) and the gap between passive arm and mount is Gap A (754), while in FIG. 48(k), the arms are in the position of FIG. 48(f), and the gap has decreased to that of Gap B (756). To avoid interfering with the free motion of the passive arm, thrust bearings 750 and radial bearings 751 are provided on either side of it; since the arms translate, springs 172 are used on either side of the two arms so that the two arms remain close to one another at all times.

In some embodiments pouches with notches in their corners may be unsealed by apparatus similar to that of FIG. 48(d) in which pads 740 are able to travel further, applying tension to the flaps that causes them to open; linear translation of such pads (e.g., horizontally) vs. rotation may be used in such embodiments.

FIGS. 49(b)-(d) show plan views of a method for fabricating pouches having partial flaps (hereinafter, "tabs"), much like those in FIG. 11(c), which allows the peeler clamps to reach the flaps and separate them (e.g., by traveling along curved tracks as in FIG. 13(d). In embodiments which allow peeler clamps to grasp the flaps in their normal position (without needing to reorient them rotated first), then the dispenser needs no mechanism to move the flaps into the peelers, and if the grasp is secure enough, apparatus such as the grippers and slide tables of FIG. 54(a) of the FIG. 57(e) may also be superfluous in some embodiments, since tightly-grasped flaps may in some embodiments be pulled apart reliably even if the flaps are initially curved/distorted rather than flat.

The method is essentially that depicted in FIGS. 45(a)-(d) in that it involves punching two films at once, and shifting one relative to the other before forming a seal. As noted above, while only a single column of pouches is shown as would be the case using narrow webs, multiple pouches can be made simultaneously using wider webs. FIG. 49(a) shows the shape of punch 762 used in some embodiments to create the desired tab geometry. In FIG. 49(b), Film 1 (764) and Film 2 (766) are shown side-by-side for clarity, but in fact would be overlapped, with their left edges aligned. Both films have been punched, creating Film 1 tab 770a and Film 2 tab 770b. The cutting line 768, along which pouches will later be singulated, is also shown. The concave corners of each tab are preferably rounded as shown, or chamfered, to minimize the risk of film tearing. In FIG. 49(c), both films are advanced in direction 771 but Film 1 has been retarded relative to Film 2 (both are shown side-by-side, again for clarity), allowing tabs on both films to later be accessed on both sides, without interference from the other film. In FIG. 49(d), both films (now shown overlapped) have been sealed together creating seal 772. In some embodiments tabbed pouches similar to those shown, but with two or more tabs per film per pouch, can be made similarly (and with a smaller relative shift), resulting in a set of interleaved tabs which can be grasped by the peeler clamps, and more uniformly apply peeling forces to the flaps.

Figure 50A:
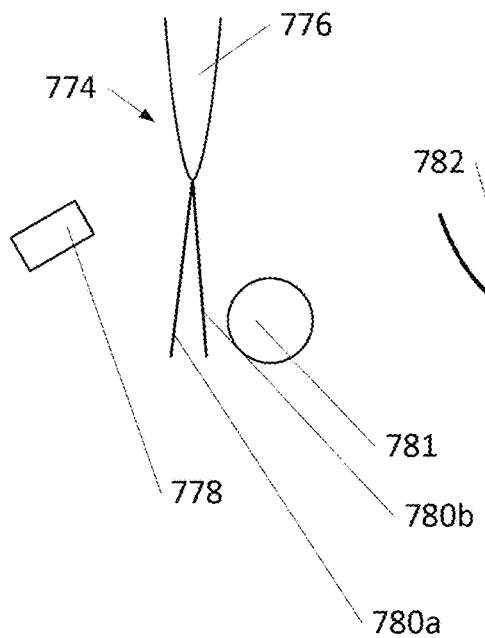
FIGS. 50(a)-(f) depict steps in a method and apparatus for separating and reorienting flaps.

FIGS. 50(a)-(f) depict elevation views of a method and apparatus for separating and reorienting the flaps of a pouch that requires no offsetting (as in FIG. 41(b)), perforation, or notching. In FIG. 50(a), the flaps of pouch 774, having upper part 776, has been inserted between pad 778 adjacent to Flap 1 (780a) and wheel 781 (in some embodiments one of two, e.g., at opposite ends of the flap) adjacent to Flap 2 (780b). The pad and wheel are capable of moving (e.g., along arced paths). Pad 778 is retained (e.g. by an actuator such as the cylinder of FIG. 48(i) and may be weighted or spring loaded such that when released, it will descend to the position shown in FIG. 50(b). Wheel 781 is actuated both to move and to rotate. Preferably the surfaces of both pad and wheel have high friction with respect to the pouch material, allowing Flap 1 to remain in place as Flap 2 slides against it, and allowing the roller to turn with minimal slippage against Flap 2.

Figure 50B:
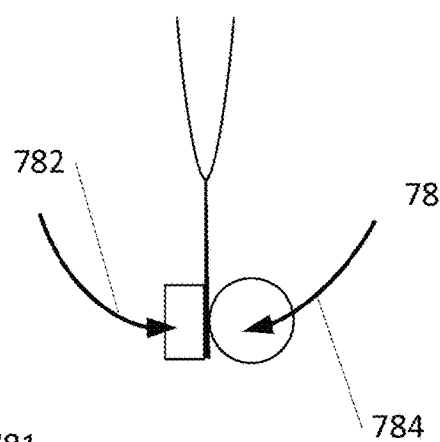
Figure 50C:
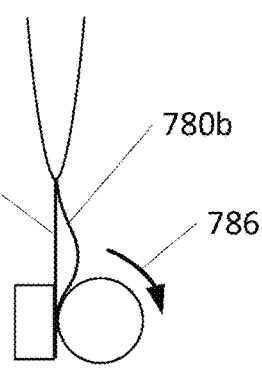
Figure 50D:
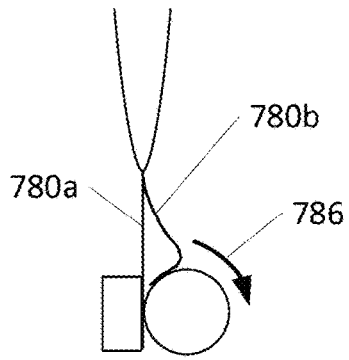
Figure 50E:
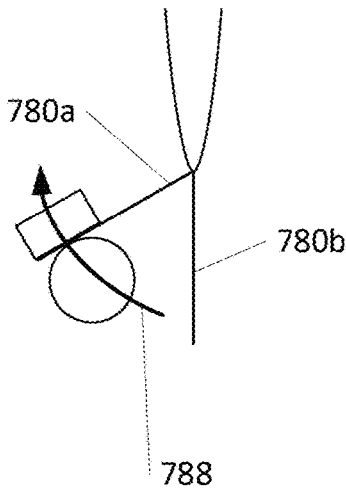
Figure 50F:
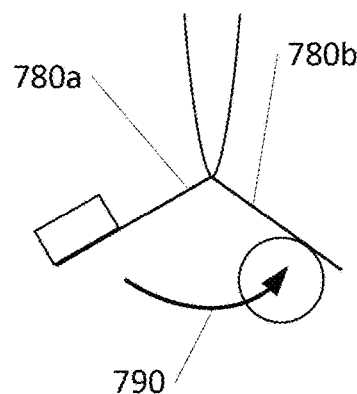

In FIG. 50(b), the pad and wheel have moved toward one another (e.g., along directions 782 and 784) pushing the flaps together. In FIG. 50(c), the wheel has rotated in direction 786 while in contact with Flap 2, causing the flap to buckle and start to be displaced upwards, and with further rotation of the wheel (FIG. 50(d)), Flap 2 no longer intervenes between Flap 1 and the wheel, and the wheel has contact only with Flap 1. Thus in FIG. 50(e), the wheel can now move in direction 788 in the direction of the pad, carrying Flap 1 along with it while the latter is clamped between pad and wheel, leaving Flap 2 behind. Flap 1 is then clamped by the peeler clamps on the left side. In FIG. 50(f), the pad remains in its original, upper position while the wheel swings in direction 790 and contacts Flap 2, rotating it upwards and between the jaws of the peeler clamp on the right side. Before inserting the next pouch, the wheel returns to the position shown in FIG. 50(a).

Figure 50G:
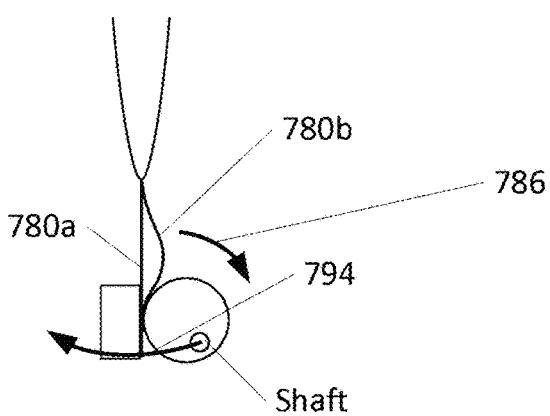
FIG. 50(g) shows an apparatus and method for separating and reorienting flaps.

The wheel rotation required can in some embodiments be produced by having the wheel turn eccentrically on shaft 792 (e.g., equipped with a torsional spring to return it to its original position) as shown in FIG. 50(g). As the shaft moves in direction 794, forcing the wheel into the flaps and against the pad, the wheel is forced to rotate clockwise due to its eccentricity relative to the shaft being located below the center of the wheel. The wheel diameter is large enough that its tangential motion is sufficient to displace Flap 2 and allow contact with Flap 1 as in FIG. 50(d). The rest of the sequence is similar to that shown in FIGS. 50(e)-(f).

Figure 51:
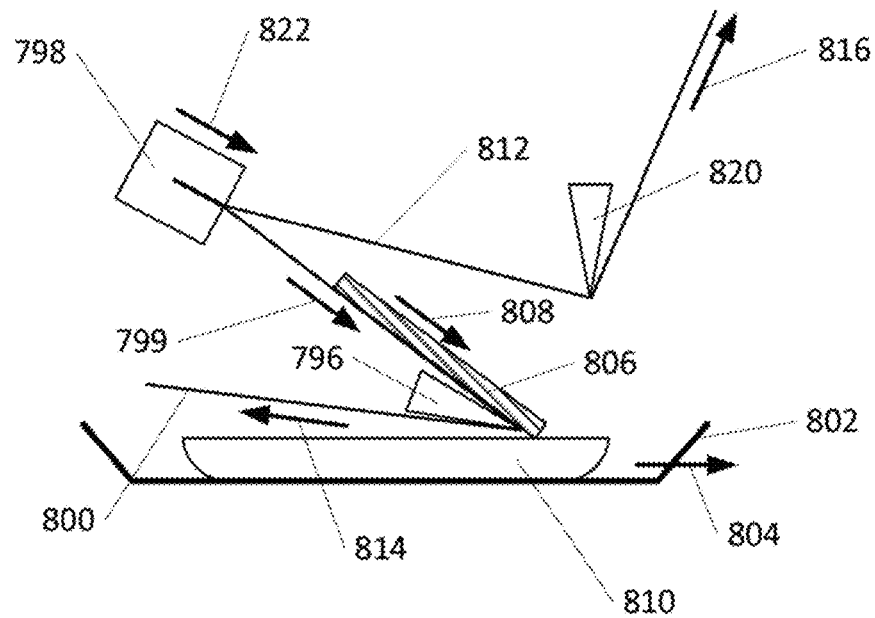
FIG. 51 depicts an apparatus and method for dispensing an ingredient.

For ingredients which adhere to the inner surfaces of the pouch films, pulling on the films to peel them (especially for a Type 2B ingredient) in which much or all of the pouch is peeled open), the moving pouch films can serve as a "conveyor belt" transporting the adherent ingredients toward the blades, where they often detach and fall into a dish or other substrate below as in FIG. 8(j). For less or non-adherent ingredients (e.g., a tomato or onion slice that is to be laid onto a bun within a dish), a vertically-oriented pouch would allow the ingredient to fall out, rather than remain on the "belt". As shown in FIGS. 31(a)-(c), if the surface onto which the ingredient descends is moving, large ingredients may be caused to fall over in a controlled way. However, more control may be possible in some embodiments in which, as shown in FIG. 51, at least a portion of the dispenser (e.g., one blade 796, one peeler) as well as other components (e.g., grasper 798) are tilted such that at least one wall 800 of the pouch is at a smaller angle to the horizontal then normal (e.g., as small as zero degrees), and can serve as a conveyor belt. As shown, through a coordinated motion of film 800 (moving down and to the right in direction 799, carrying the ingredients) and dish 802 (moving to in direction 804), a tomato slice 806 (one example of many) can move in direction 808 and be laid onto bun half 810 in a controlled manner (e.g., the correct side can be up (if applicable) and it can be well-centered). As film 800 (and opposite file 812) are pulled (in direction 814 for film 800, and in direction 816 for film 812), film 812 may pass over blade 820, or be pulled directly; grasper meanwhile moves in direction 822. Other ingredients can be similarly dispensed: e.g., a pepperoni slice laid onto a pizza, pickle slices, grilled mushrooms, lettuce, or relish laid onto a hamburger, etc.

Vibrating, shaking, or tapping the film before and after it passes around the blade can be helpful to dislodge adherent ingredients. In some embodiments, this is done directly to the film, while in others, it can be done to elements of the machine in contact with the film, such as the blade. For example, the blade, which may be compliantly mounted, can be struck by one or more oscillating rods (e.g., from a small solenoid or air cylinder, e.g., impinging on its top surface), or may have mounted to it one or more small vibration motors.

The ability to translate the dispenser with respect to the dish or vessel into which an ingredient is dispensed, or vice-versa, along two axes allows for a given ingredient to be placed within the dish at a specific location. This can be achieved, for example, using two linear motions, or one linear and one rotational motion. In the case of some ingredients—especially those that are not roughly equiaxed (e.g., baby carrots, rolled cookies) or symmetric, it can be beneficial at least aesthetically to provide an additional motion axis, allowing the ingredient orientation to also be controlled. FIG. 52(*a*) depicts dish 824 into which ingredient 826 such as a carrot has been dispensed (e.g., as a garnish). With only two axes of motion, location can be controlled but not orientation. Adding a third axis as in FIG. 52(*b*) allows a more pleasing (and in some cases, more functional) arrangement of the ingredients, e.g., one that is rotationally symmetric.

Pouch flaps generally become curved and distorted, and difficult to flatten and rotate to a position that allows them to be grasped (if they need to be separated in order to grasp them) due to the distortion of the pouch caused by the weight and volume of its contents, or due to the evacuation of air inside the pouch, or pressurizing the pouch with a modified atmosphere gas, as the case may be. In the case of a Type 1 ingredient, the effect of gravity can exacerbate the distortion when the pouch is oriented normally (flaps at the bottom). Thus, in some embodiments, to facilitate flattening of the pouch flaps so as to make the flaps easier to rotate, the pouch can be tilted to another orientation (e.g., horizontal, partially or fully inverted) before the flaps are rotated. Once the flaps are grasped securely, the pouch can be reoriented as needed for dispensing.

If a pouch is vacuum packed or contains air or a modified atmosphere gas, then before the pouch is opened (e.g., before attempting to re-orient the flaps before they are gripped by the peeler clamps), the pouch can be opened (e.g., near the top) in a small area to allow gas exchange and minimize pouch distortion caused by the pressure differential between inside and outside the pouch. This can be done by piercing or ablating the pouch, peeling it in a particular region (e.g., a pull tab may be provided for this that the apparatus can grasp and pull), tearing or cutting it (e.g., a tear notch may be provided, etc.). If a permanent part of the machine comes into contact with the pouch, it preferably does not come into contact with the ingredient within the pouch. To avoid this in some embodiments a gas-permeable but otherwise impermeable material (e.g., TYVEK® or GORE-TEC) may be incorporated into the pouch adjacent to the location where the pouch is opened.

For Type 1 ingredients, after opening the pouch and before extending the squeegees, the pouch can be raised (while simultaneously lowering the peeler clamps) so that the squeegees can travel over more of the full height of the pouch; without this, the lower portion of the pouch may be too low for the squeegees to reach, such that some of the ingredient remains in this region.

In some embodiments it is desirable to have the opening of the pouch as close as possible to the dish or vessel below it (e.g., to reduce the risk of splatter as the ingredient falls). This can be accomplished by lowering the pouch relative to the blades, thus making the pouch films between the blades more horizontal. Increasing the angle between the two films between the blades can also reduce the tendency of the ingredient to cling to the inside surface of the pouch as it issues from the opening.

Some ingredients within a pouch may tend to clump together. To separate them for use, several methods can be used, depending on the ingredient. For example, air may be let into the pouch if previously under vacuum, and the pouch may be inflated to increase its volume, after which the pouch can be sealed or held closed, and agitated (e.g., tumbled) to help break apart clumps. Without contacting the ingredients, the pouch can be vibrated, shaken, folded, twisted, rolled, etc., or one or more blunt tools (e.g., interleaved) can impinge on the pouch walls (e.g., rolling, pushing) to help break up clumps inside. Liquid (e.g., water) can be introduced into the pouch, which can tend to separate clumps held together by surface tension; the liquid can then be drained before dispensing the ingredient. To avoid ingredient clumping, separator sheets, tubes, or other shapes within the pouch can be included, made from parchment paper, wax paper, etc. These can be fixed to the pouch (e.g., at the top and/or sides) so that they don't fall into the dish when the pouch is opened.

In some embodiments pouches, especially those containing Type 2B ingredients, can be everted (turned inside out) to dispense the ingredient within. This can be especially useful for pouches that are reusable and flexible (e.g., elastomer pouches used in a home appliance such as that in FIGS. 31(a)-(l) of the 074 and 253 filings.

In dispensers such as that shown in FIGS. 8(*a*)-(*k*), the pouch may enter the dispenser from the side (i.e., horizontally), either when the pouch is at the correct height for dispensing, or at a greater height (after which it descends to the correct height).

The pouch guides of FIG. 38(*b*) may be spring loaded or otherwise moveable/compliant such that a bulging section of the pouch can still pass.

The grasper of FIG. 19(*d*) filing may be provided with means of reading codes (e.g., bar codes) on the pouch using such methods as optical sensing and, if the codes are not perfectly flat and thin (but, for example, if they are embossed), tactile sensing. For example, a pressure sensing array in the grasper jaw may be used to read such a code, or a sensor based on Gelsight technology (Gelsight, Waltham, Massachusetts) may be used.

When loading a pouch into a dispenser, to avoid inadvertently folding the flap the system can a) move the pouch past the dispenser center when moving horizontally, then center it; b) move the pouch vertically below the height at which dispensing will begin, then raise it to that height. Bristles or similar biased structures which preferentially allow motion in one direction (e.g., downwards) but not upwards can be useful to unfold the flap during these movements or otherwise.

If the rate of an ingredient being released from the pouch isn't well controlled, the motion of the dish below it can be coordinated with it nonetheless by sensing the actual rate and adjusting the bowl motion accordingly. For example, if the dish is weighed during dispensing, and/or if the pouch is weighed, rates can be determined. Sensing may also be used, such as optical sensing to measure such behavior as an ingredient protruding from the pouch, detaching from the pouch, pouring out of the pouch with a particular stream diameter, etc.

Pouches holding some ingredients (e.g., Type 1 or 2A) can be opened by means other than peeling, and therefore may not include flaps. Such means are preferably non-contact, to avoid any contamination of the system (thus cutting them open with a blade, unless disposable or easily and thoroughly cleaned, is undesirable). For example, pouches can be opened by using a laser (e.g., carbon dioxide, excimer, diode) to burn, melt, or ablate the pouch material along a path that opens the pouch. Similarly, plasma, electrical discharge, and other methods may be used, depending on the pouch material (e.g., polymer, metal) in the region of the pouch to be opened.

In some embodiments, pouches without flaps containing some ingredients (e.g., Type 1 or 2A) but having at least one peelable seal may be used. These may be peeled open by grasping the sides of the pouch (e.g., using vacuum) and pulling them apart, by pulling on a portion of the pouch to tear it (e.g., using a tear notch to start the tear, and optionally using pre-scoring the pouch to guide the tear, or pulling on an embedded string or wire.

Systems

Systems such as that of FIG. 26(*a*) can be adapted to prepare foods which are cooked (e.g., stir fries, Mongolian bar-b-que, stews) by using dishes (e.g., metal) which are heated, and which may be in the form of foil liners within heated vessels as in FIG. 12 or 20 of the 074 and 253 filings.

Figure 53:
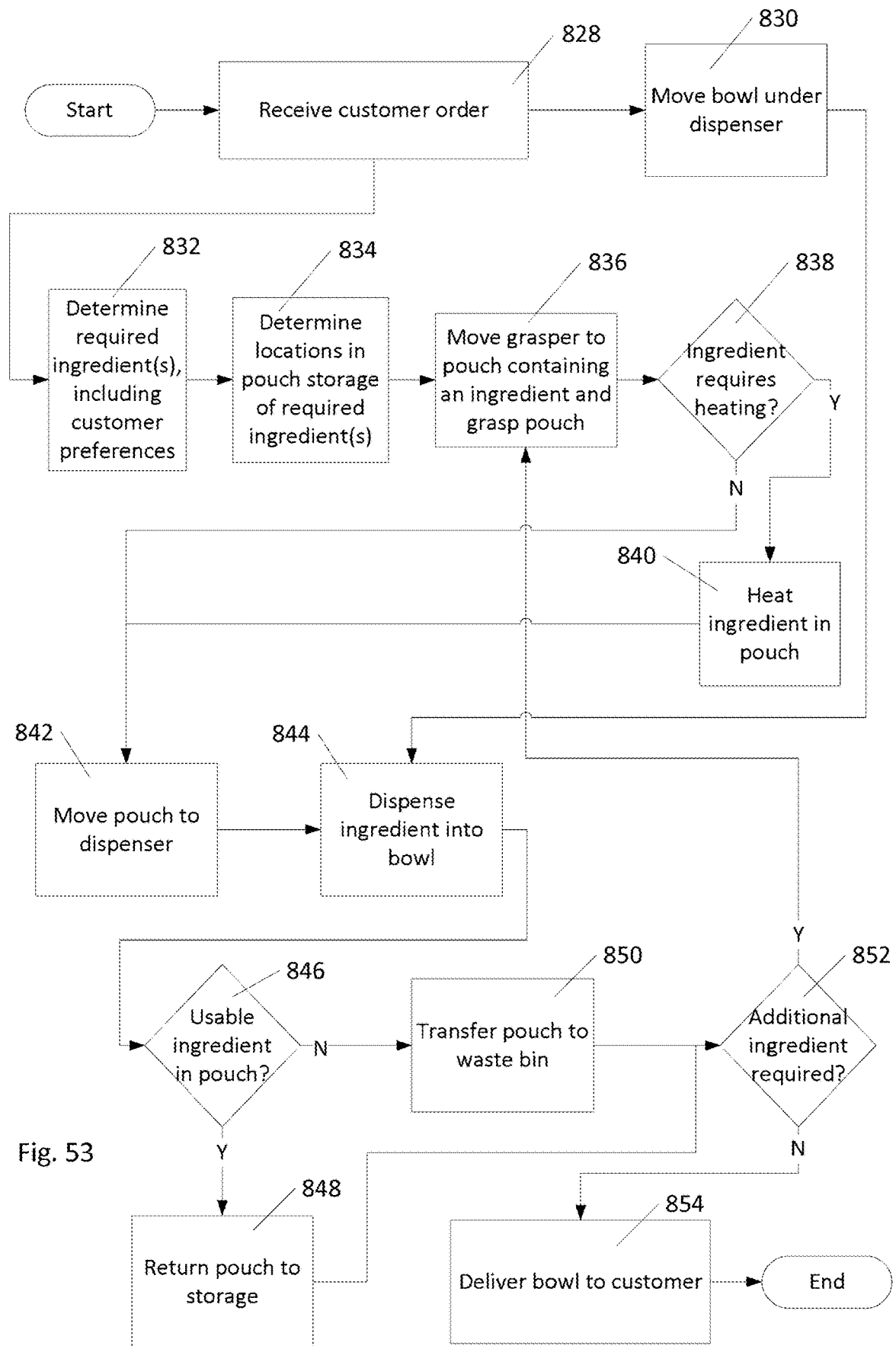
FIGS. 53-54 is are flowcharts showing processes for fulfilling orders.
Figure 54:
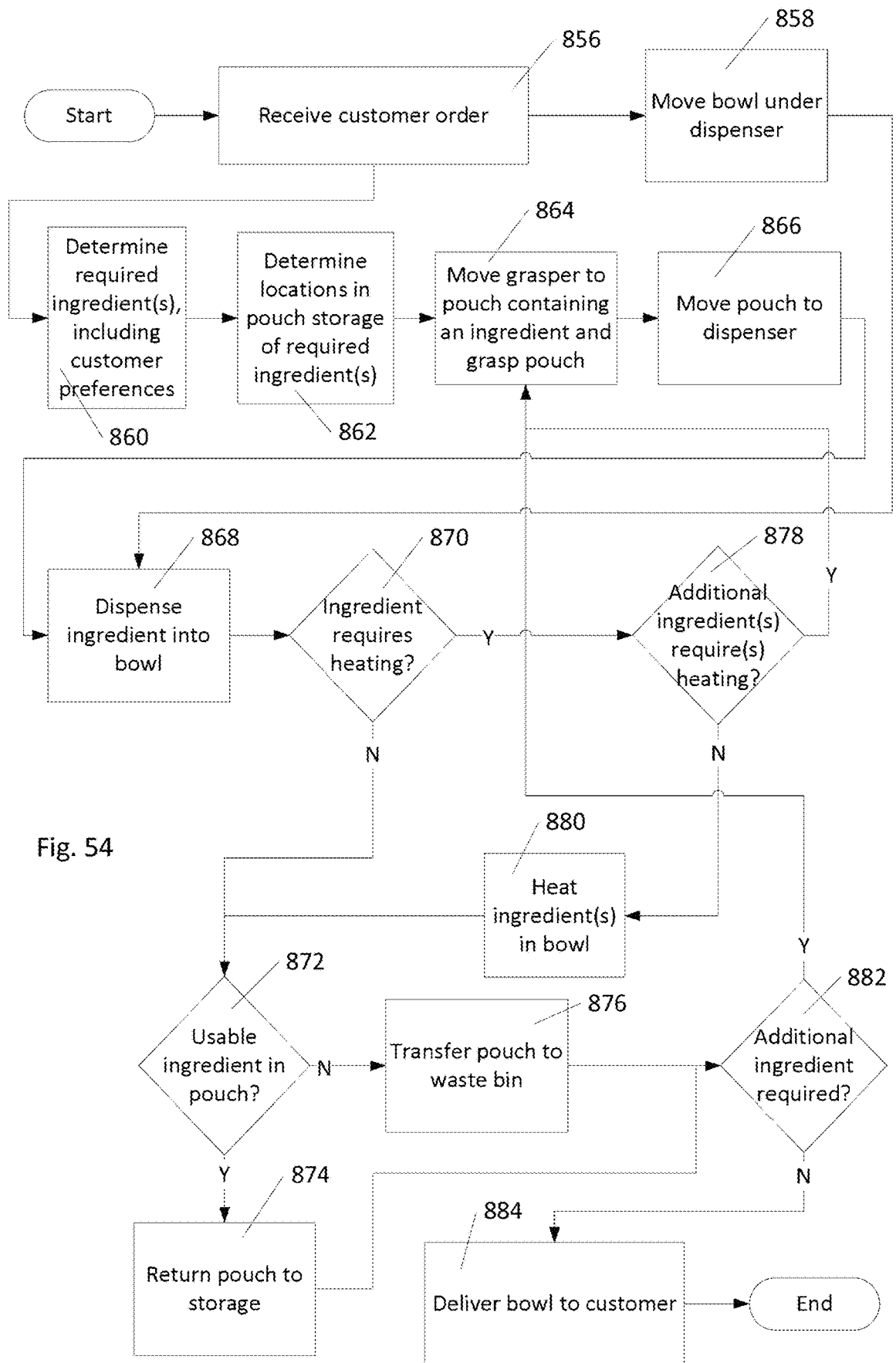

FIGS. 53-54 are flowcharts describing processes for providing a customer with food using a system such as those described herein. Ingredients stored within the system may be refrigerated or in some cases, frozen. The flowchart of FIG. 53 assumes that at least one ingredient requires heating (or cooking) before serving, and heating is performed in the pouch, while that of FIG. 54 assumes at least one ingredient requires heating, and heating is performed in the bowl (or dish, plate, or other vessel in which the food is served or further processed; for certain heating methods such as broiling or halogen cooking this may be a metal container such as an aluminum foil dish). Heating in the pouch may be achieved by a variety of methods such as infrared, microwave, RF, electroporation, pulsed ohmic heating (IXL Netherlands, Schalkwijk, The Netherlands), laser, halogen, immersion in hot liquid, and steaming. In some embodiments the wavelength(s) or radiation that may be used for heating are selected so as to be minimally absorbed by the packaging materials and maximally absorbed by the ingredients. Heating within the bowl may be achieved by methods such as microwave, RF, halogen, electroporation, hot air impingement, convection, pulsed ohmic heating, broiling, baking, and steaming. After dispensing an ingredient from a pouch, the pouch may be disposed of, but if there is a useable quantity of an ingredient left within the pouch, the pouch may be returned to storage (e.g., cubby or MEP). If the pouch is subdivided into multiple compartments (e.g., each may have a chevron-shaped seal at the bottom) and fewer than the total number of compartments is opened, or if the pouch is resealed (e.g., thermally, ultrasonically, using a zipper, possibly along with a vacuum or tacky film to remove contamination before resealing), the pouch may be returned to storage if the ingredients haven't expired and a use is anticipated. Sometimes a pouch may be disposed of before it is empty (e.g., if the customer wants less of an ingredient stored in a pouch that cannot be resealed). In some embodiments unwanted quantities of an ingredient in a pouch may be dispensed into a waste container (e.g., one beneath the bowl, while the bowl is moved out of the way). If several ingredients are to be heated within the bowl and there are other ingredients that it is desirable not to heat (e.g., in a burrito bowl, the first category may include rice and beans, and the second category may include salsa and guacamole) then those to be heated may be dispensed first, then heated, followed by dispensing into the bowl the non-heated ingredients.

In Box 828 of FIG. 53, a customer order is received (e.g., for a burrito bowl). The machine controller moves a new/clean bowl (or other dish) under the dispenser in Box 830, and in Box 832, the ingredients required for the order (based on a digital recipe and customer preferences) are determined. Then in Box 834, the controller identifies, based on stored data, in which storage locations (e.g., which cubbies) the required ingredients are located, considering expiration dates (e.g., giving priority to ingredients closer to their expiration). Then in Box 836, the controller moves the grasper to the location of the first ingredient to be added to the bowl and the pouch containing it is grasped and removed from the storage location. The controller then determines in Box 838, based on stored data and possible customer preferences, whether the ingredient requires heating (e.g., beans), and if so, under what conditions (e.g., time, temperature, power level). If the ingredient requires heating, then in Box 840 the controller brings the pouch to a heating system or vice-versa and the pouch is heated (e.g., by immersion in hot water, microwave, RF). After heating, per Box 842, the controller moves the pouch to the dispenser, and in Box 844, the controller directs the ingredient to be dispensed into the bowl. If the ingredient does not require heating, the pouch proceeds directly to the dispenser. The controller determines (e.g., based on knowing the pouch characteristics that are contained within the barcode or other identifier, based on how much dispensing was done, pouch weight after dispensing (if measured), etc.) in Box 846 whether any usable ingredient remains in the pouch (which may be a multiple-compartment pouch, or a resealable pouch). If usable ingredients remain, the controller directs the grasper in Box 848 to return the pouch to storage, whereas if no such ingredients remain, the controller directs the grasper in Box 850 to transfer the pouch to a waste bin (e.g., allowing it to drop into a bin located below the dispenser, in which case the grasper is simply opened (possibly after the pouch is further lowered). The controller then determines in Box 852 whether the order requires any other ingredients. If so, then the controller directs the process described above to be repeated starting at Box 836. If not, then the controller delivers the bowl to the customer in Box 854 and the process ends.

Referring now to FIG. 54 (and with the parenthetical comments of the above paragraph removed for brevity), in Box 856 of FIG. 54, a customer order is received. The machine controller moves a new/clean bowl under the dispenser in Box 858, and in Box 860, the ingredients required for the order are determined. Then in Box 862, the controller identifies, based on stored data, in which storage locations the required ingredients are located, considering expiration dates. Then in Box 864, the controller moves the grasper to the location of the first ingredient to be added to the bowl and the pouch containing it is grasped and removed from the storage location. Then per Box 866, the controller moves the pouch to the dispenser and in Box 868, the controller directs the ingredient to be dispensed into the bowl. Next, in Box 870, the controller determines whether the ingredient requires heating. If the ingredient (e.g., lettuce) does not require heating, then the controller determines in Box 872 whether any usable ingredient remains in the pouch. If usable ingredients remain, the controller directs the grasper in Box 874 to return the pouch to storage, whereas if no such ingredients remain, the controller directs the grasper in box 876 to discard the pouch in a waste bin. If the ingredient (e.g., chicken) does require heating, the controller determines in Box 878 whether other ingredients to be added to the bowl also require heating. If so, then the controller directs the process described above to be repeated starting at Box 864. If no other ingredients require heating, then the controller directs in Box 880 the ingredients to be heated while within the bowl (e.g., using microwave or RF radiation). The controller then determines in box 882 whether any additional (non-heated) ingredients are required, and if so, then the controller directs the process described above to be repeated starting at Box 864. If not, then the controller delivers the bowl to the customer in Box 884 and the process ends.

Certain steps in the flowcharts may in some embodiments not be in the strict chronological order shown or described herein, but may occur in a different order or simultaneously.

Some automated food preparation systems may include fire detection and suppression systems, as required for safety. Some systems may generate fumes and/or grease vapor/gas/particles or smoke and may include an exhaust duct or other filtration system that can be cleaned or replaced. In some embodiments the system may include at least one chambers which is refrigerated (e.g., for ingredient storage) and at least one other chamber in which heating of ingredients takes place. In addition to thermal insulation between such cold and hot chambers, double doors or airlocks may be used to transfer pouches and/or dishes and vessels from one chamber to another, to minimize heat transfer between them.

Some automated food preparation systems may be used on a vehicle, such as an airplane, bus, or train. Such systems may also include delivery to passengers. For example, a system may dispense (and possibly further process, such as heat) ingredients into a dish, add a lid (snap-on, heat sealed film, etc.), then move the dish to the passenger via an overhead conveyor/trolley (having sensors to avoid collisions). With such a system it becomes possible to eliminate the standard approach to serving meals on a plane, for example, which requires a cart pushed by flight attendants (who may have other responsibilities, or in case of turbulence, should be belted into a seat), resulting in fresher/better meals and snacks.

Since pouches are small and lightweight, then a food preparation system can be very mobile: collecting from a fixed (or larger mobile) storage system only the pouches needed for a particular dish or dishes, and transporting these to the customer, preparing the food while en route or upon arrival to maximize freshness. Thus, systems can be built which provide food to a hotel, hospital, or dormitory room; apartment or condominium; or which using small robots (e.g., autonomous) and other platforms to bring food to passengers of a car (parked or moving) by rolling, flying, or (if the passengers are in a boat), optionally navigating on water. In some embodiments (e.g., for delivery to a moving vehicle) a docking station may be provided on the vehicle so that the delivery/food preparation platform can temporarily dock with the vehicle while transferring food to it. For example, delivery of fresh food to a car, truck, or bus that is moving toward a destination is achievable.

In some embodiments machines may incorporate peristaltic pumps to transport flowable ingredients, with the pump tubing replaced when needed (e.g., potentially very infrequently if pumping water).

In some embodiments multiple squeegees/rollers may be used in a dispenser on each side of the pouch, such that the contents are pushed out by more than one, acting in succession, or with each squeegee/roller travelling over only a portion of the pouch compartment height.

Figure 55:
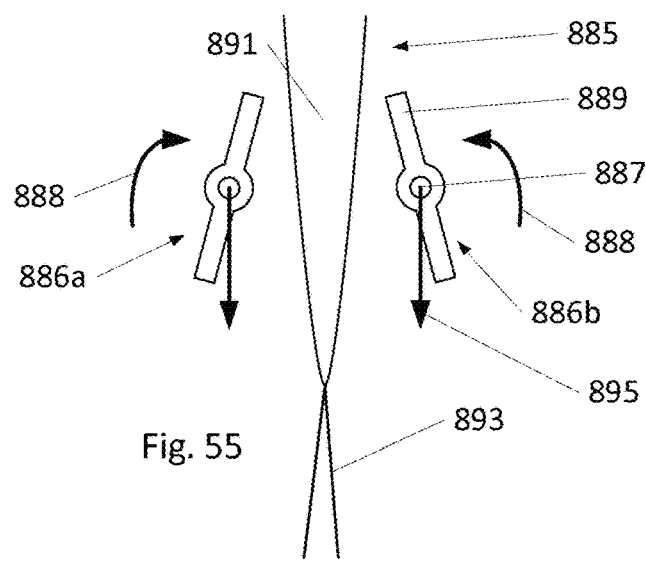
FIG. 55 depicts an apparatus for dispensing.

In some embodiments one or more paddle wheel-like devices exterior to pouch 885 (so they are not contaminated) with flaps 893 and containing ingredient 891 can be used to control dispensing of ingredients from the pouch (e.g., those which might ordinarily fall out too quickly). FIG. 55 depicts an elevation view of two such paddle wheels 886a and 886b rotating on pivots 887, which are shown with two paddles 889 each, but which can have one or more than two. As the wheels turn (typically in directions 888, but they can turn in the opposite direction) and optionally move in direction 895, they trap ingredients between the paddles, releasing them gradually according to the paddle angle. Paddle wheels such as those in FIG. 55 may replace the squeegees of squeezers used to dispense Type 1 ingredients from pouches in some embodiments, in which case they can translate (downward as shown, or upward) as well as rotate.

Minimizing Cleaning

In some embodiments mixing, blending (e.g., to prepare a smoothie), and similar operations on ingredients may be performed such that no cleaning of the machine is required, since no non-disposable/non-consumable portion of the machine comes into contact with any ingredient. For example, an immersion-type blender with blades, a shaft driving the blades, and a motor at the top turning the shaft, may be lowered into a disposable cup used for serving the smoothie. The blades and shaft of the blender may be covered with a disposable coating material such as a plastic film, which can be automatically inserted and removed by the machine. Alternatively, the blades—and in some embodiments, the shaft—can be disposable. FIG. 56(b) depicts in cross-sectional elevation view a disposable blender blade and shaft (e.g., made from a high-impact polymer such as FDA-compliant ABS) which includes a shell 896 that covers a permanent core up to the maximum height ingredients may reach during blending. The core comprises shaft 898 that is square, hexagonal, splined, etc. in cross section and the inner cross-section of the shell can match this shape. Since disposable materials such as molded plastic may not be sufficiently strong or stiff to serve themselves as blender elements and it is desirable to dispose of/recycle as little material as possible, the shell can be made thin (e.g., via blow molding) into which is inserted a reusable stronger and stiffer (e.g., metal) core (FIG. 56(a)). As the shape of the blades can be complex, it can be therefore be difficult to insert a stiff core within a shell shaped like a standard immersion blender blade. However, if properly designed, the core can comprise tongues 890 which can elastically deform (e.g., spring steel, superelastic nickel-titanium alloy) in the region of the blades and bend easily in one direction but be stiff and strong in a perpendicular direction (the direction in which force is primarily exerted on the blades). Thus, the tongues may have the form of bendable leaf springs, and inserting the elements into the shell may comprise sliding in direction 892 the tongues into cavities within the shell, the tongues bending to conform to the inner shape and/or desirably shaping the shell, which itself may be flexible. As the blender rotates in direction 900, it may be translated axially or perpendicularly and/or rotated to more effectively blend the contents. Other tools besides blender blades may be implemented similarly using a disposable polymer shell that is reinforced by a stronger and stiffer core.

A knife (e.g., an ultrasonic knife, which might be used for cutting sandwiches) can be covered (e.g., wrapped at least partially under tension, held by vacuum or temporary adhesive) with a disposable film (e.g., foil, hard plastic like PET) so it can cut food items without contamination and need for cleaning. If cleaning or an ultrasonic knife is needed, it can be made more effective by applying/immersing it in a cleaning fluid (e.g., water) to the knife while ultrasonically vibrating it. Slicing and chopping of ingredients within a pouch can be achieved using pressure and/or ultrasonic energy applied through the pouch walls. Ingredients can be separated (e.g., torn, broken) within a pouch by clamping two portions of the pouch and pulling them apart, twisting, bending, etc.

Systems having surfaces that do come into contact with ingredients can be sterilized by a number of methods such as hot air, hot water, sterilizing liquid (e.g., heated), steam, ultraviolet light, e-beam or other radiation, etc.

Pouch Filling

In some embodiments a "mold" may be provided for pouches which clamps the pouch along its peelable seals (sides, chevron) but bends or deforms to allow the pouch to expand and open for loading (vacuum may be used to help the pouch open/stay open). The mold allows ingredients to be forcefully "stuffed" into the pouch without the risk of peeling/damaging the seals. In some embodiments grippers which grasp the pouch while in a pre-made pouch filling/sealing machine can also prevent peeling; such grippers can be larger than usual to protect more of the seal, including the chevron. Such grippers can also shake the pouch to encourage settling of an ingredient loaded therein, allowing more to be added and ensuring the top seal region of the pouch is free of the ingredient.

Pouches can be filled with ingredients in some embodiments by 1) pulling apart their opposite walls (e.g., using tacky pads and/or suction cups provided with vacuum) at least partially; 2) inserting a curved liner/expander (FIG. 57) into the pouch; 3) filling the pouch; and 4) withdrawing the liner/expander (e.g., while the ingredient is introduced into the pouch). The liner/expander, having the shape of a flattened funnel whose inner and outer surfaces don't communicate except at the bottom 902 and top 904, serves to keep the inside surfaces of the pouch free from contamination by the ingredients in the area to be sealed; maintains the pouch in an widely-open configuration, facilitating loading; and may facilitate pouch "stuffing", e.g., with ingredients that are normally low density (e.g., cut-up kale) such that it without some compression, an adequate weight cannot easily be made to fit into a given pouch. If the pouch is peelable at least in part, stuffing an ingredient into it may cause premature peeling. By lining the pouch during loading, the rigidity of the liner/expander prevents forces from being transferred to the pouch walls. Each ingredient to be loaded in a pouch may be loaded using its own liner/expander. While the inner surfaces of the liner/expander will be contaminated with a particular ingredient, the outer surface will generally remain clean since even a flowable ingredient will not flow onto the outside of the liner/expander if the latter is withdrawn as the ingredient is added.

The top seal of a pouch may be created using a variety of sealing methods including heated (impulse or constant heat) or ultrasonic sealers. If using a band sealer, pouches can be fed into the moving band using feed rollers or belts whose tangential speed is lower than that of the band sealer, and with provision for the pouch to slip within the rollers/belts (or their drive can be made to slip using a clutch), thus providing tension across the top seal area prior to sealing, to ensure the seal is formed correctly and without wrinkling or other potential sources of leakage.

Pouches in a continuous chain (FIG. 7(*a*)) as-fabricated and before singulating (or if used in chain form, as-is) can be loaded by a system that sequentially opens each pouch, fills it, tensions it (this can be easier when the pouches form a chain) and passes it on for sealing (e.g., in a band sealer). After loading and probably sealing, pouches can be cut apart if desired.

A group of pouches to be filled may be supported (e.g., in an "eggcrate"-like structure lying horizontally, or a pouch box, or a shelving unit or module thereof (e.g., a module with rotatable cubbies with the open ends of the cubbies pointing upwards), and filled one by one (or with at least some pouches filled simultaneously) and then sealed. To remove air from pouches before the seal area is compressed and then sealed, a vacuum snorkel can be used (which can move along with the pouches if using a band sealer), or the pouch can be mostly immersed in a container filled with liquid (e.g., water) which moves along with the pouch on the sealer's conveyor belt, or has the form of a long trough through which the pouch moves. In lieu of liquid, a fluid-filled flexible bladder or bag, e.g., moving along the belt, may be provided to surround the pouch and squeeze out air.

Ingredient Heating and Cooking

To eliminate or at least minimize contact between ingredients and the system that assembles/processes them before serving a meal or snack (thus minimizing microbial growth, the need for cleaning, and inter-contamination), it is desirable to perform various heating (or cooling, as the case may be) and cooking operations within an ingredient package (e.g., pouch). The package can be one that contains at least one of the ingredients, or one specifically used for heating/cooking and into which ingredients are transferred. Or, surfaces of the system can be made easily cleanable or covered with replaceable (e.g., single-use) materials that prevent direct contact with ingredients.

Figure 58:
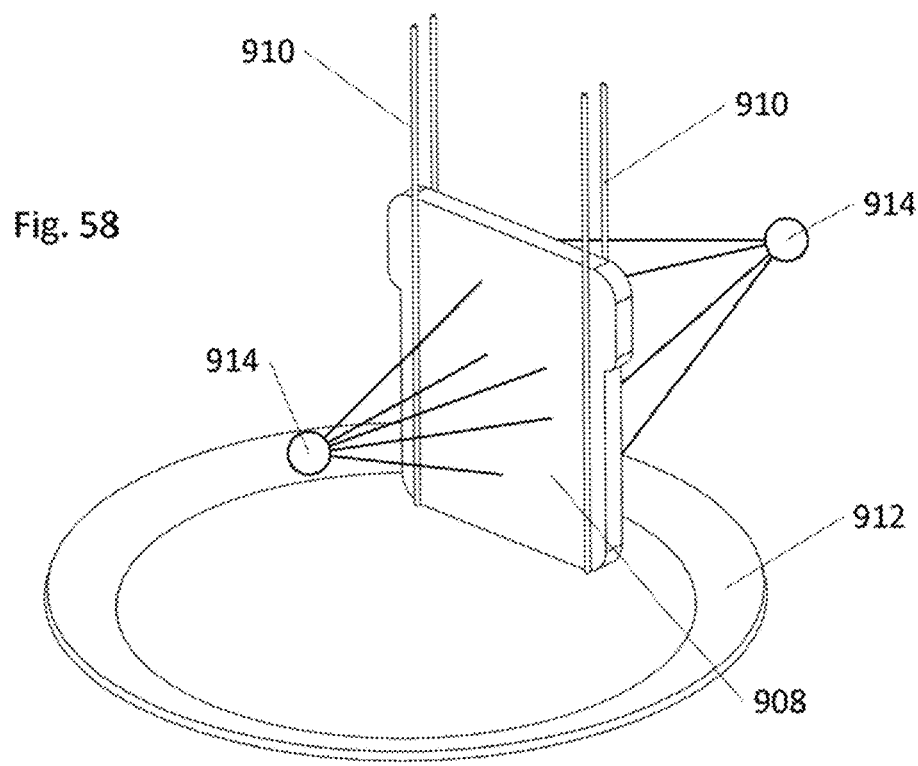
FIG. 58 illustrates a method and apparatus for heating an ingredient.
Figures 59A, 59B:
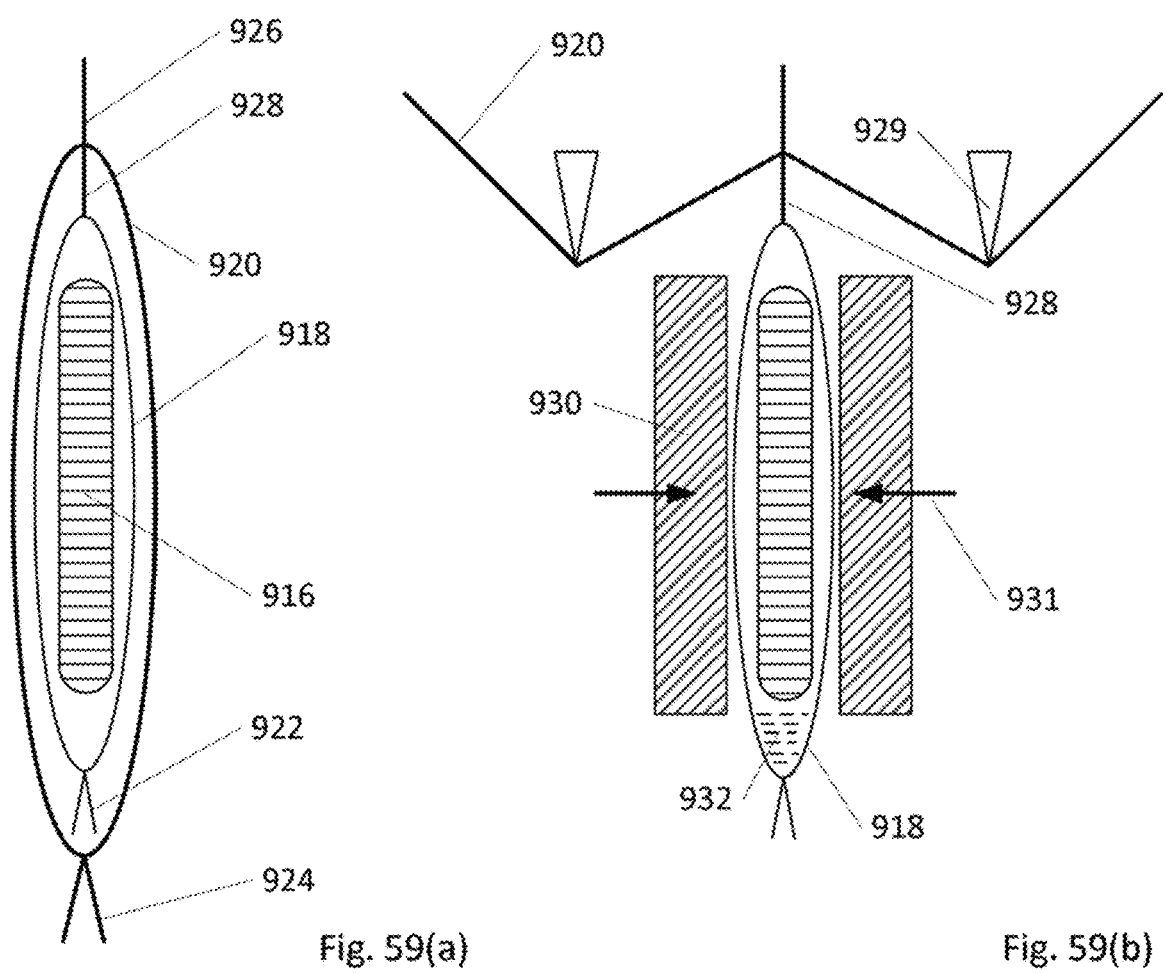
FIGS. 59(a)-(b) depicts a method and pouch for heating or cooking an ingredient.
Figure 68A:
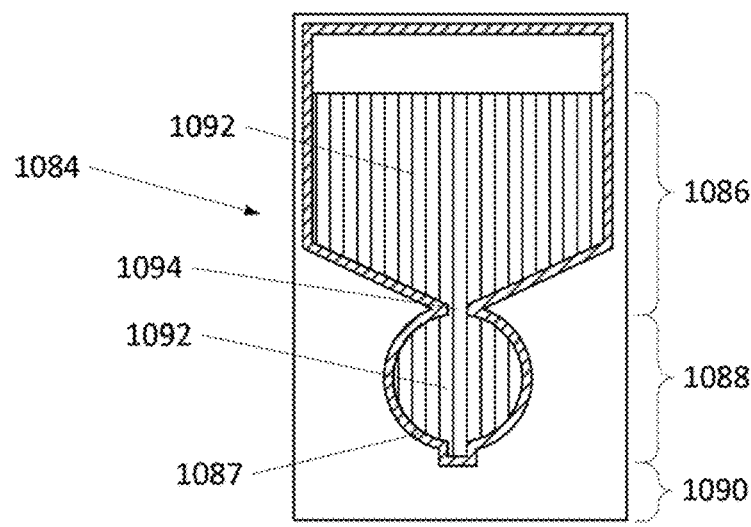
FIG. 68(a) shows a pouch having a molding cavity.
Figure 68B:
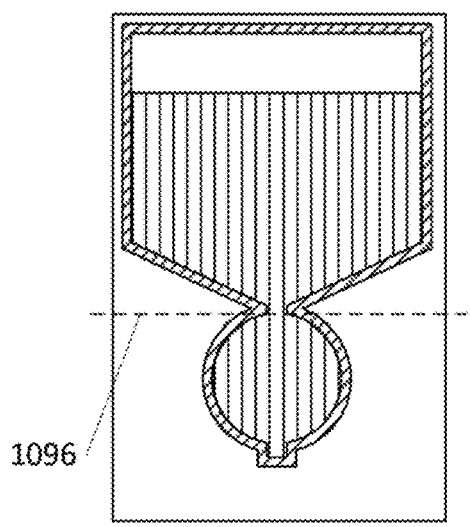
FIGS. 68(b)-(f) depict a molding sequence.
Figure 68C:
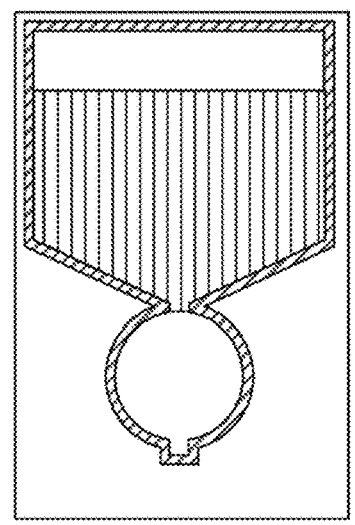
Figure 68D:
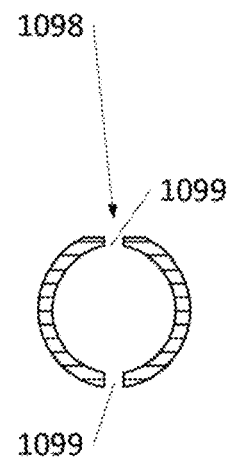
Figure 68E:
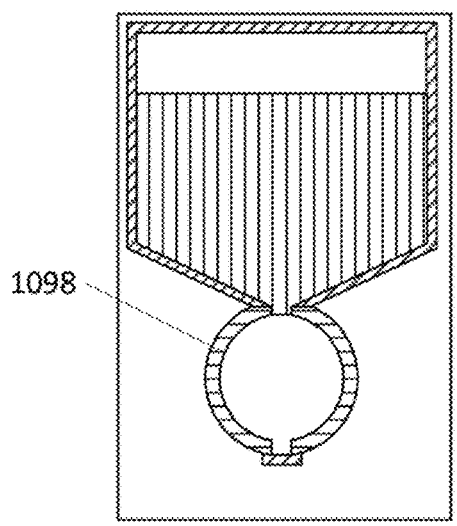
Figure 68F:
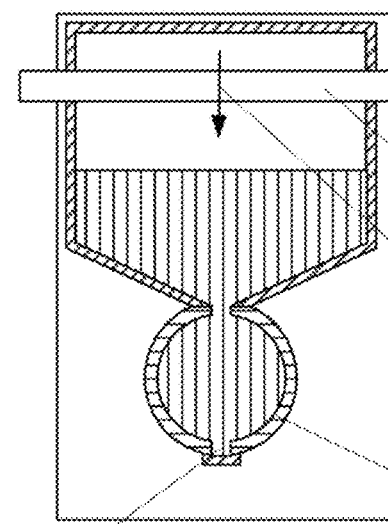

The 3D view of FIG. 58 depicts a method and apparatus for heating or cooking, e.g., toasting or roasting, an ingredient. For illustration, a slice of bread 908 is shown being toasted, but many other ingredients and combinations thereof are possible, e.g., a sandwich (e.g., grilled cheese), a Portobello mushroom cap. In some embodiments the ingredient is initially within a pouch (not shown) and once released from the pouch, descends between heat-resistant, preferably narrow and inexpensive supports 910 (e.g., stainless steel wires or rods, PTFE/fiberglass strips) which may be vertical as shown, horizontal, or at other angles (not all need be at the same angle) and which are preferably disposable (in some embodiments the supports are in the form of continuous wire or strips which are advanced after each use). In some embodiments, in lieu of the ingredients descending into the supports, the supports are incorporated into the pouch and already surround the ingredient, and the walls of the pouch are peeled away. In some embodiments the ingredient descends until it reaches dish 912 below, such that the ingredient is held upright (or at another angle) by the support and dish and at the desired distance from one or more radiation sources, allowing it, in some embodiments, to be heated/cooked from multiple sides. The dish may be position off-center as in the figure, allowing the ingredient to fall onto the dish in a desired (e.g., centered) position once the supports are moved (e.g., sideways) or removed. As shown, radiation sources 914 may be on either side (e.g., IR lamps, heated wires, lasers (which can heat selectively, in a pattern), heated hot, RF or microwave energy generators, etc.) and expose the ingredient, heating or cooking it. In some embodiments the rods form closed loops passing under the ingredient, suspending it, in which case juices in the pouch and produced while heating can fall into a waste bin below (the dish can be introduced beneath the ingredient afterwards). Crumbs or other small pieces of the ingredient that are in the pouch or which shed during processing fall into the dish, which can be disposable (e.g., single-use), rather than contaminating the machine.

In some embodiments, no supports are needed. Once a pouch containing an ingredient is sufficiently opened and pulled away from the ingredient, the ingredient can be retained (e.g. in a vertical orientation) near its top, and exposed to a heat source. For example, a slice of bread may be toasted by peeling the pouch while lowering it vertically until the bottom of the slice rests on a dish or other substrate. The top of the slice can be stabilized by the pouch films or the dispenser squeegees (which may be extended to clamp the slice near its upper surface if needed). Once the bread is toasted, the pouch can be raised by the grasper and removed. The squeegees can be extended above the slice to ensure it doesn't move with the pouch as the pouch is raised.

In some embodiments an ingredient to be heated can be suspended from one or more wires or other filaments (e.g., passing through the ingredient and forming one or more closed loops, or loops with larger, anchored, or supported ends), which may be attached to the pouch (e.g., near its top) so that it is accessible to heating apparatus yet remains in a controlled position. The heating apparatus can include at least one surface brought into contact with the ingredient, or producing infrared radiation, a source of microwave or RF energy, hot gas or liquid, a laser, a steam generator, and others. If the wires are thin and easily broken, raising the pouch as described with the squeegees extended break the wire to allow release of the ingredient.

In some embodiments of the apparatus, ingredients can be heated, grilled, or otherwise cooked in a non-contact fashion (e.g., via indirect contact with one or more heated surfaces, through the pouch walls) as depicted in the cross-sectional elevation views of FIGS. 59(*a*)-(*b*). In FIG. 59(*a*), an ingredient 916 (e.g., a raw, fully-cooked, or partially-cooked hamburger patty or boneless chicken breast) may be contained within a pouch 918 or other retaining structure (the "inner pouch") located inside another pouch 920 or other structure (the "outer pouch") that is fully sealed if needed. Outer pouch 920 may serve to improve barrier properties, further protect the ingredient from the environment, protect inner pouch 918 from damage, and prevent any portion of the ingredient from leaving the pouch. The inner pouch serves to retain the ingredient during further processing once the outer pouch is opened (and in some cases, moved out of the way, so as to provide access). The two pouches may be made of different or the same materials (e.g., a heat-resistant material such as metal foil or parchment paper for the inner pouch, and PET or nylon for the outer pouch). Both pouches may be peelable (e.g., with flaps 922 and 924 as shown). The top portion of the inner pouch may be attached to top seal 926 of the outer pouch (e.g., it may be sealed along with it) and can serve as tether 928, allowing the inner pouch to be suspended from the outer pouch.

In FIG. 59(*b*), the outer pouch has been peeled away around the dispenser's blades 929, which allow the outer pouch's films to be kept well above the inner pouch. Heated plates 930 (which may be ribbed so as to impart grill marks on the ingredient) are shown converging in direction 931 on the sides of the inner pouch, about to contact the ingredient through the inner pouch walls. In some embodiments other methods of heating (e.g., microwave, RF) the ingredient are used. One or more holes may be made in the inner pouch (e.g., in its upper portion) to vent steam, gasses, etc. which may be generated while cooking. A hood or tube provided with an exhaust or vacuum fan may be introduced to withdraw anything issuing from the inner pouch to the outside, pass it through filters, etc.

If the ingredient is cooked by the plates, juices 932 may collect at the bottom of the pouch (this area may be isolated using a discontinuous or porous seal below the ingredient (not shown), such that the ingredient is suspended and the juices collect beneath it) or if the bottom is perforated or porous, or peeled open (plate pressure will retain the ingredient), juices will drip into a waste bin below. Once juices have been captured, a dish can be moved underneath the inner pouch and the pouch peeled open to release the ingredient onto the dish.

In some embodiments the inner pouch may include openings (e.g., open sides, slots or other perforations) which allow for the ingredient within, or portions thereof, to be released at the appropriate time without having to open the pouch. Perforations in the inner pouch can allow liquids, gasses, and/or ingredients or particles smaller than the perforations to enter or exit the inner pouch. For example, potatoes, rice, or pasta may be packaged within an inner pouch having the form of a mesh, then lowered into a container of boiling water for cooking once the outer pouch has been peeled and pulled out of the way.

FIG. 60 depicts a specialized, preferably disposable pouch having flaps 933 for grilling or other forms of processing and cooking in which the pouch is subdivided into multiple compartments. An ingredient 934 such as a burger patty may be cooked entirely within such a pouch without the ingredient or its emissions coming into contact with and contaminating the food preparation apparatus. The pouch may be made primarily of materials such as PET or another polymer and may comprise several compartments: 1) a lower liquid compartment 936 intended to contain drippings 937, and having a peelable/frangible seal 938 along its bottom and an interrupted/discontinuous/liquid permeable and peelable/frangible seal 940 (e.g., produced by heat sealing) or alternative ingredient support along its top; 2) a central ingredient compartment 942 containing the ingredient to be processed, having a heat-resistant material 935 (e.g., metal foil, parchment paper) on one or both sides of the ingredient and peelable/frangible seal 944 along its top which prevents the ingredient or any part thereof (e.g., juices) from entering the filter before seal 944 is opened; and 3) an optional upper filter compartment or region 946 containing and retaining a filter 948, having in some embodiments peelable seal 950 along its top. However, in some embodiments one or more pouch walls or portions thereof may serve as a filter. The filter may comprise at least one porous filter material such as filter paper, metal wool or mesh, cotton, synthetic, nonwoven polyester, viscose, an impregnated material, activated charcoal, or oleophilic materials such as wool (U.S. Pat. No. 7,465,332) or combinations thereof, able to trap and filter out pouch emissions such as gas, vapor, and/or particulates (e.g., grease in all its forms), water vapor, and/or odors so that none of these reach the apparatus, where they can create problems of sanitation and intercontamination and/or interfere with system functions, or escape into the air (unless desired: e.g., the smell of cooking food might be advantageous to release outside the system). The filter material preferably fills the filter compartment and/or is sealed to it so that the only path out of the pouch is to pass through the filter. At the top of the pouch is top seal 952.

The discontinuous (or porous) seal between the liquid and ingredient compartments may be peelable, allowing the ingredient to be removed after cooking. Since the seal is discontinuous, liquids within the ingredient compartment can enter the liquid compartment during cooking.

Some filter materials may be food-safe and be effective wet as well as dry, in which case seal 944—provided to avoid contact between the ingredient and the filter—may be unnecessary. If provided, seal 944 may be peelable or rupturable so it can be opened by the expansion of steam, etc. generated by heating the ingredient and/or liquid in the ingredient and/or liquid compartments, or by compressing one or both of those compartments within the apparatus (especially if they are pre-filled with gas such as air). Once seal 944 has been opened, the filter material should not detach and descend into the ingredient compartment. This can be achieved—assuming the filter material remains a continuous, non-shedding mass—by providing a discontinuous or porous seal below the filter, or by sealing/bonding the filter to at least one pouch wall. If the filter material can shed or otherwise break apart, then it can be contained above or within a material having pores fine enough to hold back the filter material, but allow grease, etc. to pass through.

At the top of the pouch peelable seal 950 is provided in some embodiments (e.g., those in which seal 944 is not used), above which are one or more pre-made holes 954 to vent emissions which have been filtered, allowing them to escape the pouch. Emissions may also vent through a porous upper region of the pouch if provided, or the upper region of the pouch may be pierced within the apparatus (e.g., by one or more needles) to allow venting. Since seal 950 (or seal 944) is peelable/rupturable, other seals in the pouch subject to the same pressure should be stronger. An exhaust duct with fan to generate airflow may be provided in some embodiments near the top of the pouch to collect emissions from the pouch.

As an example of using the pouch of FIG. 60 in an automated cooking process, a burger may be cooked and dispensed according to the following sequence: 1) the machine controller causes the upper portion of the pouch (in some embodiments) to be pierced to establish vent holes; 2) the controller causes the ingredient to be heated (e.g., by bringing heated plates such as those of FIG. 59(*b*) into contact with the ingredient through the pouch wall(s), or via microwave or RF radiation; 3) if seal 2 is provided, then the expansion of gasses produced within the ingredient and liquid compartments opens the seal, and the gasses (and other emissions, if applicable) enter the filter compartment, exiting the pouch via the vent holes or equivalent after being filtered; 4) the controller causes peelable seal 1 to be opened, allowing drippings accumulated in the liquid compartment to be released into a waste bin (or other container, if the drippings are to be retained for another purpose); and 5) the controller moves a dish or other receptacle (which may contain at least one other ingredient such as a bun, pasta, salad greens) below the pouch and then causes the interrupted seal below the ingredient to be peeled and the ingredient released into the dish. In some embodiments the drippings can be captured in compartment 936, e.g., by heat sealing the pouch above it, and the pouch opened above compartment 942 and tilted or inverted to release the ingredient; this is especially feasible if filter 948 is fastened to the pouch; also, seals 938 and 940 need not be openable.

The pouch of FIG. 60 may also be used for steaming an ingredient using microwave, RF, or another heat source, in which case water may be provided in the liquid compartment (e.g., as-packed); the filter material may be chosen so as to trap water vapor, or no filter may be used if the steam can be exhausted effectively, or condensed and drained. A vent hole can be provided for steam release, and/or a peelable portion of the pouch seal can be opened before steaming, or opened by steam pressure. When steam heating, the pouch may be shaken, inverted, or otherwise manipulated to improve uniformity.

Alternatively, in some embodiments, the controller may cause the pouch to be clamped between ingredient and liquid compartments so as to prevent communication between them (and thus leakage from the liquid compartment), or the pouch may be sealed between the compartments (e.g., heat sealed in this region using heated jaws). The controller may then open the pouch at its top or elsewhere (e.g., the pouch may be slit beyond a peelable seal that can be opened) and when tilted or inverted so as to deliver the ingredient to a dish. After this, the controller may cause the pouch to be returned to an upright position, unclamped, and disposed of (e.g., dropped into a waste bin), possibly after sealing the pouch. In some embodiments the pouch of FIG. 60 comprises the inner pouch of a two-pouch system similar to that of FIG. 59(*a*).

FIGS. 61(*a*)-(*f*) depict an alternative heating/cooking (e.g., grilling) approach in which the ingredient is processed but preferably without the food preparation apparatus coming into contact with the ingredient. The apparatus comprises a fixed (or moving) plate 956*a* and a moveable plate 956*b* (one or both of which is heated), disposable plate covers, a dispenser for a peelable pouch, a waste container, and a dish transport, while the materials comprise an ingredient (e.g., beef patty, chicken breast, tofu slice, hash brown potatoes, sausages, steak, shish kabob, fish, Portobello mushroom cap, eggplant slice, pineapple, etc.) to be processed and a pouch to contain the ingredient.

In FIG. 61(*a*), the two plates are shown having inner heated surfaces 958*a*, 958*b*. The plates may be arranged in a "V" shape as shown with the inner surfaces facing one another and separated by an angle A (e.g., greater than zero and less than 180 degrees, with 45-90 degrees being preferred), though other shapes may be used in some embodiments. The plates are spaced to allow the plate covers to be added. The plates may be ribbed on their inner surfaces (e.g., to create grill marks on the ingredient). Prior to this step, the dispenser and pouch may need to move out of the way, e.g., perpendicular to the plane of the figure.

In FIG. 61(*b*), disposable heat-resistant plate covers 960*a, b* (e.g., aluminum foil, parchment paper, optionally coated with a non-stick material (e.g., Reynolds Wrap Non-Stick Foil (Reynolds Consumer Products)), or oiled) have been placed over the plates and the plates have been brought closer together to prevent ingredients from falling in-between the plates. However, for processing certain foods (e.g., frying eggs or making pancakes), the fixed plate may be horizontal and both plates may be flat (not ribbed). The covers may be supplied from separate rolls (not shown)—possibly moving from supply to take-up rolls—may be pre-cut, and may be retained by the plates (e.g., by vacuum applied to holes within the plates) and conform to them (e.g., conform to any ribs, which preferably are curved in only one axis so that the cover material need not stretch (and not bend) in order to conform. For example, the covers may easily conform to ribs shaped like half cylinders extending from the top to the bottom edge of the plate. If not retained by vacuum, etc., the covers (especially for the fixed plate) may simply be held in place temporarily by being continuous with rolls of cover material above the plates, etc.; in such cases, the pressure of a somewhat flowable ingredient (e.g., raw meat) against the covers in FIG. 61(e) will cause the covers to locally conform to the plate to some extent; it may be preferable to have the ingredient not perfectly conform to the shape of the cover, thus allowing channels to remain between ingredient and cover through which drippings can escape. Plates may be preheated or heated only after the ingredient is added.

In FIG. 61(c), a pouch 962 has been peeled open, possibly involving blades 964, allowing ingredient 966 within to fall in direction 968 onto the covered plates. This is preferably done while the plates are above a waste bin, in case there are initial drippings (e.g., raw poultry juices) from the ingredient, and to prepare for drippings produced during processing. The ingredient typically will then settle (e.g., direction 970) onto either one plate or another (it doesn't matter which) as in FIG. 61(d).

In FIG. 61(e), the moveable plate has moved (e.g., through both translation 972 and rotation 974) so as to change the angle of its inner surface to an angle smaller than A (e.g., 0 degrees, making the moveable plate parallel to the fixed plate) and a controlled pressure is applied to the ingredient between the plates to prevent it from sliding off the plates and to make close contact with the ingredient, allowing good heat transfer, and optionally controlling the ingredient shape (e.g., thickness). As the plate moves, its trajectory is controlled so that the gap between plates is not large enough to allow the ingredient to slip through (e.g., a rolling motion) and/or the ingredient is continuously compressed to prevent slippage. While in the configuration shown in FIG. 61(e), the ingredient is processed (e.g., cooked), e.g., while over a waste bin 978, and drippings 976 run down the cover(s) and into the bin, avoiding contact with the plates. A hood or tube provided with an exhaust or vacuum fan may be introduced near/above the plates to withdraw emissions from the ingredients and optionally, pass them through filters, etc.

In FIG. 61(f), the ingredient has been fully processed and most all dripping has ceased. The bin has moved out from under the plates (or the plates and ingredient have moved so no longer over the bin) and under the plates is now dish 980 or other vessel, in this case a dish containing half hamburger bun 982 to which other ingredients (not shown) may already have been added. The moveable plate has moved away from the fixed plate (optionally after rotating so that a portion (e.g., the lower part) of the ingredient is released first while another portion (e.g., the upper part) is clamped, to allow for further draining) in direction 983, allowing the ingredient to slide downwards in direction 984 and onto the dish. If the dish is moved in direction 986 at the same time the ingredient is descending, its position on the dish (or bun) can be well controlled. Or, if the ingredient (e.g., patty) contacts the dish (or other ingredient such as a bun), it can stop due to friction and not move further until the dish translates (e.g., to the right as shown).

In some embodiments the fixed plate inner surface is oriented at a smaller angle to the horizontal such that the ingredient does not slide on its own. The cover over the fixed plate can then be advanced downwards (e.g., using a gripper, rolling it up onto a take-up roller) and serve as a conveyor belt as in FIG. 51, delivering the processed ingredient controllably onto the dish. In some embodiments, unheated plates covered with disposable, moving conveyor films can be used to control the delivery of an ingredient in a similar fashion: the ingredient can be dropped onto the conveyor film from a pouch, and then be controllably delivered by the film. In a last step (not shown), the covers are released (e.g., cut loose from rolls above, if applicable) and fall (possibly with some air assist to dislodge them from the plates) into a waste bin (e.g., which can move back underneath the plates) and the cycle repeated. Or, if the covers are fed from supply rolls, they can be or advanced downwards (e.g., by edge or vacuum grippers, or by applying tension to take-up rolls) such that the plates are now covered by a pristine portion of the covers, ready for the new ingredient to be processed.

Since cooking takes time (e.g., 5-7 minutes for a hamburger patty), in some embodiments the grill plates move out from under the dispenser (e.g., off to the side), allowing the dispenser to dispense other ingredients that may be needed (bun, tomatoes, sauce, etc.). The mechanism that moves the moveable plate as shown in 61(e) need not travel with the plates, since the plate can due to its weight remain in position.

In some embodiments multiple plate pairs forming a ring-shaped carousel are used, such that as the ring rotates from position to position, ingredients are added to plate pairs and then are processed and removed while the ring continues to rotate. Such a system is able to randomly access any plate pair to add an ingredient or allow it to exit (e.g., facilitating different cooking times). However, the ring can also index at a constant speed, with the first ingredients to be added being the first to be removed (first-in, first-out). The plates of FIGS. 61(a)-(f) can also be used with the pouches of FIGS. 59(a)-(b) or FIG. 60. Plates can be inductively heated if desired.

In some embodiments, ingredients 988 skewered on sticks 990 (e.g., disposable wooden sticks as used in shish kabob, yakitori) may be cooked in an automated system in a manner that does not contaminate the apparatus as shown in FIGS. 62(a)-(b), using a rotisserie assembly which comprises at least one actuator 992 (e.g., a motor), releasable clips 995 (one per skewer) which are rotated by the motor (e.g., through a set of meshed gears 994), an actuator which can rotate the assembly about axis 996 (e.g., horizontal) in direction 998, an actuator that can open/close the clips, a heater, and an exhaust system. The cooking process in some embodiments is as follows: 1) package the sticks/ingredients in a pouch with the sticks oriented vertically (i.e., perpendicular to the top seal) as shown in the elevation view of FIG. 62(a) and with upper end 1000 of each stick extending into the upper portion of the pouch (e.g., embedded within peelable seal 2); 2) position a waste bin under the pouch and peel peelable seal 1002 to open the pouch and continue to peel the walls apart (e.g., around blades) including vertical seal regions 1003 as is done for a Type 2B ingredient as the pouch descends, exposing the skewers (the upper end of each skewer is still held within seal 2); 3) position the rotisserie assembly 1005 under the skewers (by moving the dispenser or the assembly) and capture the lower end 1004 of each skewer in a releasable clip; 4) continue to peel the pouch until the skewers are released completely from seal 1006, then remove the pouch (e.g., grasping its top seal 1008); 5) rotate the rotisserie assembly around axis 996 such that the skewers are more horizontal (though preferably with their upper ends lower than their lower ends so that drippings will not move toward the rotisserie assembly) as shown in the plan view of FIG. 62(b); 6) turn on heating element 1010 and exhaust system (not shown) above the skewers while rotating the latter in directions 1012, and cook the ingredients as drippings fall into the waste bin; 7) after dripping from the ingredients and skewers has stopped (at least briefly: machine vision can be used to ascertain the timing of this), introduce a dish 1014 underneath the skewers; 8) release the clips, allowing the skewered ingredients to fall into the dish.

In some embodiments ingredients on skewers can be cooked without transferring the skewers to a rotisserie (e.g., while vertical). Ingredients can be pierced by skewers/wires (e.g., vertical) and fall off of these (or be pushed off) into a dish after cooking, or the skewers may be released such that the ingredients fall into the dish while still on skewers. If the ingredient would normally slide off the wire, this can be prevented initially by ensuring that the ingredient is supported by the dish. Skewers (or wires) can be released by various methods, e.g., their tops may be embedded within the pouch above the compartment holding the ingredient, and once the pouch is peeled in that region, the skewer is released. If skewers do not rotate as they would if using a rotisserie, then heating means such as heating elements can be used—preferably arranged on both sides of the group of skewers (i.e., moved into place after the pouch is peeled)—to evenly cook the ingredients.

In some embodiments, ingredients (e.g., in a pouch or dish (e.g., if metal)) can be heated or cooked using a flameless heater such as SpeedHeat (Sterno Products, Corona, California).

In some embodiments forced convection can be used to heat, cook, toast, and/or re-crisp ingredients (e.g., in a dish), similar to the way an air fryer, convection oven, or halogen oven works. Ingredients can be supported during heating in some embodiments by or one or more wires (e.g., 2 underneath, or 3-4 at different angles) that are fed from supply spools (e.g., to take-up spools, or they can be cut and dropped into a waste bin) such that for each new meal, the wires are advanced to a fresh section. In other embodiments ingredients can be supported while resting on raised ribs on a disposable foil tray (e.g., in which the ingredients are served) which allow air flow beneath the ingredients to heat them on the underside.

Using RF energy (e.g., from Goji Food Solutions Ltd., Hamilton, Bermuda or NXP Semiconductors, Eindhoven, The Netherlands) ingredients can in some embodiments be heated or cooked while within pouches or after being dispensed into dishes. This can be done selectively/differentially, thus for example all ingredients to be served can be dispensed onto a dish and then only some of them can be heated, and ingredients can be heated with different temperatures and times. This can avoid the need to dispense some ingredients, heat them, and then dispense other ingredients which are not to be heated. Precisely-beamed RF energy can be used to heat an ingredient inside a pouch while it is being transported to the dispenser, or to selectively heat one or more ingredients within a dish while the dish is still under the dispenser (the latter may also be achieved with other heating methods such as microwave). RF energy can also be used to selectively heat water in a pouch so as to steam an ingredient without directly cooking it.

Other methods of heating and cooking ingredients include resistive high-frequency heating, in which the skin effect is exploited to sear/crisp an ingredient, and variable peak wavelength cooking (Brava Home, California, US patent application US20170223774A1).

In some embodiments pouches or dishes containing ingredients are placed in microwave/RF chambers to be heated for pouches or dishes. Such chambers may be designed to be loaded or unloaded from the top, side, or bottom, and generally will include a door or other barrier. In the case of RF chambers, to the extent that RF energy can be precisely beamed, a fully-enclosed chamber may be unnecessary.

An ingredient may be heated or cooked by more than one method, either sequentially or simultaneously. For example, a chicken breast may be heated on its underside by placing it into a disposable foil dish in contact (e.g., enhanced by vacuum) with a heated chuck. Meanwhile, a radiant heater (e.g., a quartz infrared heat lamp) above the dish may be used to heat its upper surface. Thus, one side is heated by conduction while the other side is heated by radiation (of if the upper surface is exposed to hot air, then by convection).

In some embodiments a pouch design with multiple compartments may be used for steaming an ingredient: water may be contained in the lower compartment and heated (e.g., by direct application of microwave or RF energy, or by contact with a heated surface) and an ingredient to be steam in the upper compartment. Steam produced by the water rises through the channels into the upper chamber. Once the steaming is completed, the pouch can be partially peeled so as to release the water into a waste bin, etc., after which the ingredient can be released into a dish by peeling the pouch further.

In some embodiments, ingredients may be boiled, braised, soaked (e.g., beans), have their flavor contribute to a broth, etc. by using a similar two-compartment pouch. The pouch contains liquid (e.g., water) which fills both the lower compartment and at least a portion of the upper compartment, while the latter contains the ingredients, which are at least partially immersed. The liquid can be introduced during the packaging process, or later (e.g., by piercing the pouch with a needle). In some situations (e.g., boiling pasta or a grain), the goal is to retain the ingredients in the upper compartment and dispose of or separately utilize the liquid, while in other situations (e.g., making soup), the goal is to retain the liquid while disposing of or separately utilizing the ingredients (e.g., chicken, bay leaves, a tea bag) in the upper compartment, and in some situations both the liquid and ingredients are to be retained but need to be dispensed into different vessels. After cooking, the lower compartment is opened, releasing the liquid (e.g., into a waste bin, bowl, or secondary pouch) after which the upper compartment may be opened to release its contents (if these contents are to be disposed of, there may be no need to first release them, however).

Pouches (e.g., polymer) may comprise conductive (e.g., metal foil or wire) patterns of electrodes/antennas which provide for resistive (DC/low-frequency) or RF/dielectric (high frequency) heating of an ingredient within. If intimate contact between the conductive patterns and the ingredient is desired, the pouch can be vacuum packed. To facilitate recycling, the conductive patterns may be separable from other portions of the pouch (e.g., may be sandwiched between the ingredient and the polymer pouch walls).

In some embodiments an ingredient in a pouch may only be partially cooked (e.g., seared) by methods and apparatus such as those described above.

If cooking in an open vessel, steam, splatter, oil droplets, etc. may rise up and contaminate the dispenser and other equipment. To minimize the risk of this, in some embodiments air flow (e.g., generated by one or more air knives or vacuum plenums) is arranged to flow across the vessel (e.g., horizontally), such that such contaminants are diverted from their normal trajectories and rarely if even end up on surfaces they would contaminate.

Figure 63A:
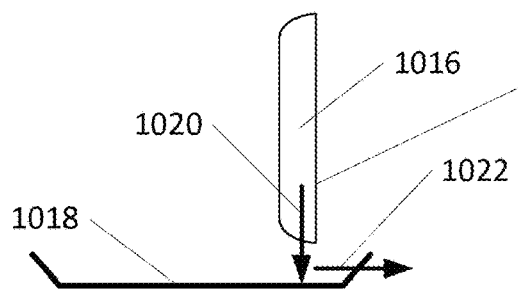
FIGS. 63(a)-(f) show steps in a process for preparing a sandwich.
Figure 63B:
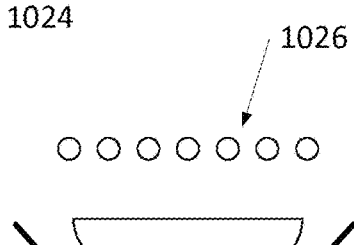
Figure 63C:
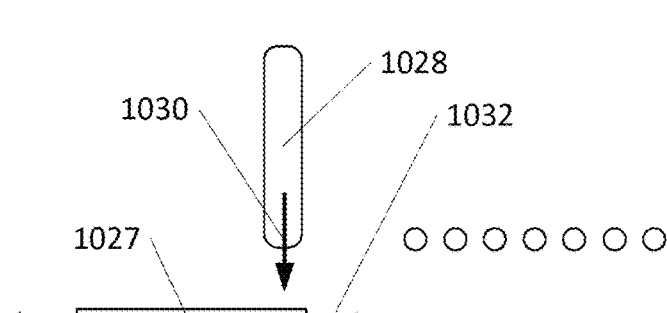
Figure 63D:
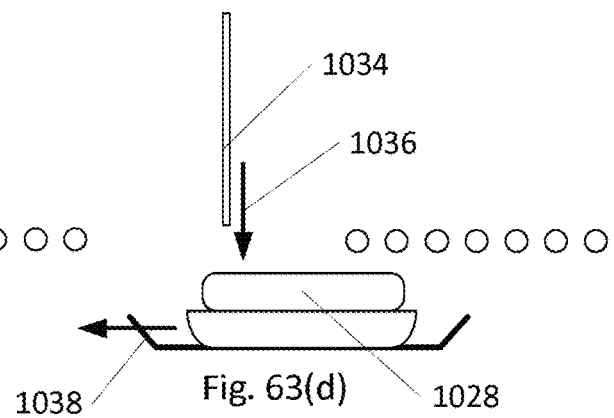
Figure 63E:
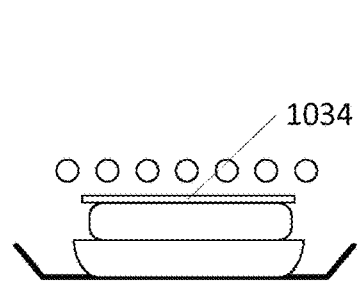
Figure 63F:
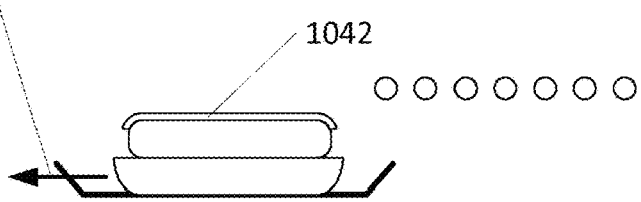

FIGS. 63(a)-(f) are cross-sectional elevation views of a sequence for preparing an egg sandwich with melted cheese on a toasted bagel. In FIG. 63(a), a bagel half 1016 (e.g., pre-sliced, or sliced as it exits the pouch) is released from a pouch toward a dish 1018 (heat tolerant, e.g., aluminum foil). The bagel half descends in direction 1020 and contacts the dish, which in some embodiments is moving at the time of contact in direction 1022; this causes the bagel to rotate in the desired direction, continuing to descend until it lies flat in the dish with the cut surface 1024 facing upwards. Preferably the second half of the bagel (not shown) is similarly dispensed onto the dish in another, non-overlapping location with its cut surface also facing upwards, so that both halves of the bagel can be toasted simultaneously. In FIG. 63(b) the dish has moved underneath one or more heating elements 1026 (e.g., halogen, resistively-heated nichrome wire, possibly with a fan to provide air flow) and the bagel is toasted, or equivalently, the element may move over the dish. In FIG. 63(c), the dish with toasted bagel half 1027 has moved out from under the element and a cooked, heated egg 1028 (e.g., steamed, sous vide, fried, possibly in a circular format) is dispensed from the pouch, moving in direction 1030, e.g., as the dish moves in direction 1032 to one side such that the egg is compelled to lie flat and roughly centered on one bagel half. In FIG. 63(d), cheese 1034 has been dispensed and moves in direction 1036 on top of the egg, e.g., as the dish moves in direction 1038, such that the cheese lies on top of the egg and is roughly centered (if desired). Prior to adding cheese, Canadian bacon, etc. may be similarly dispensed. In FIG. 63(e), the dish is moved under the element and the cheese is melted. Lastly, in FIG. 63(f), the dish moves out from under the heating element in direction 1040 with melted cheese 1042, ready to serve. A similar approach can be used to a) prepare a toasted bagel on which smoked salmon, cream cheese, tomato, etc. is dispensed; b) assemble a pizza from various ingredients and then cook it prior to serving.

In some embodiments ingredients may be heated, cooked, toasted, crisped, etc. while inside a heat-resistant pouch, or after transfer to a sleeve that is heat-resistant and preferably, disposable. Materials which can be used include metal foil, metal mesh, PET, fiberglass, and PTFE-coated fiberglass.

Ingredients, especially those in pouches containing little or no air, can be heated in-pouch by immersion into hot water, or using steam. Prior to opening the pouch, if desired the outside of the pouch can be dried by hot air (e.g., via an air knife, shaking, centrifugation, drying similar to that of an Airblade (Dyson, Malmesbury, Wiltshire, United Kingdom), contact with an absorbent material, etc. To minimize the need for drying, the pouch exterior can have a hydrophobic coating, or be surrounded by another pouch that isolates it from water or steam. In the case of hot water, the first (ingredient-containing) pouch can be lowered into a second pouch surrounded by hot water whose bottom is preferably anchored so it remains submerged. Hydrostatic pressure will push out air between the two pouches, providing intimate contact and good thermal contact between the first pouch and the water. To facilitate placing the first pouch inside the second, the latter can be lifted out of the water temporarily, or water can be introduced afterwards; actuated tabs may also help open the second pouch.

Other methods of heating and cooking that may be used include cooking by electroporation and pulsed ohmic heating (IXL Netherlands, Schalkwijk, The Netherlands); high intensity focused ultrasound energy (known to the medical art); in-pouch vigorous agitation, manipulation, tumbling, etc.; and injecting steam or hot water into the pouch (and optionally tumbling).

Other Processing

Some foods may benefit (at least aesthetically) from having an ingredient introduced by swirling, mixing, etc. once at least another ingredient has been introduced into a dish or other vessel. For example, a soup can be dispensed into a bowl (preferably first adding any solid ingredients to the bowl to avoid splashing) and then a cream, yogurt, etc. can be dispensed onto the surface and swirled into the soup using a disposable tool such as a plastic or wood stick held in a holder (e.g., clamped by a solenoid). The bowl can be moved under the tool (or vice versa) with two axes of motion to achieve the desired swirl, etc. Once the bowl has moved away (e.g., to be served), the tool can be released into a waste bin below. A new stick can be delivered (e.g., from a magazine) into the holder when needed. A similar approach using a disposable tool can be exploited for mixing, blending, stirring, breaking up/dispersing, etc. ingredients within a vessel (e.g., as part of the process of preparing a meal).

If at least one compartment of a pouch contains a gas such as air or a modified atmosphere (to preserve freshness), or a flowable liquid, peelable or burstable seals can be opened in some embodiments by applying pressure to the compartment. The seal can be between the compartment and the outside, or can be an internal seal between multiple compartments within the pouch. Once an internal seal is opened, the contents of multiple compartments may be combined (e.g. mixed, stirred) and may interact. Inter-mixing can be encouraged by shaking or vibrating the pouch, by tilting it (e.g., multiple times) or tumbling it, by pressing on the pouch or rolling/dragging across it using one or more rollers or other shapes, etc. In some embodiments, compartments with items to be combined are not adjacent to one another, but are separated by a compartment intended for mixing. Examples of ingredients that can be combined in a pouch are flour and water used to make a roll or pizza crust, salad greens and salad dressing, eggs and vegetables used to cook a frittata, etc.

Pouch Disposal

In some embodiments it is preferable to dispose of a pouch by dropping it from the grasper into a bin (e.g., refrigerated) below the dispenser than to lift it out of the dispenser and move it to a bin. Dropping it is quicker and minimizes the risk of an ingredient dripping from or falling off of an open pouch during transport and onto the machine, contaminating it. Before dropping the pouch, it may be lowered until closer to the bin (or partway inside of it) to make sure that it goes entirely into the bin (and air resistance or currents do not disturb this).

If a bin is located below the dispenser and below the dish, the dish can move out of the way (e.g., along one or more tracks that do not obscure the bin), and then return to being under the dispenser. The bin may also be located alongside the dish, and optionally move along with it. The bin can also be used to receive undesired contents of pouches (unwanted amount of ingredient, liquid), drippings from cooking, etc. More than one bin can be used in some embodiments, e.g., one for relatively empty pouches, one for liquids and solid waste (unwanted amounts of ingredients). In the system shown in FIG. 29(b) of the 074 and 253 filings, multiple bins can be provided, one below each dispenser.

Figures 64A, 64B, 64C:
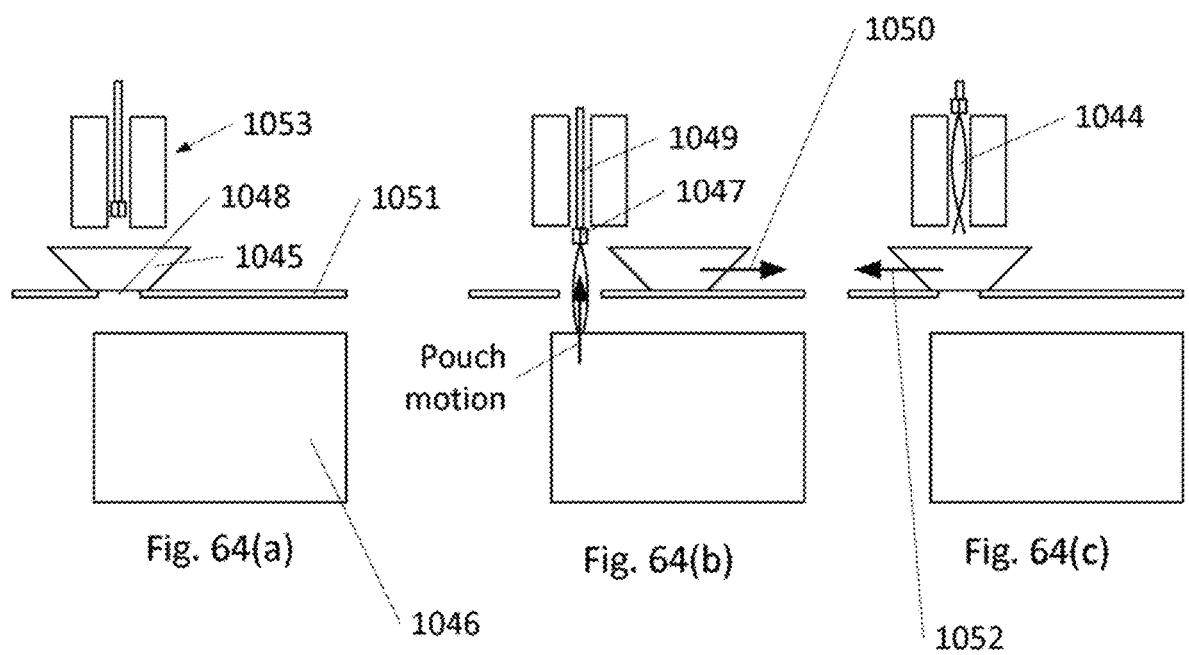
FIGS. 64(a)-(c) depict steps in fetching a pouch for dispensing.

FIGS. 64(a)-(c) depict in elevation view an arrangement in which pouches 1044 are stored underneath dish 1045 and dispense from pouch supply 1046. In such an arrangement, the manipulator comprising gripper 1047 and arm 1049 may fetch a pouch from the supply through slot 1048 in a plate 1051 that supports the dish once the dish has moved out of the way in direction 1050 as in FIG. 64(*b*). Once the pouch has been lifted into dispenser 1053 as in FIG. 64(*c*), the dish can return in direction 1052 to its position beneath the dispenser, and have the pouch contents emptied into it. The dish can be moved by a linear stage, etc.

Dish Transport and Delivery

The delivery box described in the 074 and 253 filings can also serve as a heater such as a microwave oven: a dish can enter, be heated, and if any additional ingredients need to be added, it can leave the delivery box, move to one or more dispensers, and then return to the box for delivery to the customer. The box or a similar box may incorporate a double door/airlock and be positively pressurized and/or have high velocity airflow to prevent the entrance of insects or other vermin. Machine vision may be used to verify that no undesired "visitors" have entered the box before it is opened to the inside of the machine. Delivery boxes may be stacked vertically and completed meals introduced in one boxes using an elevator-type device.

In some embodiments, rather than have dishes move in a sequential fashion as in FIG. 29(b) of the 074 and 253 filings, dishes may be moved by the system controller to and from dispensers independent of one another on "smart" carriers in a random-access (vs. serial) fashion. Such carriers can bring dishes only to the dispensers (or other subsystems, such as heaters) needed for a particular customer recipe/order, and in the required sequence. Carriers may be wheeled or slide, driven by motors, linear motors (e.g., Sawyer-effect 2-axis linear motors), etc. In some embodiments one or more robots (Cartesian, SCARA, etc.) can manipulate the carriers (e.g., from below using magnets) in a pick and place fashion. In systems with independently-moving bowls, the controller must coordinate the motion of the bowls to avoid any collisions, and holes can be provided below dispensers that provide access to one or more waste bins. The carrier paths can be designed so that any portion of the carrier (e.g., wheels) that might fall into a hole avoids it instead.

To determine how much of the contents of a pouch are dispensed, the dispenser may have a built-in weighing capability similar to that of FIG. 22(d) of the 074 and 253 filings, by incorporating a load cell or spring/linear scale (which also provides compliance/tension control) into the assembly above the grasper, and/or the dish carrier may incorporate weighing capability (e.g., load cell).

Restocking

Systems for automated food preparation, especially if deployed in public spaces, can be restocked manually but also by robotic, remotely-controlled or autonomous resupply vehicles. For example, a system can be located out of doors and resupplied by a rolling delivery vehicle, or by an air vehicle (e.g., quadcopter) or boat-like vehicle that delivers individual pouches, groups of pouches, shelves filled with pouches, etc. For example, a quadcopter can drop pouches into a funnel or net one at a time, or feed a pouch chain to an outdoor system, without even needing to land. Systems that are indoors, if located adjacent to an exterior wall, may be restocked by a delivery vehicle that accesses the system through a hole (e.g., closeable) in the wall. To minimize the size of this hole, individual pouches may be used for restocking, or pouch chains (which may be separated using perforations, scoring, or by cutting within the system, if the system uses individual pouches rather than chains). If individual pouches are delivered to the system, it can identify them and place them into shelf cubbies or other storage units using the same manipulator it uses to fetch them later (e.g., using paddle 332); this can be done when the system is idle (e.g., early morning). Whether resupplied by a human or a machine, it is desirable that the resupply process take as little time as possible, so that many other systems can be resupplied on the same day.

Automated shuttles/drones (airborne, rolling on the ground, sailing on water) can bring ingredients needed by one machine to another machine, and to/from commissaries or other locations where ingredients are prepared and/or packaged. For example, an ingredient that is in demand (generally, or as the result of at least one pre-order) at one machine but less in demand at another machine can be moved from one to another by an autonomous device.

In machines having shelves comprised of modules, or using pouch boxes, since modules and boxes can be removed independently, then the machine in some embodiments can 'defragment' storage so that it keeps pouches in as few modules or boxes as possible, thus freeing others (or filling them with pouches to be removed due to them not selling, being close to expiration, etc.) to be removed and replaced with modules or boxes with new/fresher/more pouches. Defragging can also facilitate/accelerate pouch fetching by the grasper, and machine servicing tasks such as loading and unloading ingredients.

The MEP may be part of the shelving unit: an area reserved for pouches that are soon to be used for one or more meals. Once an order is placed but it is not yet time to prepare it, the machine can create/allocate a MEP for that particular order. Space may be provided for multiple, simultaneous MEPs.

In some embodiments the machine may be restocked by merely placing inside the machine within reach of the grasper a box, case, etc. containing pouches, which may be randomly piled inside. The controller can then direct the grasper to fetch each pouch from the box and using a scanner (e.g., barcode) and/or machine vision, identify each pouch, verify it and its contents are acceptable, and then place it in a known location within the shelf or pouch box. This operation can be done during idle times, when the machine is not preparing a meal for a customer.

Once a shelf module has been inserted or replaced, the codes on all of its pouches can be scanned, after which it is ready to use. If, however, it is known to the machine generally in which region of the machine to find a particular ingredient, the machine may select a pouch within that region, and then read the code to verify the identify, expiration date, etc. of the ingredient.

If a pouch has an ingredient that is only partially consumed (e.g., a multi-compartment pouch, or a pouch that has been resealed), it can be replaced in the shelf or box. If the pouch has been resealed, a new expiration date can be established by the machine controller based on ingredient data and in recognition that the pouch may have been packaged under vacuum or a modified atmosphere, and these conditions may no longer exist in the resealed pouch (although in some embodiments the machine may vacuum reseal the pouch after evacuating air inside and/or backfilling with a modified atmosphere gas).

Cooking Vessels

Vessels with detachable liners such as those shown in FIGS. 10, 20, and 31 of the 074 and 253 filings are provided with vacuum in some embodiments since in many cases if vacuum is not applied between the wall of a heated vessel and its liner, thermal conduction between vessel and liner can be poor due to the insulating layer of air between them, reducing efficiency, slowing heating and cooling, and limiting the temperature that the liner can practically attain. The liner is preferably thin (e.g., 0.0005-0.0050" inch) and made of low-cost, heat-stable and food-compatible materials such as aluminum foil, anodized aluminum foil, or stainless-steel foil) so that it can readily be disposed of. Due to its small thickness, it might normally be fragile were it not held in intimate contact with the vessel wall through the use of vacuum, the wall thus also providing mechanical support. Liners (or if no liner is used, then vessels without liners), may be provided with small openings (e.g., widely spaced, or contiguous, as with a screen or mesh) or with a membrane or porous/filter material. Such liners may be used for procedures such as frying that may generate steam or gasses which should be allowed to escape. Openings can be made using laser or mechanical drilling, by stamping, by fixing a mesh over a larger hole, etc. While allowing steam and/or gasses to escape, such a liner/vessel can retain droplets such as oil which should be keep inside the cooking environment to avoid contamination of the system.

In some embodiments rather than vacuum between vessel and liner, a thermally-conductive liquid, gel, or soft elastomer may be used. Flowable materials such as water (e.g., under pressure to avoid steam evolution, possibly superheated), or a high-temperature stable working fluid may also be introduced into the space between vessel and liner in order to heat or cool the liner. In some embodiments the volume between the vessel wall and liner can behave similar to a heat pipe in which heat is transferred from vessel to liner via an evaporating liquid such as water, which then condenses on the liner, heating it; condensed liquid then returns to the vessel surface and is evaporated again. In some embodiments liners may be heated using jets of fluid (e.g., steam or hot air jets), or by using inductive heating (e.g., using a liner containing a ferromagnetic or relatively low electrical conductivity material).

In FIG. 20(a) of the 074 and 253 filings, a "clamshell"-like arrangement of vessels is shown. The bases depicted may incorporate channels for vacuum which can be communicated to the lower base through a rotating vacuum fitting, and to the upper base via such a fitting or flexible tubing.

To reduce the possibility of adhesion to a liner such as liner 678 (FIGS. 20(a)-(j) of the 074 and 253 filings), ingredients which tend to adhere if completely raw (e.g., meat) may be cooked partially, at least on their surfaces. In some embodiments a single-use scraper (e.g., plastic, or plastic with a metal edge) can be provided to help detach adherent ingredients. Vessels such as those in FIGS. 31(a)-(l) of the 074 and 253 filings may contain actively or passively driven elements (e.g., a washable, passively driven weighted scraper attached to a pivot) which serve to mix or scrape ingredients (to prevent sticking, in the case of raw meats or eggs, etc.), e.g. while the vessel is rotating.

With respect to liners such as 678, in cases in which heat is supplied by other means (e.g., radiation, convection) and not by conduction, a heat source adjacent the liner and a vacuum to provide close contact between heat source and liner is not needed.

Miscellaneous

In some embodiments the dish or cooking vessel into which ingredients are dispensed already has one (or more, if mutually non-interacting) ingredient in it, such that the dish serves as a food storage device (in lieu of a pouch) as well. As an example, an acai bowl might be prepared using a bowl in which refrigerated/frozen acai is already packed into the bottom of the bowl; to this could then be added various topping. Ingredients in the dish can be sealed within by a peelable film, etc. This approach may be useful for example when it is difficult to dispense the ingredient into a dish in a way that a) delivers it entirely into the dish; and/or b) has it properly placed or shaped within the dish.

The system controller can prevent food sales from the machine if temperature ever rises above a particular level for too long a time, and notify the appropriate personnel.

The machine can include an uninterruptable power supply to prepare for possible power outages and to allow the machine to be temporarily disconnected for transport without first removing the ingredients within. While operating on battery, machine functions other than refrigeration and critical sensing, data logging, and communication (with parties responsible for tending to the machine) may be disabled. The system may include a variety of temperature sensors, such as those which monitor ingredient temperatures. If monitored temperatures become too high or too low (signaling possible freezing) for too long (e.g., due to malfunction or power loss), the affected ingredients can be identified and disposed of if needed.

In some embodiments the machine can prepare frozen desserts (e.g., ice cream, sorbet, custard, yogurt) as follows: The dessert mix in liquid form can be initially within a pouch. Upon opening the pouch, the mix can be dispensed onto a cold plate (e.g., covered by a thin, disposable film which may be held tightly against the surface by vacuum) and a disposable or cleanable spatula can be used to scrape the frozen mix off the plate and into a bowl for Thai-style rolled ice cream, etc. Or, the mix can be dispensed onto a disposable film and the film manipulated (e.g., bent, passed around a blade as in FIG. 8(*k*)) such that the frozen treat peels off and drops into a bowl, cone, etc.

The machine can adapt the meals which are offered according to ingredients available or which should be consumed first (based on expected expiration and/or general or machine/location-specific usage patterns), and offer substitutions to the customer, and can also refer customers directly or through a mobile app or web site to another nearby machine if what they want is not available.

"On the side" ingredients that are always delivered directly in a pouch to a customer can be contained in pouches that are intended for customer use (e.g., size, shape, graphics, method of opening) rather than for machine use, and may be stored within the machine in the same shelf, pouch box, etc. in some embodiments, or in other storage locations if not compatible with such storage. In some embodiments a pouch intended for machine use but containing an ingredient a customer requests to be "on the side" can be delivered (e.g., dropping the pouch down a chute) after a trimming operation which removes portions of the pouch (e.g. reduces the size of flaps) that are not needed by the customer or would be suboptimal.

The machine can include a "black box" comprising a data recorder that records images from the machine camera of every pouch before its contents are dispensed, every dish before it is served, pouch bar codes, and other photos (possibly photos of people in the vicinity of the machine, to help solve vandalism crimes), as well as data collected by various sensors. This data can be transmitted as needed (for pouches that a machine vision system determines are questionable) and/or periodically.

When dispensing an ingredient into a dish into wish at least one other ingredient has already been dispensed, it can be advantageous to determine the configuration (e.g., 2D or 3D size, shape, location, orientation) of previously-dispensed ingredients, as this can be difficult to predict since the exact configuration of an ingredient may depend on the conditions under which it was dispensed, interaction with other ingredients and with the dish or other vessel, movement (e.g., slumping) of the ingredient one dispensed, etc. If the configuration can be determined, then the deposition of subsequent ingredients can be adjusted to achieve the desired outcome. For example, in preparing a burrito bowl or salad, it may be desirable to dispense an ingredient in a specific region of the dish offering more space for that ingredient, rather than pile one ingredient upon another. In another example, when making a sandwich, accurately determining the configuration of a previously-dispensed bun or bread slice can allow a filling (e.g., tuna salad, cheese slice), condiment (e.g., mustard), or other ingredient to be dispensed correctly, by adjusting the position of the dish beneath the dispenser before and/or during the dispensing of the ingredient. With this approach, a cooked egg can be well-centered on a bagel, etc. The configuration of pre-dispensed ingredients—effectively creating a 2D or 3D map of what is in the dish, which may include grayscale or color information—can be determined using sensors known to the art such as cameras, 3D scanners, stereo cameras, time-of-flight sensors, and laser distance sensors (collectively, "scanners" in a process of "scanning"). Scanning may be done before an ingredient is dispensed and/or while an ingredient is being dispensed, since the configuration may change dynamically during dispensing (e.g., a previous ingredient may be moved by a new ingredient), and the dispensing may advantageously be made into a closed-loop process based on real-time sensing and feedback. Feedback may adaptively influence the apparatus to vary location and orientation of a dish, adjust the order in which ingredients are dispensed, modify the dispensing parameters such as squeezing speeds, etc. If scanning is before dispensing, then in some embodiments the dish can move to a position where it can be scanned without obstruction by the dispenser, etc. If scanning is during dispensing, then if impractical to scan from one vantage point due to obstructions, scans can be taken from multiple vantage points and the results combined. In some embodiments a clear or translucent dish (e.g., with a light above the dish) may be used to allow scanning from below. In some embodiments a scanner is attached to the dispenser or above the dispenser. Scanners may also be used to scan the final meal as prepared, for purposes of documentation, publicity, and quality control.

FIG. 65 depicts a 3D view of a pouch that like FIG. 28(d), includes peelable pleats or folds to increase pouch capacity and/or reduce pouch distortion due to the contents. In FIG. 65, however, the folds are vertical and are formed between films 1054a and 1054b which are folded in regions 1056a and 1056b and openably (e.g., peelably) sealed in regions 1058a and 1058b. Near the bottom of the pouch is shown in region 2060 can be an openable chevron seal 1060 and below that, flaps 1062.

To produce a folded food product such as a burrito, a set of rotating plates may be used sequentially (similar in some respects to the plates of U.S. Pat. No. 5,912,035A) to fold a tortilla, etc. once one or more ingredients has been dispensed onto it. Each plate can be independently actuated, and the set of plates can be stationery (e.g., beneath a dispenser).

To prepare a taco, a dish (e.g., molded pulp) having a shape (e.g., letter "U") that can support a crisp taco shell with its opening facing upwards or at an angle can be used, with ingredients dispensed directly into the shell. To prepare a taco using a soft tortilla, a dish having a shape (e.g., wide letter "V") that keeps the tortilla mostly open but slightly folded may be similarly used.

Systems for automated food preparation may include frying subsystems such as air fryers (optionally having screens which confine the ingredient to be fried to a limited area while air circulates, avoiding system contamination) and deep fat fryers (e.g., with automated oil exchange and/or filtration/recycling).

Systems may be fully, partially, or not refrigerated depending on design, ingredients to be stored, and desired shelf life. In some embodiments systems are designed so some or all storage devices are refrigerated, but not the rest of the system, which can be more efficient and reduce system cost. For example, a storage device for pouches might be in the form of a heavily-insulated chamber (e.g., standard insulation, aerogel, vacuum), and a fetching mechanism (e.g., grasper 274) may be within the chamber, along with motion stages. The mechanism can then deliver a pouch requested by the controller to a port in the chamber (e.g., a revolving door which can bring the pouch from inside to outside while not opening the chamber) where another mechanism can take over.

Filling/sealing and weighing equipment known to the art of flexible packaging is difficult to use for loading many large solid ingredients (e.g., a slice of cheese or bread) into a pouch similar to FIG. 1. A very low profile (low height) conveyor at a small angle to the horizontal may be used, however. It can be inserted into the pouch as the pouch is held open and convey the ingredient into the pouch. As the ingredient begins to exit the conveyor and enter the pouch, the conveyor can be withdrawn at the same speed the ingredient is conveyed.

Food can be prepared for a customer in one of a multiplicity of automated machines/kiosks depending on the customer's preferred machine location and in a way that minimizes waste. An algorithm for facilitating the ordering process may include the following steps: 1) input the preferred location; 2) search the current ingredient inventory and expiration dates of the machine at that location; 3) compare packages having the soonest-to-expire ingredients with a recipe database and determine which recipes to offer; 4) offer recipes and solicit input; 5) if an offer is selected, prepare the food, or, if an offer is not selected, then offer additional recipes which require ingredients that will take longer to expire, and if an offer is selected, prepare the food.

Food can be prepared for a customer so that it is ready at exactly the time requested, without any wait, using an algorithm that may include the following steps: 1) input the customer's recipe selection and preferred machine location; 2) calculate the preparation time for the recipe (this can be done with great accuracy if dispensing times for given ingredients are programmed or measured in advance, if grasping/travel time for a given pouch to reach the dispenser, for heating, etc., is taken into account); 3) determine available time slots for the particular machine that accommodate the preparation time; 4) offer available pickup times to the customer and solicit input; 5) once a pickup time is selected, allocate the time slot accordingly to the customer's order; 6) monitor the customer interface for possible change requests; 7) if a change request is made, repeat beginning at step 3; 8) when the time slot start time arrives, start preparing the food. If the customer provides her location (e.g., via GPS) and possibly her mode of transportation to the machine, the algorithm can further suppress any pickup times that are too soon, and optionally modify the pickup time, automatically selecting another available time slot, if customer location and speed indications suggest that the customer will not arrive within a few minutes after her planned pickup time.

An algorithm can be used that inputs a customer's food selection, location (e.g., GPS coordinates), and desired distance, then executes steps that may include: 1) determine which machines within the specified distance have the required ingredients for the selection, optionally prioritizing those having ingredients closer to expiration; 2) calculate preparation time and identify available time slots for each nearby machine; 3) display a choice of machines and available pickup times for each machine, e.g., in order of increasing distance; 4) solicit and receive an order; 5) add the order to the selected time slot for the selected machine.

In some embodiments pouches may be made in which one flap is longer than the other, thus allowing one flap to be separated from another more easily. Such pouches may be made two across from film webs as shown in FIGS. 66(*a*)-(*b*). In the elevation view of FIG. 66(*a*), the two webs 1064 and 1066 have been offset laterally and then sealed on both sides of cutting line 1068 to form two columns of pouches. In FIG. 66(*b*), the pouches have been cut apart along line 1068, producing two columns of pouches each of which has long flaps 1070, short flaps 1072, and top openings 1074.

Digital recipes used by automated food preparation systems can include ordinary recipe information regarding ingredients and quantities (number of pouches or pouch compartments, or fraction of a single compartment (though often pouches will have the pre-measured weight or volume required for the recipe, taking into account the number of servings)), but may also include: information required for dish/dispenser coordinated motion; locations and orientations of ingredients to be deposited within a receptacle; stirring or other manipulations to be performed within a receptacle; in-pouch processes to be performed, and associated parameters; heating and cooking (in-pouch, in-vessel, etc.) and associated parameters; type of dish for serving, and whether a lid is provided; whether to supply utensils with food, and which kind; whether the pouch needs to be drained of liquid (e.g., by partially opening it and allowing liquid to drain into a waste container) before dispensing, and for how long; for grilling, time, temperature, and plate pressure; for stir-frying or other tumble-cooking operations, the motion profile (displacement, speed, acceleration, type of motion, draining, etc.); which ingredients should be by default served 'on the side', etc.

In some embodiments it is desirable to dispense an flowable ingredient in a shape other than that which might be obtained by simply compressing the pouch and allowing the ingredient to issue through the opening at the bottom of the pouch compartment. For example, it can be more aesthetic to dispense such an ingredient in a spherical shape, suggesting that it was scooped out of a container, as is commonly done for ice cream, etc. While many other shapes are possible, a spherical shape will be assumed below. Methods of achieving such a shape include that of cross-sectional elevation view FIG. 67, in which the pouch comprises one or more pre-formed (e.g., thermoformed) cavities—here, hemispherical—within at least one (here, two) of films 1076*a* and 1076*b* used to make the pouch. Ingredient 1078 is introduced into the cavities while loading the pouch and the pouch is sealed with an openable seal that extends from the bottom to approximately the top (line 1080) of the cavities. Flaps 1082 may be provided as usual, allowing the pouch to be opened (e.g., peeled open) up to line 1080 to release the item. Preferably the item is not too adherent to the inner cavity surface and leaves little residue behind; the inner surface may comprise a low surface energy material to assist with release.

FIG. 68(*a*) depicts an elevation view of pouch 1084 capable of multiple cycles of dispensing a molded flowable ingredient or other substance. The pouch comprises reservoir region 1086, cavity region 1088, and flap region 1090. Openable seals 1087 are used for region 1088. Initially, ingredient 1092 has been loaded in regions 1086 and 1088, which communicate through inlet 1094. Thus, a pre-molded amount of ingredient 1092 is in the cavity, ready to dispense as in FIG. 67 by opening the pouch up through line 1096 in FIG. 68(*b*). FIGS. 68(*b*)-(*f*) depict a sequence for dispensing and then re-molding the ingredient multiple times. In FIG. 68(*b*), flaps 1090 have been separated and the pouch has been opened (not shown) up to line 1096, resulting in the ejection of molded ingredient 1092 as is shown in FIG. 68(*c*). To mold additional quantities of ingredient, the pouch films forming the cavity are brought together again and seal 1087 is closed. If seal 1087 is resealable, it may spontaneously reseal and have adequate strength for molding. However, external clamps 1098 in FIG. 68(*d*) (one 2-part clamp on each side of the pouch) can be used to reseal the cavity (briefly, or if the seal is not resealable, during the molding process of FIG. 68(*f*)) as shown in FIG. 68(*e*), where the clamps have engaged the pouch and surround the cavity. The shape of the clamp includes two gaps 1099 to allow ingredient to flow into the cavity at the top and to allow air in the cavity to be forced out at the bottom. In FIG. 68(*f*), region 1086 has been compressed (e.g., by squeegee 1100 moving in direction 1102) to force additional ingredient into the cavity, filling it while forcing air out in region 1104. The clamps can then be removed (if still in place) and the cycle repeats, returning to the step of FIG. 68(*b*) in which the newly-molded ingredient is released from the pouch and so on.

A third approach to controlling the shape of a flowable ingredient during dispensing is to vary the shape and/or size of the pouch outlet during the dispensing process. For example, to deposit an ingredient in a spherical shape, the outlet can be initially small while the "south pole" of the sphere issues from the outlet, then gradually widen until reaching a maximum diameter at the "equator", then gradually shrink again until the "north pole" is finally deposited. Such changes in size can be implemented using an actuated, adjustable hole size version of a casing (see casing 726 of the 074 and 253 filings)—e.g., a mechanical iris—which surrounds the pouch outlet and forces the flexible pouch walls to form a smaller size opening (or stretches the walls if the material is elastic), thereby varying the instantaneous cross section according to commands from the system controller.

Ramifications

In some embodiments sensing may be used to detect for example when the pouch is correctly positioned within the cubby to allow proper grasping, when the grasper has grasped the pouch, when the flaps of the pouch are moving along with the arms, when the flaps are between the lower and upper clamps and can be grasped by the peeler, when the flaps are securely grasped, etc.

Materials which come into contact with ingredients do not necessarily need to be disposed of or cleaned after a single use. In particular, in a system in which a limited number of ingredients (bread and cheese) comes into contact with the materials, and particularly if such materials become heated to a sterilizing temperature or can otherwise be sterilized, then such materials may be used multiple times.

In some embodiments in which a pouch is vacuum packed, it may be pierced, peeled, or otherwise opened by a small amount (e.g., near its top) before being peeled opened, to reduce pouch distortion and/or to allow the venting of gasses during heating of the ingredient therein.

In lieu of tensioning the pouch (e.g., using grippers as shown), the pouch flaps can become easier to separate/reorient by squeezing the pouch so that the contents (especially if flowable) are not able to distort the pouch as much due to their weight, etc. Squeezing can be performed in the area of the apex or above it.

In lieu of being supported from their top edges when moved (e.g., from storage to dispenser), pouches can be supported from at least one face (e.g., with suction cups), their vertical edges, or their flaps. During dispensing, pouches can be supported from their vertical edges and in some cases from their faces.

In some embodiments a second set of squeegees or rollers near the bottom of the pouch may be provided to serve as a valve, which can increase control over dispensing food items such as those of Type 1.

Dispensers such as those described herein can be configured so that the top of the pouch does not move downward during peeling of the pouch. Rather, the pouch walls are peeled upwards such that the peel front moves upwards as more and more film is peeled. Blades such as those of FIG. 8(k), or peeling rollers, if used, can be allowed to rise as peeling continues. Because the top of the pouch is stationary, it can be held in place for example by being sandwiched between two feed belts. These belts may also hold in place other pouches that are queued up to be dispensed after the current pouch.

Ingredients can be in various formed: raw, cooked, partially-cooked, dehydrated, freeze-dried, etc. If dehydrated or freeze-dried, they can be reconstituted by the addition of water (e.g., hot).

Sensors may be incorporated into systems using to evaluate nutritional content, quality, taste (e.g., sweetness) and other attributes of ingredients, to find contaminants, detect pouch breach, identify spoilage and pathogens, etc. For example, measuring pouch thickness, height, or width can identify pouch inflation due to gasses which may indicate spoilage. Sensing modalities may include spectroscopy (e.g., near infrared spectrometers from Consumer Physics, Herzliya, Israel); X-ray imaging systems; metal detectors; ultrasonic systems; cameras; machine vision systems; weight, volume, and dimensional sensors; mechanical compliance sensors; etc. Ingredient evaluations can be performed as ingredients are introduced into the system, while in storage, just before use, etc.

In some embodiments blades (or peeling rollers) may be moveable with respect to the dispenser. For example, they may be mounted to linear bearings or flexures and urged downwards (e.g., by their own weight), allowing them to move in a way that allows them to press against the film surface and maintain a desired tension on the film as it passes around them. Or, they can be moved by suitable actuators into different positions or orientations to optimize delivery for particular ingredients.

In some embodiments, in lieu of a carousel (e.g. FIGS. 31(a)-(l) of the 074 and 253 filings) holding individual pouches, ingredients may be stored in other ways, including other structures which hold individual pouches, or approaches using pouch chains/multi-compartment pouches (e.g., chains containing multiple ingredients arranged in the order required by a particular recipe).

The appliance shown in FIGS. 31(a)-(l) of the 074 and 253 filings can be provided with a set of pouches arranged linearly, e.g., in a box, such that pouches are selectively accessed by sliding them linearly. In addition to reusable pouches already described, and other reusable containers (e.g., trays with film lids held in place by resealable seals, magnets, etc.), the appliance (and the system of FIGS. 19(a)-(l)) in the 074 and 253 filings) can use pre-loaded pouches with disposable/recyclable film. Such pouches, containing the ingredients for one or more meals, can be grouped/ganged together (e.g., into a box) at least temporarily, to allow them to be loaded (and optionally, unloaded) into the appliance all at once, and also stored in a refrigerator before use. The box can be collapsible, with the pouches remaining inside, for easy return after use.

Sensors may be incorporated into the machine for a variety of purposes. For example, if the flaps of a pouch are not successfully separated/reoriented, this can be detected by flap sensors (e.g., near/within the peeler clamps of FIG. 38(f)). Additional attempts may be made, but if no flaps are detected, the pouch can be released into a waste bin/designated for donation, etc. and the process attempted with another pouch. Sensors in the cubby or grasper (e.g., of FIG. 19(d)) can be used to determine that the pouch is present and positioned correctly. Improper position (e.g., angle) can be corrected for (e.g., by rotating the grasper to better match the angle of the pouch top edge).

Pouches may contain chemicals for self-heating (e.g., as in U.S. Pat. No. 6,289,889) or cooling the ingredients, a process that can be initiated, e.g., by using a roller or clamp to crush a portion of the pouch holding the chemicals or rupture a frangible seal.

Pouches may have flaps that are initially joined together to provide robustness in handling, such as having corner or bottom regions that are sealed, with such regions cut off, or the seal holding them weakened (e.g., if made with a light-degradable adhesive) before the flaps are separated. Flaps may be fully sealed together initially, and forced apart by powerful suction, seal weakening, etc.

Terminology

The term "ingredient" or "ingredients" refers to one or more distinct, edible food items used in the preparation of an item to be consumed, and the term "food product" or "food products" refers to one or more edible food items ready to be consumed. The singular and plural forms of both phrases may be considered interchangeable, and the phrases themselves may not always be strictly applied herein and may be considered at least in some situations to be interchangeable.

The terms "food item" and "substance" are generally used as synonyms for the term "ingredient".

The term "pouch" generally refers to a flexible package comprised of one or more materials in film form such as polymers and/or metals, but may be understood in some cases to refer to other containers, including ones which are more rigid.

The term "vessel" generally refers to a container able to hold ingredients/food products for purposes of storage, processing delivery/presentation/consumption, etc. and may be interchanged in many cases with other containers having similar functionality.

The term "dish" generally refers to a receptacle or vessel for serving or eating or drinking food, such as bowls, plates, cups, mugs, and glasses.

The term "meal" generally refers to one or more food items delivered for consumption, possibly involving processing of various kinds.

"Proximate" or "in proximity to" generally refers to close enough to achieve the required functional purpose, for example, in the context of a dispenser or dispensing system, it refers to a distance comparable to a dimension of a typical pouch and more preferably within a smaller distance.

As used herein, words of approximation such as, without limitation, "about", "substantial" or "substantially" refers to a condition that when so modified is understood to not necessarily be absolute or perfect but would be considered close enough to those of ordinary skill in the art to warrant designating the condition as being present. The extent to which the description may vary will depend on how great a change can be instituted and still have one of ordinary skilled in the art recognize the modified feature as still having the required characteristics and capabilities of the unmodified feature.

General

Figures within this application are not necessarily to scale.

Motions are considered relative. Thus, if object A moves relative to object B which is at rest, the equivalent effect of object B moving relative to object A which is at rest is also contemplated in the disclosure.

It will be understood that particular embodiments described herein are shown by way of illustration and not as limitations of the disclosure. The principal features of this disclosure can be employed in various embodiments without departing from the scope of the disclosure. Those skilled in the art will recognize, or be able to ascertain using no more than routine experimentation, numerous equivalents to the specific procedures described herein. Such equivalents are considered to be within the scope of this disclosure and are covered by the claims.

It is intended that the aspects of the invention set forth herein represent independent invention descriptions which Applicant contemplates as full and complete invention descriptions that Applicant believes may be set forth as independent claims without need of importing additional limitations or elements, from other embodiments or aspects set forth herein, for interpretation or clarification other than when explicitly set forth in such independent claims once written. It is also understood that any variations of the aspects set forth herein represent individual and separate features that may form separate independent claims, be individually added to independent claims, or added as dependent claims to further define an invention being claimed by those respective dependent claims should they be written.

In view of the teachings herein, many further embodiments, alternatives in design and uses of the embodiments of the instant invention will be apparent to those of skill in the art. As such, it is not intended that the invention be limited to the particular illustrative embodiments, alternatives, and uses described above but instead that it be solely limited by the claims presented hereafter.

The invention claimed is:

1. A method of dispensing a substance from a flexible package into a receptacle, comprising:
   (a) providing a flexible package wherein the package comprises at least one flexible film comprising a left portion and a right portion with the left and right portion each having an inside surface and an outside surface with the inside surface of the left and right portion facing each other and wherein the left and right portions have regions that are sealed one to the other with a seal to form at least one closed compartment sealed on all sides and containing the substance and wherein the seal comprises at least one openable seal region and wherein the left portion comprises a moveable left flap below the openable seal region and wherein the right portion comprises a moveable right flap below the openable seal region and wherein at least one area of the left flap does not overlap the right flap and wherein at least one area of the right flap does not overlap the left flap;
   (b) providing an electronic controller and providing a controller-directed mechanical dispenser comprising a plurality of mechanical clamps for gripping the flaps when the package is introduced into the dispenser and wherein at least one of the plurality of clamps is moved by at least one actuator directed by the controller and wherein the plurality of clamps are arranged as a left leading clamp and a left trailing clamp configured and positionable to grip the left flap and a right trailing clamp and a right leading clamp configured and positionable to grip the right flap;
   (c) positioning the left leading clamp and the left trailing clamp to form a left gap between them wherein the left gap allows entry of at least a portion of the at least one area of the left flap to enter the left gap when the package is introduced into the dispenser;
   (d) positioning the right leading clamp and the right trailing clamp to form a right gap between them wherein the right gap allows entry of at least a portion of the at least one area of the right flap to enter the right gap when the package is introduced into the dispenser;
   (e) introducing the package into the dispenser with the left and right flaps at the bottom of the package such that the at least a portion of the at least one area of the left flap enters the left gap and such that the at least a portion of the at least one area of the right flap enters the right gap;
   (f) relatively moving at least one of the left leading clamp and the left trailing clamp toward one another so as to grip the at least a portion of the at least one area of the left flap, but not grip the right flap, between the left leading and left trailing clamp;
   (g) relatively moving at least one of the right leading clamp and the right trailing clamp toward one another so as to grip the at least a portion of the at least one area of the right flap, but not grip the left flap, between the right leading and right trailing clamp;
   (h) moving the left leading clamp and the left trailing clamp such that the left trailing clamp trails the left leading clamp, while the left leading clamp and the left trailing clamp continue to grip the at least a portion of the at least one area of the left flap;
   (i) moving the right leading clamp and the right trailing clamp such that the right trailing clamp trails the right leading clamp, while the right leading clamp and trailing clamp continue to grip the at least a portion of at least one area of the right flap;
   whereby the left and right flaps become separated from another thereby applying tension to the left flap and left portion and to the right flap and right portion thereby at least partially separating the left and right portions and opening the at least one openable seal region thereby opening the package.

2. The method of claim 1 wherein at least one of (1) the left leading clamp and the left trailing clamp moves along a first track, and (2) the right leading clamp and right trailing clamp move along a second track.

3. The method of claim 2 wherein at least one of the first track or the second track comprises at least one curved section.

4. The method of claim 2 comprising the first track and the second track, wherein the first track and the second track are positioned outside the area in which food ingredients may fall when the flexible package is opened so as to avoid contamination of the first track and the second track.

5. The method of claim 1 wherein at least one of the left leading clamp and the left trailing clamp and the right leading clamp and the right trailing clamp comprises a lateral extension.

6. The method of claim 2 wherein at least a portion of the first track and the second track is located lower than the flexible package while the package is within the dispenser.

7. The method of claim 2 comprising the first track and the second track, wherein the first track and the second track are spaced apart and arranged with circular symmetry around a vertical axis.

8. The method of claim 3 wherein the curved section is curved within a vertical plane.

9. The method of claim 2 wherein at least one of the first track and the second track comprises at least one straight section.

* * * * *